United States Patent [19]
Scott

[11] Patent Number: 5,802,046
[45] Date of Patent: Sep. 1, 1998

[54] EFFICIENT TIME DIVISION DUPLEX COMMUNICATION SYSTEM WITH INTERLEAVED FORMAT AND TIMING ADJUSTMENT CONTROL

[75] Inventor: Logan Scott, Breckenridge, Colo.

[73] Assignee: Omnipoint Corporation, Colorado Springs, Colo.

[21] Appl. No.: 465,555

[22] Filed: Jun. 5, 1995

[51] Int. Cl.⁶ ........................................................ H04J 3/16
[52] U.S. Cl. .................... 370/280; 370/329; 370/341; 370/508; 455/34.1
[58] Field of Search ...................... 455/53.1, 54.1, 455/57.1, 34.1; 370/276, 277, 280, 282, 294, 329, 337, 341, 347, 442, 506, 508, 509

[56] References Cited

U.S. PATENT DOCUMENTS

| | | | |
|---|---|---|---|
| 3,795,864 | 3/1974 | Fullton | 325/38 R |
| 3,838,221 | 9/1974 | Schmidt et al. | 179/15 BS |
| 4,189,677 | 2/1980 | Cooper et al. | 325/321 |
| 4,217,563 | 8/1980 | Vale | 330/150 |
| 4,222,115 | 9/1980 | Cooper et al. | 375/200 |
| 4,291,410 | 9/1981 | Caples | 375/345 |
| 4,301,530 | 11/1981 | Gutleber | 370/18 |
| 4,324,001 | 4/1982 | Rhodes . | |
| 4,355,411 | 10/1982 | Reudink et al. | 455/33 |
| 4,418,393 | 11/1983 | Zachiele | 364/724 |
| 4,432,089 | 2/1984 | Wurzburg et al. | 370/110.1 |
| 4,481,640 | 11/1984 | Chow et al. | 375/200 |
| 4,484,028 | 11/1984 | Kelley et al. | 179/2 DP |
| 4,494,211 | 1/1985 | Schwartz | 364/571 |

(List continued on next page.)

FOREIGN PATENT DOCUMENTS

| | | | |
|---|---|---|---|
| 2211053 | 6/1989 | United Kingdom | H04L 9/00 |
| 3984485 | 9/1985 | WIPO | H04B 7/26 |
| 9315573 | 8/1993 | WIPO | H04J 13/00 |
| 9318596 | 9/1993 | WIPO | H04J 3/16 |
| 9318601 | 9/1993 | WIPO | H04L 27/30 |
| 9406217 | 3/1994 | WIPO | H04B 7/005 |
| 9503652 | 2/1995 | WIPO | H04B 7/26 |
| 9512938 | 5/1995 | WIPO | H04J 13/00 |
| 9512943 | 5/1995 | WIPO | H04L 25/02 |

OTHER PUBLICATIONS

Mohsen Kavehrad et al., *Direct Sequence Spread Spectrum with DPSK Modulation and Diversity for Indoor Wireless Communications*, IEEE Transactions oon Communications, Feb. 1987, vol. COM–35, No. 2, pp. 224–226.

J. H. Collins & P.M. Grant, *The Role of Surface Acoustic Wave Technology in Communication Systems*, Ultrasonics, Mar. 1972, vol. 10, No. 2, pp. 59–71.

(List continued on next page.)

*Primary Examiner*—Douglas W. Olms
*Assistant Examiner*—Ricky Q. Ngo
*Attorney, Agent, or Firm*—Lyon & Lyon LLP

[57] ABSTRACT

A system for efficient time division duplex communication between a base station and a plurality of user stations over a single frequency band whereby guard time overhead is reduced through use of an interleaved frame structure and active adjustment of reverse link transmission timing as a function of round trip propagation time. A time frame is divided into a plurality of time slots. The base station transmits a forward link message to a first user station in a first time slot. The user station responds with a reverse link message in the following time slot. In the meantime, the base station receives a reverse link message from a second user station in the first time slot, and sends out another forward link message to a third base station in the first portion of the first time slot. The delay between transmitting the forward and reverse link messages to a particular user station allows for round trip propagation of the forward and reverse link messages. The interleaved frame structure provides for forward and reverse link messages to other user stations while the base station is waiting for a response from the user station, thereby maximizing time efficiency. The base station may, based on a measured propagation delay, command the user station to adjust its reverse link transmission timing so as to allow for reduced guard times.

45 Claims, 33 Drawing Sheets

U.S. PATENT DOCUMENTS

| | | | |
|---|---|---|---|
| 4,506,372 | 3/1985 | Massey | 375/366 |
| 4,525,835 | 7/1985 | Vance et al. | 370/29 |
| 4,587,662 | 5/1986 | Langewellpott | 375/203 |
| 4,612,637 | 9/1986 | Davis et al. | 370/95 |
| 4,621,365 | 11/1986 | Chiu | 375/208 |
| 4,638,494 | 1/1987 | Kartchner et al. | 375/367 |
| 4,641,304 | 2/1987 | Raychaudhuri | 370/95.3 |
| 4,672,658 | 6/1987 | Kavehrad | 379/63 |
| 4,675,863 | 6/1987 | Paneth et al. | 370/50 |
| 4,688,210 | 8/1987 | Eizenhofer et al. | 370/18 |
| 4,696,051 | 9/1987 | Breeden | 455/33 |
| 4,701,904 | 10/1987 | Darcie | 370/3 |
| 4,703,474 | 10/1987 | Foschini et al. | 370/18 |
| 4,724,435 | 2/1988 | Moses et al. | 340/870.13 |
| 4,736,371 | 4/1988 | Tejima et al. | 370/95 |
| 4,742,512 | 5/1988 | Akashi et al. | 370/96 |
| 4,754,453 | 6/1988 | Eizenhofer | 370/95 |
| 4,765,753 | 8/1988 | Schmidt | 379/60 |
| 4,797,947 | 1/1989 | Labedz et al. | 455/33 |
| 4,807,222 | 2/1989 | Amitay | 370/85 |
| 4,817,089 | 3/1989 | Paneth et al. | 370/95 |
| 4,901,307 | 2/1990 | Gilhousen et al. | 370/18 |
| 4,905,221 | 2/1990 | Ichiyoshi | 370/18 |
| 4,912,705 | 3/1990 | Paneth et al. | 370/95.1 |
| 4,953,197 | 8/1990 | Kaewell | 379/58 |
| 4,979,170 | 12/1990 | Gilhousen et al. | 370/104.1 |
| 4,984,247 | 1/1991 | Kaufmann et al. | 375/200 |
| 4,995,083 | 2/1991 | Baker et al. | 380/23 |
| 5,016,255 | 5/1991 | Dixon et al. | 375/208 |
| 5,018,165 | 5/1991 | Sohner et al. | 375/200 |
| 5,022,024 | 6/1991 | Paneth et al. | 370/50 |
| 5,022,046 | 6/1991 | Morrow | 375/200 |
| 5,022,047 | 6/1991 | Dixon et al. | 375/208 |
| 5,025,452 | 6/1991 | Sohner et al. | 375/200 |
| 5,029,184 | 7/1991 | Andren et al. | 375/203 |
| 5,042,050 | 8/1991 | Owen | 375/206 |
| 5,042,082 | 8/1991 | Dahlin | 455/33 |
| 5,056,109 | 10/1991 | Gilhousen et al. | 375/205 |
| 5,073,900 | 12/1991 | Mallinkdrodt | 375/205 |
| 5,093,840 | 3/1992 | Schilling | 375/200 |
| 5,097,484 | 3/1992 | Akaiwa | 375/269 |
| 5,101,501 | 3/1992 | Gilhousen et al. | 455/33 |
| 5,103,459 | 4/1992 | Gilhousen et al. | 375/205 |
| 5,107,225 | 4/1992 | Wheatley et al. | 330/279 |
| 5,109,390 | 4/1992 | Gilhousen et al. | 370/95.1 |
| 5,109,393 | 4/1992 | Saegusa | 375/108 |
| 5,111,535 | 5/1992 | Tokunaga | 455/33.2 |
| 5,117,423 | 5/1992 | Shepherd et al. | 370/95.1 |
| 5,119,375 | 6/1992 | Paneth et al. | 370/95.1 |
| 5,121,391 | 6/1992 | Paneth et al. | 370/95.1 |
| 5,166,929 | 11/1992 | Lo | 370/85.3 |
| 5,170,412 | 12/1992 | Massey | 375/206 |
| 5,177,765 | 1/1993 | Holland et al. | 375/368 |
| 5,177,766 | 1/1993 | Holland et al. | 375/206 |
| 5,200,956 | 4/1993 | Pudney et al. | 370/95.1 |
| 5,210,771 | 5/1993 | Schaeffer et al. | 375/202 |
| 5,257,283 | 10/1993 | Gilhousen et al. | 375/200 |
| 5,263,045 | 11/1993 | Schilling | 375/200 |
| 5,263,047 | 11/1993 | Kotzin et al. | 375/202 |
| 5,265,119 | 11/1993 | Gilhousen et al. | 375/205 |
| 5,267,262 | 11/1993 | Wheatley | 375/200 |
| 5,274,665 | 12/1993 | Schilling | 375/200 |
| 5,278,835 | 1/1994 | Ito et al. | 370/95.3 |
| 5,289,497 | 2/1994 | Jacobson et al. | 375/200 |
| 5,291,516 | 3/1994 | Dixon et al. | 375/200 |
| 5,299,198 | 3/1994 | Kay et al. | 370/95.3 |
| 5,303,287 | 4/1994 | Laborde | 379/59 |
| 5,313,457 | 5/1994 | Hostetter et al. | 370/18 |
| 5,353,303 | 10/1994 | Walthall | 375/200 |
| 5,355,368 | 10/1994 | Dore et al. | 370/95.3 |
| 5,363,373 | 11/1994 | Nakahara et al. | 370/95.1 |
| 5,383,219 | 1/1995 | Wheatley et al. | 375/205 |
| 5,398,247 | 3/1995 | Delprat et al. | 370/95.1 |
| 5,402,413 | 3/1995 | Dixon et al. | 370/18 |
| 5,410,568 | 4/1995 | Schilling | 375/205 |
| 5,414,796 | 5/1995 | Jacobs et al. | 395/2.3 |
| 5,420,851 | 5/1995 | Seshadri et al. | 370/29 |
| 5,430,760 | 7/1995 | Dent | 375/200 |
| 5,434,859 | 7/1995 | Levardon | 370/84 |
| 5,444,696 | 8/1995 | Petranovich | 370/17 |
| 5,446,727 | 8/1995 | Bruckert et al. | 370/18 |
| 5,454,028 | 9/1995 | Hara et al. | 379/61 |
| 5,481,533 | 1/1996 | Honig et al. | 370/18 |
| 5,483,676 | 1/1996 | Mahany et al. | 455/67.4 |
| 5,506,837 | 4/1996 | Söllner et al. | 370/31 |
| 5,517,681 | 5/1996 | Talarmo | 455/54.1 |
| 5,528,597 | 6/1996 | Gerszberg et al. | 370/95.3 |

OTHER PUBLICATIONS

Sust, M. K. and M. Kowatsch, *All Digital Signal Processing In A Spread Spectrum Communication System*, Proceedings of Melecon '87, Mar. 24–26, 1987, pp. 157–161.

GSM Specification 05.10, Oct. 1992.

Marvin, N. Cohen, Marshall R. Fox, and J. Michael Baden, *Minimum Peak Sidelobe Pulse Compression Codes*, IEEE International Radar Conference, 1990, pp. 633–638.

Colin K. Campbell, *Applications of Surface Acoustics and Shallow Bulk Acoustic Wave Devices*, Proceedings of the IEEE, Oct. 1989, pp. 1453–1484.

Dixon, Robert C., *Spread Spectrum Systems with Commercial Applications* (J. Wiley & Sons, 3d ed. 1994).

ETSI, ETR 015, Mar. 1991.

Ritter, Gerhard, *Response to Proposal for FQPSK Modulation in DCS 1900*, Joint Technical Committee Standardisation of the PCS Air Interface, Feb. 7, 1994.

Omnipoint Corporation Voice Comments on Winforum Spectrum Etiquette Dated: Aug. 28, 1993.

In the Matter of: Amendment of the Commission's Rules to Establish New Personal Communications Services Comments.

In the Matter of: Request of Omnipoint Communications, Inc. For a Pioneer's Preference in the Licensing Process for Personal Communications Services Request for a Pioneer's Preference Dated: May 4, 1992.

Joint Technical Committee on Wireless Access (JTC) Omnipoint Candidate Air Interface Solution Date: Nov. 1, 1993.

Joint Technical Committee on Wireless Acess—JTC(Air) *Standards Contribution (Air Interface Standards Project)* Date: Mar. 21, 1994.

Joint Technical Committee on Wireless Access—JTC(Air) *Draft PCS2000 Standard (PN–3390)* Date: Sep. 23, 1994.

Omnipoint Corporation—PCS2000—A Composite *CDMA/TDMA Air Interface Compatibility Standard For Personal Communication in 1.8–2.2 GHz For Licensed And Unlicensed Applications*.

European digital cellular telecommunications system (phase 1); Mobile Station –Base Station System (MS–BSS) interface data link layer specification, I–ETS 300 021, May 1992.

European digital cellular telecommunications system (phase 1); MS–BSS Layer 1—General Requirements, I–ETS 300 078, May 1992.

In the Matter of: Amendment of the Commissions' Rules to Establish New Personal Communications Services—*Adelphia Comm. Corp.—Satcom, Inc.* Dated: Jun. 25, 1992.

Hagon, P.J. et al., *A Programmable Surface Acoustic Wave Matched Filter for Phase–Coded Spread Spectrum Waveforms*, IEEE Transactions on Microwave Theory and Techniques, 21(4):303–306, Apr. 1973.

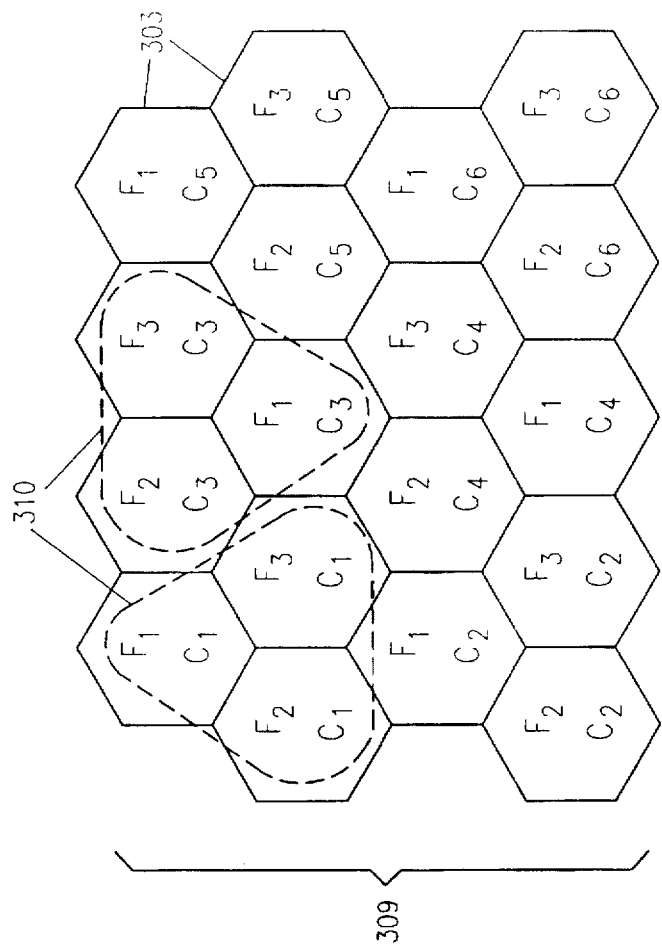
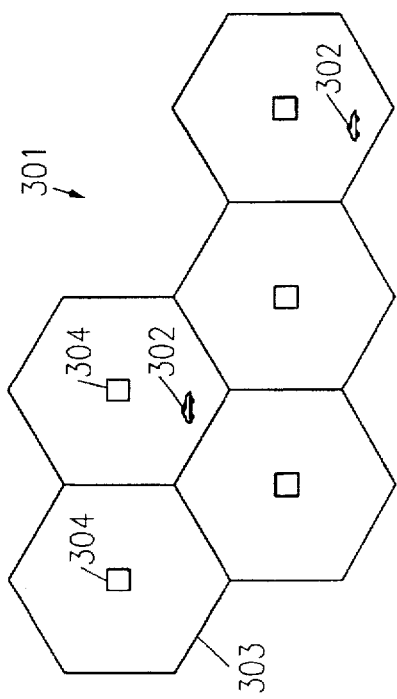
FIG. 3B
FIG. 3A

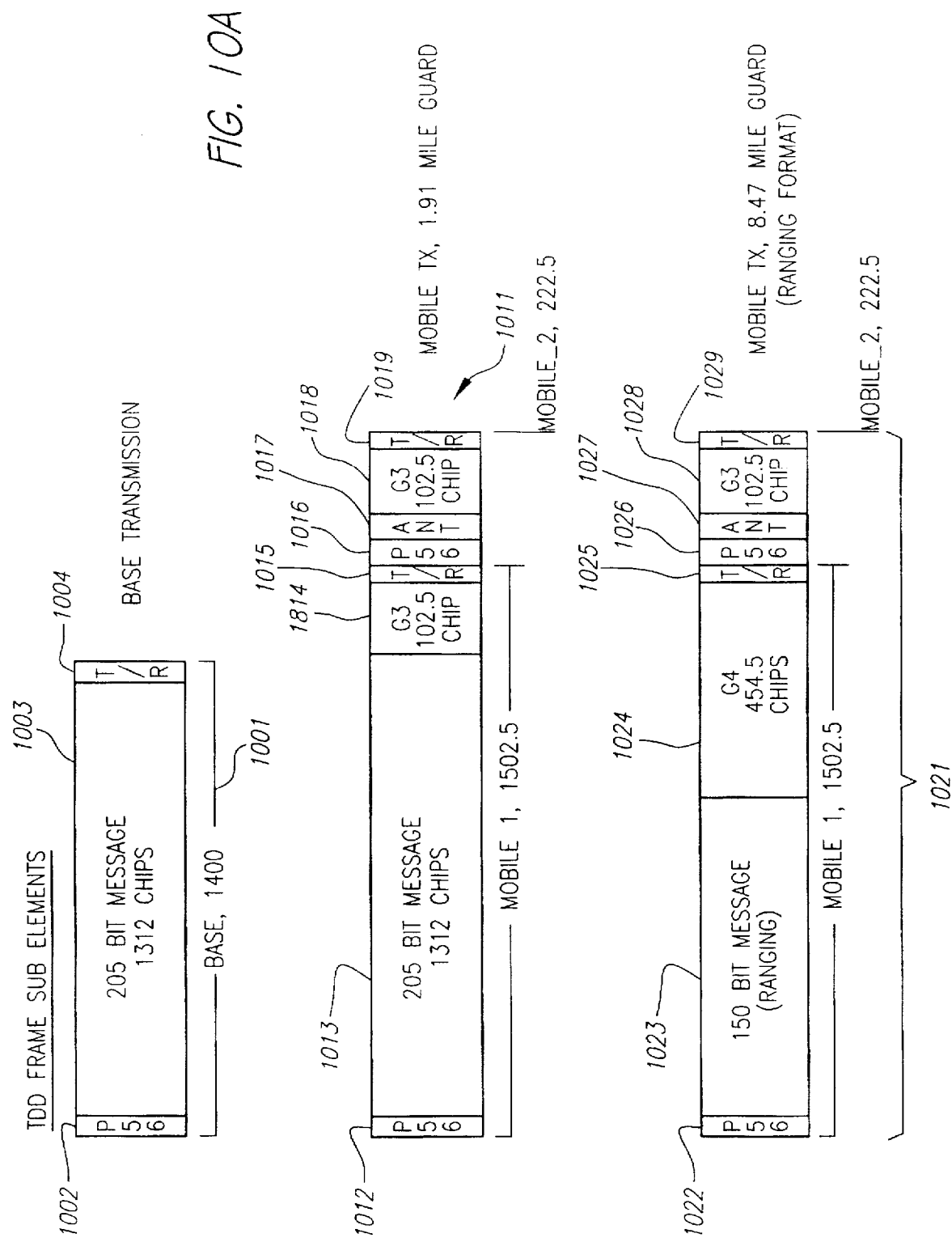

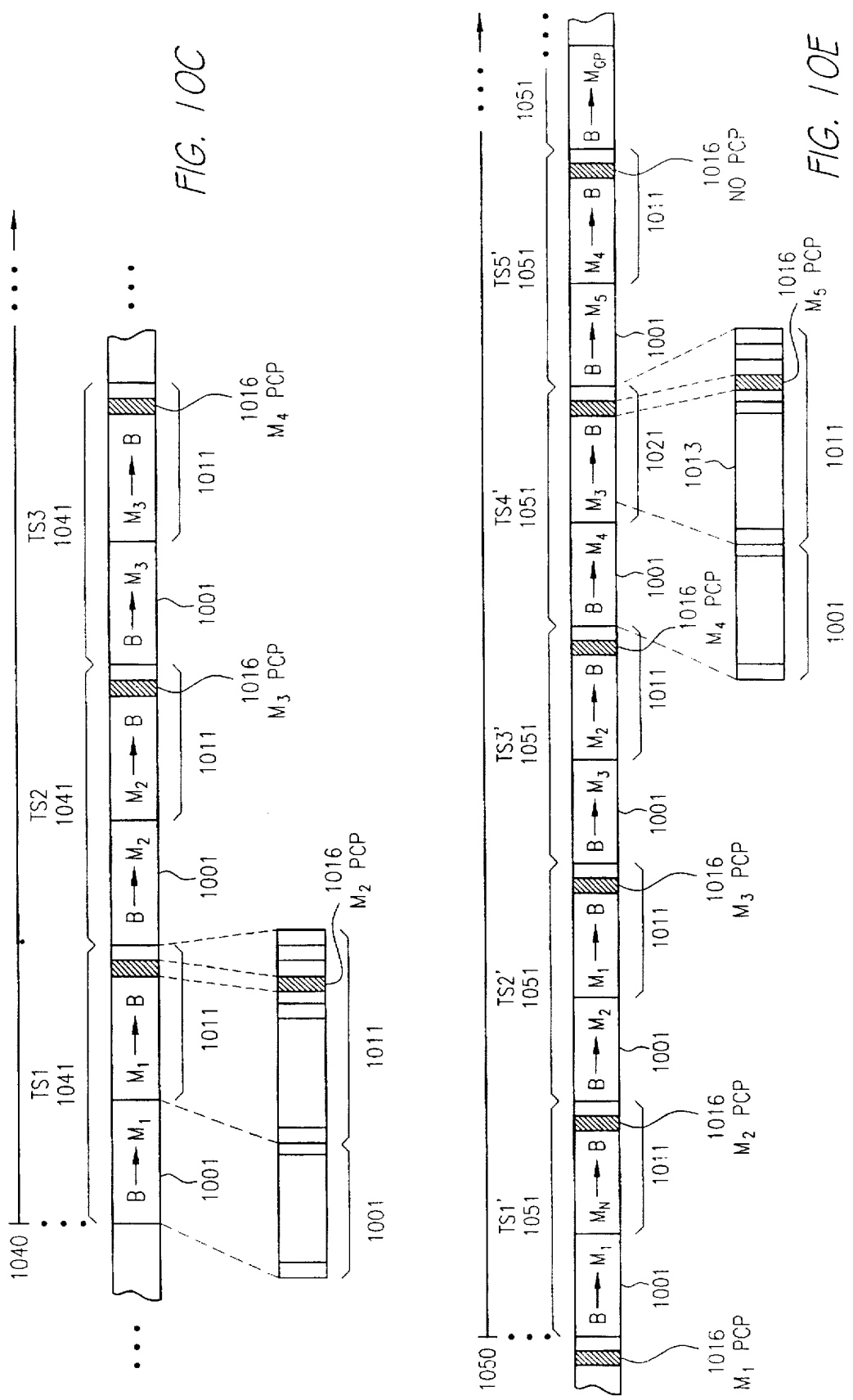

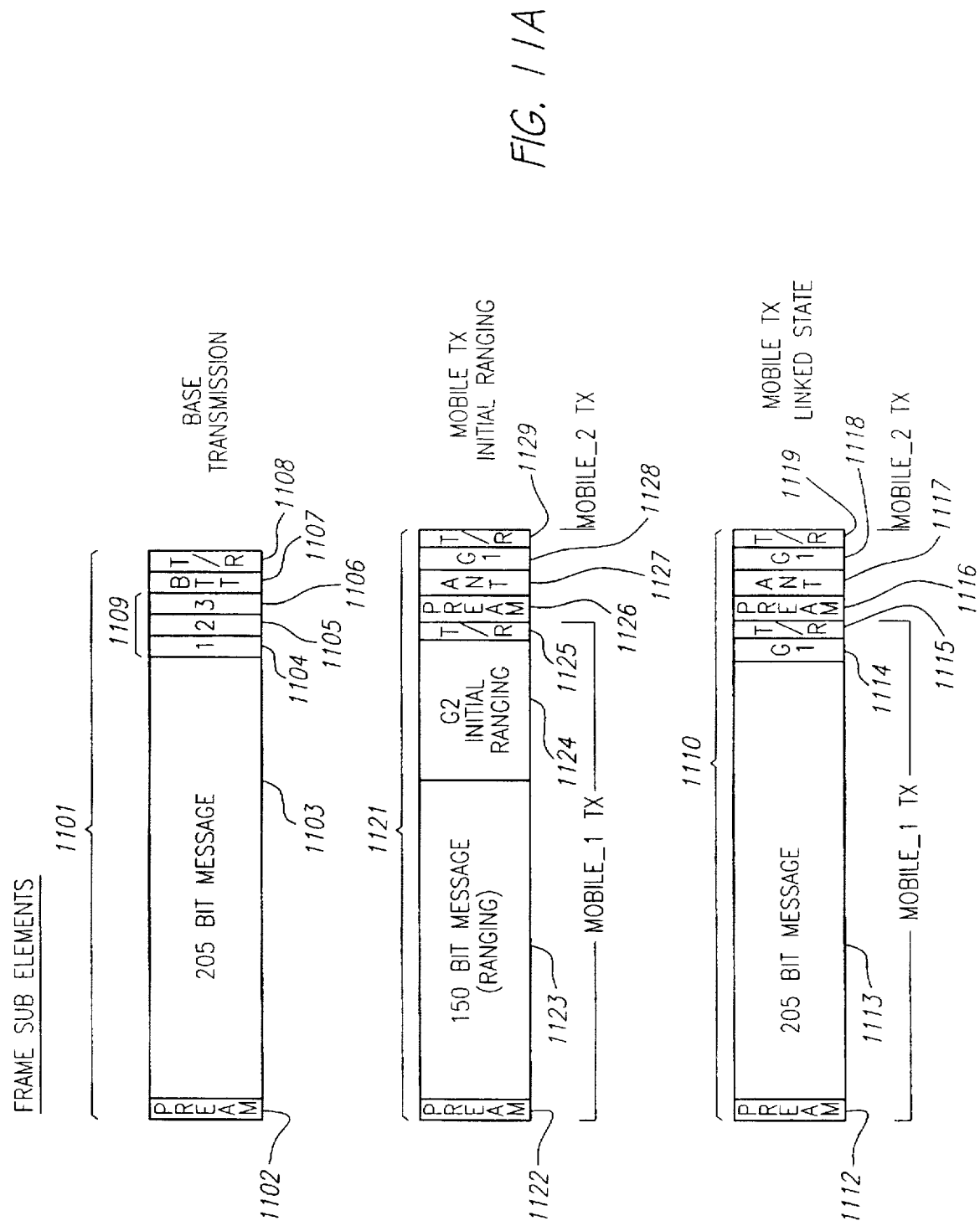

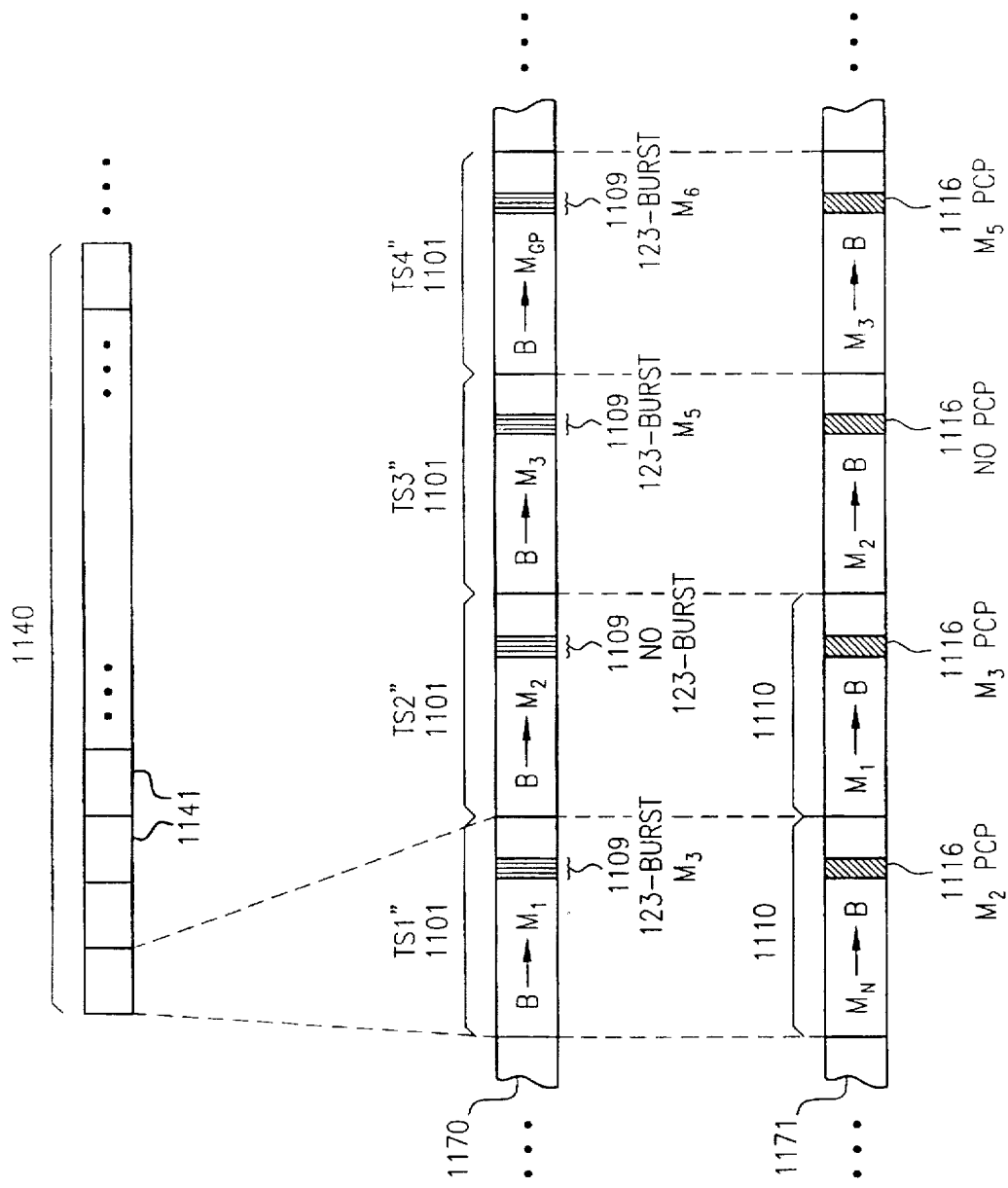
FIG. 11B ZERO OFFSET FRAME FORMAT

21 BIT HEADER BIT UTILIZATION

TABLE 12A-1

BASE POLLING

REFERENCE 3.1.2.14.1
PAGE 47

| | |
|---|---|
| TOTAL BITS | 21 |
| FIELD | |
| B/H | 1 |
| E | 1 |
| G/S | 1 |
| P/N | 1 |
| SA | 1 |
| PWR | 3 |
| CU | 2 |
| OPP. LINK QUAL. | 2 |
| TIMING COMMAND | 3 |
| HEADER FCW | 4 |
| BITS USED | 19 |
| SPARES | 2 |

TABLE 12A-2

BASE TRAFFIC 3.1.2.14.2
49

| | |
|---|---|
| TOTAL BITS | 21 |
| FIELD | |
| B/H | 1 |
| E | 1 |
| C/N | 1 |
| P/N | 1 |
| SA | 1 |
| PWR | 3 |
| B/W GRANT | 2 |
| CU | 2 |
| OPP. LINK QUAL. | 2 |
| TIMING COMMAND | 3 |
| HEADER FCW | 4 |
| BITS USED | 21 |
| SPARES | 0 |

21 BIT HEADER BIT UTILIZATION

TABLE 12A-3

MOBLIE STATION POLLING

TOTAL BITS  21

| FIELD | |
|---|---|
| B/H | 1 |
| E | 1 |
| G/S | 1 |
| P/N | 1 |
| SA | 1 |
| PWR | 3 |
| BW REQUEST | 1 |
| CU | X |
| OPP. LINK QUAL. | 2 |
| TIMING COMMAND | X |
| HEADER FCW | 4 |
| BITS USED | 15 |
| SPARES | 6 |

TABLE 12A-4

MOBLIE STATION TRAFFIC

TOTAL BITS  21

| FIELD | |
|---|---|
| B/H | 1 |
| E | 1 |
| S/N | 1 |
| P/N | 1 |
| SA | 1 |
| PWR | 3 |
| B/W GRANT | 1 |
| CU | X |
| OPP. LINK QUAL. | 2 |
| TIMING COMMAND | X |
| HEADER FCW | 4 |
| BITS USED | 15 |
| SPARES | 6 |

FRAME BIT UTILIZATION, GP, SP, GR

TABLE 12B-1

| BASE GENERAL POLL | |
|---|---|
| TOTAL BITS | 205 |
| FIELD | |
| HEADER | 21 |
| SLOT QUALITY | X |
| BASE ID | 32 |
| SERVICE PROVIDER | 16 |
| ZONE | 16 |
| FACILITY | 32 |
| SLOT NUMBER | 6 |
| FRAME FCW | 16 |
| BITS USED | 139 |
| SPARES | 66 |

TABLE 12B-2

| BASE SPECIFIC POLL | |
|---|---|
| TOTAL BITS | 205 |
| FIELD | |
| HEADER | 21 |
| CORRELATIVE ID | 8 |
| RESULT | 8 |
| SLOT QUALITY | X |
| PID | 40 |
| MAP TYPE | 8 |
| MAP | 32 |
| SLOT NUMBER | 6 |
| FRAME FCW | 16 |
| BITS USED | 139 |
| SPARES | 66 |

TABLE 12B-3

| MOBILE STATION GENERAL RESPONSE | |
|---|---|
| TOTAL BITS | 150 |
| FIELD | |
| HEADER | 21 |
| PID | 40 |
| SERVICE PROVIDER | 16 |
| SERVICE REQUEST | 16 |
| 1 MOBILE CAPABILITY | 8 |
| FRAME FCW | 16 |
| BITS USED | 117 |
| SPARES | 33 |

| MOBILE CAPABILITY SUB FIELDS | |
|---|---|
| FIELD | |
| TYPE | 2 |
| HOME BASE SLOT # | 6 |
| SPARES | 0 |

SYMMETRIC FRAME FORMATS

ASYMMETRIC FRAME FORMATS
(TDD, NON-RANGING ONLY)

TABLE 12C-1

| BASE SYMMETRIC BEARER | | |
|---|---|---|
| TOTAL BITS | | 205 |
| FIELD | | |
| HEADER | 21 | |
| D CHANNEL | 8 | |
| B-CHANNEL | 160 | |
| FRAME FCW | 16 | |
| OR | | |
| HEADER | 21 | |
| D CHANNEL | 8 | |
| B-CHANNEL | 176 | |
| FRAME FCW | 0 | |
| BITS USED | | 205 |
| SPARES | | 0 |

TABLE 12C-2

| BASE ASYMMETRIC BEARER | | | | |
|---|---|---|---|---|
| | | BASE | | MOBILE |
| | | | | DOMINANT |
| TOTAL BITS | | 45 | | 365 |
| FIELD | | | | |
| HEADER | | 21 | | 21 |
| D CHANNEL | | 8 | | 8 |
| B-CHANNEL | | 0 | | 320 |
| FRAME FCW | | 16 | | 16 |
| OR | | | | |
| HEADER | | 21 | | 21 |
| D CHANNEL | | 8 | | 8 |
| B-CHANNEL | | 16 | | 336 |
| FRAME FCW | | 0 | | 0 |
| BITS USED | | 45 | | 365 |
| SPARES | | 0 | | 0 |

TABLE 12C-3

| MOBILE STATION SYMMETRIC BEARER | | |
|---|---|---|
| TOTAL BITS | | 205 |
| FIELD | | |
| HEADER | | 21 |
| D CHANNEL | | 8 |
| B-CHANNEL | | 160 |
| FRAME FCW | | 16 |
| OR | | |
| HEADER | | 21 |
| D CHANNEL | | 8 |
| B-CHANNEL | | 176 |
| FRAME FCW | | 0 |
| BITS USED | | 205 |
| SPARES | | 0 |

TABLE 12C-4

| MOBILE STATION ASYMMETRIC BEARER | | |
|---|---|---|
| TOTAL BITS | 365 | 45 |
| FIELD | | |
| HEADER | 21 | 21 |
| D CHANNEL | 8 | 8 |
| B-CHANNEL | 320 | 0 |
| FRAME FCW | 16 | 16 |
| OR | | |
| HEADER | 21 | 21 |
| D CHANNEL | 8 | 8 |
| B-CHANNEL | 336 | 16 |
| FRAME FCW | 0 | 0 |
| BITS USED | 365 | 45 |
| SPARES | 0 | 0 |

| CASE IDENTIFIER | PREAMBLE LENGTH | 99.9% DETECTION THRESHOLD(dBm) | | ANTENNA PROBE LENGTH | 90% DETECTION THRESHOLD(dBm) | |
|---|---|---|---|---|---|---|
| | | NO SIDELOBE | -7 dB PEAK SIDELOBE | | NO SIDELOBE | -7 dB PEAK SIDELOBE |
| HIGH TIER INTERFACES AND ISM INTERFACES | | | | | | |
| 5.00HT | 56 | -100.4 | -96.1 | 28 | -100.6 | -94.8 |
| 2.80HF | 112 | -105.9 | -101.6 | 56 | -106.1 | -100.4 |
| 1.60HF | 84 | -107.1 | -102.8 | 28 | -105.5 | -99.8 |
| 1.40HF | 112 | -108.9 | -104.6 | 28 | -106.1 | -100.4 |
| LOW TIER INTERFACES AND UNLICENSED ISOCHRONOUS INTERFACES | | | | | | |
| 5.00HT | 56 | -100.4 | -96.1 | 28 | -100.6 | -94.8 |
| 0.64LF | 28 | -106.3 | -102.0 | 13 | -106.2 | -100.4 |
| 0.56LF | 28 | -106.9 | -102.6 | 13 | -106.8 | -101.0 |
| 0.35LF | 25 | -108.4 | -104.2 | 11 | -108.1 | -102.3 |

$^1PFA_{1SHOT}=1\%$, NF=4 dB, IMPLEMENTATION LOSS=3 dB, CFAR LOSS=2 dB

AIR INTERFACE SUMMARY[1]

| CASE IDENTIFIER | DUPLEX METHOD | TIME SLOTS | CHIPRATE (MHz) | CHANNELS IN ALLOCATION | SENSITIVITY (dBm) | BASES REQUIRED | |
|---|---|---|---|---|---|---|---|
| | | | | | | $R^2$ PROP | $R^4$ PROP |
| HIGH TIER INTERFACES ($L_{ANT}=2$, $L_{RAKE}=2$, 30 MHz ALLOCATION) | | | | | | | |
| 5.00HT | TDD | 32/25 | 5.00 | 8.0 | −97.1 | 100.00% | 100.00% |
| 2.80HF | FDD | 32 | 2.80 | 7.1 | −99.6 | 55.98% | 74.82% |
| 1.60HF | FDD | 20 | 1.60 | 12.5 | −102.0 | 31.99% | 56.56% |
| 1.40HF | FDD | 16 | 1.40 | 14.3 | −102.6 | 27.99% | 52.91% |
| LOW TIER INTERFACES ($L_{ANT}=3$, $L_{RAKE}=1$, 30 MHz ALLOCATION) | | | | | | $R^2$ PROP | $R^7$ PROP |
| 5.00LT | TDD | 32 | 5.00 | 8.0 | −99.1 | 100.00% | 100.00% |
| 0.64LF | FDD | 40 | 0.64 | 31.3 | −92.9 | 410.20% | 149.67% |
| 0.56LF | FDD | 35 | 0.56 | 35.7 | −93.5 | 358.92% | 144.07% |
| 0.35LF | FDD | 25 | 0.35 | 57.1 | −95.5 | 224.39% | 125.98% |
| UNLICENCED ISOCHRONOUS INTERFACES ($L_{ANT}=3$, $L_{RAKE}=1$, 1.25 MHz MAX CHANNEL BANDWIDTH) | | | | | | $R^2$ PROP | $R^7$ PROP |
| 5.00LT | TDD | 32 | 5.00 | 0.3 | −99.1 | 100.00% | 100.00% |
| 0.64LT | TDD | 20 | 0.64 | 2.6 | −92.9 | 410.20% | 149.67% |
| 0.56LT | TDD | 17 | 0.56 | 3.0 | −93.5 | 358.92% | 144.07% |
| 0.35LT | TDD | 12 | 0.35 | 4.8 | −95.5 | 224.39% | 125.98% |
| ISM AIR INTERFACES ($L_{ANT}=3$, $L_{RAKE}=1$, 83.5 MHz ALLOCATION) | | | | | | $R^2$ PROP | $R^7$ PROP |
| 5.00HT | TDD | 32 | 5.00 | 22.3 | −99.1 | 100.00% | 100.00% |
| 2.80HT | TDD | 16 | 2.80 | 19.9 | −101.6 | 55.98% | 84.72% |
| 1.60HT | TDD | 10 | 1.60 | 34.8 | −104.0 | 31.99% | 72.21% |
| 1.40HT | TDD | 8 | 1.40 | 39.8 | −104.6 | 27.99% | 69.50% |

[1] SENSITIVITY IMPROVEMENTS OF 3 TO 6 dB ARE POSSIBLE IN LOW TIER AND UNLICENCED ISOCHRONOUS AIR INTERFACES.

FIG. 15

DIGITAL RANGE LIMITS FOR PHYSICAL LAYER AIR INTERFACES

| CASE IDENTIFIER | DUPLEX METHOD | CHIPRATE (MHz) | RANGING USED | TIME SLOTS | | | DIGITAL RANGE (MILES) | | |
|---|---|---|---|---|---|---|---|---|---|
| HIGH TIER INTERFACES | | | | | | | | | |
| 5.00HT | TDD | 5.00 | YES | 32 | 32 | 25 | 8.47 | 1.91 | 10.06 |
| 2.80HF | FDD | 2.80 | YES | 32 | 32 | 28 | 13.67 | 1.96 | 6.12 |
| 1.60HF | FDD | 1.60 | YES | 20 | 20 | 16 | 21.66 | 1.16 | 12.81 |
| 1.40HF | FDD | 1.40 | YES | 16 | 16 | 14 | 27.88 | 4.46 | 12.77 |
| LOW TIER INTERFACES | | | | | | | | | |
| 5.00HT | TDD | 5.00 | YES | 32 | 32 | 25 | 8.47 | 1.91 | 10.06 |
| 0.64LF | FDD | 0.64 | YES | 40 | 40 | 32 | 10.77 | 2.77 | 8.59 |
| 0.56LF | FDD | 0.56 | YES | 35 | 35 | 32 | 12.31 | 3.16 | 5.66 |
| 0.35LF | FDD | 0.35 | YES | 25 | 25 | 20 | 15.17 | 0.53 | 9.85 |
| UNLICENSED ISOCHRONOUS INTERFACES | | | | | | | | | |
| 5.00HT | TDD | 5.00 | NO | 32 | 32 | 25 | | 1.91 | 10.06 |
| 0.64LT | TDD | 0.64 | NO | 40 | 40 | 32 | | 2.77 | 8.59 |
| 0.56LT | TDD | 0.56 | NO | 35 | 35 | 32 | | 3.16 | 5.66 |
| 0.35LT | TDD | 0.35 | NO | 25 | 25 | 20 | | 0.53 | 9.85 |
| ISM AIR INTERFACES | | | | | | | | | |
| 5.00HT | TDD | 5.00 | NO | 32 | 32 | 25 | | 1.91 | 10.06 |
| 2.80HT | TDD | 2.80 | NO | 32 | 32 | 28 | | 1.96 | 6.12 |
| 1.60HT | TDD | 1.60 | NO | 20 | 20 | 16 | | 1.16 | 12.81 |
| 1.40HT | TDD | 1.40 | NO | 16 | 16 | 14 | | 4.46 | 12.77 |

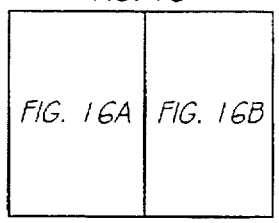

FIG. 16A

FRAME LAYOUT IMPACTS ON RULES FOR NEXT
BASE TRANSMISSION & SLOT AGGREGATION

| DUPLEX METHOD | BASE STATION OPERATING MODE | MOBILE HAS DIPLEXER | FORWARD LINK ANTENNA PROBE SIGNAL EMPLOYED |
|---|---|---|---|
| TDD " " " | RANGING " NON-RANGING " | N/A | NO " " " |
| FDD " " " | RANGING " NON-RANGING " | NO " " " | NO " " " |
| FDD " " " | RANGING " NON-RANGING " | YES " " " | NO " " " |
| FDD " " " | RANGING " NON-RANGING " | NO " " " | YES " " " |
| FDD " " " | RANGING " NON-RANGING " | YES " " " | YES " " " |

NOTE: SLOT NEGOTIATIONS RELATES ONLY TO
GP->SP, SP->SP AND SP->TRAFFIC NEGOTIATIONS
WHEN PCP HANDSHAKE IS INACTIVE.

FIG. 16B

FRAME LAYOUT IMPACTS ON RULES FOR NEXT
BASE TRANSMISSION & SLOT AGGREGATION

| DUPLEX METHOD | BASE STATION OPERATING MODE | MOBILE HAS DIPLEXER | FORWARD LINK ANTENNA PROBE SIGNAL EMPLOYED |
|---|---|---|---|
| TDD " " " | RANGING " NON-RANGING " | N/A | NO " " " |
| FDD " " " | RANGING " NON-RANGING " | NO " " " | NO " " " |
| FDD " " " | RANGING " NON-RANGING " | YES " " " | NO " " " |
| FDD " " " | RANGING " NON-RANGING " | NO " " " | YES " " " |
| FDD " " " | RANGING " NON-RANGING " | YES " " " | YES " " " |

NOTE: SLOT NEGOTIATIONS RELATES ONLY TO
GP->SP, SP->SP AND SP->TRAFFIC NEGOTIATIONS
WHEN PCP HANDSHAKE IS INACTIVE.

LOW TIER SYSTEM[1] – SUMMARIES FOR HANDSETS WITH & WITHOUT ANTENNA SELECTION DIVERSITY

| CASE DESIGNATION | SYMBOL RATE (ksps) | RANGING FORMAT USED | NUMBER OF FULL DUPLEX 8 kbps SLOTS[2] | | | DIGITAL RANGE (MILES) | | | 4DPSK SENSITIVITY (dBm) | | | |
|---|---|---|---|---|---|---|---|---|---|---|---|---|
| | | | | | | | | | NO FADE | $L_{ANT}=1$ | $L_{ANT}=2$ | $L_{ANT}=3$ |

MOBILES HAVE SELECTION DIVERSITY ANTENNA (FORWARD LINK SENDS TWO PREAMBLES, NO PCP)

| 0.350LF_D | 350 | YES | 50 | 50 | 40 | 10.64 | 3.99 | 13.31 | -97.8 | -87.2 | -92.5 | -94.5 |
| 0.280LF_D | 280 | YES | 40 | 50 | 35 | 13.31 | 4.99 | 11.64 | -98.8 | -88.1 | -93.5 | -95.4 |
| 0.224LF_D | 224 | YES | 32 | 32 | 28 | 16.63 | 6.24 | 14.55 | -99.8 | -89.1 | -94.5 | -96.4 |

MOBILES DO NOT HAVE SELECTION DIVERSITY ANTENNA
(FORWARD LINK SENDS THREE ANTENNA PROBES, PCP USED ONCE LINKED)

| 0.350LF_P | 350 | YES | 40 | 40 | 35 | 10.78 | 3.33 | 6.65 | -97.8 | -87.2 | -92.5 | -94.5 |
| 0.280LF_P | 280 | YES | 35 | 35 | 28 | 11.64 | 1.66 | 8.32 | -98.8 | -88.1 | -93.5 | -95.4 |
| 0.224LF_P | 224 | YES | 28 | 28 | 20 | 13.72 | 2.08 | 15.38 | -99.8 | -89.1 | -94.5 | -96.4 |

1: BASED ON 4QAM MODULATION FORMAT.
2: UNLICENSED ISOCHRONOUS TDD MODES HAVE INT(FDD SLOT COUNT/2) FULL DUPLEX TIME SLOTS (ABOUT 1/2 AS MANY).

|  | 2.80Mcp SPREAD SPECTRUM | 1.60Mcp SPREAD SPECTRUM |
|---|---|---|
| MASTER OSC FREQ f0: | 22.4 | 22.4 |
| f0/28: | 0.8 | 0.8 |
| f0/28/4: | 0.2 | 0.2 |
| SECOND LO DIVIDE RATIO: | 462 | 462 |
| SECOND LO FREQ: | 369.6 | 369.6 |
| M: | 2 | 7 |
| M2: | 4 | 2 |
| CHIP RATE: | 2.8 | 1.6 |
| SAMPLE RATE: | 11.2 | 11.2 |
| FS/(IF+Fch): | 2.00 | 3.50 |
| FINAL IF FREQUENCY: | −2.8 | −1.6 |
| SECOND IF FREQUENCY: | 366.8 | 368 |
| INPUT FREQUENCY: | 1850 | 1850 |
| FIRST LO: | 1483.2 | 1482 |
| N: | 7416 | 7410 |
| INPUT FREQUENCY: | 1850.2 | 1850.2 |
| FIRST LO: | 1483.4 | 1482.2 |
| N: | 7417 | 7411 |
| INPUT FREQUENCY: | 1930 | 1930 |
| FIRST LO: | 1563.2 | 1562 |
| N: | 7816 | 7810 |

FIG. 19B2

| 1.40Mcp SPREAD SPECTRUM | 0.70Mcp NARROW-BAND | 0.64Mcp NARROW-BAND | 0.56Mcp NARROW-BAND | 0.35Mcp NARROW-BAND |
|---|---|---|---|---|
| 22.4 | 22.4 | 22.4 | 22.4 | 22.4 |
| 0.8 | 0.8 | 0.8 | 0.8 | 0.8 |
| 0.2 | 0.2 | 0.2 | 0.2 | 0.2 |
| 462 | 462 | 462 | 462 | 462 |
| 369.6 | 369.6 | 369.6 | 369.6 | 369.6 |
| 4 | 8 | 7 | 10 | 16 |
| 4 | 4 | 5 | 4 | 4 |
| 1.4 | 0.7 | 0.64 | 0.56 | 0.35 |
| 5.6 | 2.8 | 3.2 | 2.24 | 1.4 |
| 2.00 | 1.87 | 2.22 | 1.93 | 1.87 |
| −1.4 | −0.8 | −0.8 | −0.6 | −0.4 |
| 368.2 | 368.8 | 368.8 | 369 | 369.2 |
| 1850 | 1850 | 1850 | 1850 | 1850 |
| 1481.8 | 1481.2 | 1481.2 | 1481 | 1480.8 |
| 7409 | 7406 | 7406 | 7405 | 7404 |
| 1850.2 | 1850.2 | 1850.2 | 1850.2 | 1850.2 |
| 1482 | 1481.4 | 1481.4 | 1482.2 | 1481 |
| 7410 | 7407 | 7407 | 7406 | 7405 |
| 1930 | 1930 | 1930 | 1930 | 1930 |
| 1561.8 | 1561.2 | 1561.2 | 1561 | 1560.8 |
| 7809 | 7806 | 7806 | 7805 | 7804 |

EFFICIENT TIME DIVISION DUPLEX COMMUNICATION SYSTEM WITH INTERLEAVED FORMAT AND TIMING ADJUSTMENT CONTROL

BACKGROUND OF THE INVENTION

1. Field of the Invention

The field of the present invention pertains to communications and, more particularly, to an air interface structure and protocol suitable for use in a cellular communication environment.

2. Description of Related Art

A growing demand for flexible, mobile communication has led to development of a variety of techniques for allocating available communication bandwidth among a steadily increasing number of users of cellular services. Two conventional techniques for allocating communication bandwidth between a cellular base station and a set of cellular user stations (also called "mobile stations") are frequency division duplex (FDD) and time division duplex (TDD).

As used herein, FDD refers to a technique for establishing full duplex communications having both forward and reverse links separated in frequency, and TDD refers to a technique for establishing full duplex communications having both forward and reverse links occurring on the same frequency but separated in time to avoid collisions. Other techniques for communication are time division multiple access (TDMA), wherein transmissions by a plurality of users are separated in time to avoid conflicts, frequency division multiple access (FDMA), wherein transmissions by a plurality of users are separated in frequency to avoid conflicts, and time division multiplex (TDM), wherein multiple data streams are time multiplexed together over a single carrier. Various combinations of FDD, TDD, FDMA, and TDMA may also be utilized.

In a particular FDD technique, a base station is allocated a set of frequencies over which it may transmit, using a different frequency slot for each user station, and each user station is allocated a different frequency over which it may transmit to the base station. For each new user in contact with a base station, a new pair of frequencies is required to support the communication link between the base station and the new user station. The number of users that can be supported by a single base station is therefore limited by the number of available frequency slots.

In a particular TDD technique, the same frequency is used for all user stations in communication with a particular base station. Interference between user stations is avoided by requiring that user stations transmit at different times from one another and from the base station. This is accomplished by dividing a time period into a plurality of time frames, and each time frame into a plurality of time slots. Typically, the base station communicates with only one user station during a time slot, and communicates with all the user stations sequentially during different time slots over a single time frame. Thus, the base station communicates with a particular user station once during each time frame.

In one version of the described system, the base station is allocated a first portion of each time slot during which the base station transmits to a particular user station, and the user station is allocated a second portion of the time slot during which the user station responds to the base station. Thus, the base station may transmit to a first user station, await a response, and, after receiving a response from the first user station, transmit to a second user station, and so on, until the base station has communicated with all user stations sequentially over a particular time frame.

Time division duplex has an advantage over FDD and FDMA of requiring use of only a single frequency bandwidth. However, a drawback of many conventional TDD or TDMA systems is that their efficiency suffers as cell size increases. The reduction in efficiency stems from the relatively unpredictable nature of propagation delay times of transmissions from the base station over air channels to the user stations, and from the user stations over air channels back to the base station. Because user stations are often mobile and can move anywhere within the radius of the cell covered by a base station, the base station generally does not know in advance how long the propagation delay will be for communicating with a particular user station. In order to plan for the worst case, conventional TDD systems typically provide a round-trip guard time to ensure that communication will be completed with the first user station before initiating communication with the second user station. Because the round-trip guard time is present in each time slot regardless of how near or far a user station is, the required round-trip guard time can add substantial overhead, particularly in large cells. The extra overhead limits the number of users, and hence the efficiency, of TDD systems.

FIG. 1 is an illustration of the basic round trip timing for a TDD system from a base station perspective. A polling loop 101, or time frame, for a base station is divided into a plurality of time slots 103. Each time slot 103 is used for communication from the base station to a particular user station. Thus, each time slot comprises a base transmission 105, a user transmission 107, and a delay period 106 during which the base transmission 105 propagates to the user station, the user station processes and generates a responsive user transmission 107, and the user transmission 107 propagates to the base station.

If the user station is located right next to the base station, then the base station can expect to hear from the user station immediately after finishing its transmission and switching to a receive mode. As the distance between the user station and the base station grows, the time spent by the base station waiting for a response grows as well. The base station will not hear from the user station immediately but will have to wait for signals to propagate to the user station and back.

As shown in FIG. 1, in a first time slot 110 the user transmission 107 arrives at the base station at a time approximately equidistant between the end of the base transmission 105 and the end of the first time slot 110, indicating that the user station is about half a cell radius from the base station. In a second time slot 111, the user transmission 107 appears very close to the end of the base transmission 105, indicating that the user station is very close to the base station. In a third time slot 112, the user transmission 107 appears at the very end of the time slot 112, indicating that the user station is near or at the cell boundary. Because the third time slot 112 corresponds to a user station at the maximum communication distance for a particular base station, the delay 106 shown in the third time slot 112 represents the maximum round-trip propagation time and, hence, the maximum round-trip guard time.

In addition to propagation delay times, there also may be delays in switching between receive and transmit mode in the user station, base station, or both, which are not depicted in FIG. 1 for simplicity. Typical transmit/receive switching times are about two microseconds, but additional allocations may be made to account for channel ringing effects associated with multipath.

As cell size increases, TDD guard time must increase to account for longer propagation times. In such a case, guard time consumes an increasingly large portion of the available time slot, particularly for shorter round trip frame durations. The percentage increase in time spent for overhead is due to the fact that TDD guard time is a fixed length, determined by cell radius, while the actual round trip frame duration varies according to the distance of the user station. Consequently, as cells get larger, an increasing amount of time is spent on overhead in the form of guard times rather than actual information transfer between user stations and the base station.

One conventional TDD system is the Digital European Cordless Telecommunications (DECT) system developed by the European Telecommunications Standards Institute (ETSI). In the DECT system, a base station transmits a long burst of data segmented into time slots, with each time slot having data associated with a particular user station. After a guard time, user stations respond in a designated group of consecutive time slots, in the same order as the base station sent data to the user stations.

Another system in current use is the Global System for Mobile communications ("GSM"). FIG. 4 illustrates a timing pattern according to certain existing GSM standards. According to these standards, communication between a base station and user stations is divided into eight burst periods 402. Up to eight different user stations can communicate with a base station, one in each burst period 402.

GSM standards require two separate frequency bands. The base station transmits over a first frequency $F_A$, while the user stations transmit over a second frequency $F_B$. After a user station receives a base transmission 405 on the first frequency $F_A$ during a particular burst period 402, the user station shifts in frequency by 45 MHz to the second frequency $F_B$ and transmits a user transmission 406 in response to the base transmission 405 approximately three burst periods 402 later. The three burst period delay is assumed to be large enough to account for propagation time between the base station and the user station.

It is important in the GSM system that the user transmissions 406 received at the base station fit into the appropriate burst periods 402. Otherwise, the user transmissions 406 from user stations using adjacent burst periods 402 could overlap, resulting in poor transmission quality or even loss of communication due to interference between user stations. Accordingly, each burst period 402 is surrounded by a guard times 407 to account for uncertain signal propagation delays between the base station and the user station. By comparing the time of the signal actually received from the user station 302 to the expected receive time, the base station may command the user station to advance or retard its transmission timing in order to fall within the proper burst period 402, a feature known as adaptive frame alignment. A specification relating to adaptive frame alignment for the GSM system is TS GSM 05.10.

A drawback of the described GSM system is that it requires two separate frequency bands. It also has a relatively rigid structure, which may limit its flexibility or adaptability to certain cellular environments.

Another system in presence use is known as Wide Area Coverage System (WACS), a narrowband system employing aspects of both FDMA and TDMA. Under WACS, as in GSM, two distinct frequency bands are used. One frequency band is used for user station transmissions, and the other frequency band is used for base station transmissions. The user station transmissions are offset by one-half of a time slot from the corresponding base station transmissions, in order to allow for propagation time between the base station and the user station. Standard WACS does not support spread spectrum communication (a known type of communication wherein the bandwidth of the transmitted signal exceeds the bandwidth of the data to be transmitted), and has an overall structure that may be characterized as relatively rigid.

In a number of systems, the channel structure is such that a user station may have to transmit a response to a base station while receiving information on another channel. The capability for simultaneous transmission and reception generally requires the use of a diplexer, which is a relatively expensive component for a mobile handset.

It would be advantageous to provide a flexible system having the benefits of time division duplex communication, particularly in large cells, but without having an overhead of a full round-trip guard time in every time slot. It would further be advantageous to provide such a system requiring only a single frequency band for communication. It would further be advantageous to provide a TDMA or combination TDMA/FDMA system wherein user stations are not required to be fitted with a diplexer. It would further be advantageous to provide a time frame structure readily adaptable to single or multiple frequency bands, and for use in either a variety of communication environments.

SUMMARY OF THE INVENTION

The present invention in one aspect provides an efficient means for carrying out time division multiplexed communication, particularly in large cell environments.

In one embodiment, in a first portion of a time frame, a base station issues consecutive base transmissions directed to each of the communicating user stations. A single collective guard time is allocated while the base station awaits a response from the first user station. The user stations then respond, one by one, in allocated time slots on the same frequency as the base station, with only minimal guard times between each reception. In order to prevent interference among the user transmissions, the base station commands the user stations to advance or retard their transmission timing.

To initiate communication between a base station and a user station, each base transmission may have a header indicating whether or not the slot pair is unoccupied. If a slot pair is free, the user station responds with a brief message in its designated portion of the slot pair. The user portion of the slot pair includes a full round-trip guard time allowance to account for the uncertain distance between the base station and the user station upon initial communication. The base station compares the actual time of receiving the user transmission with the expected time of reception, and determines how far away the user station is. In subsequent time frames, the base station may command the user station to advance or retard its timing as necessary so that full information messages may thereafter be sent without interference among user stations.

In another aspect of the invention, base transmissions are alternated with user transmissions over the same frequency band. The base station and user stations may precede their main data transmissions with a preamble, such as, for example, where desired for synchronization of spread spectrum communication signals or for conducting power control. The preamble may be transmitted at a designated time interval between two data transmissions. The base station may command the user station to advance or retard its timing based on a calculated round-trip propagation time.

In other embodiments of the invention, multiple frequency bands are utilized. For example, one frequency band may be used for base station transmissions, and another frequency band may be used for user station transmissions. Reverse-link user station transmissions are offset from the base station transmissions by a predetermined amount. A base station and user stations may transmit a preamble prior to a time slot designated for a main data transmission, and may interleave the preamble in a designated time interval between two time other time slots. The preamble may consist of multiple bursts, one burst from each a different antenna, to allow channel sounding at the target. The base station may command the user station to advance or retard its timing based on a calculation of round-trip propagation delay time.

In another aspect of the present invention, a universal frame structure is provided for use in a TDMA or TDMA/FDMA system. A suitable frame structure employing ranging capability may be constructed from timing elements which may include provision for data transmissions, preambles, guard times, and the like. A frame structure may be constructed suitable for operation in various embodiments in either a high tier or a low tier environment, by selecting an appropriate combination of the generic timing elements.

A dual-mode base station structure is also provided capable of multiple frequency band operation. The base station takes advantage of a low IF digital correlator design.

Further variations, adaptations, details and refinements of the embodiments generally described above are also disclosed in herein.

BRIEF DESCRIPTION OF THE DRAWINGS

The various objects, features and advantages of the present invention may be better understood by examining the Detailed Description of the Preferred Embodiments found below, together with the appended figures, wherein:

FIGS. 3A and 3B are diagrams of cellular environments for communication.

FIG. 10A is a diagram of timing sub-elements in accordance with another embodiment of the present invention, and FIGS. 10B through 10E are diagrams of time frame structures expressed in terms of the timing sub-elements of FIG. 10A.

FIG. 11A is a diagram of timing sub-elements in accordance with another embodiment of the present invention, and FIGS. 11B through 11D are diagrams of time frame structures expressed in terms of the timing sub-elements of FIG. 10A.

FIGS. 12A–C are tables of a preferred message formats for base station and user station transmissions.

FIG. 13 preamble performance.

FIGS. 14–17 are charts comparing various performance aspects of high tier and low tier air interfaces incorporating selected features of the embodiments described herein.

DETAILED DESCRIPTION OF THE PREFERRED EMBODIMENTS

Figure 1:
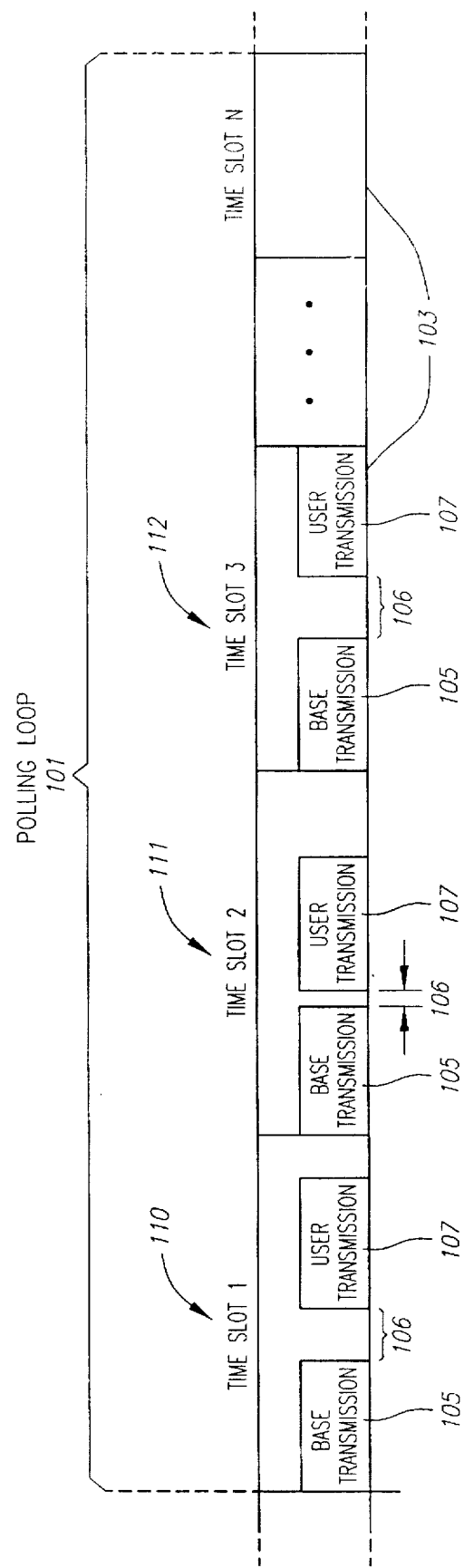
FIG. 1 is an illustration of the basic round trip timing for a prior art TDD system, from a base station perspective.

This disclosure is supplemented by a Technical Appendix described in more detail herein, setting forth illustrative high tier and low tier air interface specifications.

The present invention provides in one aspect an efficient means for carrying out time division duplex communication, and is well suited for a large cell environment. Embodiments of the invention may take advantage of spread spectrum communication techniques, such as, for example, code division multiple access (CDMA) techniques in which communication signals are encoded using a pseudo-random coding sequence, or may be used in conjunction with frequency division multiple access (FDMA) techniques in which communication signals are multiplexed over different frequencies, or may be used in conjunction with a combination of CDMA, FDMA or other communication techniques.

FIG. 3A is a diagram of a cellular environment for a communication system having base stations and user stations.

In FIG. 3A, a communication system 301 for communication among a plurality of user stations 302 includes a plurality of cells 303, each with a base station 304, typically located at the center of the cell 303. Each station (both the base stations 304 and the user stations 302) generally comprises a receiver and a transmitter. The user stations 302 and base stations 304 may communicate using time division duplex or any of the other communication techniques disclosed herein.

FIG. 3B is a diagram of a cellular environment in which the invention may operate. As shown in FIG. 3B, a geographical region 309 is divided into a plurality of cells 303. Associated with each cell 303 is an assigned frequency F1, F2 or F3 and an assigned spread spectrum code or code set C1 through C7. In order to minimize interference between adjacent cells 303, in a preferred embodiment three different frequencies F1, F2 and F3 are assigned in such a manner that no two adjacent cells 303 have the same assigned frequency F1, F2 or F3.

To further reduce the possibility of intercell interference, different orthogonal spread spectrum codes or code sets C1 through C7 are assigned as shown in adjacent clusters 310. Although seven spread spectrum codes or code sets C1 through C7, which are convenient to form a 7-cell repeated pattern, are shown in FIG. 3B, the number of spread spectrum codes or code sets may vary depending upon the particular application. Further information regarding a particular cellular communication environment may be found in U.S. application Ser. No. 07/682,050 entitled "Three Cell Wireless Communication System" filed on Apr. 8, 1991 in the name of Robert C. Dixon, and in U.S. application Ser. No. 08/284,053 entitled "PCS Pocket Phone/Microcell Communication Over-Air Protocol" filed on Aug. 1, 1994 in the name of Gary B. Anderson et al., each of which is hereby incorporated by reference as if fully set forth herein.

While the use of spread spectrum for carrier modulation is not a requirement for practicing the invention, its use in the cellular environment of FIG. 3B may permit a very efficient frequency reuse factor of N=3 for allocating different carrier frequencies F1, F2 and F3 to adjacent cells 303. Interference between cells 303 using the same carrier frequency F1, F2 or F3 is reduced by the propagation loss due to the distance separating the cells 303 (no two cells 303 using the same frequency F1, F2 or F3 are less than two cells 303 in distance away from one another), and also by the spread spectrum processing gain of cells 103 using the same carrier frequencies F1, F2 or F3. Additional interference isolation is provided through CDMA code separation. TDD or TDMA communication techniques may also be used in conjunction with the cellular architecture of FIG. 3B.

In a preferred embodiment of the invention using time division duplex, the same frequency F1, F2 or F3 is used for all user stations 302 in communication with a particular base station 304. Interference between user stations 302 is avoided by requiring that different user stations 302 do not transmit at the same time, or at the same time as the base station 304. The base station 304 is allocated a first portion of a time slot during which the base station 304 transmits to a particular user station, and each user station 302 is allocated a second portion of the time slot during which it responds. Thus, the base station 304 may transmit to a first user station 302, await a response, and, after receiving a response from the first user station 302, transmit to a second user station 302, and so on.

As noted previously with respect to FIG. 1, the mobility of user stations 302 leads to unpredictability in the propagation delay times of transmissions from the base station 304 over air channels to the user stations 302, and from the user stations 302 over air channels back to the base station 304. Thus, the base station 304 generally does not know in advance how long the propagation delay will be for communicating with a particular user station 302. In order to plan for the worst case, conventional TDD systems provide a round-trip guard time in each time slot to ensure that communication will be completed with the first user station 302 before initiating communication with the second user station 302.

Typical round trip guard times are 6.7 microseconds per kilometer of cell radius; thus, for a cell 303 of 3 kilometer radius, a round trip guard time of 20 microseconds is needed. In conventional systems, the round-trip guard time is applied in each time slot 103 regardless of how near or far a user station 302 is from the base station 304. The required round-trip guard time therefore increases timing overhead and inherently limits the number of users in such conventional TDD systems.

As cell size increases, TDD guard time must increase to account for longer propagation times. The relationship between cell radius and guard time can be established as follows:

TDD Guard Time=2×(Cell Radius)/(Speed of Light)

Figure 2:
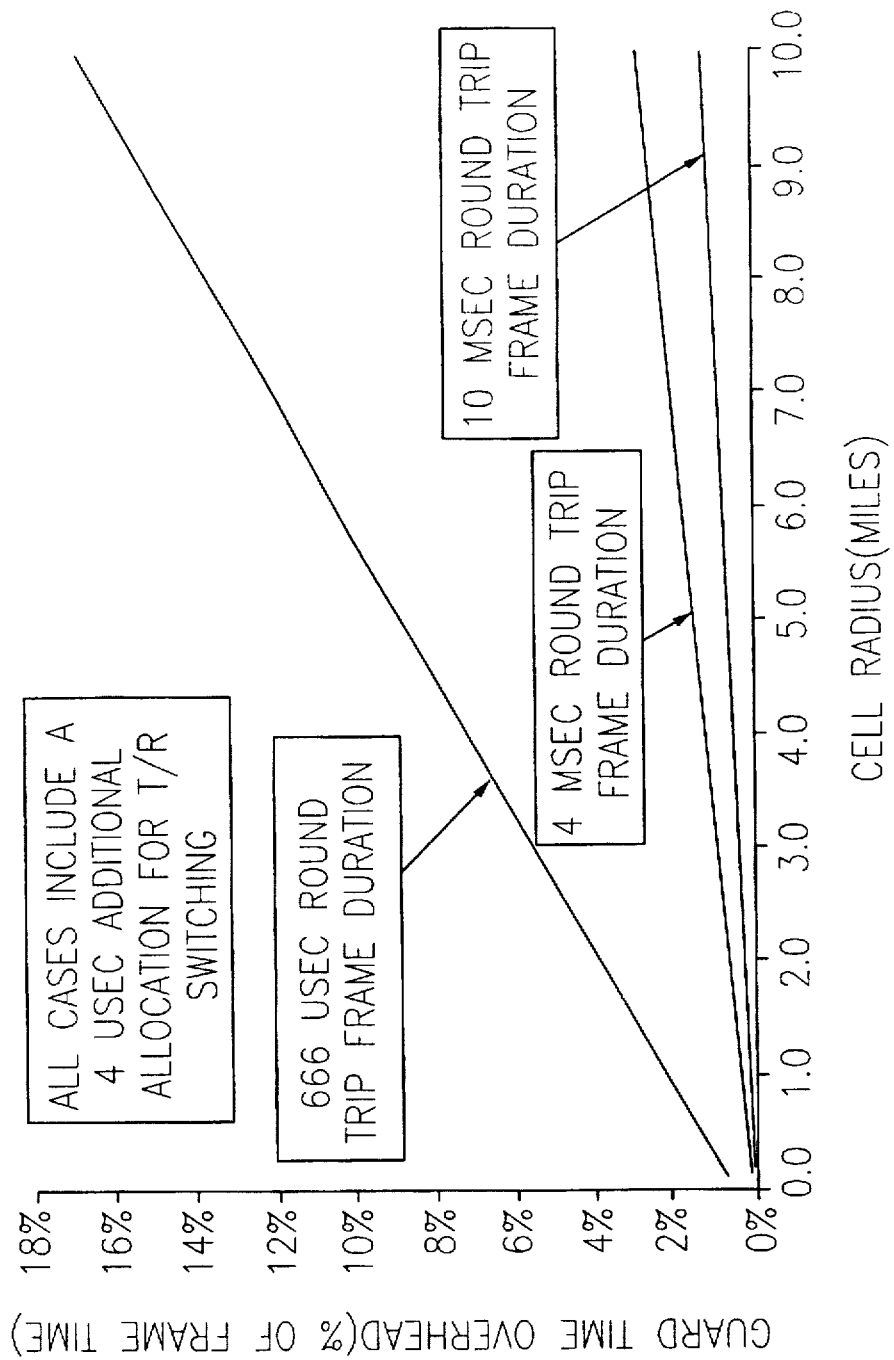
FIG. 2 is a graph of round-trip guard time as a percentage of the actual round trip frame duration in the prior art TDD system of FIG. 1.
Figure 4:
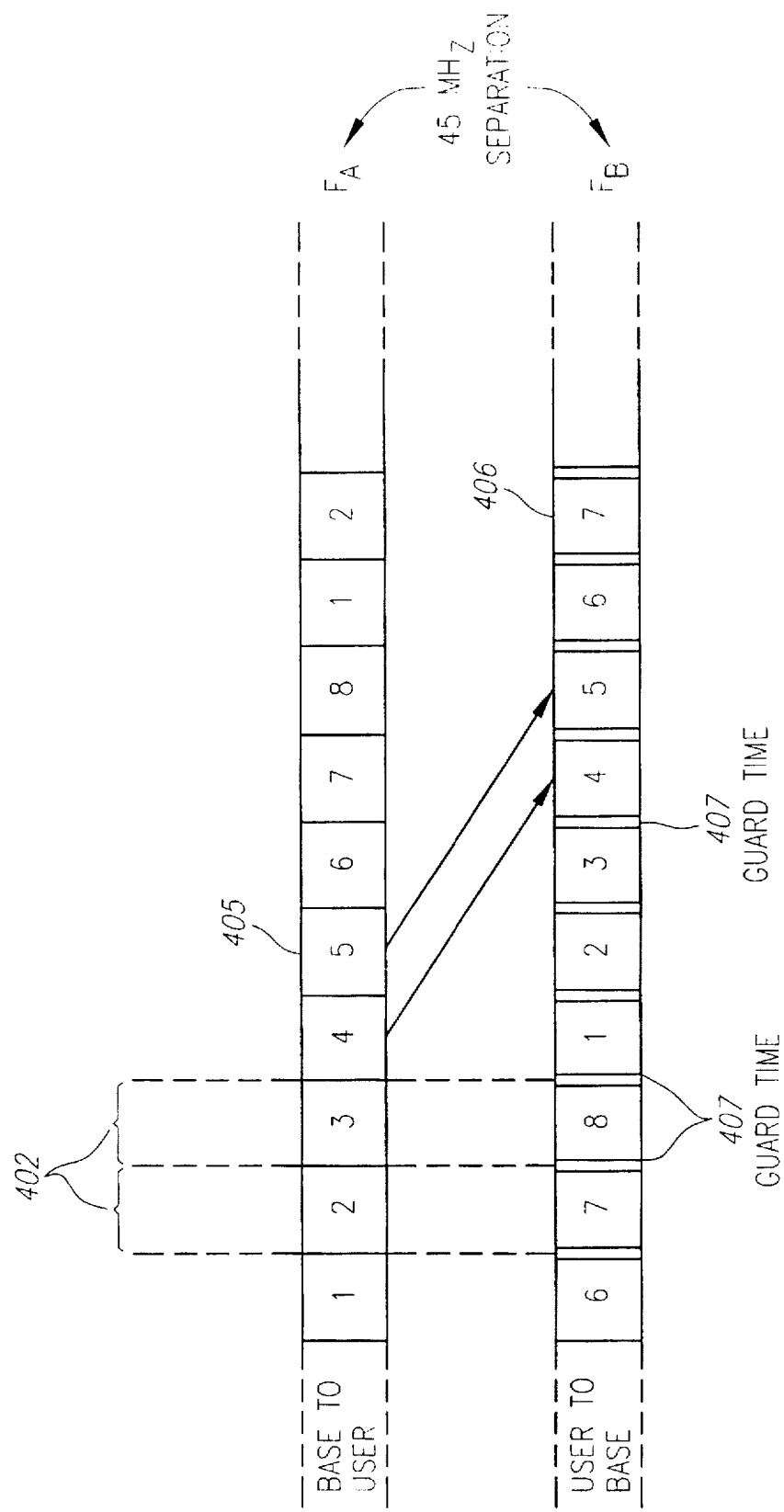
FIG. 4 is an illustration of a timing pattern according to existing GSM standards.

FIG. 2 is a graph of round-trip guard time as a percentage of the actual round trip frame duration (i.e., the amount of time actually necessary for a base transmission 105, a propagation delay time 106, and a user transmission 107) for a conventional TDD system such as depicted in FIG. 1. Four microseconds have been added to account for transmit/receive switching delays. The graph of FIG. 2 illustrates that, because TDD guard time is a fixed length, determined by the cell radius, while actual round trip transmission time varies according to the distance of the user station 302, an increasing amount of time is spent on overhead in the form of guard times rather than actual information transfer between user stations 302 and the base station 304 as cell radius increases. The efficiency of conventional TDD systems, especially those with large cells, therefore suffers as a consequence of round trip guard times.

Figure 5A:
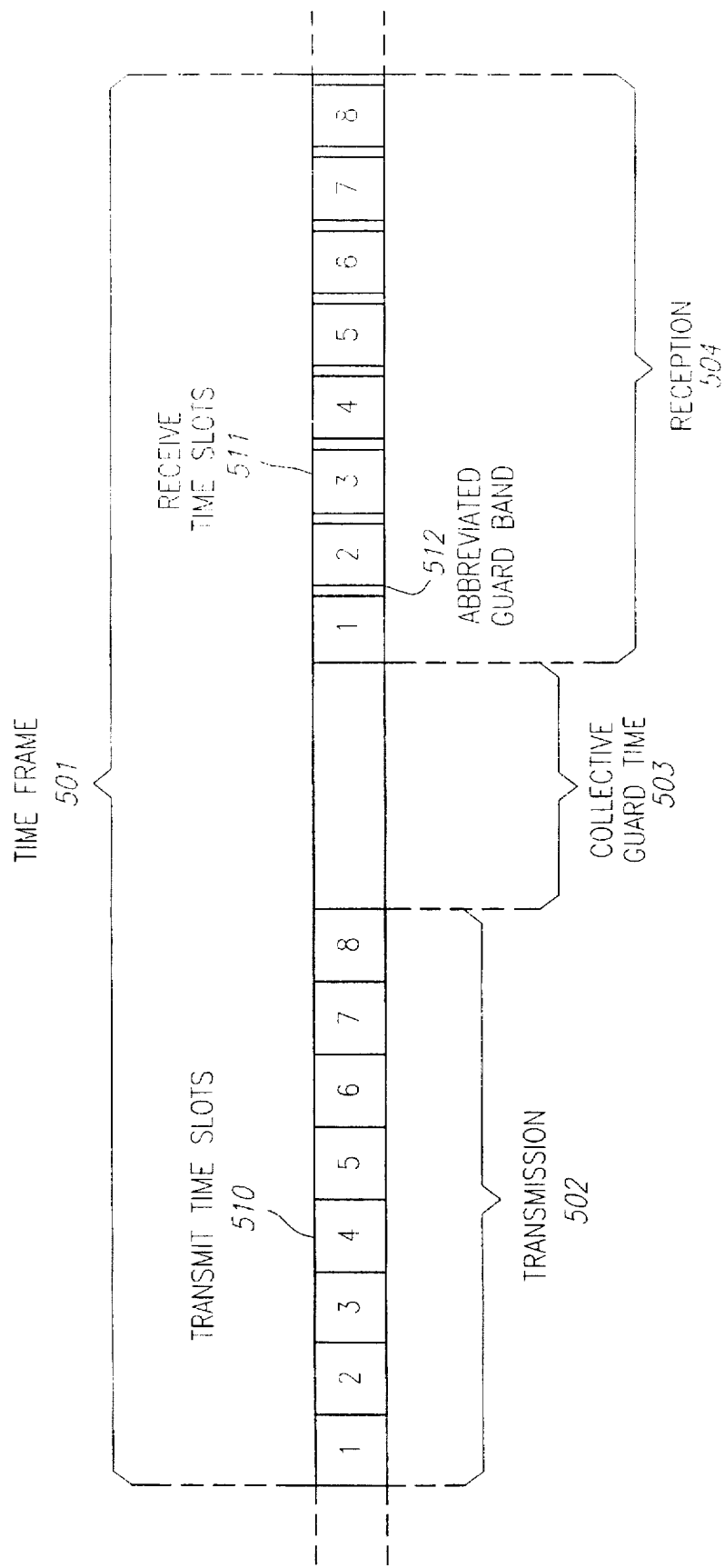
FIG. 5A is an illustration of the basic round trip timing of a TDD/TDM/TDMA system, from a base station perspective, in accordance with one embodiment of the present invention.

FIG. 5A is an illustration of the basic round trip timing of a TDD/TDM/TDMA system, from a base station perspective, for reducing total round trip guard time in accordance with one or more aspects of the present invention.

In the FIG. 5A embodiment, a time frame 501 is divided into a transmission portion 502, a collective guard time portion 503, and a receiving portion 504. The transmission portion 502 comprises a plurality of transmit time slots 510. The receiving portion 504 comprises a plurality of receive time slots 504.

In the transmission portion 502, the base station 304 transmits to a plurality of user stations 302, one in each of the transmit time slots 510 of the transmission portion 502 of the time frame 501. During the collective guard time portion 503, the base station 304 waits for the last base transmission from the last transmit time slot 510 to be received by the appropriate user station 302, and for the first user transmission to arrive from a user station 302. In the receiving portion 504 of the time frame 501, the base station 304 receives user transmissions, one in each receive time slot 511 of the receiving portion 504 of the time frame 501.

A particular transmit time slot 510 and its corresponding receive time slot 511 may be thought of as collectively comprising a duplex time slot analogous to time slots 110, 111 and 112 shown in FIG. 1. Although there are eight time slots 510, 511 shown in FIG. 5A, more than eight or fewer than eight time slots 510, 511 can be used as needed for a particular application.

The base station 304 preferably transmits messages to and receives messages from each of the user stations 302 in a duplex fashion once during each time frame 501. In one embodiment of the invention, the user station 302 receiving a base transmission from the first transmit time slot 510 is the first to send a responsive user transmission in the first receive time slot 511, the user station 302 receiving the base transmission from the second transmit time slot 510 is the second to send a responsive user transmission in the second receive time slot 511, and so on. In this manner, the base station 304 sends a series of consecutive base transmissions, each directed to a separate user station 302, and receives a series of consecutive user transmissions in matching return order.

Although the user stations 302 may respond in the same order as the base transmissions, alternatively the base station may include a command, in a header or otherwise, instructing a particular user station 302 to respond in a different position.

The collective guard time portion 503 of the time frame 501 is essentially a single collective idle time during which the base station 304 awaits a response from the first user station 302. The collective guard time portion 503 is necessary to allow the base transmission in the last transmit time slot 510 to reach the intended user station 302, which could be located at the cell periphery, before the first user station 302 responds. If the first user station 302 were permitted to respond before the expiration of the collective guard time portion 503, then its transmission could interfere with the last base transmission. The collective guard time portion 503 therefore needs to be roughly the same length as the delay 106 shown in the third time slot 112 of FIG. 1, which, as noted, represents the maximum round-trip guard time of the FIG. 1 system. However, unlike the FIG. 1 system, only one maximum round-trip guard time (i.e., the collective guard time portion 503) is needed in the FIG. 5A embodiment.

It should be noted that there are slight delay times, such as with the FIG. 1 system, for the base station 304 and the user stations 302 to switch from a transmit mode to a receive mode, or from a receive mode to a transmit mode. These delays are roughly 2 microseconds for each switching operation. Unlike the conventional FIG. 1 system, wherein the base station needs to switch modes in each time slot 103, the base station 304 in the FIG. 5A embodiment may need to only switch once from transmit to receive mode and back again in a given time frame 501. Also unlike the FIG. 1 system, in which the base station must wait in each time slot 103 for the user station to switch from receive to transmit mode, only the first user station 302 responding in the time frame 501 of the FIG. 5A embodiment potentially adds a receive/transmit switching delay to the system.

In the FIG. 5A embodiment, the timing structure is preferably organized such that user-to-base messages from the user stations 302 arriving at the base station 304 during the receiving portion 504 do not overlap. If each user station 302 were to begin reverse link transmissions at a fixed offset from the time of forward link data reception according to its time slot number, overlapping messages and resulting interference would occasionally be seen by the base station 304. To prevent such interference of incoming user transmissions, each user station 302 biases its transmission start timing as a function its own two-way propagation time to the base station 304, as further explained below. Reverse link messages thus arrive in the receiving portion 504 of the time frame 501 at the base station 304 in sequence and without overlap. In order to allow for timing errors and channel ringing, abbreviated guard bands 512 are provided between each pair of receive time slots 511. These abbreviated guard bands 512 are significantly shorter than the maximum round trip guard time 106 as described with respect to FIG. 1.

To bias its transmission start timing, in a preferred embodiment the base station 304 is provided with means for determining round trip propagation delay to each user station 302. A round trip timing (RTT) measurement is preferably accomplished as a cooperative effort between the base station 304 and the user station 302 and therefore comprises a communication transaction between the base station 304 and the user station 302. An RTT transaction may be done upon initial establishment of communication between a base station 304 and a user station 302, and periodically thereafter as necessary. The measured round-trip time from the RTT transaction may also be averaged over time.

In an RTT transaction, the base station 304 sends an RTT command message instructing the user station 302 to return a short RTT reply message a predetermined delay period ΔT after reception. The predetermined delay period AT may be sent as part of the RTT command message, or may be pre-programmed as a system parameter. The base station 304 measures the time at which it receives the RTT reply message. The base station 304 then computes the propagation delay to the user station 302 based on the time of sending the RTT command message, the predetermined delay period AT, and the time of receiving the short RTT reply message.

Once the base station 304 has computed the propagation delay to the user station 302, the base station 304 then sends a bias time message to the user station 302 either informing the user station 302 of the propagation delay measured in the RTT transaction, or providing a specific timing adjustment command. The user station 302 thereafter times its transmissions based on the information contained in the bias time message. Once timing has been established in such a manner, the base station 304 may periodically command the user station 302 to advance or retard its transmission timing to keep reverse link TDMA time slots aligned. The mechanics of adjusting the timing responsive to the timing adjustment commands may be similar to the techniques conventionally employed in the GSM system generally described elsewhere herein. Timing adjustment command control may be carried out, for example, according to the techniques described in GSM specification TS GSM 05.10, which is incorporated by reference as if set forth fully herein. After a response from the user station 302 is received at the base station 304, the base station 304 may maintain closed loop control over the timing of the user station 302 by adjusting timing of the user station transmission as often as each time frame 501 if necessary.

For precise timing measurements in the RTT transaction, communication between the user station 302 and the base station 304 is preferably carried out using a direct sequence spread spectrum modulation format. Other formats can be used but may result in less accurate RTT measurements, leading to larger allowances needed in the abbreviated guard bands 512 for timing errors in the user station 302 transmissions.

Figure 5B:
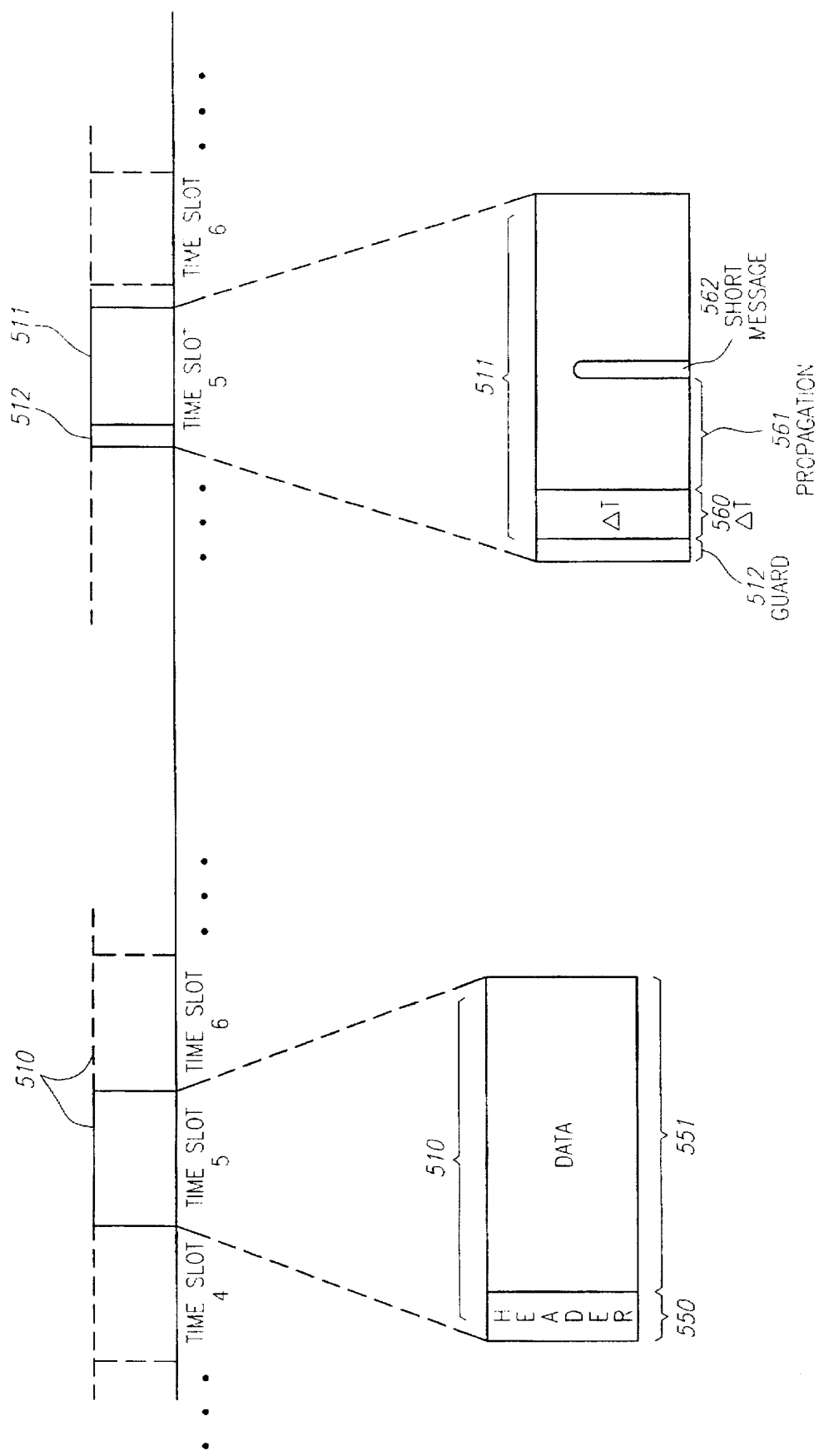
FIG. 5B is a timing diagram showing an initial communication link-up between a base station 304 and a user station 302.

FIG. 5B is a timing diagram showing an example of initial communication link-up between a base station 304 and a user station 302 in accordance with the system of FIG. 5A. To facilitate initial communication between a base station 304 and a user station 302, each base transmission during a transmit time slot 510 may have a brief header 550 preceding a data link message 551 indicating whether or not the particular slot pair 510, 511 is available. If a slot pair 510, 511 is available, a user station 302 desiring to establish communication with the base station 304 responds with a brief reply message 562 in the receive time slot 511 of the slot pair 510, 511. The receive time slot 511 should have a duration of at least a full round-trip guard time, plus the length of a reply message 562, to account for the initial maximum distance uncertainty between the base station 304 and the user station 302 upon initial communication.

The base station 304 compares the actual time of receiving the reply message 562 with the expected time of reception, and determines how far away the user station 302 is. In subsequent time frames 501, the base station 304 may command the user station 302 to advance or retard its timing as necessary so that full length information messages may thereafter be sent without interference among user stations 302.

The timing protocol illustrated in FIG. 5B will now be explained in greater detail. A user station 302 desiring to establish communication with a base station 304 listens to the headers 550 transmitted from a base station 304 at the start of each transmit time slot 510. When the user station 302 detects a header 550 containing a status message indicating that the corresponding time slot pair 510, 511 is available or unoccupied, the user station 302 attempts to respond with a reply message. The header 550 may contain bits which define a delay time ΔT and indicate to the responding user station 302 a predetermined delay time before it should transmit in reply. The delay time ΔT may by measured with respect to a variety of references, but is preferably measured relative to the start of the corresponding receive time slot 511. The user station 302 preferably comprises means (such as timers and/or counters) for keeping track of the relative position and timing of the time slots 510 and 511 in order to respond accurately.

In the example of FIG. 5B, the delay time ΔT represents a relative delay time measured from the start of the appropriate receive time slot 511. An exploded view of the receive time slot 511 is shown in FIG. 5B. At the appropriate receive time slot 511, the user station 302 delays for a delay time ΔT before sending a reply message 562. The delay time ΔT may be used by the user station 302 for error processing or other internal housekeeping tasks. As FIG. 5B is illustrated from the perspective of the base station 304 awaiting receipt of the reply message 562, the base station 304 will perceive a propagation delay 561 from the time the user station 302 transmits the reply message 362 until the time of actual receipt of the reply message 362. By measuring the difference in time between the end of the delay time ΔT and the start of the reply message 562, the base station 304 may ascertain the propagation delay 561.

The reply message 562 may therefore serve the function of the RTT reply message described earlier, in that the base station 304 ascertains the proper timing for the user station 302 by measuring the propagation delay 561 in receiving the reply message 562.

Once the propagation delay 561 has been determined, the base station 304 can command the user station 302 to advance or retard its timing by a desired amount. For example, the base station 304 in the exemplary FIG. 5B system may command the user station 302 to advance its timing by an amount of time equal to the propagation delay time 561, so that the user station 302 transmits essentially at the very end of the abbreviated guard band 512. Thus, when the user station 302 is at the maximum range, the timing advance command will be set to zero (not including the delay ΔT, which is implicit in the user station transmissions). Conversely, when the user station 302 is very close to the base station, the timing advance command will be set close to the full guard time provided (i.e., the maximum propagation delay time). The timing advance command may be expressed as a number of bits or chips, so that the user station 302 will respond by advancing or retarding its timing by the number of bits or chips specified. Alternatively, the timing advance command may be expressed as a fractional amount of seconds (e.g., 2 microseconds). As noted, the user station 302 may advance or retard its timing using techniques already developed and conventionally used for the GSM system described earlier, or by any other suitable means.

In one embodiment, the delay time ΔT is preferably set equal to the receive/transmit switching time of the user station 302. Thus, the delay associated with a user station 302 switching from a receive mode to a transmit mode is not included in the RTT measurement. The delay time ΔT should also be selected short enough so that there will be no overlap between the reply message 562 of a particular user station 302 and the user-to-base transmissions in other receive time slots 511.

If two user stations 302 attempting to establish communication transmit in the same receive time slot 511 using short reply messages 562, the reply messages 562 may or may not overlap depending on how far each user station 302 is positioned from the base station 304. In some situations the simultaneous reply messages 562 will cause jamming. Should the base station 304 receive two reply messages 562 in the same receive time slot 511, the base station 304 may select the user station 302 with the stronger signal for communication.

Alternatively, the base station 304 may initiate a backoff procedure or otherwise resolve the conflict as appropriate for the particular application. For example, the base station 304 may issue a backoff command which causes each user station 302 to back off for a variable period based on an internal programming parameter unique to each user station 302 (e.g., such as a unique user identification number). As another alternative, if the base station 304 can discriminate between the two reply messages 562, then the base station 304 may instruct one or both user stations 302 to relocate to a different slot pair 510, 511.

The system of FIGS. 5A-5B thus depicts in one aspect a combined TDD/TDM/TDMA message structure that adjusts reverse link transmission timing so that user-to-base messages transmitted from user stations 302 arrive at the base station 304 sequentially and do not overlap. The base station 304, using a TDM technique, transmits during the transmission portion 502 of a time frame 501 a single, long burst of data comprising a plurality of base-to-user messages, one base-to-user message per transmit time slot 510. After the transmission portion 502, the base station 304 switches to a receive mode. Each user station 302 extracts from the long base station burst the particular data that is intended for it. Reverse link transmissions are not allowed to commence until all user stations 302 have had a chance to receive their forward link data. The user stations 302 then respond, one by one, in allocated receive time slots 511 on the same frequency as used by the base station 304, with only minimal guard times 512 between each reception. In order to prevent interference among the user transmissions, the base station 304 commands the user stations 302 to advance or retard their transmission timing as necessary.

Figure 6:
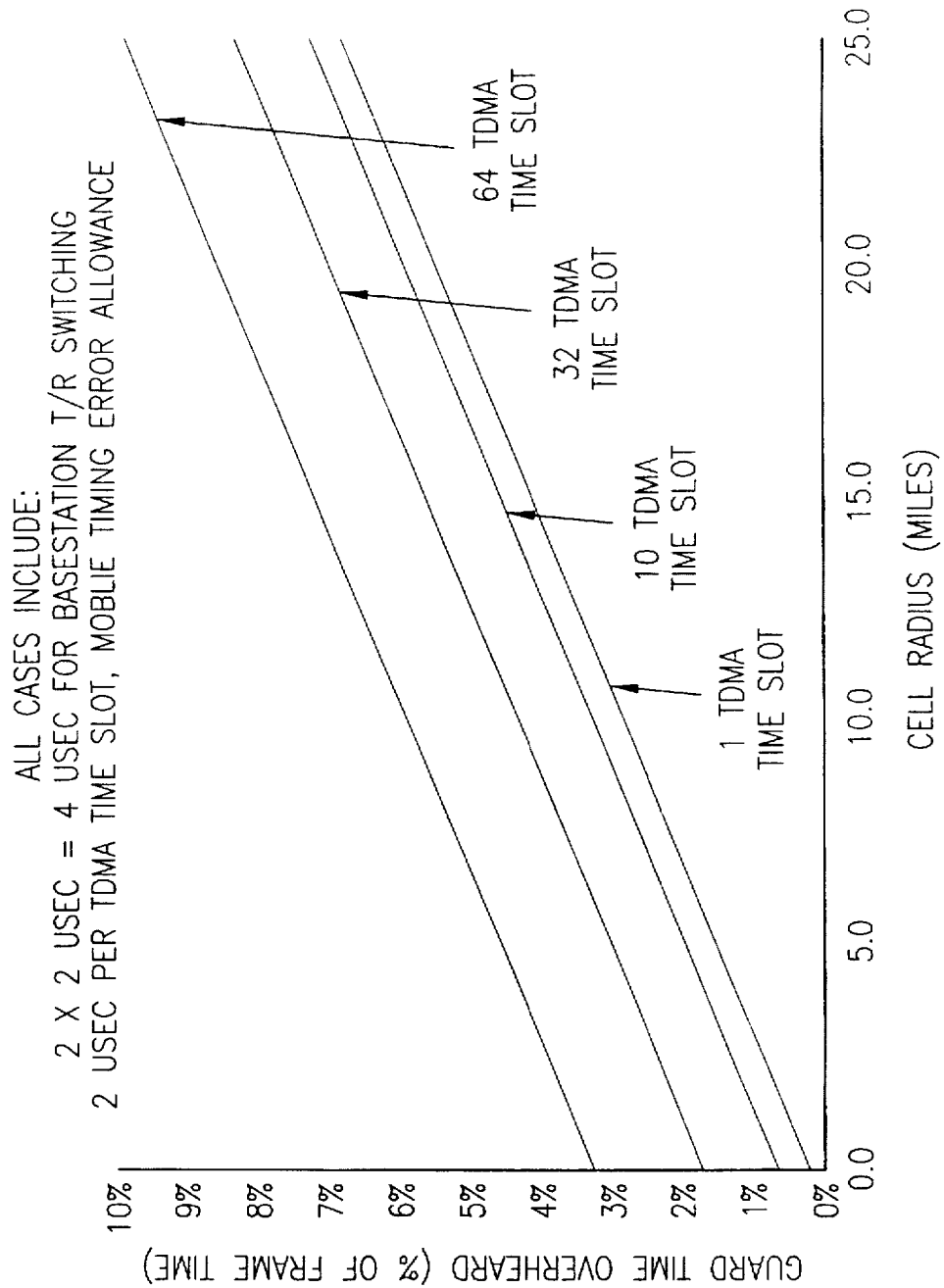
FIG. 6 is a graph of round-trip guard time as a percentage of the actual round trip frame duration in the embodiment of FIG. 5A.

FIG. 6 is a graph of total round trip guard time (i.e., the collective guard portion 503 plus abbreviated guard bands 512 and transmit/receive switching delays) as a percentage of frame time for the system of FIGS. 5A-5B. Four microseconds has been added to account for transmit/receive switching delays, and it is assumed that reverse link TDMA time slots are separated by 2 microseconds to allow for timing errors. A time frame 501 having a duration of 4 milliseconds is selected for the example of FIG. 6. The graph of FIG. 6 illustrates that relatively modest overhead requirements are possible even with cell diameters approaching 25 miles. The graph of FIG. 6 also shows that, as the number of time slots increases, more total time per time frame 501 is allocated for user station timing errors, but that total overhead is nevertheless held to less than 10% for a 25 mile radius cell.

Figure 7:
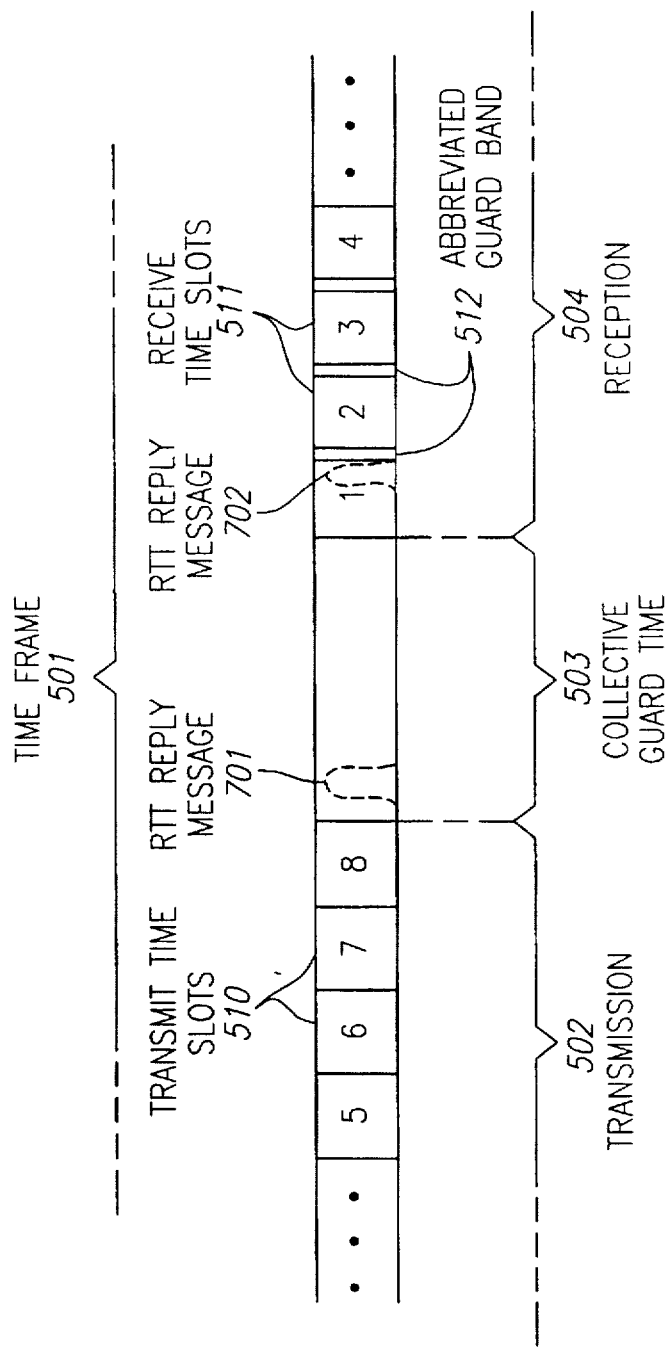
FIG. 7 is an illustration of an alternative timing protocol for reducing total round trip guard time.

FIG. 7 is an illustration of a TDD/TDM/TDMA timing structure having an alternative initial timing protocol for reducing total round trip guard time. Like FIGS. 5A–5B, the TDM aspect of FIG. 7 relates to the base transmissions, while the TDMA aspect relates to the user transmissions.

The FIG. 7 embodiment uses the collective guard portion 503 (as previously shown in FIG. 5A) for initial establishment of communication and RTT measurement. The approach of FIG. 7 contrasts with the approach described with respect to FIG. 5B, wherein each of the receive time slots 511, as noted, are preferably of a duration no less than the maximum round-trip guard time (plus reply message length) due to the initial round trip timing uncertainty. In a FIG. 5B system wherein the time frame 501 comprises many receive time slots 511 of relatively short duration, then, for very large cells, the initial round trip timing uncertainty may cover several receive time slots 511. In such a case, attempts to send a reply message 562 during initial link-up by one user station 302 could interfere with the data link transmissions from other user stations 302, leading to interference or overlapping messages received by the base station 304 during the receive time slots 511.

In order to prevent such a situation, each of the receive time slots in the FIG. 5B system should, as noted, be of a duration no less than the sum of the maximum round-trip guard time plus the duration of a reply message 562. The maximum round trip propagation time therefore places a maximum limit on the number of time slots (and hence users) in the FIG. 5B system.

The FIG. 7 system resolves this same problem by using a designated portion of the time frame 501 for initial establishment of communication. In the system of FIG. 7, in order to prevent the possibility of RTT reply message overlap or interference yet provide the capability of handling more time slots (particularly in larger cells), initial communication link-up (including RTT transactions) are conducted during the idle time of the collective guard portion 503 between the end of transmission portion 502 of the time frame 501 up to and, if necessary, including the first receive time slot 511 of the receiving portion 504 of the time frame 501. The collective guard portion 503 is thereby utilized in the FIG. 7 system for conducting RTT measurements and to assist in establishing an initial communication link between the base station 304 and a new user station 302.

In the FIG. 7 system, a transmission time slot 510 may comprise a header, similar to the header 550 shown in FIG. 5B. The header may indicate whether a particular time slot pair 510, 511 is free. If a time slot pair 510 is free, a user station 302 desiring to establish communication responds with a message indicating the desired time slot of communication. If no header is used, the user station 302 responds with a general request for access, and the base station 304 may in the following time frame 501 instruct the user station 302 to use a particular time slot pair 510, 511 for communication. The general request for access by the user station 302 may comprise a user station identifier, to allow the base station 304 to specifically address the user station 302 requesting access.

The header 550 in the FIG. 7 system may include a command indicating a delay time ΔT after which a user station 302 desiring to establish communication may respond. Alternatively, such a delay time ΔT may be preprogrammed as a system parameter, such that the user station 302 delays its response until the delay time ΔT elapses. After detecting the end of the base transmission 502 and waiting for the delay time ΔT to elapse, the user station 302 transmits an RTT reply message 701 or 702.

If the user station 302 is very close to the base station 304, then the RTT reply message 701 will appear to the base station 304 immediately after the end of the base transmission 502, and presumably within the collective guard portion 503.

If the user station 302 is near the cell periphery, then the RTT reply message 702 will appear to the base station 304 either towards the end of the collective guard portion 503 or within the first receive time slot 511 of the receiving portion 504 of the time frame 501, depending on the particular system definition and timing. The first receive time slot 511 available for established data link communication is the first receive time slot 511 designated after the maximum round-trip propagation delay (including message length) of a reply message from a user station 302 at the maximum cell periphery. Some guard time allowance may also be added to ensure that reply messages from more distant user stations 302 will not interfere with the reverse data link transmissions from user stations 302 in established communication.

In an embodiment wherein the headers 550 contain information as to the availability of time slot pairs 510, 511, the RTT reply message 701 or 702 may contain a time slot identifier indicating which available time slot the user station 302 desires to use for communication. The user station 302 may also determine time slot availability by monitoring the base transmission 502 and/or user transmissions 504 for a period of time, and thus transmit a RTT reply message 701 or 702 containing a time slot identifier indicating which available time slot pair 510, 511 the user station 302 desires to use for communication. In response, during the first transmit time slot 510 of the transmission portion 502, the base station 304 may issue a command approving the user station 302 to use the requested time slot pair 510, 511 for communication, instructing the user station 302 to use a different time slot pair 510, 511 for communication, or informing the user station 302 that the base station 304 is busy.

If no headers are used, or if the user station 302 does not have specific information as to the availability of time slot pairs 510, 511, the user station 302 may still transmit an RTT reply message 701 or 702 as a general request for access. In response, during the first transmit time slot 510 of the transmission portion 502, the base station 304 may issue a command instructing the user station 302 to use a specific time slot pair 510, 511 for communication, or informing the user station 302 that the base station 304 is busy. The general request for access by the user station 302 may comprise a user station identifier, to allow the base station 304 to specifically address the user station 302 requesting access.

In one embodiment of the FIG. 7 system, the first receive time slot 511 of the receiving portion 504 is used solely for receiving RTT reply messages 701 or 702 to establish communication, unless all the other time slot pairs 510, 511 are busy, in which case the first receive time slot 511 could be used for data link communication. In the latter case, if another time slot pair 510, 511 becomes available as a result of communication terminating with a different user station 302, the user station 302 occupying the first receive time slot 511 may be transferred to the available receive time slot 511, thus opening up the first receive time slot 511 for access by a new user station 302 seeking to establish communication with the same base station 304.

In the described embodiment, wherein both the collective guard portion 503 and the first receive time slot 511 of the receiving portion 504 are being used to receive RTT reply messages 701 or 702, the combined length of the collective guard time 503 and the first receive time slot 511 should be no less than the sum of the maximum round trip propagation time plus the duration of an RTT reply message 701 or 702.

In a variation of the FIG. 7 embodiment, only the collective guard portion 503 is used for initial communication link-up, and for receiving RTT reply messages 701. The first receive time slot 511 in this embodiment is not used for such a purpose. In this variation, the length of the collective guard portion 503 should be no less than the sum of the maximum round trip propagation time plus the duration of an RTT reply message 701.

After receiving an RTT reply message 701 or 702 at the base station 304, the manner of response of the base station 304 depends on the particular system protocol. As noted, the base station 304 may transmit using headers 550, but need not; the user station 302 may respond with an RTT reply message 701 or 702, with or without a specific time slot request; and the first receive time slot 511 may or may not be used to receive RTT reply messages 701 or 702. The manner of response of the base station 304 therefore depends on the particular structure of the system, and the particular embodiments described herein are not meant to limit the possible base/user station initial communication processes falling within the scope of the invention.

Where the first receive time slot 511 is being used along with the collective guard time 503 to receive RTT reply messages 701, 702, then the base station 304 may respond to an RTT reply message 701 or 702 with an initial communication response message in the first transmit time slot 510 of the transmit portion 502 of the immediately following time frame 501. The base station 304 may utilize a particular transmit time slot 510 (e.g., the first transmit time slot 510) for assisting in the initiation.

If an RTT reply message 701 or 702 identifies a specific time slot pair 510, 511 which the user station 302 desires to use for communication, then the base station 304 may respond to the user station 302 in either the header 550, the data message portion 551, or both, of the designated transmit time slot 510 in the next immediate time frame 510. If two user stations 302 send RTT reply messages 701 or 702 requesting the initiation of communication in the same time slot pair 510, 511, the base station 304 may send a response in the header 550 of the designated transmit time slot 510 selecting one of the two user stations 302 and instructing the other user station 302 to use a different time slot pair 510, 511 or instruct it to backoff for a period of time, and may in the same time frame 501 transmit a data message in the data message portion 551 of the designated transmit time slot 510 intended for the selected user station 302.

If two user stations 302 attempt to access the base station 304 simultaneously (that is, within the same time frame 501), then the base station 304 may select the user station 302 with the stronger signal.

Alternatively, the base station 304 may initiate a backoff procedure or otherwise resolve the conflict as appropriate for the particular application. For example, the base station 304 may issue a backoff command which causes each user station 302 to back off for a variable period based on an internal programming parameter unique to each user station 302 (e.g., such as a unique user identification number).

As another alternative, the base station 304 may instruct one or both user stations 302 to relocate to a different slot pair 510, 511. If the reply messages 701, 702 each contain a different time slot identifier (assuming that the user stations 302 had information as to which time slots were open, such as from the base station headers 550), then the base station 304 could initiate communication simultaneously with both user stations 302 provided the reply messages 701, 702 were not corrupted by mutual interference (which may occur, for example, when the different user stations 302 are the same distance away from the base station 504).

As with the FIG. 5B embodiment, in the FIG. 7 embodiment the RTT reply message 701 or 702 may be used by the base station 304 to ascertain the proper timing for the user station 302 by measuring the propagation delay in receiving the reply message 701 or 702. A user station 302 seeking to establish communication delays for a delay time $\Delta T$ before sending a reply message 701 or 702 after receiving the base transmission 502. The base station 304 determines the propagation delay from the user station 302 to the base station 304 by measuring the round trip propagation delay from the end of the base transmission 502 to the time of actual receipt of the reply message 701 or 702, taking into account the delay time $\Delta T$.

Once the propagation delay time has been determined, the base station 304 can command the user station 302 to advance or retard its timing by a desired amount, relative to the appropriate time slot pair 510, 511 to be used for communication. For example, the base station 304 may command the user station 302 to advance its timing by an amount of time equal to the round trip propagation time, so that the user station 302 transmits essentially at the very end of the abbreviated guard band 512. The user station 302 may, for example, advance or retard its timing using techniques developed and conventionally used in the GSM system described earlier, or by any other suitable means.

The time delay $\Delta T$ in FIG. 7 is preferably set equal to the larger of the transmit/receive switching time of the base station 304 and the receive/transmit switching time of the user station 302. This is to ensure that if the responding user station 302 is located extremely close to the base station 304, the delay of the user station 302 in switching from a receive mode to a transmit mode will not be included in the RTT measurement, and to allow the user station 302 adequate processing time. Once the user station 302 desiring to establish communication has detected the end of the base transmission 502, the user station 302 may commence its reply message 562 immediately after the delay time $\Delta T$ without fear of interference, as it is not physically possible for the reply message 562 to overtake the outward-radiating forward link message so as to cause interference with the forward link reception by other user stations 302.

Figure 8A:
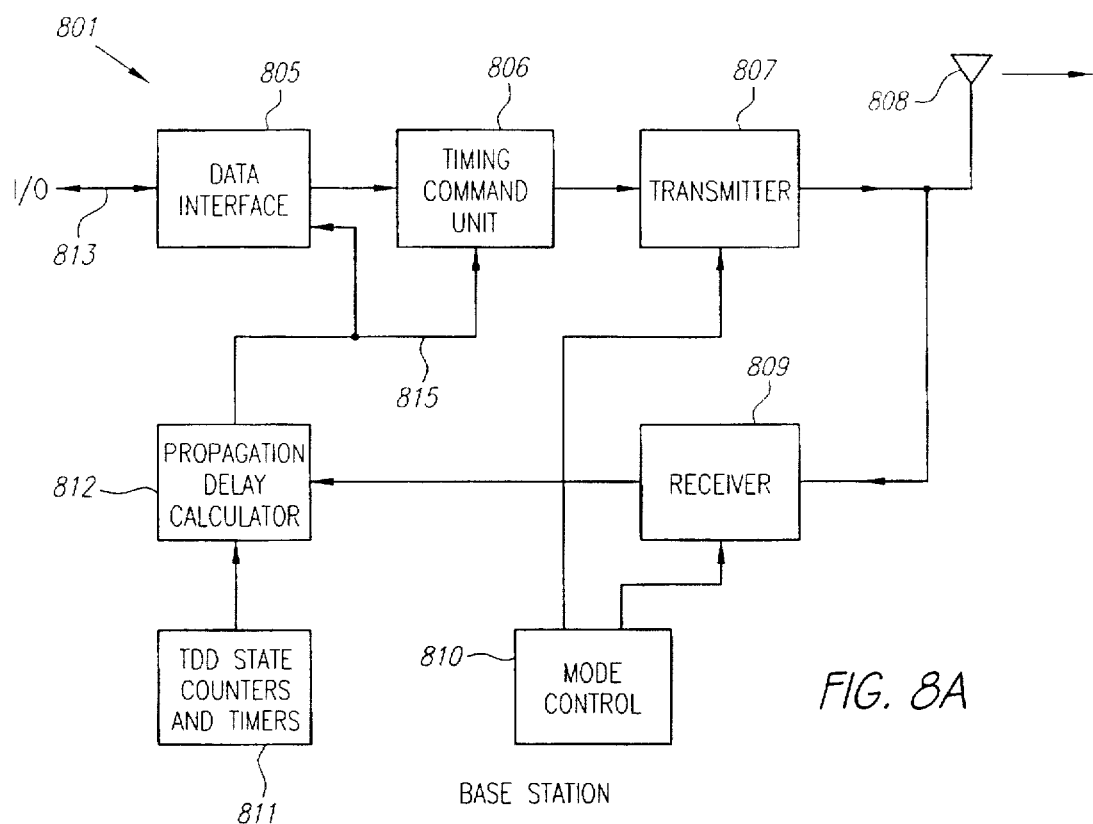
FIG. 8A is a hardware block diagram of a base station in accordance with an embodiment of the invention.

FIG. 8A is an hardware block diagram of a base station 304 in accordance with an embodiment of the invention. The base station 304 of FIG. 8A comprises a data interface 805, a timing command unit 806, a transmitter 807, an antenna 808, a receiver 809, a mode control 810, a TDD state control 811, and a propagation delay calculator 812.

Timing control for the system of FIG. 8A is carried out by the TDD state control 811. The TDD state control 811 comprises appropriate means, such as counters and clock circuits, for maintaining synchronous operation of the TDD system. The TDD state control 811 thereby precisely times the duration of the time frame 501 and its constituent parts, including each of the transmit time slots 510, the receive time slots 511, the abbreviated guard bands 512, and the collective guard portion 503.

The TDD state control 811 may be synchronized from time to time with a system clock such as may be located in a base station controller, a cluster controller, or an associated network, so as to permit global synchronization among base stations in a zone or cluster.

The mode control 810 selects between a transmit mode and a receive mode of operation. The mode control 810 reads information from the TDD state control 811 to determine the appropriate mode. For example, at the end of the transmission portion 502, as indicated by status bits in the TDD state control 811, the mode control 810 may switch modes from transmit mode to receive mode. At the end of the receiving portion 504, as indicated by status bits in the TDD state control 811, the mode control 810 may switch modes from receive mode to transmit mode.

During the transmit mode, data to be transmitted is provided to the data interface 805 from a data bus 813. The data interface 805 provides the data to be transmitted to a timing command unit 806. As explained in more detail herein, the timing command unit 806 formats the data to be transmitted to include, if desired, a timing adjustment command 815. The data output by the timing command unit 806 may be in a format such as the transmission portion 502 shown in FIG. 5A, whereby data targeted for each user station 302 is properly segregated.

The output of the timing command unit 806 is provided to the transmitter 807, which modulates the data for communication and transmits the data targeted for each user station 302 in the proper transmit time slot 510. The transmitter 807 obtains necessary timing information from either the mode control 810, or directly from the TDD state control 811. The transmitter 807 may comprise a spread spectrum modulator such as is known in the art. The data is transmitted by transmitter 807 from antenna 808.

Figure 9:
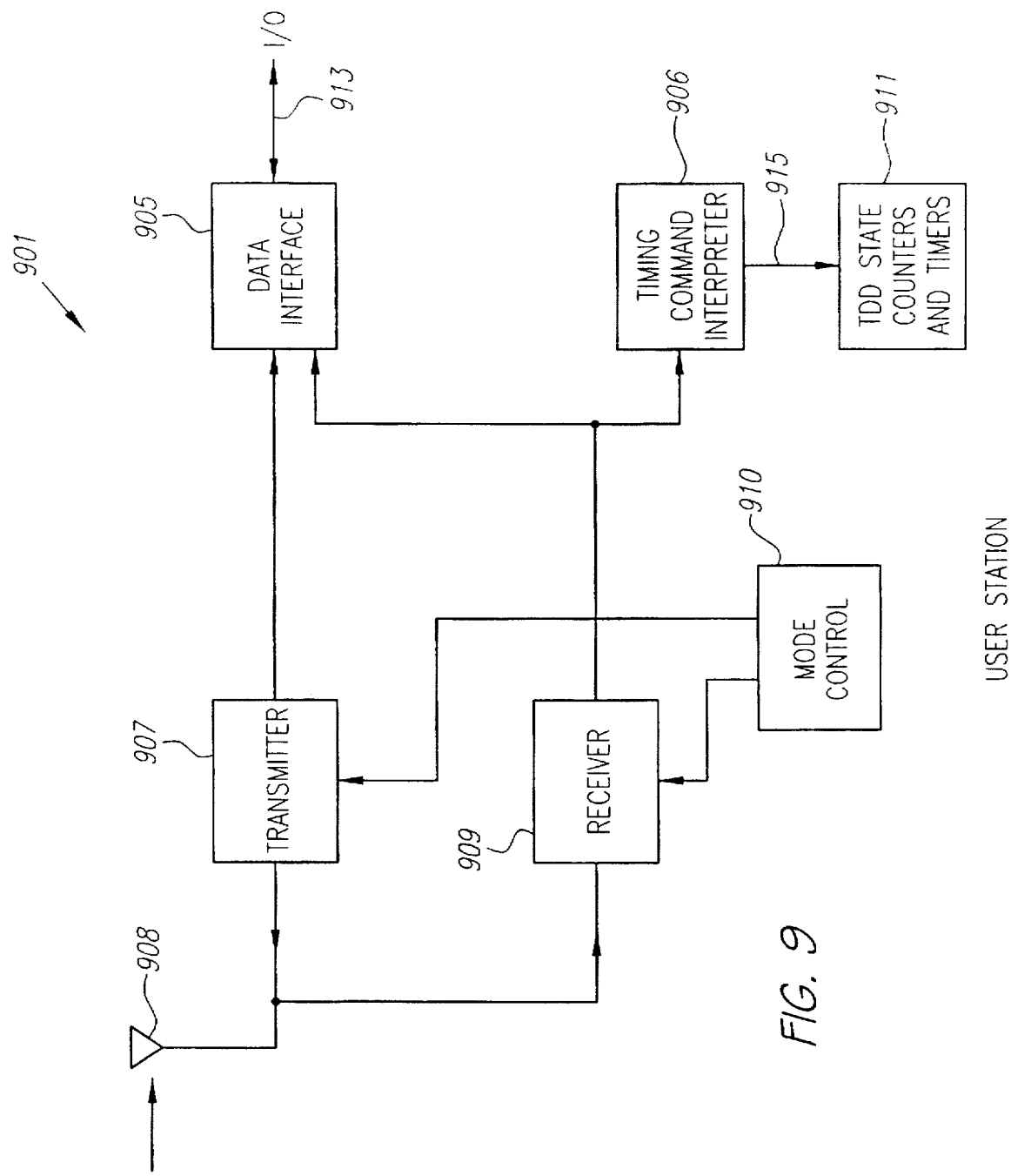
FIG. 9 is a hardware block diagram of a user station in accordance with an embodiment of the present invention.

The user stations 302 receive the transmitted data, formulate responsive user-to-base messages, and send the user-to-base messages in return order. A structure of a user station 302, whereby receipt of the transmissions from the base station 304 and formulation of responsive messages is carried out, is shown in FIG. 9 and described further below. The messages from the user stations 302 appear at the base station 304 in the receive time slots 511.

After switching from transmit mode to receive mode, the antenna 808 is used to receive data from the user stations 302. Although a single antenna 808 is shown in the FIG. 8A embodiment, different antennas may be used for transmit and receive functions, and multiple antennas may be used for purposes of achieving the benefits of antenna diversity. The antenna 808 is coupled to a receiver 809. The receiver 809 may comprise a demodulator or a spread spectrum correlator, or both. Demodulated data is provided to the data interface 805 and thereupon to the data bus 813. Demodulated data is also provided to the propagation delay calculator 812, which calculates the propagation delay time for the RTT transaction.

In operation, the timing command unit 806 inserts a timing adjustment command, such as a time period T (which may or may not include the delay period ΔT used in the initial round trip timing transaction), into the transmit time slot 510 instructing the user station 302 to delay sending its response by an amount of time equal to the time period T. The timing adjustment command may be placed at a designated position in a base-to-user message sent during the appropriate transmit time slot 510. For example, the timing adjustment command may be placed in a header 550 or a data message portion 551 of the transmit time slot 510. At initial communication link-up, the timing adjustment command is preferably set to the receive/transmit switching delay time of a user station 302, and is thereafter adjusted based on a calculated propagation delay time.

The user station 302 receiving the timing adjustment command delays sending its response by an amount of time designated thereby. The responsive message sent by the user station 302 is received by the receiver 809 and provided to the propagation delay calculator 812. The propagation delay calculator 812 obtains precise timing information from the TDD state control 811, so that the propagation delay calculator 812 may accurately determine the over-air propagation delay of the responsive message sent from the user station 302. Specifically, the propagation delay may be calculated as the difference in time between the time of actual receipt of the responsive message from the user station 302, and the amount of time equal to the time T past the beginning of the appropriate receive time slot 511 (plus the delay period ΔT if such a delay is programmed into each user response).

In a preferred embodiment, the propagation delay calculator 812 then calculates a new timing adjustment command 815 for the particular user station 302. The new timing adjustment command 815 is preferably selected so that the responsive message from the user station 302 in the following time frame 501 begins at the end of the abbreviated guard band 512 and does not overlap with the responsive message from any other user station 302. For example, the new timing adjustment command 815 may be equal to the calculated round-trip propagation time for the particular user station 302.

The timing adjustment command 815 may be updated as often as necessary to maintain a sufficient quality of communication between the base station 304 and all of the user stations 302. The propagation delay calculator 812 therefore preferably stores the calculated timing adjustment command 815 for each independent user station 302. As the user station 302 moves closer to the base station 304, the timing adjustment command 815 is increased, while as the user station 302 moves farther away from the base station 304, the timing adjustment command 815 is decreased. Thus, in a dynamic manner, the timing of the user stations 302 is advanced or retarded, and the ongoing communications between the base station 304 and the user stations 302 will not be interrupted by overlapping responsive user-to-base messages received from the user stations 302.

Figure 8B:
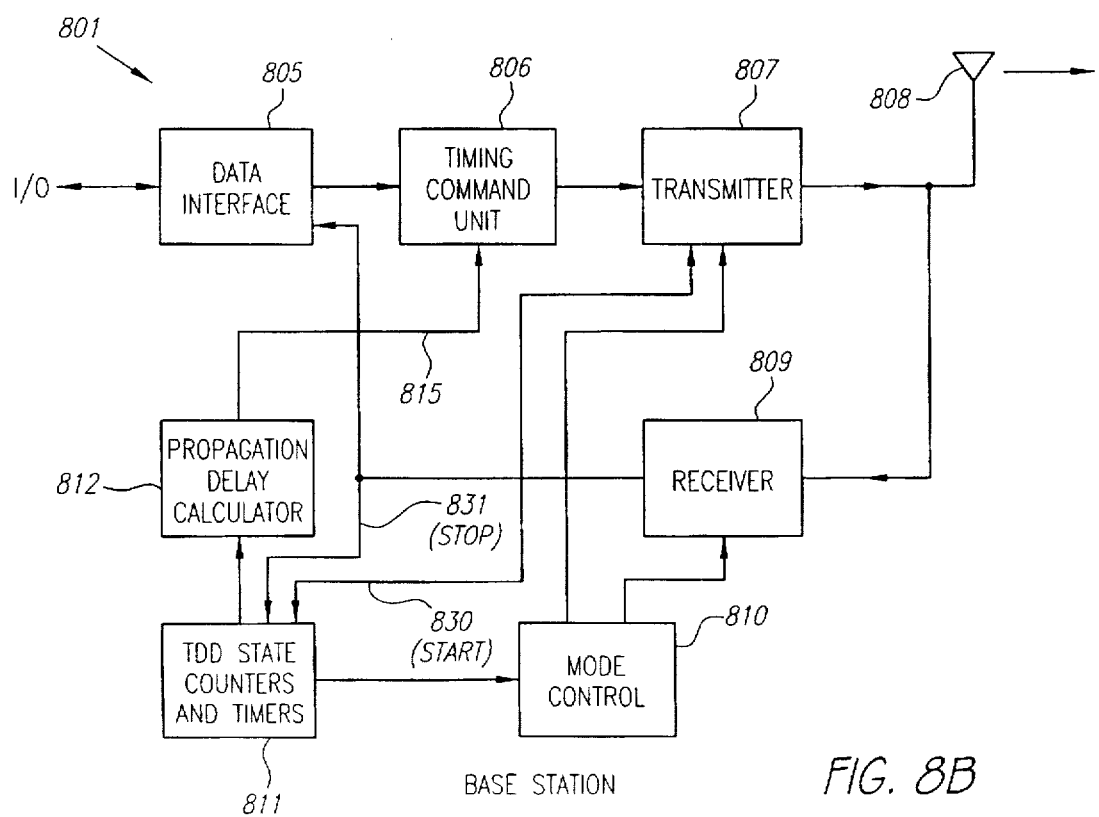
FIG. 8B is a hardware block diagram of an alternative embodiment of a base station.

FIG. 8B is a hardware block diagram of an alternative embodiment of a base station 304. The FIG. 8B base station is similar to that of FIG. 8A, except that a start counter command and a stop counter command are employed as follows. At the start of a base transmission from the transmitter 807, a start counter command 830 is sent from the transmitter 807 to the TDD state control 811 for the target user station 302. When the receiver 809 receives a response from the target user station 302, the user station sends a stop counter command 831 to the TDD state control 811 for the target user station 302. The value stored in the counter for the particular user station 302 represents the round trip propagation delay time. A separate counter may be employed for each user station 302 with which the base station 304 is in contact.

FIG. 9 is a hardware block diagram of a user station 302 in accordance with an embodiment of the present invention. The user station 302 of FIG. 9 comprises a data interface 905, a timing command interpreter 906, a transmitter 907, an antenna 908, a receiver 909, a mode control 910, and a TDD state control 911.

Timing control for the system of FIG. 9 is carried out by the TDD state control 911. The TDD state control 911 comprises appropriate means, such as counters and clock circuits, for maintaining synchronous operation of the user station 302 within the TDD system. The TDD state control 911 thereby precisely times the duration of the time frame 501 and its constituent parts, including each of the transmit time slots 510, the receive time slots 511, the abbreviated guard bands 512, and the collective guard portion 503.

The mode control 910 selects between a transmit mode and a receive mode of operation. The mode control 910 reads information from the TDD state control 911 to determine the appropriate mode. For example, the mode control 910, in response to status bits in the TDD state control 911, may switch modes to a receive mode during the appropriate transmit time slot 510 of the time frame 501. The mode control 910 may switch modes, in response to status bits in the TDD state control 911, to transmit mode during the appropriate receive time slot 511. At other times, the mode control 910 may maintain a dormant mode, or may be kept in a receive mode in order to monitor transmissions from the base station 304, to monitor the activity of other nearby base stations 304, or for other purposes.

During the transmit mode, data to be transmitted is provided to the data interface 905 from a data bus 913. The data interface 905 provides the data to be transmitted to the transmitter 907, which modulates the data for communication and transmits the data in the appropriate receive time slot 511. The transmitter 907 obtains necessary timing information from either the mode control 910, or directly from the TDD state control 911. The transmitter 907 may (but need not) comprise a spread spectrum modulator such as is known in the art. The data is transmitted by transmitter 907 from antenna 908.

The base station 304 receives the transmitted data, formulates responsive base-to-user messages as desired, and sends the base-to-user messages in the appropriate transmit time slot 510.

In receive mode, the antenna 908 is used to receive data from the base station 304. Although a single antenna 908 is shown in the FIG. 9 embodiment, different antennas may be used for transmit and receive functions, or multiple antennas may be used to obtain antenna diversity. The antenna 908 is coupled to a receiver 909. The receiver 909 may comprise a demodulator or a spread spectrum correlator, or both. Demodulated data is provided to the data interface 905 and thereupon to the data bus 913. Demodulated data is also provided to the timing command interpreter 906, which applies the timing adjustment command received from the base station 304.

In operation, the timing command interpreter 906 parses the data received from the base station 304 to determine the timing adjustment command. Assuming the timing adjustment command comprises a time T equal to the calculated round-trip propagation (RTT) time, the timing command interpreter 906 may reset the clocks and/or timers in the TDD state control 911 at the appropriate instant (such as around the start of the next time frame 501) so as to achieve global re-alignment of its timing. If the timing adjustment command is an instruction to advance timing by an amount of time T, then the timing command interpreter 906 may reset the TDD state control 911 at a period of time T just prior to the elapsing of the current time frame 501. If the timing adjustment command is an instruction to retard timing by an amount of time T, then the timing command interpreter 906 may reset the TDD state control 911 at a period of time T just after the elapsing of the current time frame 501.

The timing adjustment command may, as noted, be expressed in terms of a number of bits or chips by which the user station 302 should advance or retard its timing. The timing adjustment command may also be expressed in terms of a fractional timing unit (e.g., milliseconds).

Alternatively, the timing command interpreter 906 may maintain an internal timing adjustment variable, thereby utilizing a delta modulation technique. The internal timing adjustment variable is updated each time a timing adjustment command is received from the base station 304. If the timing adjustment command is an instruction to advance timing, then the timing adjustment variable is decreased by an amount T. If the timing adjustment command is an instruction to retard timing, then the timing adjustment variable is increased by an amount T. The timing adjustment variable may be added to the output of the TDD state control 511 in order to synchronize to the base station timing. Alternatively, the timing adjustment variable may be provided directly to the transmitter 907 and the receiver 909, which alter the timing of their operations accordingly.

The timing command interpreter 906 may comprise a first order tracking circuit which integrates the requested change in transmission timing from time period to time period, and adjusts the timing of the user station 302 transmission on such a basis.

Figure 5C:
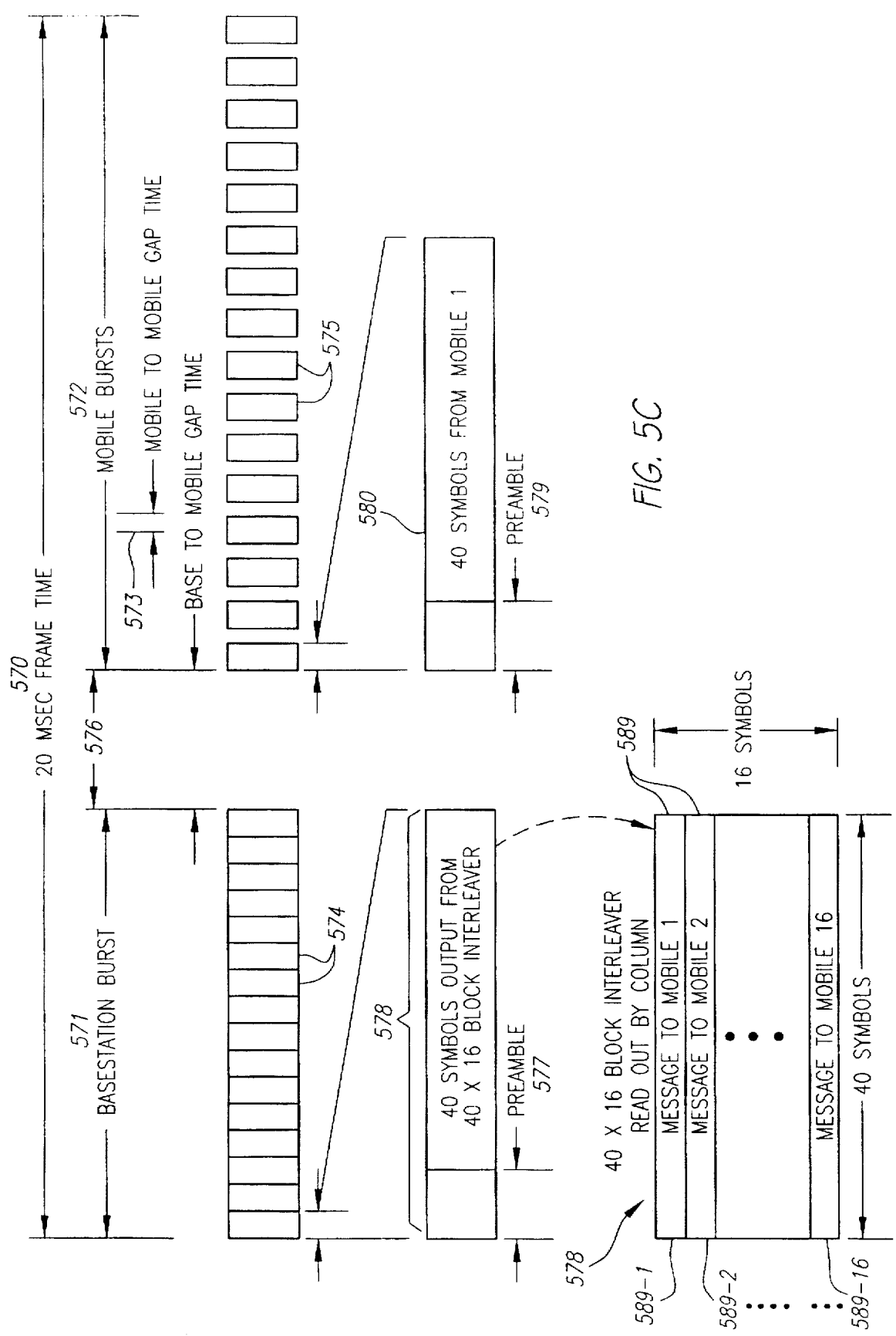
FIG. 5C is a timing diagram showing a variation of the TDD/TDM/TDMA system of FIG. 5A using an interleaved symbol transmission format.

FIG. 5C is a timing diagram, illustrated from a base station perspective, showing a variation of the TDD/TDM/TDMA system of FIG. 5A using an interleaved symbol transmission format. In FIG. 5C, a time frame 570 is divided into a transmission portion 571, a collective guard time portion 576, and a receiving portion 572, similar to FIG. 5A or FIG. 7. During the transmission portion 571, the base station 304 transmits to a plurality of user stations 302 during a plurality of transmit time slots 574. In each transmit time slot 574, rather than sending a message directed to a single user station 302, the base station 304 sends an interleaved message 578 containing a sub-message 589 for each of the user stations 302 (or a sub-message 589 for general polling or other functions if the receive time slot is unoccupied). The user stations 302 therefore receive a portion of their total incoming message from each of the transmit time slots 574, and must listen over the entire transmission portion 571 to obtain their entire message for the time frame 570.

In more detail, as shown in FIG. 5C, each transmit time slot 574 comprises a plurality of sub-messages 589, preferably one sub-message 589 for each receive time slot 575 (and therefore one sub-message 589 for each potential user station 302). For example, if there are 16 transmit time slots 574 and 16 receive time slots 575, each transmit time slot 574 would comprises 16 sub-messages 589, denoted in order 589-1, 589-2, . . . 589-16. Each sub-message 589 preferably comprises the same number of symbols, e.g. 40 symbols. The first sub-message 589-1 is intended for the first user station 302, the second sub-message 589-2 is intended for the second user station 302, and so on, up to the last sub-message 589-16. A user station 302 reads part of its incoming message from the appropriate sub-message 589 in the first transmit time slot 574, the next part of its incoming message from the appropriate sub-message 589 of the second transmit time slot, and so on, until the last transmit time slot 574, in which the user station 302 receives the last part of its message.

In each transmit time slot 574, preceding the interleaved message 578 is a preamble 577. The preamble 577 assists the user station 302 in synchronization, and may comprise a spread spectrum code. Preambles 577 appear in each transmit time slot 574 and are dispersed throughout the transmission portion 574, therefore allowing the user station 302 to support channel sounding operations useful for setting up a rake receiver (e.g., synchronization) and/or selection diversity. Because the user station 302 obtains its information over the entire transmission portion 571, the communication path is less sensitive to sudden fading or interference affecting only a relatively brief period of the transmission portion 571. Thus, if interference or fading corrupt information in a particular transmit time slot 574 (e.g., the second transmit time slot 574), the user station 302 would still have 15 sub-messages 589 received without being subject to such interference or fading.

By employing forward error correction techniques, the user station 302 can correct for one or more sub-messages 589 received in error. A preferred forward error correction technique utilizes Reed-Solomon codes, which can be generated by algorithms generally known in the art. The number of erroneous sub-messages 589 that can be corrected is given by the equation INT|(R-K)/2|, where R=the number of symbols sent to a user station 302 over a burst period, K=the number of symbols used for traffic information (i.e., non-error correction), and INT represents the function of rounding down to the nearest integer. Thus, for a Reed-Solomon code designated R(N, K)=R(40, 31), up to INT|(40-31)/2|=4 erroneous sub-messages 589 can be corrected.

Although a particular symbol interleaving scheme is shown in FIG. 5C, other symbol interleaving techniques, such as diagonal interleaving, may also be used.

The user stations 302 respond over the reverse link in generally the same manner as described with respect to FIGS. 5A or 7. Thus, the user stations 302 respond with a user transmission in a designated receive time slot 575 of the receive portion 572. The receive time slot 575 comprises a preamble 579 and a user message 580. The receive time slots 575 are separated by abbreviated guard times 573, and ranging may be used to instruct the user stations 302 to advance or retard their timing as previously mentioned.

Figure 5D:
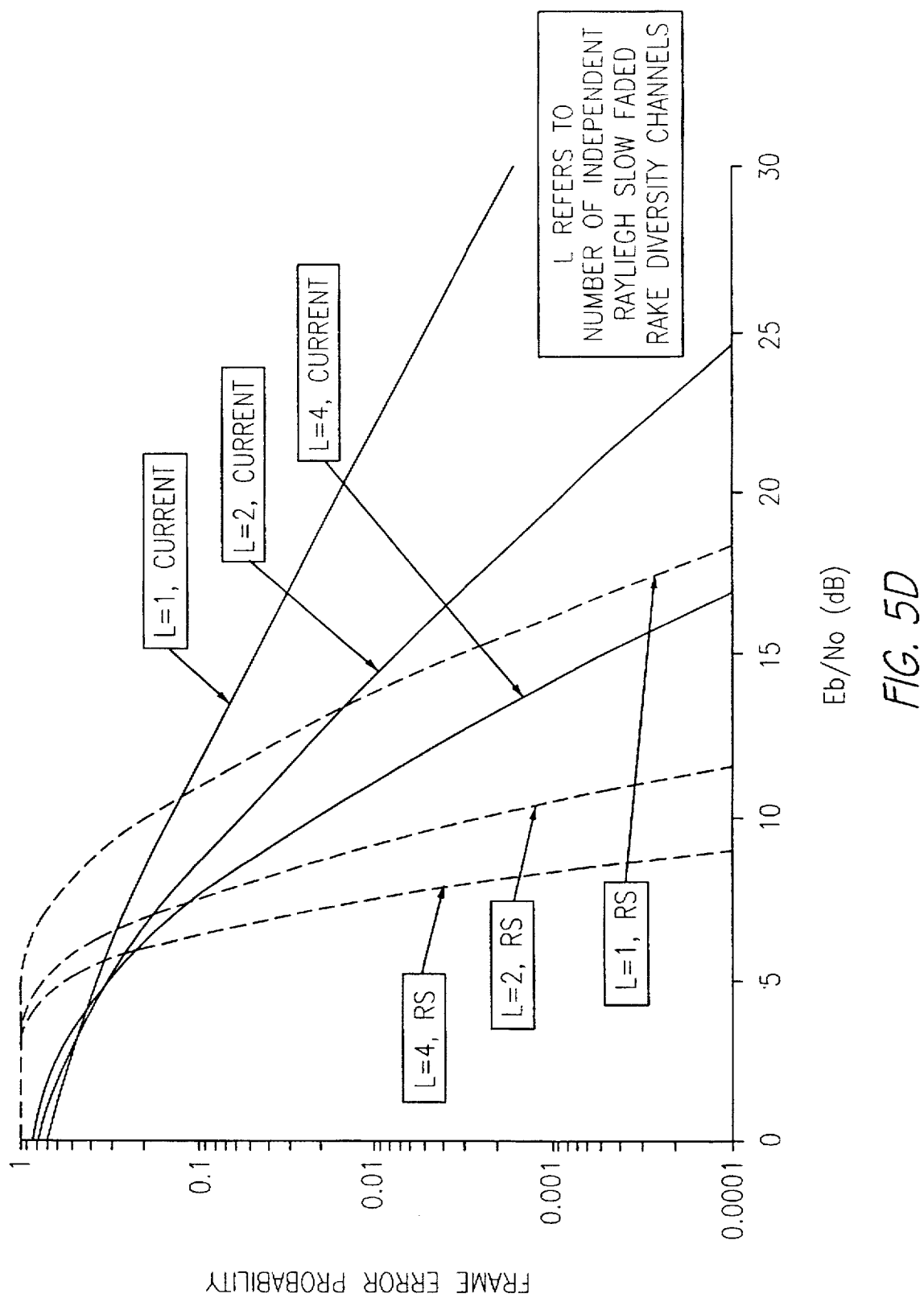
FIG. 5D is a chart comparing performance of the system of FIG. 5A, without forward error correction, and the system of FIG. 5C, with forward error correction.

FIG. 5D is a chart comparing performance of a particular TDD/TDM/TDMA system in accordance with FIG. 5A, without forward error correction, and a particular system in accordance with FIG. 5C, with forward error correction. FIG. 5D plots frame error probability against signal-to-noise ratio (Eb/No), in dB. In FIG. 5D are shown separate plots for different rake diversity channels L (i.e., resolvable multipaths) of 1, 2 and 4. The solid plot lines in FIG. 5D represent the performance of the FIG. 5A system without forward error correction, while the dotted plot lines represent the performance of the FIG. 5C system with Reed-Solomon forward error correction. FIG. 5D thus illustrates a substantial reduction in frame error probability over the FIG. 5A system by use of interleaved symbol transmission and forward error correction.

Figure 10B:
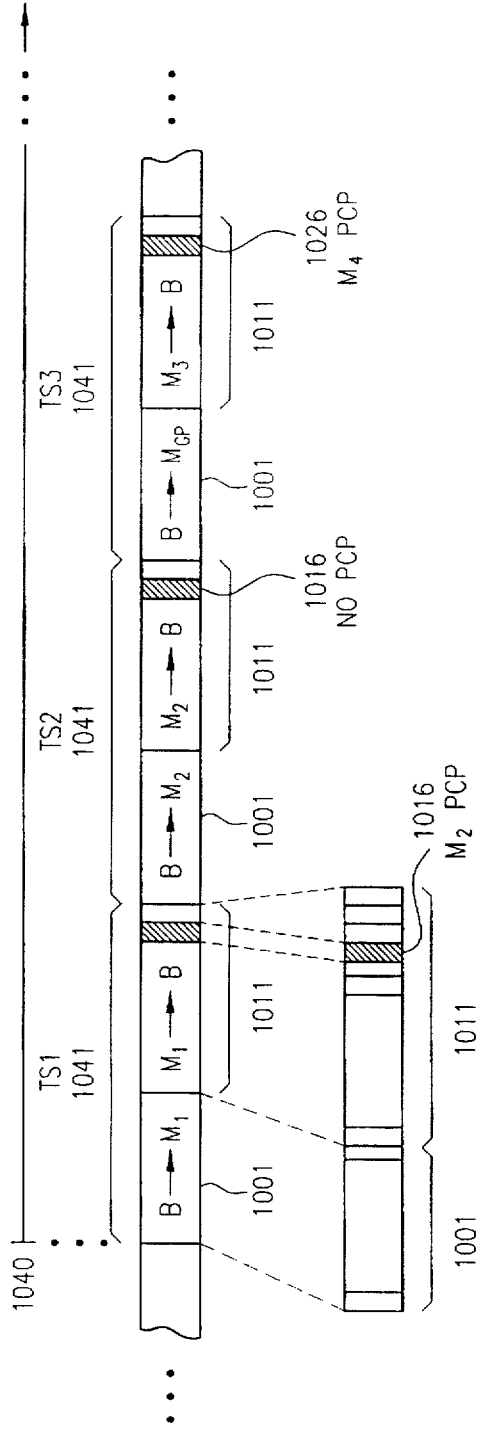

Another embodiment of a time frame structure and associated timing components for carrying out communication between a base station and multiple user stations is shown in FIGS. 10A-E. FIG. 10A is a diagram of timing sub-elements having predefined formats for use in a time division duplex system. The three timing sub-elements shown in FIG. 10A may be used to construct a time division duplex frame structure, such as the frame structures shown in FIGS. 10B-E. Although systems constructed in accordance with FIGS. 10A-E preferably use spread spectrum for communication, spread spectrum is not required. However, the following description assumes the use of spread spectrum techniques. For the present example, a chipping rate of 5 MHz is preferred.

In FIG. 10A are shown a base timing sub-element 1001, a user datalink timing sub-element 1011, and a range timing sub-element 1021. For each of these sub-elements 1001, 1011, and 1021, as explained more fully below, timing is shown from the perspective of the base station 304 with the initial range of the user station 302 at zero for range timing sub-element 1021.

The base timing sub-element 1001 comprises a base preamble interval 1002, a base message interval 1003, and a transmit/receive switch interval 1004. The base preamble interval 1002 may be 56 chips in length. The base message interval 1003 may be 205 bits in length (or, equivalently, 1312 chips if using 32-ary encoding). In a preferred 32-ary encoding technique, each sequence of five data bits is represented by a unique spread spectrum code of 32 chips in length. The number of spread spectrum codes used is 32, each the same number of chips long (e.g., 32 chips), to represent all possible combinations of five data bits. From the set of 32 spread spectrum codes, individual spread spectrum codes are selectively combined in series to form a transmission in the base message interval 1003. The base message interval 1003 comprises a total of up to 41 5-bit data sequences, for a total of 205 bits; thus, a transmission in the base message interval 1003 may comprise a series of up to 41 spread spectrum codes, each selected from the set of 32 spread spectrum codes, for a total of 1312 chips.

Although the present preferred system of FIGS. 10A-E is described using a 32-ary spread spectrum coding technique, other spread spectrum techniques, including other M-ary encoding schemes (such as 4-ary, 16-ary, etc.) may also be used, depending on the particular system needs.

The transmit/receive switch interval 1004 is preferably selected as a length of time sufficient to enable the switching of the base station 304 from a transmit mode to a receive mode or, in some embodiments, to enable the switching of a user station 302 from a receive mode to a transmit mode, and may be, for example, two microseconds in length.

The user datalink timing sub-element 1011 and the range timing sub-element 1021 each generally provide for transmissions by more than one user station 302. As explained further below, each of these timing sub-elements 1011, 1021 provides for transmission by a first user station 302 of a data message or a ranging message in the first part of the timing sub-element 1011 or 1021, and transmission by a second user station 302 of a control pulse preamble in the latter part of the timing sub-element 1011 or 1021. The control pulse preamble, as further described below, generally allows the base station 304 to carry out certain functions (e.g., power control) with respect to the second user station 302.

The user datalink timing sub-element 1011 comprises a datalink preamble interval 1012, a user message interval 1013, a guard band 1014, a transmit/receive switch interval 1015, a second preamble interval 1016, an antenna adjustment interval 1017, a second guard band 1018, and a second transmit/receive switch interval 1019. The preamble intervals 1012, 1016 may each be 56 chips in length. The user message interval 1013 may be 205 bits in length, or 1312 chips, using the 32-ary spread spectrum coding technique described above with respect to the base timing sub-element 1001. The guard bands 1014, 1018 may each be 102.5 chips in length. The transmit/receive switch intervals 1015, 1019 may each be of a duration sufficient to allow proper switching between transmit and receive modes, or between receive and transmit modes, as the case may be. The antenna adjustment interval 1017 may be of sufficient duration to allow transmission of a data symbol indicating selection of a particular antenna beam or permitting minor adjustments to the angle of a directional antenna at the base station 302, or permitting selection of one or more antennas if the base station 302 is so equipped.

The range timing sub-element 1021 comprises a ranging preamble interval 1022, a user ranging message interval 1023, a ranging guard band 1024, a transmit/receive switch interval 1025, a second preamble interval 1026, an antenna adjustment interval 1027, a second guard band 1028, and a second transmit/receive switch interval 1029. The preamble intervals 1022, 1026 may each be 56 chips in length. The user ranging message interval 1023 may be 150 bits in length, or 960 chips, using the 32-ary spread spectrum coding technique described above with respect to the base timing sub-element 1001. The ranging guard band 1024 may be 454.5 chips in length. The other guard band 1028 may be 102.5 chips in length. The transmit/receive switch intervals 1025, 1029 may each be of a duration sufficient to allow proper switching between transmit and receive modes, or between receive and transmit modes, as the case may be. The antenna adjustment interval 1027 may be of sufficient duration to allow transmission of a data symbol for selecting a particular antenna beam or permitting minor adjustments to the angle of a directional antenna at the base station 302, or permitting selection of one or more antennas if the base station 302 is so equipped.

The total length of the base timing sub-element 1001 may be 1400 chips. The total length of each of the user datalink timing sub-element 1011 and the range timing sub-element 1021 may be 1725 chips. For these particular exemplary values, a chipping rate of 5 MHz is assumed.

FIG. 10B is a timing diagram for a fixed time division duplex frame structure (or alternatively, a zero offset TDD frame structure) using the timing sub-elements depicted in FIG. 10A. The frame structure of FIG. 10B, as well as of FIGS. 10C–E described below, is shown from the perspective of the base station 304.

In FIG. 10B, a time frame 1040 comprises a plurality of time slots 1041. For convenience, time slots are also designated in sequential order as TS1, TS2, TS3, etc. Each time slot 1041 comprises a base timing sub-element 1001 and either a user datalink timing sub-element 1011 or a range timing sub-element 1021. While the frame structure of FIG. 10B supports range timing sub-elements 1021, it is contemplated that communication in the FIG. 10B system, which may be denoted a fixed framing structure, will ordinarily occur using user datalink timing sub-elements 1011.

It may be noted that the designated starting point of the time slots TS1, TS2, TS3, etc. is to some degree arbitrary in the FIG. 10B frame structure and various of the other embodiments as are described further herein. Accordingly, the frame structure may be defined such that time slots each start at the beginning of the user timing sub-elements 1011 or 1021, or at the start of the preamble interval 1016, or at the start or end of any particular timing interval, without changing the operation of the system in a material way.

In operation, the base station 304 transmits, as part of the base timing sub-element 1001 of each time slot 1041, to user stations 302 in sequence with which it has established communication. Thus, the base station 304 transmits a preamble during the preamble interval 1002 and a base-to-user message during the base message interval 1003. In the transmit/receive switch interval 1004, the base station 304 switches from a transmit mode to a receive mode. Likewise, the user station 302 during the transmit/receive switch interval 1004 switches from a receive mode to a transmit mode.

In the first time slot TS1, the base-to-user message transmitted in the base message interval 1003 is directed to a first user station M1, which may be mobile. After the transmit/receive switch interval 1004, the first user station M1 responds with a preamble during the datalink preamble interval 1012 and with a user-to-base message during the user message interval 1013. Proper timing is preferably set upon initial establishment of communication, and the transmissions from the user stations, such as the first user station M1, may be maintained in time alignment as seen at the base station 304 by timing adjustment commands from the base station 304, such as the timing adjustment commands described with respect to FIGS. 8–9 and elsewhere herein. However, a round-trip guard time must be included in each time slot 1041 so as to allow the base-to-user message to propagate to the user station 302 and the user-to-base message to propagate to the base station 304. The depiction of the exploded time slot TS1 in FIG. 10B is generally shown with the assumption that the user station M1 is at zero distance from the base station 304; hence, the user-to-base messages appear in FIG. 10B directly after the transmit/receive switch interval 1004 of the base timing sub-element 1001. However, if the user station M1 is not immediately adjacent to the base station 304, then part of guard time 1014 will be consumed in the propagation of the user-to-base message to the base station 304. Thus, if the user station M1 is at the cell periphery, then the user-to-base message will appear at the base station 304 after the elapsing of a time period equal at most to the duration of guard time 1014. Timing adjustment commands from the base station 304 may allow a shorter maximum necessary guard time 1014 than would otherwise be possible.

After the transmission of the user-to-base message from the first user station M1, which may, as perceived by the base station 304, consume up to all of the user message interval 1013 and the guard band 1014, is another transmit/receive switch interval 1015. Following the transmit/receive switch interval 1015, a control pulse preamble is received from a second user station M2 during the preamble interval 1016. The function of the control pulse preamble is explained in more detail below. Following the preamble interval 1016 is an antenna adjustment interval 1017, during which the base station 304 adjusts its transmission antenna, if necessary, so as to direct it towards the second user station M2. Following the antenna adjustment interval 1017 is another guard band 1018, which accounts for the propagation time of the control pulse preamble to the base station 304. After the preamble interval is another transmit/receive switching interval 1019 to allow the base station 304 opportunity to switch from a receive mode to a transmit mode, and to allow the second user station M2 opportunity to switch from a transmit mode to a receive mode.

The control pulse preamble received during the preamble interval 1016 preferably serves a number of functions. The control pulse preamble may be used by the base station 304 to determine information about the communication link with the user station 302. Thus, the control pulse preamble may provide the base station 304 with a power measurement indicative of the path transmission loss and link quality over the air channel. The base station 304 may determine the quality of the received signal, including the received power and the signal-to-noise ratio. The base station 304 may also determine, in response to the power, envelope, or phase of the control pulse preamble, the direction or distance of the user station 302, and the degree of noise or multipath error to which the communication link with the user station 302 may be prone.

In response to receiving the control pulse preamble in the preamble interval 1016 and determining the quality of the received signal and other operating parameters, the base station 304 may if necessary send a message commanding the user station 302 to adjust its power. Based on the quality of the received signal, the base station 304 may command the user station 302 to change (i.e., increase or decrease) its transmit power by a discrete amount (e.g., in minimum steps of 3 dB) relative to its current setting, until the quality of the control pulse preamble as periodically received by the base station 304 in the preamble interval 1016 is above an acceptable threshold.

After the base station 304 determines the power setting of the user station 302, the base station 304 may adjust its own power as well. The base station 304 may adjust its power separately for each time slot 1041.

A preferred power control command from the base station 304 to the user station 302 may be encoded according to the Table 10-1 below:

TABLE 10-1

| Power Control Command | Adjustment |
|---|---|
| 000 | No change |
| 001 | −3 dB |
| 010 | −6 dB |
| 011 | −9 dB |
| 100 | +3 dB |
| 101 | +6 dB |
| 110 | +12 dB |
| 111 | +21 dB |

Although preferred values are provided in Table 10-1, the number of power control command steps and the differential therebetween may vary depending upon the particular application and the system requirements. Further details regarding the use of a control pulse preamble (i.e., control pulse) as a power control mechanism, and other related details, may be found in copending application Ser. Nos. 08/215,306 and 08/293,671, filed Mar. 21, 1994 and Aug. 1, 1994, respectively, both in the name of inventors Gary B. Anderson, Ryan N. Jensen, Bryan K. Petch, and Peter O. Peterson, both entitled "PCS Pocket Phone/Microcell Communication Over-Air Protocol," and both of which are hereby incorporated by reference as if fully set forth herein.

Returning to FIG. 10B, in the following time slot TS2 after time slot TS1, the base station 304 transmits a preamble during the base preamble interval 1002 and transmits a base-to-user message during the base message interval 1003, both directed to the second user station M2. The base station 304 thereby rapidly responds to the control pulse preamble sent by the user station M2. As with the first time slot TS1, following the base message interval 1003 is a transmit/receive switch interval 1004 during which the base station 304 switches to a receive mode and the user station M2 switches to a transmit mode. The user station M2 then responds with a preamble in the datalink preamble interval 1012 and a user-to-base message in the user message interval 1013. The remaining steps in time slot TS2 are similar to those of the first time slot TS1, except with respect to the preamble interval 1016 as noted below.

It is assumed in the exemplary time frame 1040 of FIG. 10B that there is no established communication link in the third time slot TS3, and therefore the third time slot TS3 is free for communication. Because no user station 302 is in established communication during time slot TS3, no control pulse preamble is transmitted during the preamble interval 1016 of the second time slot TS2. The base station 304 may indicate that a particular time slot 1041, such as time slot TS3, is available for communication by, for example, transmitting a general polling message during the base message interval 1003 of the time slot TS3.

Should a third user station M3 desire to establish communication with the base station 304, then, in response to the base station 304 transmitting a general polling message during the base message interval 1003 of the third time slot TS3, the third user station M3 sends a general polling response message in a user message interval 1013 of the time slot TS3. When the third user station M3 responds with the general polling response message, the base station 304 may determine the range of the user station M3 and thereby determine a required timing adjustment for subsequent transmissions by the user station M3.

Figure 10D:
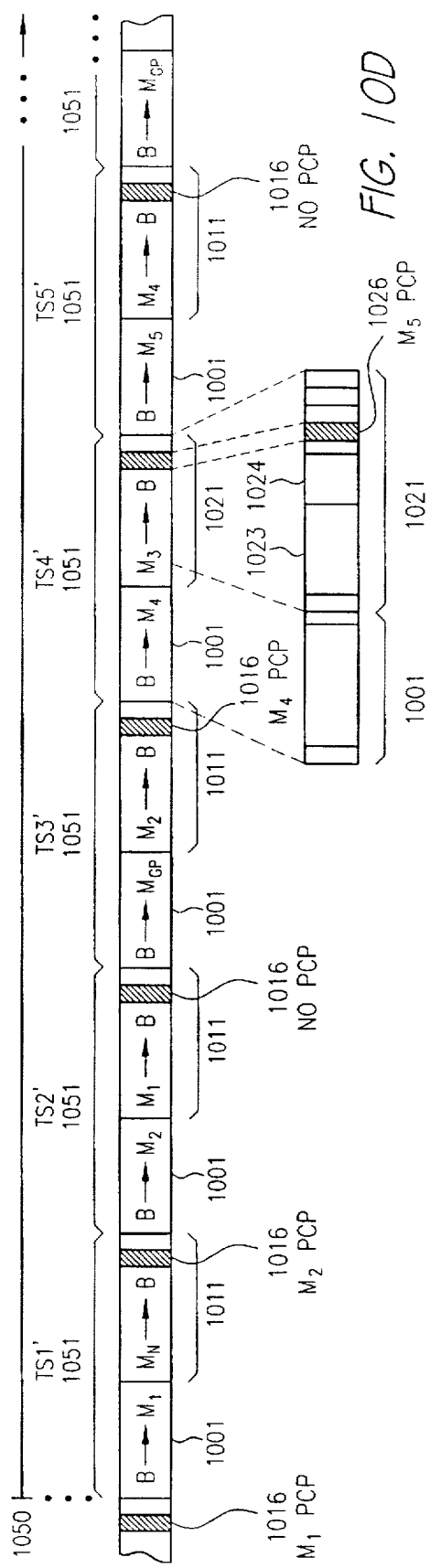

For efficiency reasons, the guard times 1014 and 1018 are preferably kept to a minimum. The smaller the guard times 1014, 1018, the more user stations 302 may be supported by the frame structure of FIG. 10B. Typically, therefore, the guard times 1014, 1018 will not be of sufficient duration to allow a full ranging transaction to occur. In particular, a ranging transaction (such as may be carried out using timing sub-element 1021 instead of timing sub-element 1011) may result in interference between the transmission of a user station 302 seeking to establish communication and the control pulse preamble of the user station 302 already in communication in the immediately following time slot 1041 with the base station 304. If the guard times are lengthened to permit ranging transactions, then fewer user stations 302 can be supported, particularly in a large cell environment. An alternative structure having improved efficiency in a large cell environment, along with the flexibility of ranging transactions, is shown in FIGS. 10D and 10E and explained in more detail below.

It may be possible to minimize potential interference between ranging messages and control pulse preambles by using a particular designated spread spectrum code for only ranging messages, or for only control pulse preambles. However, code division multiplexing in such a manner may not provide satisfactory isolation between the interfering signals.

If a ranging transaction is supported in the FIG. 10B environment, then the latter portion of the time slot TS3 may comprise a range timing sub-element 1021, as described previously with respect to FIG. 10A, during which a ranging transaction is carried out between the base station 304 and user station M3, instead of timing sub-element 1011. In such a case, the user station M3 transmits a preamble during a ranging preamble interval 1022 of time slot TS3, and transmits a ranging message during the user ranging message interval 1023 of time slot TS3. The user station M3 delays transmitting the preamble and ranging message for an amount of time ΔT. The delay time ΔT may be communicated by the base station 304 as part of the general polling message, or may be a pre-programmed system parameter. The base station 304 determines the propagation delay from the user station M3 to the base station 304 by measuring the round trip propagation delay from the end of the base message interval 1003 (i.e., the earliest possible receipt of the preamble and ranging message) to the time of actual receipt of the responsive preamble and ranging message from the user station M3, taking into account the delay time ΔT.

The ranging guard band 1024 in time slot TS3 is preferably of sufficient length to allow the ranging transaction between the base station 304 and the user station M3 to occur. Thus, the length of the ranging guard band 1024 is determined in part by the radius of the cell 303 in which the base station 304 is located, or may be determined in part by the maximum cell radius of the cellular system.

In response to receiving the ranging message from the user station M3 and determining the distance of the user station 302 and/or the propagation delay time thereto, the base station 304 may issue a timing adjustment command to the user station M3 in the next time frame 1040 instructing the user station M3 to advance or retard its timing by a designated amount. For the time frame 1040 immediately after communication with the user station M3 is established, the timing adjustment command may be set equal to the round-trip propagation time as determined by the base station 304 during the ranging transaction. Preferably, the timing adjustment command is selected so as to cause the user transmission from the user station M3 to the base station 304 in the subsequent time frame 1040 to be received by the base station 304 immediately after the end of the transmit/receive switch interval 1004, as described with respect to FIG. 10A.

In addition to its use for ranging purposes, the ranging message may also contain other information to assist the base station 304 in handshaking with the user station M3. For example, the ranging message may contain as data a user identifier for the user station M3 seeking to establish communication. The ranging message may also indicate a preferred spread spectrum code to be used by the base station 304 and the particular user station M3 in subsequent communications.

The base station 304 may determine the range of the user station 302 by using the reception time of the control pulse preamble (or, alternatively, the user-to-base message) and periodically issue a timing adjustment command during the base-to-user message interval directed to the user station 302.

FIG. 10C shows a subsequent time frame 1040 after communication has been established between the base station 304 and the third user station M3, with or without the use of a ranging transaction. In FIG. 10C, the transactions occurring in the first time slot TS1 between the user station M1 and the base station 304 are the same as those for FIG. 10B. Also, the transactions occurring in the second time slot TS2 between the user station M2 and the base station 304 are the same as those for FIG. 10B. However, during the second time slot TS2, instead of there being no transmitted control pulse preamble in the preamble interval 1016, the third user station M3 transmits a control pulse preamble during the preamble interval 1016 of the second time slot TS2. Alternatively, the user station M3 may wait until the base station 304 acknowledges its ranging message, sent in the prior time frame 1040, before transmitting a control pulse preamble in each time slot TS2 preceding its designated time slot TS3 for communication.

The base station 304 may use the control pulse preamble for a variety of purposes, including power control and other purposes, as previously described. In the third time slot TS3 of FIG. 10C, the base station 304 may send an acknowledgment signal to the user station M3 during the base message interval 1003. The acknowledgment signal may be sent using a spread spectrum code determined by a user identifier sent by the user station M3 as part of the ranging message. As part of the acknowledgment signal, or in addition thereto, the base station 304 sends a timing adjustment command instructing the user station M3 to advance or retard its timing by a designated amount.

In the following time frames 1040, after establishing communication with the third user station M3 in the manner described above, communication may be carried out between the base station 304 and the third user station M3 in time slot TS3. In each preamble interval 1016 of the second time slot TS2, the user station M3 transmits a control pulse preamble allowing the base station 304 to exercise power control, synchronize to the user station M3, or determine the distance of the user station M3. The base station 304 then sends a transmission directed to the user station M3 in the first portion of the third time slot TS3, and the user station M3 responds with a transmission directed to the base station 304 in the latter portion of the third time slot TS3. As part of each transmission from the base station 304, the base station 304 may update the timing adjustment command to the user station M3.

Should a user station 302 terminate communication in a time slot 1041 or be handed off to a new base station 304, then the base station 304 may begin to transmit a general polling message during the newly opened time slot 1041, indicating that the time slot 1041 is free for communication. New user stations 302 may thereby establish communication with the same base station 304.

FIG. 10D is a timing diagram for another embodiment of a frame structure in accordance with certain aspects of the present invention. FIG. 10D shows an interleaved time division duplex frame structure using the timing sub-elements depicted in FIG. 10A. A time frame 1050 comprises a plurality of time slots 1051. For convenience, time slots 1051 are designated in sequential order as TS1', TS2', TS3', etc. Each time slot 1051 comprises a base timing sub-element 1001 and either a user datalink timing sub-element 1011 or a user ranging sub-element 1021, as described in more detail below.

The primary difference between the frame structure of FIGS. 10B–C and the frame structure of FIG. 10D is that the frame structure of FIG. 10D may be considered interleaved in the sense that each user station 302 does not respond immediately to the communication from the base station 304 intended for it, but rather delays its response until a subsequent time slot 1051. The effect of the interleaved frame structure of FIG. 10D is that guard times can be shorter, allowing more time slots 1051 per time frame 1050, and therefore more user stations 302 per base station 304. The interleaved frame structure of FIG. 10D also allows efficient use of ranging transactions between the base station and the user stations, particularly upon initial link-up of communication. Because the frame structure of FIG. 10D is interleaved, the first time slot TS1' comprises a transmission from the base station 304 to the first user station M1 and a responsive transmission, not from the first user station M1, but from the last user station MN.

In operation of the FIG. 10D system, the base station 304 transmits, as part of the base timing sub-element 1001 of each time slot 1051, to user stations 302 with which it has established communication. The base station 304 thus transmits a preamble during the preamble interval 1002 and a base-to-user message during the base message interval 1003. In the transmit/receive switch interval 1004, the base station 304 switches from a transmit mode to a receive mode.

In the first time slot TS1', the base-to-user message transmitted in the base message interval 1003 is directed to a first user station M1, which may be mobile. After the transmit/receive switch interval 1004, the last user station MN to have been sent a message from the base station in the last time slot TSN' of the prior time frame 1050 transmits a preamble during the datalink preamble interval 1012 and a user-to-base message during the user message interval 1013. The frame structure of FIG. 10D, as noted previously, is shown from a perspective of the base station 304, and the transmissions from the user stations, such as user station MN, are maintained in time alignment as seen by the base station 304 by timing adjustment commands from the base station 304, similar to the timing adjustment commands described elsewhere herein. Proper timing is preferably set upon initial establishment of communication, by use of a ranging transaction.

After the transmission of the user-to-base message from the first user station M1, which may, as perceived by the base station 304, consume up to all of the user message interval 1013 and the guard band 1014, is another transmit/ receive switch interval 1015. Following is another transmit/ receive switch interval 1015 to allow appropriate switching of modes. Following the transmit/receive switch interval 1015, a control pulse preamble is received from a second user station M2 during the preamble interval 1016. The control pulse preamble sent during the preamble interval 1016 may serve functions such as those described with respect to the FIG. 10B–C embodiments. Thus, the base station 304 may determine, in response to the power, envelope, or phase of the control pulse preamble, the direction or distance of the user station M2, and/or the degree of noise or multipath error to which the communication link with the user station M2 may be prone. The base station 304 may command the user station M2 to adjust its power based on the quality and strength of the received control pulse preamble.

After the preamble interval 1016 is an antenna adjustment interval 1017 during which the base station 304 has opportunity to adjust its transmission antenna, if necessary, to direct it towards the second user station M2. Following the preamble interval 1016 is an antenna adjustment interval 1017, during which the base station 304 adjusts its transmission antenna, if necessary, so as to direct it towards the second user station M2. Following the antenna adjustment interval 1017 is another guard band 1018, which accounts for the propagation time of the control pulse preamble to the base station 304. After the preamble interval is another transmit/receive switching interval 1019 to allow the base station 304 opportunity to switch from a receive mode to a transmit mode, and to allow the second user station M2 opportunity to switch from a transmit mode to a receive mode.

In the following time slot TS2 after time slot TS1, the base station 304 transmits a preamble during the base preamble interval 1002 and transmits a base-to-user message during the base message interval 1003, both directed to the second user station M2. The base station 304 thereby rapidly responds to the control pulse sent by the user station M2. As with the first time slot TS1', following the base message interval 1003 occurs a transmit/receive switch interval 1004 during which the base station 304 switches to a receive mode. Unlike the FIG. 10B–C embodiment, in which the latter portion of the time slot TS2' is used for receiving a transmission from the second user station M2, in the FIG. 10D embodiment the latter portion of the time slot TS2' is used for receiving a transmission from the first user station M1. While the first user station M1 is in the process of transmitting, the second user station M2 thus has the opportunity to process the data received from the base station 304 during the same time slot TS2', and to transmit a responsive transmission timed to arrive at the base station 304 in the following time slot TS3' without interfering with other transmissions from either the base station 304 or other user stations 302.

Thus, in the second time slot TS2', the base station receives from the first user station M1 a preamble during the datalink preamble interval 1012 and a user-to-base message in the user message interval 1013.

It is assumed in the exemplary time frame 1050 shown of FIG. 10D that there is no established communication link in the duplex channel comprising the base portion of the third time slot TS3' and the user portion of the fourth time slot TS4', and therefore that particular duplex channel is free for communication. Because no user station 302 is in established communication during the duplex channel, no control pulse preamble is transmitted during the preamble interval 1016 of the second time slot TS2'. The base station 304 may indicate that a particular duplex channel is available for communication by, for example, transmitting a general polling message during the base message interval 1003 of the duplex channel, such as during the base message interval 1003 of time slot TS3'.

Should a new user station M3 desire to establish communication with the base station 304, then the new user station M3 waits until an open user portion of a time slot 1051, such as the fourth time slot TS4' in the present example, to take action. Thus, ordinary communication is carried out between the base station 304 and the second user station M2 in the latter portion of the third time slot TS3' in a manner similar to that of the first user station M1. Moreover, because another user station M4 is in established communication with the base station 304, the base station 304 receives a control pulse preamble during the preamble interval 1016 of the third time slot TS3' from the next user station M4. In the subsequent time slot TS4', the base station 304 sends a base-to-user message during the base message interval 1003 to the user station M4. The user station M4 responds with a user-to-base message in the following time slot TS5'.

In the meantime, during the fourth time slot TS4', the new user station M3 attempts to establish communication with the base station 304. Thus, in response to the base station 304 transmitting a general polling message during the base message interval 1003 of the third time slot TS3', the new user station M3 sends a general polling response message in a user message interval 1013 of the following time slot TS4'. When the new user station M3 responds with the general polling response message, the base station 304 may determine the range of the user station M3 and thereby determine a required timing adjustment for subsequent transmissions by the user station M3.

The latter portion of the time slot TS4' preferably comprises a range timing sub-element 1021 as previously described with respect to FIG. 10A. Thus, in response to the base station 304 transmitting a general polling message in the base message interval 1003 of the third time slot TS3', the new user station M3 sends a ranging message in a user ranging message interval 1023 of the following time slot TS4'. The depiction of the exploded time slot TS4' in frame structure in FIG. 10D assumes that the user station M3 is at zero distance from the base station 304; hence, the user-to-base messages appear in FIG. 10D directly after the transmit/receive switch interval 1004 of the base timing sub-element 1001. However, if the user station M3 is not immediately adjacent to the base station 304, then part of guard time 1014 will be consumed in the propagation of the user-to-base message to the base station 304. Thus, if the user station M3 is at the cell periphery, then the user-to-base message will appear at the base station 304 after the elapsing of a time period equal at most to the duration of guard time 1014. Timing adjustment commands from the base station 304 may allow a shorter maximum necessary guard time 1014 than would otherwise be possible.

When the base station 304 receives the response from the new user station M3, the base station 304 may determine the range of the user station M3 and thereby determine a required timing advance for subsequent transmissions by the user station M3.

In more detail, a ranging transaction is carried out between the base station 304 and the user station M3, whereby the user station M3 transmits a preamble during a ranging preamble interval 1022 of time slot TS4' and a ranging message during the user ranging message interval 1023 of time slot TS4'. The user station M3 delays transmitting the preamble and ranging message for an amount of time ΔT. The delay time ΔT may be communicated by the base station 304 as part of the general polling message, or may be a pre-programmed system parameter. The base station 304 determines the propagation delay from the user station M3 to the base station 304 by measuring the round trip propagation delay from the end of the base message interval 1003 in the fourth time slot TS4' (i.e., the earliest possible receipt of the preamble and ranging message) to the time of actual receipt of the responsive preamble and ranging message from the user station M3, taking into account the delay time ΔT.

The ranging guard band 1024 in time slot TS4' is preferably of sufficient length to allow the ranging transaction between the base station 304 and the user station M3 to occur. Thus, the length of the ranging guard band 1024 is determined in part by the radius of the cell 303 in which the base station 304 is located, or may be determined in part by the maximum cell radius of the cellular system.

In response to receiving the ranging message from the user station M3 and determining the distance of the user station 302 and/or the propagation delay time thereto, the base station 304 may issue a timing adjustment command to the user station M3 in the next time frame 1050 instructing the user station M3 to advance or retard its timing by a designated amount. For the time frame 1050 immediately after communication with the user station M3 is established, the timing adjustment command may be set equal to the round-trip propagation time as determined by the base station 304 during the ranging transaction. Preferably, the timing adjustment command is selected so as to cause the user transmission from the user station M3 to the base station 304 in the subsequent time frame 1050 to be received by the base station 304 immediately after the end of the transmit/receive switch interval 1004, as described with respect to FIG. 10A, giving the base station 304 an opportunity to switch from a transmit mode to a receive mode, but not interfering with the base-to-user message sent in the base message interval 1003.

The base station 304 may periodically instruct a user station 302 to adjust its timing by issuing subsequent timing adjustment commands, e.g., as often as each time frame. The base station 304 may monitor the distance of the user station 302 by measuring the time of receipt of the user-to-base message. Preferably, however, the base station 304 monitors the range of the user station 302 by using the reception time of the control pulse preamble, because of the preamble's known timing and message structure, and responds during the base-to-user message interval with a timing adjustment command.

In addition to being used for ranging purposes, the ranging message may also contain other information to assist the base station 304 in handshaking with the user station M3. For example, the ranging message may contain as data a user identifier for the user station M3 seeking to establish communication. The ranging message may also indicate a preferred spread spectrum code to be used by the base station 304 and the particular user station M3 in subsequent communications.

FIG. 10E shows a subsequent time frame 1050 after a ranging transaction has been completed with the third user station M3. In FIG. 10E, the transactions between the user stations M1, MN and the base station 304 occurring in the first time slot TS1' are the same as for FIG. 10D. Also, the transactions between the user stations M1, M2 and the base station 304 occurring in the second time slot TS2 are the same as for FIG. 10D. However, during the second time slot TS2', instead of there being no transmitted control pulse preamble in the preamble interval 1016, the third user station M3 may transmit a control pulse preamble during the preamble interval 1016 of the second time slot TS2'. Alternatively, the user station M3 may wait until the base station 304 acknowledges its ranging message sent in the prior time frame 1050 before transmitting a control pulse preamble during the preamble interval 1016 of each preceding time slot TS2'.

The base station 304 may use the control pulse preamble for a variety of purposes, including power control and other purposes, as previously described. In the third time slot TS3' of FIG. 10E, the base station 304 may respond by sending an acknowledgment signal to the user station M3 during the base message interval 1003. The acknowledgment signal may be sent using a spread spectrum code determined by a user identifier sent by the user station M3 as part of the ranging message. As part of the acknowledgment signal, or in addition thereto, the base station 304 preferably sends a timing adjustment command instructing the user station M3 to advance or retard its timing by a designated amount.

In following time frames 1050, communication may be carried out between the base station 304 and the user station M3 in an interleaved fashion in time slots TS3' and TS4' (in addition to the receipt of the control pulse preamble in the second time slot TS2' each time frame 1050). In each preamble interval 1016 of the second time slot TS2', the user station M3 transmits a control pulse preamble allowing the base station 304 to take certain actions—for example, to exercise power control, synchronize to the user station M3, or determine the distance of the user station M3. The base station 304 then sends a communication directed to the user station M3 in the first portion of the third time slot TS3', and the user station M3 responds with a communication directed to the base station 304 in the latter portion of the following time slot TS4'. During each communication from the base station 304, the base station 304 may update the timing adjustment command to the user station M3.

Should a user station 302 terminate communication in a time slot 1051 or be handed off to a new base station 304, then the base station 304 may begin to transmit a general polling message during the newly opened time slot 1051, indicating that the time slot 1051 is free for communication. New user stations 302 may thereby establish communication with the same base station 304.

In another embodiment of the present invention, described with respect to FIGS. 11A–D, two frequency bands are used for communication instead of a single frequency band.

Figure 11C:
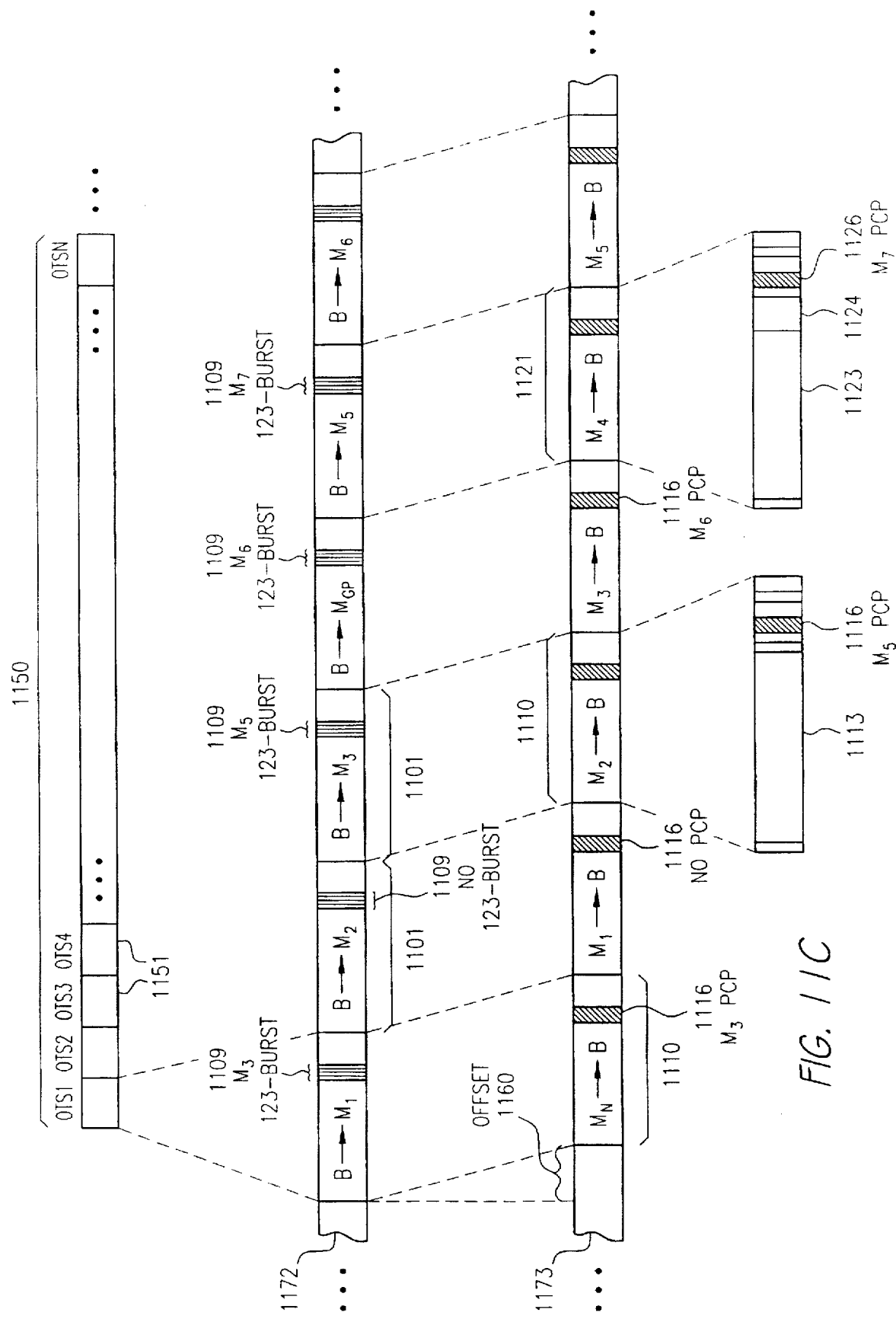

FIG. 11A is a diagram of timing sub-elements having predefined formats for use in an FDD/TDMA system. The three timing sub-elements shown in FIG. 11A may be used to construct an FDD/TDMA frame structure, such as the frame structures shown in FIGS. 11B–D. Although systems constructed in accordance with FIGS. 11A–D preferably use spread spectrum for communication, spread spectrum is not required. The following description, however, assumes the use of spread spectrum techniques. For the present example, unless otherwise specified, a chipping rate of 2.8 MHz is preferred, although the chipping rate selected depends upon the application.

In FIG. 11A are shown a base timing sub-element 1101, a user datalink timing sub-element 1110, and a range timing sub-element 1121. For each of these sub-elements 1101, 1110, and 1121, as explained more fully below, timing is shown from the perspective of the base station 304 with the range of the user station 302 at zero.

The base timing sub-element 1101 comprises a base preamble interval 1102, a base message interval 1103, three more preamble burst intervals 1104, 1105, and 1106 (collectively referred to as a 123-preamble burst interval 1109), a base fill code interval 1107, and a transmit/receive switch interval 1108. The base preamble interval 1102 may be 56 chips in length. The base message interval 1103 may be 205 bits in length, or 1312 chips using 32-ary coding, as described previously herein with respect to FIGS. 10A-E. The base message interval 1103 comprises a total of up to 41 5-bit data sequences, for a total of 205 bits; thus, a transmission in the base message interval 1103 may comprise a series of up to 41 spread spectrum codes, each selected from the set of 32 spread spectrum codes, for a total of 1312 chips.

Although the present preferred system of FIGS. 11A-E is described using 32-ary spread spectrum coding techniques, other spread spectrum techniques, including other M-ary coding schemes (such as 4-ary, 16-ary, etc.) may also be used, depending on the particular system requirements.

The three preamble burst intervals 1104, 1105, and 1106 are each preferably 56 chips in length; thus, the 123-preamble burst interval 1109 is preferably 168 chips in length. The transmit/receive switch interval 1108 is preferably selected as a length of time sufficient to enable the switching of the base station 304 from a transmit mode to a receive mode and may be, for example, 32 chips or 11.43 microseconds in length. The transmit/receive switch interval 1108 and the base fill code interval 1107 collectively comprise, in a preferred embodiment, a length of 189 chips.

Thus, the total length of the base timing sub-element 1101 is preferably 1750 chips (for the assumed 2.8 MHz chipping rate), which matches the length of the user datalink timing sub-element 1110 and the range timing sub-element 1121 as described below. In the FIGS. 11A-D embodiment, it is preferred to have the base timing sub-element 1101 equal in length to the user timing sub-elements 1110, 1121 to maintain synchronicity in the dual-frequency band system described in FIGS. 11A-D, wherein the base station 304 communicates over one frequency band and the user stations 302 over another frequency band.

The user datalink timing sub-element 1110 and the range timing sub-element 1121 each generally provide for transmissions by more than one user station 302. As explained further below, these timing sub-elements 1110, 1121 provide for transmission by a first user station 302 of a data message or a ranging message in the first part of the timing sub-element 1110 or 1121, and transmission by a second user station 302 of a control pulse preamble in the latter part of the timing sub-element 1110 or 1121. The control pulse preamble, as further described below, generally allows the base station 304 to carry out certain functions (e.g., power control) with respect to the second user station 302.

The user datalink timing sub-element 1110 comprises a datalink preamble interval 1112, a user message interval 1113, a guard band 1114, a transmit/receive switch interval 1115, a second preamble interval 1116, an antenna adjustment interval 1117, a second guard band 1118, and a second transmit/receive switch interval 1119. The preamble intervals 1112, 1116 may each be 56 chips in length. The user message interval 1113 may be 205 bits in length, or 1312 chips, using the 32-ary spread spectrum coding technique described previously herein. The length of the guard bands 1114, 1118 may vary, but should be sufficient to allow receipt of the pertinent message transmissions without interference. The transmit/receive switch intervals 1115, 1119 may each be of a duration sufficient to allow proper switching between transmit and receive modes, or between receive and transmit modes, as the case may be. The antenna adjustment interval 1117 may be of sufficient duration to allow transmission of a data symbol for selecting a particular antenna beam or permitting minor adjustments to the angle of a directional antenna at the base station 302, or permitting selection of one or more antennas if the base station 302 is so equipped.

The range timing sub-element 1121 comprises a ranging preamble interval 1122, a user ranging message interval 1123, a ranging guard band 1124, a transmit/receive switch interval 1125, a second preamble interval 1126, an antenna adjustment interval 1127, a second guard band 1128, and a second transmit/receive switch interval 1129. The preamble intervals 1122, 1126 may each be 56 chips in length. The user ranging message interval 1123 may be 150 bits in length, or 960 chips, using the 32-ary spread spectrum coding technique described previously herein. The length of the ranging guard band 1124 may vary depending, for example, on cell radius, but should be sufficient to allow receipt of a ranging message without interference. The other guard band 1128 should likewise be of sufficient length to allow receipt of the pertinent information without interference. The transmit/receive switch intervals 1125, 1129 may each be of a duration sufficient to allow proper switching between transmit and receive modes, or between receive and transmit modes, as the case may be. The antenna adjustment interval 1127 may be of sufficient duration to allow transmission of a data symbol for selecting a particular antenna beam or permitting minor adjustments to the angle of a directional antenna at the base station 302, or permitting selection of one or more antennas if the base station 302 is so equipped.

The total length of each of the user datalink timing sub-element 1110 and the range timing sub-element 1121 may be 1750 chips, or the same length as the base timing sub-element 1101. These particular exemplary values assume a chipping rate of 2.8 MHz.

FIG. 11B is a timing diagram for a fixed or zero offset FDD/TDMA frame structure using the timing sub-elements depicted in FIG. 11A. The frame structures of FIGS. 11B-E are shown from the perspective of the base station 304.

FIG. 11B is a frame structure for a system using two frequency bands for communication in addition to certain aspects of time division multiple access. A first frequency band 1170, also referred to as a base station frequency band, is used primarily for communication from a base station 304 to user stations 302. A second frequency band 1171, also referred to as a user station frequency band, is used primarily for communication from the user stations 302 to the base station 304. The two frequency bands 1170, 1171 are preferably located 80 MHz apart. The 80 MHz frequency separation helps to minimize co-channel interference and allows easier construction of filters in the receiver for filtering out potentially interfering signals from the reverse path communication.

In the frame structure of FIG. 11B, a time frame 1140 comprises a plurality of time slots 1141. For convenience, time slots are designated in sequential order as TS1", TS2", TS3", and so on. Each time slot 1141 comprises a base timing sub-element 1101 on the base station frequency band 1170, and either a user datalink timing sub-element 1110 or a range timing sub-element 1121 on the user station frequency band 1171. The time slots 1141 are shown from the perspective of the base station 304, so that the base timing sub-elements 1101 and the user timing sub-elements 1110, 1121 appear lined up in FIG. 11B. While the frame structure of FIG. 11B supports range timing sub-elements 1121 on the user station frequency band 1171, it is contemplated that communication from the user stations 302 to the base station 304 in the FIG. 11B system will ordinarily occur using user datalink timing sub-elements 1110.

In operation, the base station 304 transmits, as part of the base timing sub-element 1101 of each time slot 1141, in sequence to user stations 302 with which the base station 304 has established communication. More specifically, the base station 304 transmits a preamble during the preamble interval 1102 and a base-to-user message during the base message interval 1103. After the base message interval 1103, the base station 304 transmits three short preamble bursts in the 123-preamble burst interval 1109 directed to a different user station 302. In the exemplary system of FIG. 11B, the three preamble bursts in the 123-preamble burst interval 1109 are directed to the user station 302 to which the base station 304 will be sending a main data message two time slots 1141 later.

The three short preamble bursts sent in the 123-preamble burst interval 1109 may be used for forward link diversity sensing and forward link power control purposes. Each of these three preamble bursts may be transmitted on a different antenna to allow receiving user stations 302 an opportunity to make a diversity selection for an upcoming forward link data message in a subsequent time slot 1141.

Following the 123-preamble burst interval 1109 is the base fill code interval 1107, during which the base station 304 transmits a fill code. Following the base code fill interval 1107 is the transmit/receive switch interval 1104, during which the base station 304 may switch from a transmit mode to a receive mode. If the base station 304 has separate transmit and receive hardware, however, then the base station need not switch modes, and may instead continue to transmit a fill code during the transmit/receive switch interval 1104.

The specific communication exchanges shown in the example of FIG. 11B will now be explained in more detail. In the first time slot TS1", on the base station frequency band 1170, the base station transmits a base-to-user message in the base message interval 1103 directed to a first user station M1. The base station 304 then transmits a 123-preamble burst during the 123-preamble burst interval 1109, directed to another user station M3. Simultaneous with the base station transmissions, the base station 304 receives, on the user station frequency band 1171, a preamble during the datalink preamble interval 1112 and a user-to-base message during the user message interval 1113 from the last user station MN with which the base station 304 is in communication. During the control pulse preamble interval 1116 of the first time slot TS1" on the user station frequency band 1171, the base station 304 receives a control pulse preamble from the user station M2 to which the base station 304 is to transmit in the following time slot TS2".

The functions of the control pulse preamble sent during the control pulse preamble interval 1116 are similar to those described earlier with respect to the control pulse preamble of FIGS. 10A-E (e.g., power control, antenna adjustment, etc.). Following the preamble interval 1116 is an antenna adjustment interval 1117, during which the base station 304 has an opportunity to adjust its transmission antenna, if necessary, so as to direct it towards the second user station M2 based upon information acquired from receipt of the control pulse preamble. Following the antenna adjustment interval 1117 is another guard band 1118, which accounts for the propagation time of the control pulse preamble to the base station 304. After the preamble interval is another transmit/receive switching interval 1119 to allow the base station 304 opportunity to switch from a receive mode to a transmit mode (if necessary), and to allow the second user station M2 opportunity to switch from a transmit mode to a receive mode.

In the following time slot TS2" after the first time slot TS1", the base station 304 transmits, using the base station frequency band 1170, a preamble during the base preamble interval 1102 and a base-to-user message during the base message interval 1103, both directed to the second user station M2. The base station 304 thereby rapidly responds to the control pulse preamble sent by the user station M2. It is assumed, however, in the exemplary time frame 1140 of FIG. 11B that the base station 304 is not in established communication with any user station 302 during the fourth time slot TS4" over the base station frequency band 1170. Thus, in the 123-preamble burst interval 1109 following the base message interval 1103, the base station 304 does not transmit a 123-preamble burst directed to a user station 302.

Simultaneous with the base station transmissions in the second time slot TS2", the base station 304 receives, on the user station frequency band 1171, a preamble during the datalink preamble interval 1112 and a user-to-base message during the user message interval 1113 from the user station M1 with which the base station 304 communicated in the first time slot TS1". Similar to the first time slot TS1", during the control pulse preamble interval 1116 of the second time slot TS2" on the user station frequency band 1171, the base station 304 receives a control pulse preamble from the user station M3 to which the base station 304 is to transmit in the following time slot TS3".

In the third time slot TS3", the base station 304 transmits, using the base station frequency band 1170, a preamble during the base preamble interval 1102 and a base-to-user message during the base message interval 1103, both directed to the third user station M3. Following the base message interval 1103 is a 123-preamble burst interval 1109 during which the base station 304 transmits three short preamble bursts (i.e., the 123-preamble burst) directed to a different user station M5, with which the base station 304 intends to communicate two time slots 1141 later.

Simultaneous with the base station transmissions, the base station 304 receives, on the user station frequency band 1171, a preamble during the datalink preamble interval 1112 and a user-to-base message during the user message interval 1113 from the user station M2 with which the base station 304 communicated in the previous time slot TS2". Because the base station 304 is not in established communication with any user station 302 during the fourth time slot TS4" over the base station frequency band 1170, the base station 304 does not receive a control pulse preamble during the control pulse preamble interval 1116 of the third time slot TS3" on the user station frequency band 1171.

A similar exchange is carried out in the fourth time slot TS4", and in subsequent time slots 1141 as well. Whether or not particular user-to-base message, base-to-user messages, and preambles or control pulse preambles are transmitted depends on whether or not the base station 304 is in communication with a user station 302 requiring such exchanges at the particular time.

Thus, in general, to support communication between a user station 302 and base station 304 communicating during a single time slot 1141, four messages are exchanged in each time frame 1140 between the particular user station 302 and the base station 304. The base station 304 first sends a 123-preamble in a 123-preamble interval 1109 of the time slot 1141 two slots 1141 prior to which the base station 304 intends to transmit to the user station 302. In the following time slot 1141, on a different frequency band 1171, the user station 302 responds by sending a control pulse preamble, which is received at the base station 304 during the control pulse preamble interval 1116. In the following time slot 1141, after making determinations as to power adjustment and/or timing adjustment, the base station 304 transmits to the user station 304 a base-to-user message during the base message interval 1103 on the base station frequency band 1170. In the following time slot 1141, after adjusting its power and/or timing, the user station 304 responds with a user-to-base message, which is received at the base station 304 during the user message interval 1113.

As noted, it is assumed in the exemplary time frame 1140 of FIG. 11B that the base station 304 is not in established communication with any user station 302 during the fourth time slot TS4" over the base station frequency band 1170. The base station 304 may indicate that a particular time slot 1141, such as time slot TS4", is available for communication by, for example, transmitting a general polling message during the base message interval 1103 of the time slot TS4".

Should a user station 302 desire to establish communication with the base station 304 (such as in the fourth time slot TS4"), then, in response to the base station 304 transmitting a general polling message during the base message interval 1103 of the fourth time slot TS4", the new user station 302 may send a general polling response message during a user message interval 1113 of the following time slot TS5" (not shown). When the new user station 302 responds with a general polling response message, the base station 304 may determine the range of the user station 302 and thereby determine a required timing adjustment for subsequent transmissions by the user station 302. The base station 304 may thereafter issue periodic timing adjustment commands to maintain receipt of user-to-base transmissions at the start of each user timing interval. The base station 304 may monitor the distance of the user station 302 by looking to the time of receiving either the control pulse preamble or the user-to-base message from a user station 302.

Figure 11D:
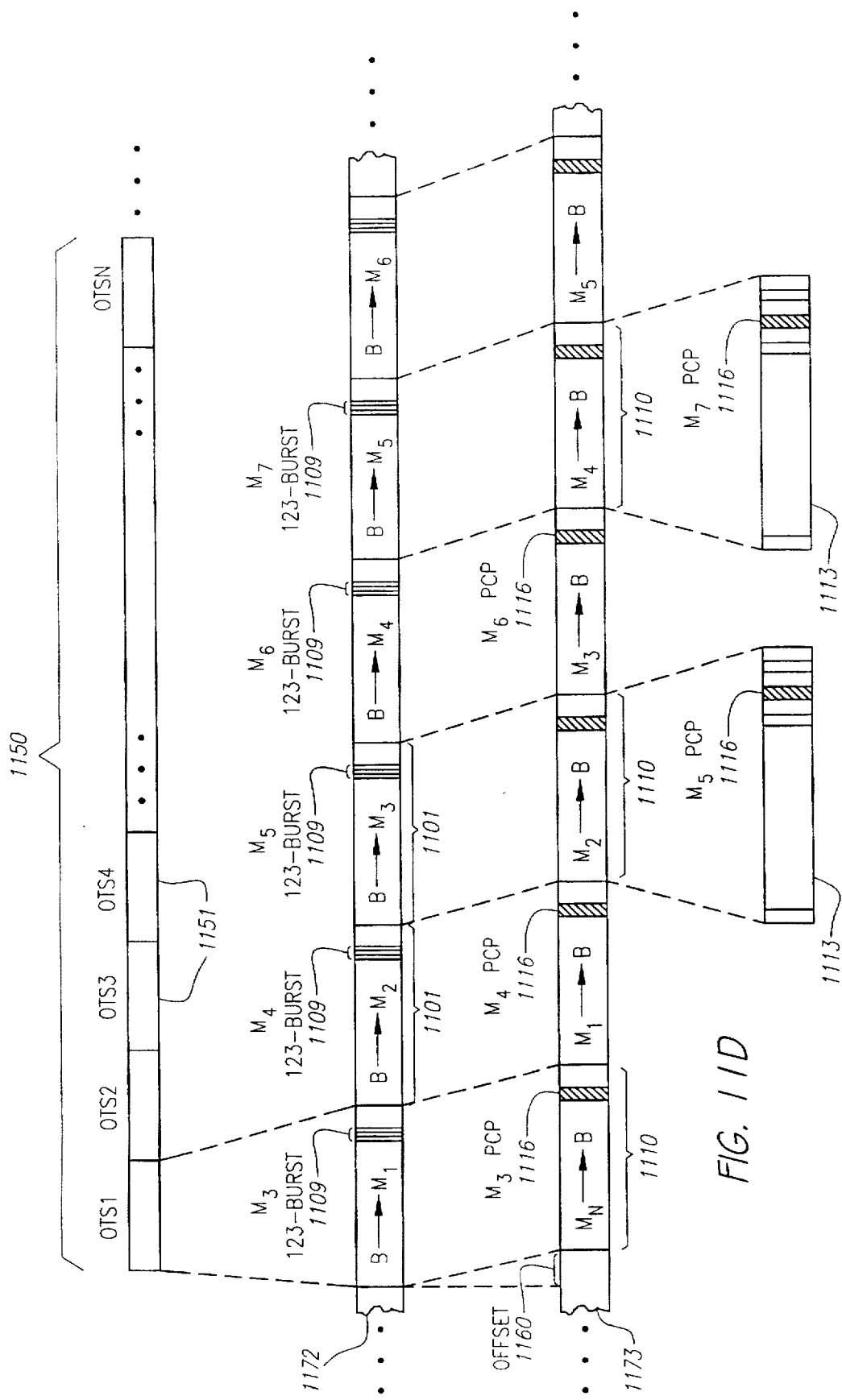

For efficiency reasons, the guard times 1114 and 1118 are preferably kept to a minimum. The smaller the guard times 1114, 1118, the more user stations 302 may be supported by the frame structure of FIG. 11B. Typically, therefore, the guard times 1114, 1118 will not be of sufficient duration to allow a full ranging transaction to occur. In particular, a ranging transaction may result in interference between the transmission of a user station 302 seeking to establish communication and the control pulse preamble of the user station 302 already in communication in the immediately following time slot 1141 with the base station 304. If the guard times are lengthened to permit ranging transactions, then fewer user stations 302 can be supported, particularly in a large cell environment. An alternative structure having improved efficiency in a large cell environment, along with the flexibility of ranging transactions, is shown in FIGS. 11C and 11D and explained in more detail below.

Proper timing is preferably set upon initial establishment of communication, and the transmissions from the user stations, such as the first user station M1, may be maintained in time alignment as seen at the base station 304 by timing adjustment commands from the base station 304, similar to the timing adjustment commands described elsewhere herein. A full round-trip guard time need not be included in each time slot 1141 because the user stations 302 and base station 304 transmit on different frequency bands, preventing interference between base-to-user messages and user-to-base messages.

The depiction of the frame structure in FIGS. 11A–B assumes that the user stations 302 are at zero distance from the base station 304, and therefore the user-to-base message appears immediately after the preamble interval 1112 or 1122. However, if the user station 302 is not immediately adjacent to the base station 304, then part of guard time 1114 shown in FIG. 11A will be consumed in the propagation of the preamble and user-to-base message to the base station 304. Thus, if the user station 302 is at the cell periphery, then the user-to-base message will appear at the base station 304 after the elapsing of a time period equal at most to the duration of guard time 1114. In order to ensure that the guard times 1114 and 1118 are kept to a minimum, timing adjustment commands are preferably transmitted from the base station 304 periodically so as to keep the user preambles and user-to-base messages arriving at the base station 304 as close to the start of the user timing sub-element 1110 as possible, without interfering with the transmissions of the previous use station 302.

If a ranging transaction is supported in the FIG. 11B environment, then the portion of a time slot 1141 on the user station frequency band 1171 may comprise a range timing sub-element 1121, as described previously with respect to FIG. 11A, during which a ranging transaction is carried out between the base station 304 and a new user station 302. Thus, the user station 302 transmits a preamble during a ranging preamble interval 1122 of time slot 1141, and transmits a ranging message during the user ranging message interval 1123 of time slot 1141. The user station 302 delays transmitting the preamble and ranging message for an amount of time $\Delta T$. The delay time $\Delta T$ may be communicated by the base station 304 as part of the general polling message, or may be a pre-programmed system parameter. The base station 304 determines the propagation delay from the user station 302 to the base station 304 by measuring the round trip propagation delay from the end of the previous time slot 1141 to the time of actual receipt of the responsive preamble and ranging message from the user station 302, taking into account the delay time $\Delta T$.

In the above described embodiment supporting ranging transactions, the ranging guard band 1124 is preferably of sufficient length to allow the ranging transaction between the base station 304 and the user station 302 to occur. Thus, the length of the ranging guard band 1124 is determined in part by the radius of the cell 303 in which the base station 304 is located, or may be determined in part by the maximum cell radius of the cellular system.

In response to receiving the ranging message from the user station 302 and determining the distance of the user station 302 and/or the propagation delay time thereto, the base station 304 may issue a timing adjustment command to the user station 302 in the next time frame 1140 instructing the user station 302 to advance or retard its timing by a designated amount. For the time frame 1140 immediately after communication with the user station 302 is established, the timing adjustment command may be set equal to the round-trip propagation time as determined by the base station 304 during the ranging transaction. Preferably, the timing adjustment command is selected so as to cause the user transmission from the user station 302 to the base station 304 in the subsequent time frame 1140 to be received by the base station 304 immediately after the end of the previous time slot 1141.

In addition to being used for ranging purposes, the ranging message may also contain other information to assist the base station 304 in handshaking with the user station 302. For example, the ranging message may contain as data a user identifier for the user station 302 seeking to establish communication. The ranging message may also indicate a preferred spread spectrum code to be used by the base station 304 and the particular user station 302 in subsequent communications.

It may be possible to minimize potential interference between ranging messages and control pulse preambles by using a particular designated spread spectrum code for only ranging messages, or for only control pulse preambles. However, code division multiplexing in such a manner may not provide satisfactory isolation between the interfering signals, or may require unacceptably long time slots.

In the following time frames 1140, after establishing communication with user station M3 in the manner described above, communication may be carried out between the base station 304 and the user station M3 in an interleaved fashion over several time slots 1140. As part of each transmission from the base station 304, the base station 304 may update the timing adjustment command to the user station M3.

Should a user station 302 terminate communication in a time slot 1141 or be handed off to a new base station 304, then the base station 304 may begin to transmit a general polling message during the newly opened time slot 1141, indicating that the time slot 1141 is free for communication. New user stations 302 may thereby establish communication with the same base station 304.

A simple means to adapt an FDD/TDMA system such as shown in FIG. 11B to emulate a TDD system is to alternately black out time slots on each of the two frequency bands 1170 and 1171. Thus, during time slot TS1", the base station 304 transmits to a user station $M_1$ over frequency band 1170, while no transmission is conducted over frequency band 1171. During the next time slot TS2", the user station M1 responds over frequency band 1171, while no transmission is conducted over frequency band 1170. The next two time slots TS3" and TS4" are used for duplex communication between the base station 304 and the next user station $M_2$, with the user slot in TS3" and the base slot in TS4" being dormant. The described frame structure generally supports fewer user stations 302 than the frame structure shown in FIG. 11B due to the dormancy of alternating time slots on each frequency band 1170 and 1171, but allows a TDD interface such as shown in FIG. 10B to be emulated with minimal modification to the base and user stations (e.g., by transmitting and receiving on different frequency bands). If both frequency bands 1170 and 1171 are selected to be the same, then the system will be true TDD, thus allowing the same hardware to be capable of either FDD/TDMA or TDD operation simply by appropriate selection of the frequency bands and appropriate selection of the time slots (i.e., by selecting in an alternating manner) on the forward and reverse links during which to transmit.

FIG. 11C is a timing diagram for an offset interleaved FDD/TDMA frame structure using the timing sub-elements depicted in FIG. 11A, as shown from the perspective of the base station 304. As described further below, the offset interleaved FDD/TDMA frame structure of FIG. 11C permits larger cells by allowing time for user stations 302 to receive base station transmissions intended for them before having to reply, and may prevent the need for a costly diplexer in the user station 302.

FIG. 11C is a frame structure for a system using two frequency bands for communication in addition to certain aspects of time division multiple access. A first frequency band 1172, also referred to as a base station frequency band, is used primarily for communication from a base station 304 to user stations 302. A second frequency band 1173, also referred to as a user station frequency band, is used primarily for communication from the user stations 302 to the base station 304. The two frequency bands 1172, 1173 are preferably located 80 MHz apart. The 80 MHz frequency separation helps to minimize co-channel interference and allows easier construction of filters in the receiver for filtering out potentially interfering signals from the reverse path communication.

In the frame structure of FIG. 11C, a time frame 1150 comprises a plurality of time slots 1151. For convenience, time slots are designated in sequential order as OTS1, OTS2, OTS3, and so on. Each time slot 1151 comprises a base timing sub-element 1101 on the base station frequency band 1170, and either a user datalink timing sub-element 1110 or a range timing sub-element 1121 on the user station frequency band 1171. The time slots 1151 are shown from the perspective of the base station 304, so that the base timing sub-elements 1101 and the user timing sub-elements 1110, 1121 appear staggered in FIG. 11C by a predetermined offset time 1160. The frame structure of FIG. 11C supports both range timing sub-elements 1121 and user datalink timing sub-elements 1110 on the user station frequency band 1171.

In operation, the base station 304 transmits, as part of the base timing sub-element 1101 of each time slot 1151, in sequence to user stations 302 with which the base station 304 has established communication. Thus, the base station 304 transmits a preamble during the preamble interval 1102 and a base-to-user message during the base message interval 1103. After the base message interval 1103, the base station 304 transmits three short preamble bursts in the 123-preamble burst interval 1109 directed to a different user station 302. In the exemplary system of FIG. 11C, the three preamble bursts in the 123-preamble burst interval 1109 are directed to the user station 302 to which the base station 304 will be sending a main data message two time slots 1151 later.

As with the system of FIG. 11B, the three short preamble bursts sent in the 123-preamble burst interval 1109 may be used for forward link diversity sensing and forward link power control purposes. Each of these three preamble bursts may be transmitted on a different antenna to allow receiving user stations 302 an opportunity to make a diversity selection for an upcoming forward link data message in a subsequent time slot 1151.

Following the 123-preamble burst interval 1109 is the base fill code interval 1107, during which the base station 304 transmits a fill code. Following the base code fill interval 1107 is the transmit/receive switch interval 1104, during which the base station 304 may switch from a transmit mode to a receive mode. Preferably, however, the base station 304 has separate transmit and receive hardware, and therefore does not need to switch modes. Instead, the base station 304 may continue to transmit a fill code during the transmit/receive switch interval 1104.

The specific communication exchanges shown in the example of FIG. 11C will now be explained in more detail. In the first time slot OTS1, on the base station frequency band 1172, the base station transmits a base-to-user message in the base message interval 1103 directed to a first user station M1. The base station 304 then transmits a 123-preamble burst during the 123-preamble burst interval 1109, directed to another user station M3. Simultaneous with the base station transmissions, but offset therefrom by an offset time 1160, the base station 304 receives, on the user station frequency band 1173, a preamble during the datalink preamble interval 1112 and a user-to-base message during the user message interval 1113 from the last user station MN with which the base station 304 is in communication. During the control pulse preamble interval 1116 of the first time slot OTS1 on the user station frequency band 1173, the base station 304 receives a control pulse preamble from the user station M2 to which the base station 304 is to transmit in the following time slot OTS2.

The functions of the control pulse preamble sent during the control pulse preamble interval 1116 are similar to those described earlier with respect to the control pulse preamble of FIGS. 10A–E and 11B (e.g., power control, antenna adjustment, etc.). Following the preamble interval 1116 is an antenna adjustment interval 1117, during which the base station 304 has an opportunity to adjust its transmission antenna, if necessary, so as to direct it towards the second user station M2 based upon information acquired from receipt of the control pulse preamble. Following the antenna adjustment interval 1117 is another guard band 1118, to allow for propagation of the control pulse preamble to the base station 304. After the preamble interval is another transmit/receive switching interval 1119 to allow the base station 304 opportunity to switch from a receive mode to a transmit mode (if necessary), and to allow the second user station M2 opportunity to switch from a transmit mode to a receive mode.

In the following time slot OTS2 after the first time slot OTS1, the base station 304 transmits, using the base station frequency band 1172, a preamble during the base preamble interval 1102 and a base-to-user message during the base message interval 1103, both directed to the second user station M2. The base station 304 thereby rapidly responds to the control pulse preamble sent by the user station M2. It is assumed, however, in the exemplary time frame 1150 of FIG. 11C that the base station 304 is not in established communication with any user station 302 during the fourth time slot OTS4 over the base station frequency band 1172. Thus, in the 123-preamble burst interval 1109 following the base message interval 1103 in the second time slot OTS2, the base station 304 does not transmit a 123-preamble burst directed to a user station 302.

Simultaneous with the base station transmissions in the second time slot OTS2 but offset therefrom by an offset time 1160, the base station 304 receives, on the user station frequency band 1173, a preamble during the datalink preamble interval 1112 and a user-to-base message during the user message interval 1113 from the user station M1 with which the base station 304 communicated in the first time slot OTS1. As with the first time slot OTS1, during the control pulse preamble interval 1116 of the second time slot OTS2 on the user station frequency band 1173, the base station 304 receives a control pulse preamble from the user station M3 to which the base station 304 is to transmit in the following time slot OTS3.

In the third time slot OTS3, the base station 304 transmits, using the base station frequency band 1172, a preamble during the base preamble interval 1102 and a base-to-user message during the base message interval 1103, both directed to the third user station M3. Following the base message interval 1103 is a 123-preamble burst interval 1109 during which the base station 304 transmits three short preamble bursts (i.e., the 123-preamble burst) directed to a different user station M5, with which the base station 304 will communicate two slots 1151 later.

Simultaneous with the base station transmissions but offset therefrom by an offset time 1160, the base station 304 receives, on the user station frequency band 1173, a preamble during the datalink preamble interval 1112 and a user-to-base message during the user message interval 1113 from the user station M2 with which the base station 304 communicated in the previous time slot OTS2. Because the base station 304 is not in established communication with any user station 302 during the fourth time slot OTS4 over the base station frequency band 1172, the base station 304 does not receive a control pulse preamble during the control pulse preamble interval 1116 of the third time slot OTS3 on the user station frequency band 1173.

A similar exchange is carried out in the fourth time slot OTS4, and in subsequent time slots 1151 as well. Whether or not particular user-to-base message, base-to-user messages, and preambles or control pulse preambles are transmitted depends on whether or not the base station 304 is in communication with a user station 302 requiring such exchanges at the particular time.

Thus, in general, to support communication between a user station 302 and base station 304 communicating during a single time slot 1151, four messages are exchanged in each time frame 1150 between the particular user station 302 and the base station 304. The base station 304 first sends a 123-preamble in a 123-preamble interval 1109 of the time slot 1151 two slots 1151 prior to which the base station 304 intends to transmit to the user station 302. In the following time slot 1151, on a different frequency band 1173 and delayed by an offset time 1160, the user station 302 responds by sending a control pulse preamble, which is received at the base station 304 during the control pulse preamble interval 1116. In the following time slot 1151, after making determinations as to power adjustment and/or timing adjustment, the base station 304 transmits to the user station 304 a base-to-user message during the base message interval 1103 on the base station frequency band 1172 In the following time slot 1151, after adjusting its power and/or timing, the user station 304 responds with a user-to-base message, which is received at the base station 304 during the user message interval 1113.

It is assumed in the exemplary time frame 1150 of FIG. 11C that the base station 304 is not in established communication with any user station 302 during the fourth time slot OTS4 over the base station frequency band 1172. The base station 304 may indicate that a particular time slot 1151, such as time slot OTS4, is available for communication by, for example, transmitting a general polling message during the base message interval 1103 of the time slot OTS4.

Should a user station 302 desire to establish communication with the base station 304 (such as in the fourth time slot OTS4), then, in response to the base station 304 transmitting a general polling message during the base message interval 1103 of the fourth time slot OTS4, the new user station 302 may send a general polling response message during a user message interval 1113 of the following time slot OTS5. When the new user station 302 responds with a general polling response message, the base station 304 may determine the range of the user station 302 and thereby determine a required timing adjustment for subsequent transmissions by the user station 302.

For efficiency reasons, the guard times 1114 and 1118 are preferably kept to a minimum. The smaller the guard times 1114, 1118, the more user stations 302 may be supported by the frame structure of FIG. 11C.

Proper timing is preferably set upon initial establishment of communication, and the transmissions from the user stations, such as the first user station M1, may be maintained in time alignment as seen at the base station 304 by timing adjustment commands from the base station 304, similar to the timing adjustment commands described elsewhere herein. A full round-trip guard time need not be included in each time slot 1151 because the user stations 302 and base station 304 transmit on different frequency bands, preventing interference between base-to-user messages and user-to-base messages.

The depiction of the frame structure in FIG. 11C (i.e., the exploded time slots 1151) assumes that the user stations 302 are at zero distance from the base station 304. However, if the user station 302 is not immediately adjacent to the base station 304, then part of guard time 1114 (as shown in FIG. 11A) will be consumed in the propagation of the preamble and user-to-base message to the base station 304. Thus, if the user station 302 is at the cell periphery, then the user-to-base message will appear at the base station 304 after the elapsing of a time period equal at most to the duration of guard time 1114. In order to ensure that the guard times 1114 and 1118 are kept to a minimum, timing adjustment commands are preferably transmitted from the base station 304 periodically so as to keep the user preambles and user-to-base messages arriving at the base station 304 as close to the start of the user timing sub-element 1110 as possible, without interfering with the transmissions of the previous use station 302.

When a user station 302 first establishes communication with the base station 304 in the FIG. 11C frame structure, a ranging transaction is carried out. The time slot 1151 on the user station frequency band 1173 during which the ranging transaction is initiated preferably comprises a range timing sub-element 1121, as described previously with respect to FIG. 11A. The user station 302 transmits a preamble during a ranging preamble interval 1122 of time slot 1151, and transmits a ranging message during the user ranging message interval 1123 of time slot 1151. The user station 302 delays transmitting the preamble and ranging message for an amount of time ΔT. The delay time ΔT may be communicated by the base station 304 as part of the general polling message, or may be a pre-programmed system parameter. The base station 304 determines the propagation delay from the user station 302 to the base station 304 by measuring the round trip propagation delay from the end of the previous time slot 1151 to the time of actual receipt of the responsive preamble and ranging message from the user station 302, taking into account the delay time ΔT.

The ranging guard band 1124 should be of sufficient length to allow the ranging transaction between the base station 304 and the user station 302 to occur. Thus, the length of the ranging guard band 1124 is determined in part by the radius of the cell 303 in which the base station 304 is located, or may be determined in part by the maximum cell radius of the cellular system.

In response to receiving the ranging message from the user station 302 and determining the distance of the user station 302 and/or the propagation delay time thereto, the base station 304 may issue a timing adjustment command to the user station 302 in the next time frame 1150 instructing the user station 302 to advance or retard its timing by a designated amount. For the time frame 1150 immediately after communication with the user station 302 is established, the timing adjustment command may be set equal to the round-trip propagation time as determined by the base station 304 during the ranging transaction. Preferably, the timing adjustment command is selected so as to cause the user transmission from the user station 302 to the base station 304 in the subsequent time frame 1150 to be received by the base station 304 immediately after the end of the previous time slot 1151.

In addition to being used for ranging purposes, the ranging message may also contain other information to assist the base station 304 in handshaking with the user station 302. For example, the ranging message may contain as data a user identifier for the user station 302 seeking to establish communication. The ranging message may also indicate a preferred spread spectrum code to be used by the base station 304 and the particular user station 302 in subsequent communications.

It may also be possible to minimize potential interference between ranging messages and control pulse preambles by using a particular designated spread spectrum code for only ranging messages, or for only control pulse preambles. However, it is anticipated that in most cases the use of an offset time 1160 between time slots 1151 on the base frequency band 1172 and the user frequency band 1173 should sufficiently separate the relevant transmissions in time so as to result in a system having minimal interference between user stations 302.

An advantage of the frame structure of FIGS. 11C–D utilizing the offset time 1160 is that a diplexer, a device which allows simultaneous transmission and reception of signals, is generally not necessary in the user station 302. With the fixed offset frame structure of FIG. 11B, on the other hand, a diplexer may be necessary to support a high density of users, particularly in a large cell environment, because a user station 302 may need to transmit in a time slot 1141 prior to receiving the entire base-to-user message intended for it sent in the previous time slot 1141. Because FIG. 11B is constructed from a perspective of the base station 304, the time slots 1141 appear lined up to the base station 304, but the user station 302 is required to send its information in advance of the user portion of the time slot 1141 in order for the information to arrive at the base station 304 lined up as shown in FIG. 11B. In a large cell environment, where a user station 302 is distant, the user station 302 may be required to send its information prior to receiving the entire base-to-user message. In order to do so, the user station 302 may require the capability to transmit and receive information simultaneously, and may thus require a diplexer. In a protocol requiring that the user station 302 receive the base message before responding, the FIG. 11B system may thus not be suitable in a very large cell environment.

In the FIGS. 11C–D embodiment, time slots 1151 on the user frequency band 1173 are offset from those on the base frequency band 1172 by an offset time 1160. The offset time 1160 allows the base-to-user message to propagate to the user station 302 prior to transmission of the user-to-base message by the user station 302. The user station 302 therefore does not need a diplexer, which can be a relatively expensive component. Operation without a diplexer is particularly beneficial where the user station 302 is embodied as a mobile handset, because it is often important to keep manufacturing costs of the handset as low as possible. Other hardware efficiency may also be achieved by not requiring simultaneous transmission and reception; for example, the user station 302 could use the same frequency synthesizer for both transmitting and receiving functions.

FIG. 11D shows a subsequent time frame 1150 after a ranging transaction has been completed with the third user station M3. In FIG. 1D, the transactions between the user stations M1, MN and the base station 304 occurring in the first time slot OTS1 are the same as for FIG. 11C. Also, the transactions between the user stations M1, M2 and the base station 304 occurring in the second time slot OTS2 are the same as for FIG. 11C. However, during the second time slot OTS2, instead of there being no transmitted control pulse preamble in the preamble interval 1116, the third user station M3 may transmit a control pulse preamble during the preamble interval 1116 of the second time slot OTS2.

Alternatively, the user station M3 may wait until the base station 304 acknowledges its ranging message sent in the prior time frame 1150 before transmitting a control pulse preamble during the preamble interval 1116 of each preceding time slot OTS2.

In the following time frames 1150, after establishing communication with the third user station M3 in the manner described above, communication may be carried out between the base station 304 and the user station M3 as shown in FIG. 11D. As part of each transmission from the base station 304, the base station 304 may update the timing adjustment command to the user station M3.

Should a user station 302 terminate communication in a time slot 1151 or be handed off to a new base station 304, then the base station 304 may begin to transmit a general polling message during the newly opened time slot 1151, indicating that the time slot 1151 is free for communication. New user stations 302 may thereby establish communication with the same base station 304.

FIGS. 12A–C are tables showing preferred message formats for base station and user station transmissions. Tables 12B-1 through 12B-3 show message formats for transmissions used in handshaking or an acquisition mode. Tables 12C-1 through 12C-4 show message formats (both symmetric and asymmetric) after acquisition when in traffic mode. It should be noted that the asymmetric message formats are intended for use in the TDD based system variants, but not the FDD based systems. Tables 12A-1 through 12A-4 show the header format for each of the different message types in Tables 12B-1 through 12C-4.

For example, Table 12A-1 shows a header format for a base polling transmission (general or specific) as described earlier. The header format of Table 12A-1 comprises 21 bits. The particular header format comprises 10 fields totalling 19 bits, leaving two spare bits. The fields include a B/H field of 1 bit identifying whether the transmission source is a base station or a user station; an E field of 1 bit which may be used as an extension of the B/H field; a G/S field of 1 bit indicating whether the polling message is general or specific; a P/N field of 1 bit indicating whether the transmission is in a polling or traffic message; an SA field of 1 bit used for identification checking and verification; a PWR field of 3 bits used for power control; a CU field of 2 bits indicating slot utilization; an opposite link quality field of 2 bits indicating how well the sending unit is receiving the opposite sense link; a timing adjustment command of 3 bits providing a command to the user station to adjust its timing if necessary; and a header FCW (frame check word) field of 4 bits used for error detection (similar to a CRC).

A header format for a base traffic transmission is shown in Table 12A-2. The header format is the same as that of Table 12A-1, except that an additional B/W grant field of 2 bits for the allocation of addition bandwidth to the user station 302 through time slot aggregation or asymmetric time slot use. The header format of Table 12A-2 utilizes 21 bits.

A header format for a mobile or user polling transmission is shown in Table 12A-3. The header format is similar to that of Table 12A-1, except that it does not include a CU field or a timing command field. Also, the header format of Table 12A-3 includes a B/W request field of 1 bit for a request of additional bandwidth or time slots. The Table 12A-3 header format includes 6 spare bits.

A header format for a mobile or user traffic transmission is shown in Table 12A-4. The header format of Table 12A-4 is the same as that of Table 12A-3, except that the B/W request field is designated in place of a B/W grant field.

Thus, the header formats for user stations 302 and base stations 304 are selected to be the same length in the exemplary embodiment described with respect to FIGS. 12A–C, whether or not in polling or traffic mode, and whether or not the polling message is general or specific.

Tables 12B-1 through 12B-3 show message formats for transmissions used in handshaking or an acquisition mode. Table 12B-1 shows a message format of 205 bits for a base general polling transmission. The message format of Table 12B-1 includes a header field of 21 bits, which comprises fields shown in Table 12A-1; a base ID field of 32 bits for identifying the base station 304 transmitting the general polling message; various network and system identification fields, such as a service provider field of 16 bits which may be used to indicate, e.g., a telephone network or other communication source, a zone field of 16 bits which may be used to identify, e.g., a paging cluster, and a facility field of 32 bits; a slot number field of 6 bits indicating the slot number of the associated general polling transmission so as to assist the user station 302 in synchronization; and a frame FCW field of 16 bits for error correction and transmission integrity verification.

A message format of 150 bits for a mobile or user station response transmission is shown in Table 12B-3. The message format of Table 12B-3 includes a header field of 21 bits, which comprises fields shown in Table 12A-3; a PID field of 40 bits for identifying the user station 302 responding to the general polling message; a service provider field of 16 bits; a service request field of 16 bits indicating which of a variety of available services from the base station 304 is being sought; a mobile capability field of 8 bits; and a frame FCW field of 16 bits. The mobile capability field comprises two sub-fields, a type or capability sub-field of 2 bits indicating the user station's capability (e.g., diplexer, interleaving of traffic slots), and a home base slot number field of 6 bits for echoing the slot number received from the slot number field of the base general polling transmission. The user station polling response transmission, at 150 bits, is substantially shorter than a base station polling transmission or a traffic message transmission so as to accommodate ranging transactions and allow for uncertain initial propagation delay time from the user station 302 seeking to establish communication.

A message format of 205 bits for a base station specific polling transmission is shown in Table 12B-2. The message format of Table 12B-2 includes a header field of 21 bits, which comprises fields shown in Table 12A-1; a correlative ID field of 8 bits indicating the relative slot location; a result field of 8 bits; a PID field of 40 bits for echoing the identification number received from the user station 302; a map type field of 8 bits for indicating, e.g., the number of time slots for the particular base station 304; a map field of 32 bits, indicating which slots are in use (which the user station 302 may evaluate in gauging potential slot aggregation); a slot number field of 6 bits; and a frame FCW field of 16 bits.

Tables 12C-1 through 12C-4 show message formats (both symmetric and asymmetric) after acquisition when in traffic mode. Tables 12A-1 and 12A-2 are base station traffic mode message formats; the message format of Table 12A-1 is used for a symmetric frame structure, and the format of Table 12A-2 is used for an asymmetric frame structure. Similarly, Tables 12A-3 and 12A-4 are mobile or user station traffic mode message formats; the message format of Table 12A-3 is used for a symmetric frame structure, and the format of Table 12A-4 is used for an asymmetric frame structure.

In a symmetric frame structure, each of the traffic mode messages is 205 bits in length. Each of the traffic mode message comprises a D-channel field (or data field) of 8 bits in length for slow data rate messaging capability, and a B-channel field (or bearer field) of 160 or 176 bits in length, depending on whether or not a frame FCW field of 16 bits is used.

In an asymmetric frame structure, used only in TDD system variants, the traffic mode message from one source is a different length, usually much longer, than the traffic mode message from the other source. The asymmetric frame structure allows a much higher data bandwidth in one direction of the communication link than the other direction. Thus, one of the traffic mode messages is 45 bits in length, while the other traffic mode messages is 365 bits in length. The total length for a forward and reverse link message still totals 410 bits, as with the symmetric frame structure. Each of the traffic mode message comprises a D-channel field (or data field) of 8 bits in length for slow data rate messaging capability, and a B-channel field (or bearer field) of either 0, 16, 320 or 336 bits in length, depending on which source has the higher transmission rate, and depending on whether or not a frame FCW field of 16 bits is used.

Base and user messages are preferably sent using an M-ary encoding technique. The base and user messages are preferably comprised of a concatenated sequence of data symbols, wherein each data symbol represents 5 bits. A spread spectrum code, or symbol code, is transmitted for each data symbol. Thus, a transmitted symbol code may represent a whole or a portion of a data field, or multiple data fields, or portions of more than one data field, of a base or user message.

Preamble processing may be augmented by taking advantage of the control pulse preamble (e.g., in preamble interval 1016) and 123-preamble message transmissions described earlier herein with respect to FIGS. 10A–11D. The control pulse preamble and 123-preamble transmissions generally have fixed timing with respect to the initial preamble transmissions (e.g., in preamble intervals 1002 or 1102) preceding each main user or base transmission, and can be used to aid in synchronization particularly on the reverse link where two full-length preamble transmissions are associated with each main user or base transmission. Preamble length is effectively doubled by processing both the control pulse preamble or 123-preamble, and the preambles preceding the main user or base transmission.

FIGS. 14–17 are charts comparing various performance aspects of selected high tier and low tier air interfaces incorporating designated features of the embodiments described herein. By the term "high tier" is generally meant system coverage over a wide area and hence low capacity. Conversely, the term "low tier" is generally applied to communication services for localized high capacity and/or specialized needs. In one scheme, users are assigned to the lowest tier possible to preserve capacity in higher tiers.

In general, high tier applications are characterized by relatively large cells to provide umbrella coverage and connectivity, wherein users tend to have high measured mobility factors (e.g., high speed vehicular). High tier operations may also be characterized by high transmit power at the base station, high gain receive antennas, and high elevation antenna placement. Factors such as delay spread (resulting from multiple propagation delays due to reflections) and horizontal phase center separation as applied to multipath and antenna diversity can be quite important. For example, increased antenna complexity and aperture size may weigh against the use of large numbers of diversity antennas in high tier applications. Receiver sensitivity may also be an important limiting factor. Small coherence bandwidths make spread spectrum waveforms favored in high tier applications.

Low tier applications are generally characterized by smaller cells with coverage limited by physical obstructions and number of radiating centers rather than receiver sensitivity. Small delay spreads allow for higher symbol rate and favor antenna diversity techniques for overcoming multipath fading. Either spread spectrum or narrowband signals may be used, and narrowband signals may be advantageous for achieving high capacity spot coverage and dynamic channel allocation. Dynamic channel assignment algorithms are favored to provide rapid response to changing traffic requirements and to permit relatively small reuse patterns by taking advantage of physical obstructions. Low tier applications may include, for example, wireless local loop, spot coverage for "holes" in high tier coverage, localized high capacity, and wireless Centrex.

While certain general characteristics of high tier and low tier applications have been described, these terms as applied herein are not meant to restrict the applicability of the principles of the present invention as set forth in its various embodiments. Categorization as high or low tier is merely intended to facilitate illustration of the exemplary embodiments described herein, and provide useful guideposts in system design. The designations of high or low tier are not necessarily exclusive of one another, nor do they necessarily encompass all possible communication systems.

High tier and low tier designations may be applied to operations in either the licensed or unlicensed frequency bands. In the unlicensed isochronous band (1910–1920 MHz), FCC rules essentially require a TDD or TDMA/FDD hybrid because of the narrow available frequency range, with a maximum signal bandwidth of 1.25 MHz. "Listen before talk" capability is commonly required in order to sense and avoid the transmissions of other users prior to transmitting. Applications in the isochronous band are typically of the low tier variety, and include wireless PBX, smart badges (e.g., position determining devices and passive RF radiating devices), home cordless, and compressed video distribution. Dynamic channel allocation and low tier structure is preferred due to the FCC requirements. Further, power limitations generally preclude large cells.

In the Industrial Scientific Medical (ISM) band (2400–2483.5 MHz), applications are similar to the unlicensed isochronous band, except that the federal regulations are somewhat less restrictive. Spread spectrum techniques are preferred to minimize transmission power (e.g., to 1 watt or less), with a minimum of 10 dB processing gain typically required. A TDD or TDMA/FDD hybrid structure is preferred due to the small frequency range of the ISM band.

FIG. 14 is a summary chart comparing various air interfaces, generally grouped by high tier and low tier designations. The first column of FIG. 14 identifies the air interface type. The air interface type is identified by the chipping rate, tier, and frame structure—either TDD (single frequency band with time division) or FDD/TDMA (multiple frequency bands with time division), such as described earlier with respect to FIGS. 10A–E and 11A–D. Thus, for example, the identifier "5.00 HT" appearing in the first row of the first column of the chart of FIG. 14 identifies the air interface as having a chipping rate of 5.00 Megachips (Mcp), being high tier, and having a TDD structure. Similarly, the identifier "0.64 LF" appearing in the sixth row of column one identifies the air interface as having a chipping rate of 0.64 Mcp, being low tier, and having an FDD/TDMA structure. A total of 16 different air interfaces (10 high tier, 6 low tier) are summarized in FIG. 14.

The second column of the chart of FIG. 14 identifies the duplex method, which is also indicated, as described above, by the last initial of the air interface type. The third column of the chart of FIG. 14 identifies the number of time slots for each particular air interface type. For the particular described embodiments, time slots range from 8 to 32. The fourth column of the chart of FIG. 14 identifies the chipping rate (in MHz) for each particular air interface type. The fifth column of the FIG. 14 chart indicates the number of channels in each allocation, which is an approximation of the number of supportable RF channels given a particular bandwidth allocation (e.g., 30 MHz), and may vary according to a chosen modulation technique and the chipping rate. The sixth column of the FIG. 14 chart indicates the sensitivity (in dBm) measured at the antenna post. The seventh and eighth columns of the FIG. 14 chart indicate the number of base stations required in different propagation environments, with 100% being a reference set with respect to the 5.00 HT air interface. The propagation environments considered in the FIG. 14 chart include $R^2$ (open area), $R^4$ (urban), and $R^7$ (low antenna urban), as listed.

The air interface types in FIG. 14 are also broken into four general categories, including high tier, low tier, unlicensed isochronous, and ISM air interface types. High tier operation assumes antenna diversity ($L_{ant}$) using two antennas, a number of resolvable multipaths ($L_{rake}$) of two, and a 30 MHz bandwidth allocation. The number of resolvable multipaths is generally a function of receiver capability, delay spread and antenna placement. Low tier operation assumes antenna diversity using three antennas, a single resolvable communication path, and a 30 MHz bandwidth allocation. Unlicensed isochronous operation assumes antenna diversity using three antennas, a single resolvable communication path, and a 1.25 MHz channel bandwidth. ISM operation assumes antenna diversity using three antennas, a single resolvable communication path, and an 83.5 MHz bandwidth allocation.

FIG. 15 compares the digital range limits (in miles) for the air interfaces described in FIG. 14. Digital range depends in part upon the number of time slots employed and whether ranging (i.e., timing adjustment control) is used. The multiple columns under the heading "Ranging Used" indicate whether or not timing control is implemented in the system, and correspond in the same order to the multiple columns under the "Time Slots" heading, which indicates the number of time slots used. The multiple columns under the "Digital Range" heading correspond in the same order to the columns under the "Ranging Used" and the "Time Slots" headings. Thus, for example, with the 5.00 HT air interface, there are three possible embodiments shown. A first embodiment uses 32 time slots and ranging (timing adjustment), leading to a digital range of 8.47 miles. A second embodiment uses 32 time slots and no ranging, leading to a digital range of 1.91 miles. A third embodiment uses 25 time slots and no ranging, leading to a digital range of 10.06 miles.

It may be observed from the exemplary system parameters shown in the FIG. 15 chart that digital range may be increased either by reducing the number of time slots used, increasing the chipping rate, utilizing multiple frequency bands (i.e., using FDD and TDD techniques), or using ranging (timing adjustment).

FIG. 16 is a chart describing the impact of various air interface structures on base-user initial handshaking negotiations and on time slot aggregation. The variables considered in FIG. 16 are whether the base station 304 operates in a ranging or non-ranging mode, whether the user station 302 has a diplexer, whether a forward link antenna probe signal is employed, and whether interleaved traffic streams are supported. The number of base time slots which must occur between each communication are shown under the heading "Number of Base Slots Forbidden Between." The number is different for initial acquisition transactions, which appear under the sub-heading "GP/SP Negotiations" (GP referring to general polling messages, and SP referring to specific polling messages, as explained previously herein), and for traffic mode transactions, which appear under the heading "Same Mobile Traffic Slots." The latter number determines maximum slot aggregation, which appears in the last column (as a percentage of the total time frame).

From the FIG. 16 chart, it can be seen that supporting ranging transactions may require a system to take into consideration delays in initial acquisition transactions. Further, the ability to support ranging transactions may also impact slot aggregation potential. This impact may be mitigated or eliminated if the user station 302 is outfitted with a diplexer, allowing the user station 302 to transmit and receive signals simultaneously.

The Technical Appendix supplementing this disclosure sets forth illustrative high tier and low tier air interface specifications in more detail. In particular, specifications are provided for the air interfaces designated as 5.00 HT, 2.80 HF, 1.60 HF, 1.40 HF, 0.64 LF, 0.56 LF, and 0.35 LF in various configurations.

FIG. 13 is a chart comparing preamble detection performance in high tier and low tier environments for a number of different air interfaces previously described. Longer preambles may be desired for asynchronous code separation, particularly in high tier applications. Shorter preambles may suffice for selected non-spread low tier and unlicensed isochronous environments, particularly where larger average N reuse patterns are employed.

The FIG. 13 chart tabulates preamble detection performance in Rayleigh fading assuming use of three antennas and employment of antenna diversity techniques, wherein the strongest of the three antenna signals is selected for communication. For preamble detection, it is desirable to have at least a 99.9% detection probability to ensure reliable communications and to prevent the preamble from becoming a link performance limiting factor. Antenna probe detections are not required to be as reliable because they are used only in diversity processing, so a failure to detect an antenna probe signal merely leads to a power increase command for the forward link.

Associated with each air interface type listed in the FIG. 13 chart is an exemplary preamble codeword length in the second column thereof, and an exemplary antenna probe codeword length (for each of three antenna probe signals in three-antenna diversity) in the fourth main column thereof. Codeword length is given in chips. The third main column and the fifth main column of the FIG. 13 chart compare detection performance for a 99.9% detection threshold and a 90% detection threshold, respectively, for the case of no sidelobe and a −7 dB peak sidelobe. As preamble codeword length decreases, relative cross-correlation power levels (i.e., the power difference between the peak autocorrelation power level and the cross-correlation power level) increase. Thus, the FIG. 13 chart shows that raising detection thresholds to reject cross-correlation sidelobes from other transmitters also leads to degraded preamble detection performance. A higher signal-to-noise ratio for the system may be necessary where preamble detection thresholds are raised.

A flexible, highly adaptable air interface system has thus far been described, having application to TDD and FDD/TDMA operations wherein either spread spectrum or narrowband signal techniques, or both, are employed. Basic timing elements for ranging transactions and traffic mode exchanges, including a provision for a control pulse preamble, are used in the definition of a suitable frame structure. The basic timing elements differ slightly for TDD and FDD/TDMA frame structures, as described with respect to FIGS. 10A and 11A. The basic timing elements may be used in either a fixed or interleaved format, and either zero offset format or an offset format, as previously described. The frame structures are suitable for use in high tier or low tier applications, and a single base station or user station may support more than one frame structure and more than one mode (e.g., spread spectrum or narrowband, or low or high tier).

Advantages exist with both the TDD and FDD/TDMA air interface structures. A TDD structure more readily supports asymmetric data rates between forward and reverse links by shifting a percentage of the timeline allocated to each link. A TDD structure allows for antenna diversity to be accomplished at the base station 304 for both the forward and reverse links since the propagation paths are symmetric with respect to multipath fading (but not necessarily interference). A TDD structure also permits simpler phased array antenna designs in high-gain base station installations because separate forward and reverse link manifold structures are not needed. Further, TDD systems are more able to share frequencies with existing fixed microwave (OFS) users because fewer frequency bands are needed.

An FDD/TDMA structure may reduce adjacent channel interference caused by other base or mobile transmissions. An FDD/TDMA system generally has 3 dB better sensitivity than a comparable TDD system, therefore potentially requiring fewer base stations and being less expensive to deploy. An FDD/TDMA structure may lessen sensitivity to multipath induced intersymbol interference because half the symbol rate is used as compared with TDD. Further, mobile units in an FDD/TDMA system may use less power and be cheaper to manufacture since bandwidths are halved, D/A and A/D conversion rates are halved, and RF related signal processing elements operate at half the speed. An FDD/TDMA system may require less frequency separation between adjacent high and low tier operations, and may allow base stations to operate without global synchronization, particularly when in low tier modes. Digital range may also be increased in an FDD/TDMA system because the timelines are twice as drawn out.

Figure 18:
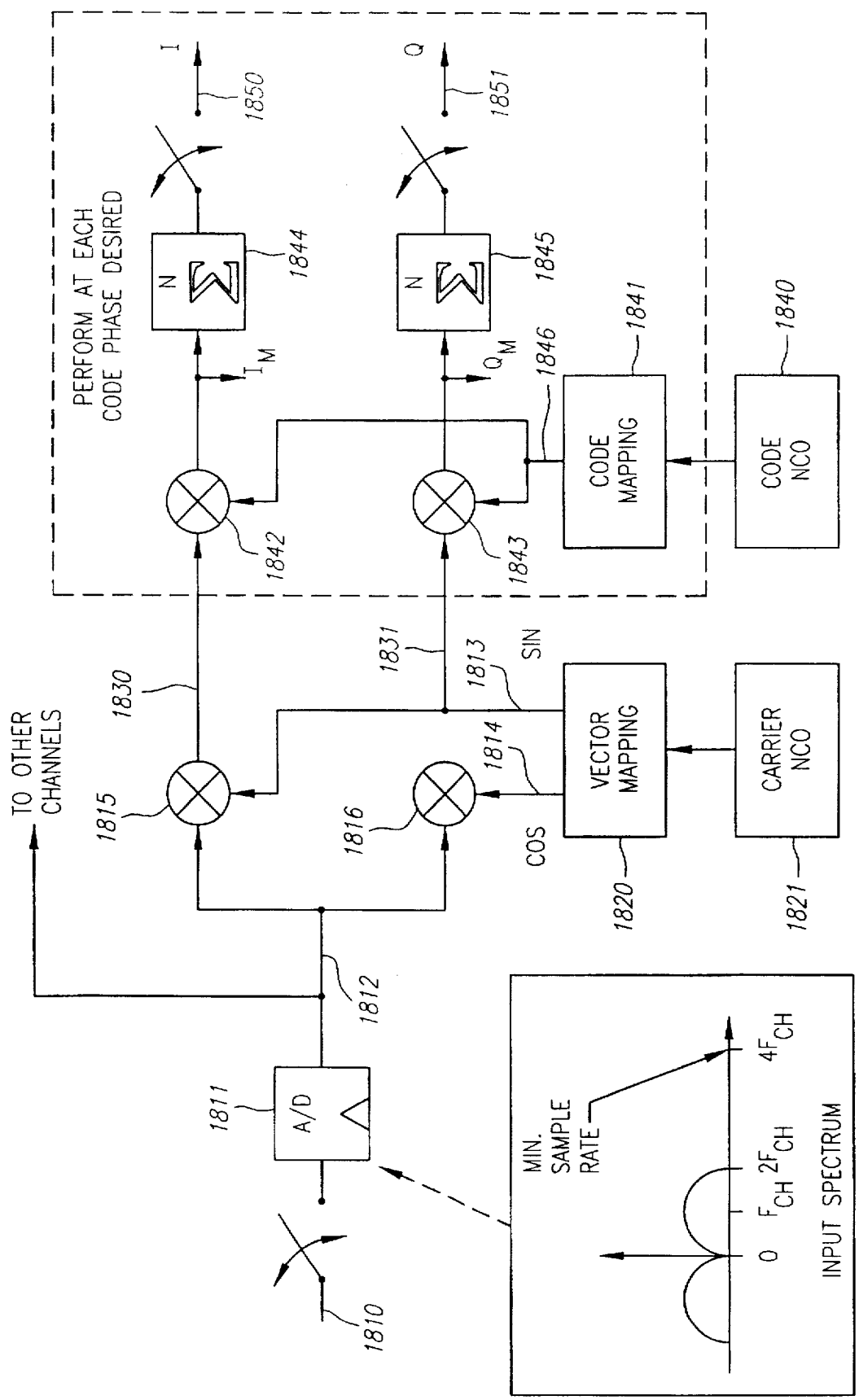
FIG. 18 is a block diagram of a low IF digital correlator.

FIG. 18 is a block diagram of a particular low IF digital correlator for use in a receiver operating in conjunction with the air interface structures disclosed herein, although it should be noted that a variety of different correlators may be suitable for use in the various embodiments disclosed herein. In the FIG. 18 correlator, a received signal 1810 is provided to an analog-to-digital (A/D) converter 1811. The A/D converter 1811 preferably performs one or two bit A/D conversion and operates at roughly four times the code rate or higher. Thus, code rates of 1.023 MHz to 10.23 MHz result in sample rates for A/D converter 1811 in the range of 4 to 50 MHz.

The A/D converter 1811 outputs a digitized signal 1812, which is connected to two multipliers 1815 and 1816. A carrier numerically controlled oscillator (NCO) block 1821 and a vector mapping block 1820 operate in conjunction to provide an appropriate frequency for demodulation and downconversion to a low IF frequency. The vector mapping block 1820 outputs a sine signal 1813 and a cosine signal 1814 at the selected conversion frequency. The sine signal 1813 is connected to multiplier 1815, and the cosine signal 1816 is connected to multiplier 1816, so as to generate an I IF signal 1830 and a Q IF signal 1831. The I IF signal 1830 is connected to an I multiplier 1842, and the Q IF signal 1831 is connected to a Q multiplier 1843.

A code NCO block 1840 and a code mapping block 1841 operate in conjunction to provide a selected spread spectrum code 1846. The selected spread spectrum code 1846 is coupled to both the I multiplier 1842 and the Q multiplier 1843. The output of the I multiplier 1842 is connected to an I summer 1844 which counts the number of matches between the I IF signal 1030 and the selected spread spectrum code 1846. The output of the Q multiplier 1843 is connected to an Q summer 1845 which counts the number of matches between the Q IF signal 1031 and the selected spread spectrum code 1846. The I summer 1844 outputs an I correlation signal 1850, and the Q summer 1845 outputs a Q correlation signal 1851.

Alternatively, a zero IF digital correlator may be used instead of a low IF digital correlator. A zero IF digital correlator performs I and Q separation prior to A/D conversion, hence requiring the use of two A/D converters instead of one. The A/D converters for the zero IF correlator may operate at the code rate, instead of at four times the code rate as is done by A/D converter 1811.

Figure 19A:
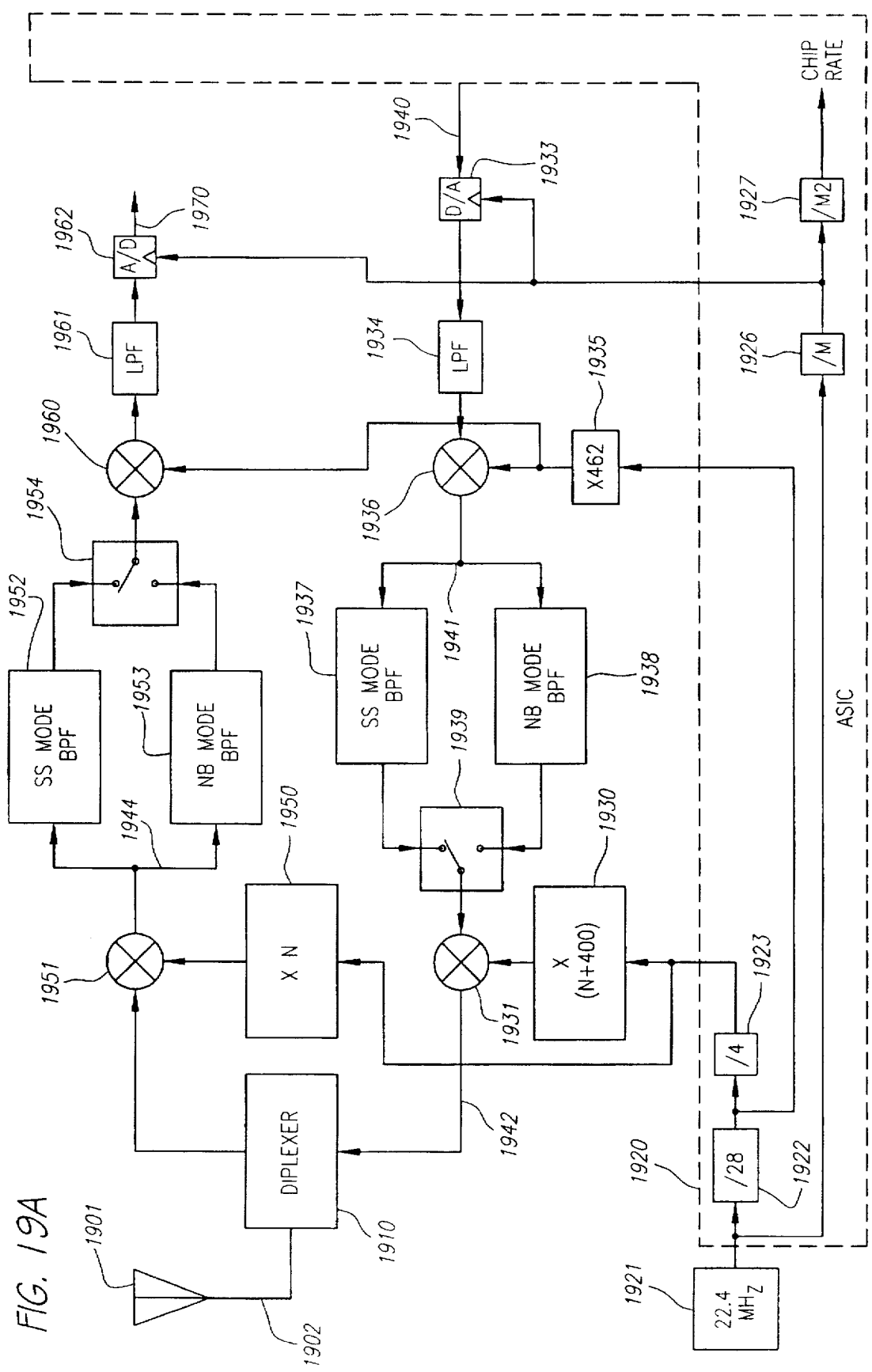
FIG. 19A is a block diagram of a dual-mode base station capable of operating over multiple frequencies and having both spread spectrum and narrowband communication capabilities.

FIG. 19A is a block diagram of an exemplary dual-mode base station capable of operating over multiple frequencies and having both spread spectrum and narrowband communication capabilities. The base station block diagram of FIG. 19A includes a frequency plan architecture for use with a low IF digital transceiver ASIC 1920. The base station may employ an FDD technique wherein the user stations 302 transmit at the lower duplex frequency, and the base station 304 transmits at the higher duplex frequency. The base station of FIG. 19A preferably uses a direct synthesis digital CPM modulator, such as described, for example, in Kopta, "New Universal All Digital CPM Modulator," *IEEE Trans. COM* (April 1987).

The FIG. 19A dual-mode base station comprises an antenna 1901, preferably capable of operating at a 2 GHz frequency range. The antenna 1901 is connected to a diplexer 1910, which allows the base station to simultaneously transmit and receive signals through the antenna 1901. The transmitted and received signals are translated to appropriate frequencies generated by multiplying or dividing a master clock frequency output from a master oscillator 1921. The master oscillator 1921 generates a master frequency (e.g., 22.4 MHz) which is provided to a clock divider circuit 1922 for dividing the master frequency by a predefined factor, e.g., 28. The master oscillator 1921 is also connected to another clock divider circuit 1926 which divides the master frequency by a programmable parameter M, determined by the physical layer with over which the base station operates. The output of clock divider circuit 1926 may be further divided down by another clock divider 1927 which divides by a programmable parameter M2, in order to support a second mode of operation over a different physical layer, if desired.

Signals to be transmitted are provided by ASIC 1920 to a digital-to-analog (D/A) converter 1933, which is clocked by a signal from clock divider circuit 1926. The output of the D/A converter 1933 is connected to a low pass filter 1934 to provide smoothing of the signal envelope. The low pass filter 1934 is connected to a multiplier 1936. An output from the clock divider circuit 1922 is connected to a frequency multiplier circuit 1935 which multiplies its input by a conversion factor, such as 462. The frequency multiplier circuit 1935 is connected to a multiplier 1936, which multiplies its inputs to generate an IF transmission signal 1941. The IF transmission signal 1941 is connected to a spread spectrum bandpass filter 1937 and a narrowband bandpass filter 1938. The spread spectrum bandpass filter 1937 is a wideband filter, while the narrowband bandpass filter 1938 operates over a relatively narrow bandwidth. The bandpass filters 1937 and 1938 filter out, among other things, CPM modulator spurs from the transmitter. A multiplexer 1939 selects between an output from the spread spectrum bandpass filter 1937 and an output from the narrowband bandpass filter 1938, depending upon the mode of operation of the base station.

Multiplexer 1939 is connected to a multiplier 1931. The clock divider circuit 1922 is connected to another clock divider circuit 1923, which divides its input by a factor, e.g., of 4. The output of the clock divider circuit 1923 is connected to a frequency multiplier circuit 1930, which multiplies its input by a factor of (N+400), where N defines the frequency of the receiving channel, as further described herein. The frequency multiplier circuit 1930 is connected to the multiplier 1931, which multiplies its inputs to generate an output signal 1942. The output signal 1942 is connected to the diplexer 1910, which allows transmission of the output signal 1942 over the antenna 1901.

Signals received over the antenna 1901 pass through the diplexer 1910 and are provided to a multiplier 1951. Clock divider circuit 1923 is connected to a frequency multiplier circuit 1950, which multiplies its input by a factor of, e.g., N. The frequency multiplier circuit 1950 is connected to multiplier 1951, which combines its inputs and generates a first IF signal 1944. The first IF signal 1944 is connected to a spread spectrum bandpass filter 1952 and a narrowband bandpass filter 1953. The spread spectrum bandpass filter 1952 is a wideband filter, while the narrowband bandpass filter 1953 operates over a relatively narrow bandwidth. The bandpass filters 1952 and 1953 remove image noise and act as anti-aliasing filters. A multiplexer 1954 selects between an output from the spread spectrum bandpass filter 1952 and an output from the narrowband bandpass filter 1953.

Multiplexer 1954 is connected to a multiplier 1960. An output from frequency multiplier circuit 1935 is also connected to multiplier 1960, which outputs a final IF signal 1946. The final IF signal 1946 is connected to a low pass filter 1961 and thereafter to an A/D converter 1962. The A/D converter 1962 is clocked at a rate determined by the clock divider circuit 1926. The output of the A/D converter is provided to ASIC 1920 for correlation and further processing. In particular, the received signal may be processed by the low IF correlator shown in FIG. 18 and described above, in which case A/D converter 1961 may be the same as A/D converter 1811.

Typically, due to cost and equipment constraints, only one narrowband and one spread spectrum mode will be supported, although as many modes as needed can be supported by a single base station by providing similar additional hardware.

Figure 19B:
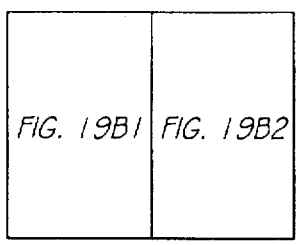
FIG. 19B is a chart showing selected frequencies and other parameters for use in the dual-mode base station of FIG. 19A.

FIG. 19B is a chart showing selected frequencies and other parameters for use in the dual-mode base station of FIG. 19A. The FIG. 19B chart is divided according to spread spectrum and narrowband modes. The first three columns relate to different transmission rates using spread spectrum techniques, and the latter four columns relate to different transmission rates using narrowband techniques. The frequencies in each column are given in megahertz. The master oscillator frequency is designated in FIG. 19B as f0. M and M2 are programmable divide ratios for clock divider circuits 1926 and 1927. The sample rate in FIG. 19B applies to the A/D converter 1962 and D/A converter 1933. The Fs/(IB+ Fch) figure represents the sampling ratio. The final IF frequency and second IF frequency are the center frequencies of the bandpass filters. Towards the bottom of FIG. 19B are sample first LO and N numbers for three different input frequencies, 1850 MHz, 1850.2 MHz, and 1930 MHz.

The frequencies and other parameters appearing in the FIG. 19B chart may be selected by use of a microprocessor or other software controller, which may refer to the system timing information or clocks as necessary to coordinate the time of switching the selected frequencies and other parameters when necessary.

A user station 302 may be designed in a similar fashion to the dual-mode base station of FIGS. 19A–B, except that a user station 304 may not require a diplexer 1910 in air interface structures wherein the user station 302 does not need to transmit and receive simultaneously. Also, frequency multiplier circuits 1930 and 1950 would be swapped because the user station 302 transmits and receives on the opposite frequency bands from the base station 304.

ALTERNATIVE EMBODIMENTS

While preferred embodiments are disclosed herein, many variations are possible which remain within the concept and scope of the invention, and these variations would become clear to one of ordinary skill in the art after perusal of the specification, drawings and claims herein.

For example, although several embodiments have generally been described with reference to spread spectrum communication, the invention is not limited to spread spectrum communication techniques. In some narrowband applications, no preamble would be required as code synchronization is not an issue (although synchronization within a TDD or TDMA structure would still be necessary).

Moreover, while the control pulse preamble described with respect to FIGS. 10A–E and 11A–D facilitates operation in some environments, these embodiments may also be implemented without the control pulse preamble. The various functions carried out by the control pulse preamble (e.g., power control, antenna selection, and the like) may be accomplished by analyzing other portions of the user transmission, or may not be necessary.

In an alternative embodiment, one or more system control channels are used so as to facilitate paging of and other transactions with user stations 302 operating within a covered region. In this embodiment, the control channel or channels provide base station or system information including traffic information at neighboring base stations to assist in handoff determinations, system identification and ownership information, open time slot information, antenna scan and gain parameters, and base station loading status. The control channel or channels may also specify user station operating parameters (e.g., timer counts, or actionable thresholds for power control, handoff, and the like), provide incoming call alerting (e.g., paging), provide time frame or other synchronization, and allocate system resources (e.g., time slots).

In heavy traffic (i.e., where a substantial portion of time slots are in use), it may be beneficial to dedicate a fixed time slot to handling paging transactions so as to minimize user station standby time. Further, a fixed paging time slot may eliminate the need for periodically transmitting a general polling message from the base station in various time slots when open, and thereby eliminate possible interference between polling messages from the base station 304 and forward link traffic transmissions. System information is preferably broadcast over the fixed paging time slot at or near full power so as to enable user stations 302 at a variety of ranges to hear and respond to the information.

This alternative embodiment may be further modified by outfitting the user stations 302 with selection diversity antennas and eliminating the user of control pulse preamble transmissions. Two preambles may be sent on the forward link, rather than using a control pulse preamble followed by a reverse link transmission followed by another forward link transmission. A comparison of such a structure with the previous described embodiments is shown in FIG. 17. In FIG. 17, the air interface type is identified in the first column as before, but with a trailing "D" indicating a user station 302 having a selection diversity antenna, and a trailing "P" indicating a user station 302 having no diversity selection antenna but employing a control pulse preamble (or "PCP"). As shown in the FIG. 17 chart, digital range is improved for the alternative embodiment employing a diversity antenna, or the number of time slots may be increased. These gains accrue because elimination of the pulse control preamble increases time available in each time frame, which may be devoted to expanding the serviceable range or increasing the number of available time slots.

In another alternative embodiment, user transmissions are conducted before base transmissions. In this embodiment, no control pulse preamble may be needed as the base station 304 obtains information relating to mobile power and channel quality by analyzing the user transmission. However, in such an embodiment, there is a longer delay from when the base station 304 issues an adjustment command to the user station 302 until the user station actually effectuates the adjustment command in the following time frame, thereby increasing latency in the control loop. Whether or not the control loop latency adversely impacts performance depends on the system requirements.

In addition to the above modifications, inventions described herein may be made or used in conjunction with inventions described, in whole or in part, in the following patents or co-pending applications, each of which is hereby incorporated by reference as if fully set forth herein:

U.S. Pat. No. 5,016,255, issued in the name of inventors Robert C. Dixon and Jeffrey S. Vanderpool, entitled "Asymmetric Spread Spectrum Correlator";

U.S. Pat. No. 5,022,047, issued in the name of inventors Robert C. Dixon and Jeffrey S. Vanderpool, entitled "Spread Spectrum Correlator";

U.S. Pat. No. 5,285,469, issued in the name of inventor Jeffrey S. Vanderpool, entitled "Spread Spectrum Wireless Telephone System";

U.S. Pat. No. 5,291,516, issued in the name of inventors Robert C. Dixon and Jeffrey S. Vanderpool, entitled "Dual Mode Transmitter and Receiver";

U.S. Pat. No. 5,402,413, issued in the name of inventor Robert C. Dixon, entitled "Three Cell Wireless Communication System";

U.S. Pat. No. 5,455,822, issued in the name of inventor Robert C. Dixon, entitled "Method and Apparatus for Establishing Spread Spectrum Communication";

U.S. patent application Ser. No. 08/146,491, filed Nov. 1, 1993, in the name of inventors Robert A. Gold and Robert C. Dixon, entitled "Despreading/Demodulating Direct Sequence Spread Spectrum Signals", now abandoned;

U.S. patent application Ser. No. 08/293,671, filed Aug. 18, 1994, in the name of inventors Robert C. Dixon, Jeffrey S. Vanderpool, and Douglas G. Smith, entitled "Multi-Mode, Multi-Band Spread Spectrum Communication System";

U.S. patent application Ser. No. 08/284,053 filed on Aug. 1, 1994, in the name of inventors Gary B. Anderson, Ryan N. Jensen, Bryan K. Petch, and Peter O. Peterson, entitled "PCS Pocket Phone/Microcell Communication Over-Air Protocol";

U.S. Pat. No. 5,648,982 issued in the name of inventors Randy Durrant and Mark Burbach, entitled "Coherent and Noncoherent CPM Correlation Method and Apparatus";

U.S. patent application Ser. No. 08/334,587, filed Nov. 3, 1994, in the name of inventor Logan Scott, entitled "Antenna Diversity Techniques"; and U.S. patent application Ser. No. 08,383,518, filed Feb. 3, 1995, Lyon & Lyon Docket No. 201/081, in the name of inventor Logan Scott, entitled "Spread Spectrum Correlation Using SAW Device."

It is also noted that variations in the transmission portion 502 of the time frame 501 may be employed. For example, systems employing error correction on the forward link (i.e., the base transmission) may interleave data destined for different user stations 302 across the entire burst of the transmission portion 502.

These and other variations and modifications to the communication techniques disclosed herein will become apparent to those skilled in the art, and are considered to fall within the scope and spirit of the invention and to be within the purview of the appended claims.

TABLE A-1

| | 5.00 HT Spread TDD | | | | | | | |
|---|---|---|---|---|---|---|---|---|
| | Link Designer 3 PDD Setup for page 145 Operation | | | | | | | |
| | TDD, Spread Mary with Small Slots 5.000 MHz Chip Rate 32.0 × 8.00 kbps | | TDD, Spread M-ary with Big Slots 5.000 MHz Chip Rate 25.0 × 8.00 kbps | | TDD, Spread M-ary Var, Slots, Ranging 5.000 MHz Chip Rate | | TDD, Spread M-ary Var Slots, Linked 5.000 MHz Chip Rate 32.0 × 8.00 kbps | |
| Slotting Efficiency: | Reverse Link | Forward Link | Reverse Link | Forward Link | Reverse Link | Forward Link | Reverse Link | Forward Link |
| 2-way Message Frame Duration | 625.00 | 625.00 | 800.00 | 800.00 | 625.00 | 625.00 | 625.00 | 625.00 |

TABLE A-1-continued 5.00 HT
Spread TDD

Link Designer 3
PDD Setup for page 145 Operation

| | TDD, Spread Mary with Small Slots 5.000 MHz Chip Rate 32.0 × 8.00 kbps | | TDD, Spread M-ary with Big Slots 5.000 MHz Chip Rate 25.0 × 8.00 kbps | | TDD, Spread M-ary Var, Slots, Ranging 5.000 MHz Chip Rate | | TDD, Spread M-ary Var Slots, Linked 5.000 MHz Chip Rate 32.0 × 8.00 kbps | |
|---|---|---|---|---|---|---|---|---|
| (usec): | | | | | | | | |
| Base J/R Switch Time (chips): | 32 | 32 | 32 | 32 | 32 | 32 | 32 | 32 |
| Base T/R Switch Time (usec): | 6.40 | 6.40 | 6.40 | 6.40 | 6.40 | 6.40 | 6.40 | 6.40 |
| Mobile 1 -> 2 Transient Time (chips): | 32 | 32 | 32 | 32 | 32 | 32 | 32 | 32 |
| Mobile 1 -> 2 Transient Time (usec): | 6.40 | 6.40 | 6.40 | 6.40 | 6.40 | 6.40 | 6.40 | 6.40 |
| Base R/T Switch Time (chips): | 32 | 32 | 32 | 32 | 32 | 32 | 32 | 32 |
| Base R/T Switch Time (usec): | 6.40 | 6.40 | 6.40 | 6.40 | 6.40 | 6.40 | 6.40 | 6.40 |
| Total Switch Time (usec): | 19.20 | 19.20 | 19.20 | 19.20 | 19.20 | 19.20 | 19.20 | 19.20 |
| Mobile Timing Error Allowance (chps): | 0 | 0 | 0 | 0 | 0 | 0 | 102.5 | 102.5 |
| Mobile Timing Error Allowance (usec): | 0.00 | 0.00 | 0.00 | 0.00 | 0.00 | 0.00 | 20.50 | 20.50 |
| Max Range Bin Step Size (mi): | 0.00 | 0.00 | 0.00 | 0.00 | 0.00 | 0.00 | 1.91 | 1.91 |
| Total Non Guard Time Overhead (usec): | 19.20 | 19.20 | 19.20 | 19.20 | 19.20 | 19.20 | 60.20 | 60.20 |
| Number of 2-way TDD Guards: | 2 | 2 | 2 | 2 | 2 | 2 | 2 | 2 |
| TDD Max Cell Radius (mi): | 1.91 | 1.91 | 10.06 | 10.06 | 8.47 | 8.47 | 0.00 | 0.00 |
| Total TDD Guard Time Available (usec): | 41.00 | 41.00 | 216.00 | 216.00 | 181.80 | 181.80 | 0.00 | 0.00 |
| Total TDD Guard Time Available (chips): | 205.00 | 205.00 | 1080.00 | 1080.00 | 909.00 | 909.00 | 0.00 | 0.00 |
| Guard Time per TDD Guard (chips): | 102.50 | 102.50 | 540.00 | 540.00 | 454.50 | 454.50 | 0.00 | 0.00 |
| Total Guard Time (usec): | 60.20 | 60.20 | 235.20 | 235.20 | 201.00 | 201.00 | 60.20 | 60.20 |
| Slot Structure Efficiency: | 90.37% | 90.37% | 70.60% | 70.60% | 67.84% | 67.84% | 90.37% | 90.37% |
| # of Ant Probes to Send (Forward Link): | 0 | 0 | 0 | 0 | 0 | 0 | 0 | 0 |
| Base Antenna Probe Length (chips): | 0 | 28 | 0 | 28 | 0 | 28 | 0 | 28 |
| Antenna Switch Time (chips): | 4 | 4 | 4 | 4 | 4 | 4 | 4 | 4 |
| Total Chips per Antenna Word (chips): | 4 | 32 | 4 | 32 | 4 | 32 | 4 | 32 |
| PCP Sync Word Length (chips): | 56 | 0 | 56 | 0 | 56 | 0 | 56 | 0 |
| Antenna Select (symbols): | 1 | 0 | 1 | 0 | 1 | 0 | 1 | 0 |
| Antenna Select (bits): | 5 | 0 | 5 | 0 | 5 | 0 | 0 | 0 |
| PCP Duration (chips): | 88 | 0 | 88 | 0 | 88 | 0 | 88 | 0 |
| Sync Word Length (chips): | 56 | 56 | 56 | 56 | 56 | 56 | 56 | 56 |
| Overhead Length (chips): | 144 | 56 | 144 | 56 | 144 | 56 | 144 | 56 |
| Header Message Length (bits): | 21 | 21 | 21 | 21 | 21 | 21 | 21 | 21 |
| D-Channel Message Length (bits): | 8 | 8 | 8 | 8 | 8 | 8 | 8 | 8 |
| B-Channel Message Length (bits): | 160 | 160 | 160 | 160 | 105 | 105 | 160 | 160 |
| R-Channel Message Length (bits): | 0 | 0 | 0 | 0 | 0 | 0 | 0 | 0 |
| CRC Bits in Traffic Mode (bits): | 16 | 16 | 16 | 16 | 16 | 16 | 16 | 16 |
| Simplex Message Length (bits): | 205 | 205 | 205 | 205 | 150 | 150 | 205 | 205 |
| Simplex Message Length (symbols): | 41 | 41 | 41 | 41 | 30 | 30 | 41 | 41 |
| Simplex Messsge Length (chips): | 1312 | 1312 | 1312 | 1312 | 960 | 960 | 1312 | 1312 |
| Total Number of Chips: | 1456 | 1368 | 1456 | 1368 | 1104 | 1016 | 1456 | 1368 |
| | | | | | [ | ←One | System→ | ] |

TABLE A-2

Spread TDD
5.00 HT

| | | | | | | | | |
|---|---|---|---|---|---|---|---|---|
| Transmit Slot Duration (usec): | 291.20 | 273.60 | 291.20 | 273.60 | 220.80 | 203.20 | 291.20 | 273.60 |
| One Slot B-Channel Data Rate (kbps): | 8 | 8 | 8 | 8 | 5.25 | 5.25 | 8 | 8 |
| Aggregate B-Channel Data Rate (kbps): | 256 | 256 | 200 | 200 | 168 | 168 | 256 | 256 |
| Max # of Voice Channels per RF Channel: | 32 | 32 | 25 | 25 | 21 | 21 | 32 | 32 |
| Superframe Duration (msec): | 20 | 20 | 20 | 20 | 20 | 20 | 20 | 20 |
| Chips/Slot: | 3125 | | 4000 | | 3125 | | 3125 | |
| Chip Duration (usec): | 0.20 | | 0.20 | | 0.20 | | 0.20 | |
| Base Slot Layout (mobile at zero range): | (usec) | (chips) | (usec) | (chips) | (usec) | (chips) | (usec) | (chips) |
| Base Tx Preamble START: | 0.00 | 0 | 0.00 | 0 | 0.00 | 0 | 0.00 | 0 |
| Base Tx Preamble END: | 11.20 | 56 | 11.20 | 56 | 11.20 | 56 | 11.20 | 56 |
| Base Tx Message START: | 11.20 | 56 | 11.20 | 56 | 11.20 | 56 | 11.20 | 56 |
| Base Tx Message END: | 273.60 | 1368 | 273.60 | 1368 | 203.20 | 1016 | 273.60 | 1368 |

TABLE A-2-continued

| | Spread TDD 5.00 HT | | | | | | | |
|---|---|---|---|---|---|---|---|---|
| Base Tx Antenna Message START: | 273.60 | 1368 | 273.60 | 1368 | 203.20 | 1016 | 273.60 | 1368 |
| Base Tx Antenna Message END: | 273.60 | 1368 | 273.60 | 1368 | 203.20 | 1016 | 273.60 | 1368 |
| Base Twiddles Thumbs (FDD only) START: | | | | | | | | |
| Base Twiddles Thumbs (FDD only) END: | | | | | | | | |
| Base T->R Switch START: | 273.60 | 1368 | 273.60 | 1368 | 203.20 | 1016 | 273.60 | 1368 |
| Base T->R Switch END: | 280.00 | 1400 | 280.00 | 1400 | 209.60 | 1048 | 280.00 | 1400 |
| Base Rx Preamble START: | 280.00 | 1400 | 280.00 | 1400 | 209.60 | 1048 | 280.00 | 1400 |
| Base Rx Preamble END: | 291.20 | 1456 | 291.20 | 1456 | 220.80 | 1104 | 291.20 | 1456 |
| Base Rx Message START: | 291.20 | 1456 | 291.20 | 1456 | 220.80 | 1104 | 291.20 | 1456 |
| Base Rx Messsge END: | 553.60 | 2768 | 553.60 | 2768 | 412.80 | 2064 | 553.60 | 2768 |
| Base Rx Guard Time 1 or 2 START: | 553.60 | 2768 | 553.60 | 2768 | 412.80 | 2064 | 553.60 | 2768 |
| Base Rx Guart Time 1 or 2 END: | 574.10 | 2870.5 | 661.60 | 3308 | 503.70 | 2518.5 | 553.60 | 2768 |
| Base Rx Time Error Allowance 1 START: | 574.10 | 2870.5 | 661.60 | 3308 | 503.70 | 2518.5 | 553.60 | 2768 |
| Base Rx Time Error Allowance 1 END: | 574.10 | 2870.5 | 661.60 | 3308 | 503.70 | 2518.5 | 574.10 | 2870.5 |
| Mobile 1 -> 2 Transient Time (T/R) START: | 574.10 | 2870.5 | 661.60 | 3308 | 503.70 | 2518.5 | 574.10 | 2870.5 |
| Mobile 1 -> 2 Transient Time (T/R) END: | 580.50 | 2902.5 | 668.00 | 3340 | 510.10 | 2550.5 | 580.50 | 2902.5 |
| Base Rx PCP START: | 580.50 | 2902.5 | 668.00 | 3340 | 510.10 | 2550.5 | 580.50 | 2902.5 |
| Base Rx PCP END: | 598.10 | 2990.5 | 685.60 | 3428 | 527.70 | 2638.5 | 598.10 | 2990.5 |
| Base Rx Guard Time 1 START: | 598.10 | 2990.5 | 685.60 | 3428 | 527.70 | 2638.5 | 598.10 | 2990.5 |
| Base Rx Guard Time 1 END: | 618.60 | 3093 | 793.60 | 3968 | 618.60 | 3093 | 598.10 | 2990.5 |
| Base Rx Time Error Allowance 2 START: | 618.60 | 3093 | 793.60 | 3968 | 618.60 | 3093 | 598.10 | 2990.5 |
| Base Rx Time Error Allowance 2 END: | 618.60 | 3093 | 793.60 | 3968 | 618.60 | 3093 | 618.60 | 3093 |
| Mob 2 -> 1 Trans or Base R -> T Swtch START: | 618.60 | 3093 | 793.60 | 3968 | 618.60 | 3093 | 618.60 | 3093 |
| Mob 2 -> 1 Trans or Base R -> T Swtch END: | 625.00 | 3125 | 800.00 | 4000 | 625.00 | 3125 | 625.00 | 3125 |
| Leftovers (Better be Zero): | 0.00 | 0 | 0.00 | 0 | 0.00 | 0 | 0.00 | 0 |

TABLE A-3

| | 5.00 HT Spread TDD | | | | | | | |
|---|---|---|---|---|---|---|---|---|
| Data Rates/RF Channel: | | | | | | | | |
| BW per RF Channel/Chip Rate (kHz): | 5000 | 5000 | 5000 | 5000 | 5000 | 5000 | 5000 | 5000 |
| Frequency Rouse Factor (N): | 3 | 3 | 3 | 3 | 3 | 3 | 3 | 3 |
| Minimum System Bandwidth (kHz): | 15000 | 15000 | 15000 | 15000 | 15000 | 15000 | 15000 | 15000 |
| S/I (dB): | 6 | 6 | 6 | 6 | 6 | 6 | 6 | 6 |
| Noise FIGURE G 290K (dB): | 4 | 4 | 4 | 4 | 4 | 4 | 4 | 4 |
| Antenna Temperature (K): | 300 | 300 | 300 | 300 | 300 | 300 | 300 | 300 |
| Sys kT inc. NF (dBm/Hz): | −169.9 | −169.9 | −169.9 | −169.9 | −169.9 | −169.9 | −169.9 | −169.9 |
| Sys kT inc. NF (mW/kHz): | 1E-14 | 1E-14 | 1E-14 | 1E-14 | 1E-14 | 1E-14 | 1E-14 | 1E-14 |
| Implimentation Loss (dB): | 3 | 3 | 3 | 3 | 3 | 3 | 3 | 3 |
| I/(S.BW) (num): | 5E-05 | 5E-05 | 5E-05 | 5E-05 | 5E-05 | 5E-05 | 5E-05 | 5E-05 |
| Mary NonCoher Format: | 32 | 32 | 32 | 32 | 32 | 32 | 32 | 32 |
| Bits per Symbol: | 5 | 5 | 5 | 5 | 5 | 5 | 5 | 5 |
| Required Frame Error Rate: | 1.0E-02 | 1.0E-02 | 1.0E-02 | 1.0E-02 | 1.0E-02 | 1.0E-02 | 1.0E-02 | 1.0E-02 |
| Frame Length for Kb/No Calc. (bits): | 200 | 200 | 200 | 200 | 200 | 200 | 200 | 200 |
| Actual Eqv. Frame Length (bits): | 205 | 205 | 205 | 205 | 205 | 205 | 205 | 205 |
| Antenna Diversity Factor: | 2 | 2 | 2 | 2 | 2 | 2 | 2 | 2 |
| Rake Diversity Factor: | 2 | 2 | 2 | 2 | 2 | 2 | 2 | 2 |
| Required Eb/No (dB): | 7.9897 | 7.9897 | 7.9897 | 7.9897 | 7.9897 | 7.9897 | 7.9897 | 7.9897 |
| 1/Eb/NoL (num): | 0.07962 | 0.07962 | 0.07962 | 0.07962 | 0.07962 | 0.07962 | 0.07962 | 0.07962 |
| Sensitivity in S/I (dBm): | −97.05 | −97.05 | −97.05 | −97.05 | −97.05 | −97.05 | −97.05 | −97.05 |
| Sensitivity, Therm Noise Only (dBm): | −100.00 | −100.00 | −100.00 | −100.00 | −100.00 | −100.00 | −100.00 | −100.00 |
| S/I Induced Sensitivity Loss (dB): | 2.95 | 2.95 | 2.95 | 2.95 | 2.95 | 2.95 | 2.95 | 2.95 |
| Required Sensitivity in S/I (mW): | 2E-10 | 2E-10 | 2E-10 | 2E-10 | 2E-10 | 2E-10 | 2E-10 | 2E-10 |
| Max Simplex Data Rate (kbps): | 781.25 | 781.25 | 781.25 | 781.25 | 781.25 | 781.25 | 781.25 | 781.25 |
| Max Simplex Symbol Rate (ksps): | 156.25 | 156.25 | 156.25 | 156.25 | 156.25 | 156.25 | 156.25 | 156.25 |
| Chips per Symbol: | 32.00 | 32.00 | 32.00 | 32.00 | 32.00 | 32.00 | 32.00 | 32.00 |
| Symbol Duration (usec): | 6.400 | 6.400 | 6.400 | 6.400 | 6.400 | 6.400 | 6.400 | 6.400 |
| Chips per Bit: | 6.40 | 6.40 | 6.40 | 6.40 | 6.40 | 6.40 | 6.40 | 6.40 |
| Processing Gain per bit (dB): | 8.06 | 8.06 | 8.06 | 8.06 | 8.06 | 8.06 | 8.06 | 8.06 |
| S/(N + I) into A/D (dB): | 2.93 | 2.93 | 2.93 | 2.93 | 2.93 | 2.93 | 2.93 | 2.93 |
| S/N into A/D (dB): | 5.88 | 5.88 | 5.88 | 5.88 | 5.88 | 5.88 | 5.88 | 5.88 |
| Max Duplex Data Rate (kbps): | 353.00 | 353.00 | 275.78 | 275.78 | 265.00 | 265.00 | 353.00 | 353.00 |
| Pilot Channel Overhead (kbps): | 0.00 | 0.00 | 0.00 | 0.00 | 0.00 | 0.00 | 0.00 | 0.00 |
| Bearer Channel Duplex Rate (kbps): | 353.00 | 353.00 | 275.78 | 275.78 | 265.00 | 265.00 | 353.00 | 353.00 |
| Link Asymmetry Factor (dB): | | 0.00 | | 0.00 | | 0.00 | | 0.00 |

TABLE A-4

5.00 HT
Spread TDD

| | dBm | | | dbm | | | dbm | | | dbm | |
|---|---|---|---|---|---|---|---|---|---|---|---|
| Voice Channel/GOS Calculations: | | | | | | | | | | | |
| Vocoder Rate (kbps): | 8.00 | 8.00 | | 8.00 | 8.00 | | 8.00 | 8.00 | | 8.00 | 8.00 |
| Overhead Rate per Vocoder (kbps): | 0.00 | 0.00 | | 0.00 | 0.00 | | 0.00 | 0.00 | | 0.00 | 0.00 |
| Data Rate per Voice Circuit (kpbs): | 8.00 | 8.00 | | 8.00 | 8.00 | | 8.00 | 8.00 | | 8.00 | 8.00 |
| Number of RP Channels/Sector | 1 | 1 | | 1 | 1 | | 1 | 1 | | 1 | 1 |
| Deployed System Bandwidth (MHz): | 15.00 | 15.00 | | 15.00 | 15.00 | | 15.00 | 15.00 | | 15.00 | 15.00 |
| Max Number Voice Channels Supported: | 32.0 | 32.0 | | 25.0 | 25.0 | | 21.0 | 21.0 | | 32.0 | 32.0 |
| Percentage of Handsets in TSI/HO: | 25.00% | 25.00% | | 25.00% | 25.00% | | 25.00% | 25.00% | | 25.00% | 25.00% |
| Erlangs Supported at 1% GOS: | 19.29 | 10.53 | | 10.53 | 10.53 | | 10.53 | 10.53 | | 7.77 | 7.77 |
| Erlangs Supported at 2% GOS: | 20.76 | 11.53 | | 11.53 | 11.53 | | 11.53 | 11.53 | | 8.60 | 8.60 |
| Single Tandem Framing Delay (msec): | 20.00 | 20.00 | | 20.00 | 20.00 | | 20.00 | 20.00 | | 20.00 | 20.00 |
| Dual Tandem Framing Delay (msec): | 40.00 | 40.00 | | 40.00 | 40.00 | | 40.00 | 40.00 | | 40.00 | 40.00 |
| Base Station Transmit Duty Cycle: | 43.78% | 43.78% | | 34.20% | 34.20% | | 34.20% | 32.51% | | 43.78% | 43.78% |
| Handset Single Slot Tx Duty Cycle: | 1.46% | 1.46% | | 1.46% | 1.46% | | 1.46% | 1.68% | | 1.46% | 1.46% |
| Capacity Calculations: | | | | | | | | | | | |
| Handset Peak Transmit Power (mW): | 300.00 | 300.00 | 24.8 | 300.00 | 300.00 | 24.8 | 300.00 | 300.00 | 24.8 | 300.00 | 300 | 24.8 |
| Handset Average Transmit Power (mW): | 4.37 | 4.37 | 6.4 | 4.37 | 4.37 | 6.4 | 5.05 | 5.05 | 7.0 | 4.37 | 4.37 | 6.4 |
| Handset Antenna Gain (dBd): | 0.00 | 0.00 | | 0.00 | 0.00 | | 0.00 | 0.00 | | 0.00 | 0.00 | |
| Base Peak Transmit Power (mW): | | 300.00 | 24.8 | | 300.00 | 24.8 | | 300.00 | 24.8 | | 300 | 24.8 |
| Base Average Transmit Power (mW): | | 131.33 | 21.2 | | 102.60 | 20.1 | | 97.54 | 19.9 | | 131.33 | 21.2 |
| Base Antenna Gain (dBd): | 17.00 | 17.00 | | 17.00 | 17.00 | | 17.00 | 17.00 | | 17.00 | 17 | |
| Num Geographic Sectors (1 Base/Sector): | 3 | 3 | | 3 | 3 | | 3 | 3 | | 3 | | 3 |
| Sector Loss Due to Antenna Overlap: | 15.0% | 15.0% | | 15.0% | 15.0% | | 15.0% | 15.0% | | 15.0% | | 15.0% |
| Net Sectorization Gain in Capacity: | 2.55 | 2.55 | | 2.55 | 2.55 | | 2.55 | 2.55 | | 2.55 | | 2.55 |
| Total Number of RF Channels at Site: | 3 | 3 | | 3 | 3 | | 3 | 3 | | 3 | | 43 |
| 1% GOS Erlangs Handeled at Site: | 49.19 | 49.19 | | 35.98 | 35.98 | | 28.64 | 28.64 | | 49.19 | | 49.19 |
| 2% GOS Erlangs Haneled at Site: | 52.94 | 52.94 | | 39.06 | 39.06 | | 31.32 | 31.32 | | 52.94 | | 52.94 |

TABLE A-5

2.80 LF
Spread FDD

Link Designer 3
FDD Setup for page 145 Operation

| | FDD, Spread M-ary Var Slots, Ranging 2.800 MHz Chip Rate | | FDD, Spread M-ary Var Slots, Linked 2.800 MHz Chip Rate 32.0 × 8.00 kbps | | FDD, Spread M-ary with Small Slots 2.800 MHz Chip Rate 32.0 × 8.00 kbps | | | FDD, Spread M-ary with Big Slots 2.800 MHz Chip Rate 28.0 × 8.00 kbps | |
|---|---|---|---|---|---|---|---|---|---|
| Slotting Efficiency: | Reverse Link | Forward Link | Reverse Link | Forward Link | Link | Reverse Link | Forward | Reverse Link | Forward Link |
| 2-way Message Frame Duration (usec): | 625.00 | 625.00 | 625.00 | 625.00 | 625.00 | 625.00 | 714.29 | 714.29 | |
| Base T/R Switch Time (chips): | 0 | 32 | 0 | 32 | | 0 | 32 | 0 | 32 |
| Base T/R Switch Time (usec): | 0.00 | 11.43 | 0.00 | 11.43 | | 0.00 | 11.43 | 0.00 | 11.43 |
| Mobile 1 -> 2 Transient Time (chips): | 32 | 0 | 32 | 0 | | 32 | 0 | 32 | 0 |
| Mobile 1 -> 2 Transient Time (usec): | 11.43 | 0.00 | 11.43 | 0.00 | | 11.43 | 0.00 | 11.43 | 0.00 |
| Base R/T Switch Time (chips): | 32 | 0 | 32 | 0 | | 32 | 0 | 32 | 0 |
| Base R/T Switch Time (usec): | 11.43 | 0.00 | 11.43 | 0.00 | | 11.43 | 0.00 | 11.43 | 0.00 |
| Total Switch Time (usec): | 22.86 | 11.43 | 22.86 | 11.43 | | 22.86 | 11.43 | 22.86 | 11.43 |
| Mobile Timing Error Allowance (chps): | 0 | 114 | 59 | 114 | | 0 | 114 | 0 | 364 |
| Mobile Timing Error Allowance (usec): | 0.00 | 40.71 | 21.07 | 40.71 | #Bins | 0.00 | 40.71 | 0.00 | 130.00 |
| Max Range Bin Step Size (mi): | 0.00 | 3.79 | 1.96 | 3.79 | 6.97 | 0.00 | 3.79 | 0.00 | 12.11 |
| Total Non Guard Time Overhead (usec): | 22.86 | 52.14 | 65.00 | 52.14 | | 22.86 | 52.14 | 22.86 | 141.43 |
| Number of 2-way TDD Guards: | 1 | 1 | 2 | 1 | | 2 | 1 | 2 | 1 |
| TDD Max Cell Radius (mi): | 13.67 | –0.00 | 0.00 | –0.00 | | 1.96 | –0.00 | 6.12 | 0.00 |
| Total TDD Guard Time Available (usec): | 146.79 | –0.00 | 0.00 | –0.00 | | 42.14 | –0.00 | 131.43 | 0.00 |
| Total TDD Guard Time Available (chips): | 411.00 | –0.00 | 0.00 | –0.00 | | 118.00 | –0.00 | 368.00 | 0.00 |
| Guard Time per TDD Guard (chips): | 411.00 | –0.00 | 0.00 | –0.00 | | 59.00 | –0.00 | 184.00 | 0.00 |
| Total Guard Time (usec): | 169.64 | 52.14 | 65.00 | 52.14 | | 65.00 | 52.14 | 154.29 | 141.43 |
| Slot Structure Efficiency: | 72.86% | 91.66% | 89.60% | 91.66% | | 89.60% | 91.66% | 78.40% | 80.20% |
| # of Ant Probes to Send (Forward Link): | 0 | 3 | 0 | 3 | | 0 | 3 | 0 | 3 |
| Base Antenna probe Length (chips): | 56 | 56 | 56 | 56 | | 56 | 56 | 56 | 56 |
| Antenna Switch Time (chips): | 4 | 4 | 4 | 4 | | 4 | 4 | 4 | 4 |
| Total Chips per Antenna Word (chips): | 60 | 60 | 60 | 60 | | 60 | 60 | 60 | 60 |

TABLE A-5-continued 2.80 LF
Spread FDD

Link Designer 3
FDD Setup for page 145 Operation

|  | FDD, Spread M-ary Var Slots, Ranging 2.800 MHz Chip Rate | FDD, Spread M-ary Var Slots, Linked 2.800 MHz Chip Rate 32.0 × 8.00 kbps | FDD, Spread M-ary with Small Slots 2.800 MHz Chip Rate 32.0 × 8.00 kbps | FDD, Spread M-ary with Big Slots 2.800 MHz Chip Rate 28.0 × 8.00 kbps |
|---|---|---|---|---|
| PCP Sync Word Length (chips): | 112 0 | 112 0 | 112 0 | 112 0 |
| Antenna Select (symbols): | 1 0 | 1 0 | 1 0 | 1 0 |
| Antenna Select (bits): | 5 0 | 5 0 | 5 0 | 5 0 |
| PCP Duration (chips): | 144 0 | 144 0 | 144 0 | 144 0 |
| Sync Word Length (chips): | 112 112 | 112 112 | 112 112 | 112 112 |
| Overhead Length (chips): | 256 292 | 256 292 | 256 292 | 256 292 |
| Header Message Length (bits): | 21 21 | 21 21 | 21 21 | 21 21 |
| D-Channel Message Length (bits): | 8 8 | 8 8 | 8 8 | 8 8 |
| B-Channel Messsge Length (bits): | 105 160 | 160 160 | 160 160 | 160 160 |
| R-Channel Message Length (bits): | 0 0 | 0 0 | 0 0 | 0 0 |
| CRC Bits in Traffic Mode (bits): | 16 16 | 16 16 | 16 16 | 16 16 |
| Simplex Message Length (bits): | 150 205 | 205 205 | 205 205 | 205 205 |
| Simplex Message Length (symbols): | 30 41 | 41 41 | 41 41 | 41 41 |
| Simplex Message Length (chips): | 960 1312 | 1312 1312 | 1312 1312 | 1312 1312 |
| Total Number of Chips: | 1216 1604 | 1568 1604 | 1568 1604 | 1568 1604 |
|  | [ ←One | System→ ] |  |  |

TABLE A-6

| | Spread FDD | | | | | | | | | | | |
|---|---|---|---|---|---|---|---|---|---|---|---|---|
| Transmit Slot Duration (usec): | 434.29 | | 572.86 | | 560.00 | | 572.86 | | 560.00 | | 572.86 | 560.00 | 572.86 |
| One Slot B-Channel Data Rate (kbps): | 5.25 | | 8 | | 8 | | 8 | | 8 | | 8 | 8 | 8 |
| Aggregate B-Channel Data Rate (kbps): | 168 | | 256 | | 256 | | 256 | | 256 | | 256 | 224 | 224 |
| Max # of Voice Channels per RF Channel: | 21 | | 32 | | 32 | | 32 | | 32 | | 32 | 28 | 28 |
| Superframe Duration (msec): | 20 | | 20 | | 20 | | 20 | | 20 | | 20 | 20 | 20 |
| Chips/Slot: | 1750 | | | | 1750 | | | | 1750 | | | 2000 | |
| Chip Duration (usec): | 0.36 | | | | 0.36 | | | | 0.36 | | | 0.36 | |
| Base Slot Layout (mobile at zero range): | (usec) | (chips) | | | (usec) | (chips) | | | (usec) | (chips) | | (usec) | (chips) |
| Base Tx Preamble START: | 0.00 | 0 | | | 0.00 | 0 | | 0.00 | 0 | | 0.00 | 0 | |
| Base Tx Preamble END: | 40.00 | 112 | 112 | | 40.00 | 112 | 112 | 40.00 | 112 | 112 | 40.00 | 112 | 112 |
| Base Tx Message START: | 40.00 | 112 | 0 | | 40.00 | 112 | 0 | 40.00 | 112 | 0 | 40.00 | 112 | 00 |
| Base Tx Message END: | 508.57 | 1424 | 1312 | | 508.57 | 1424 | 1312 | 508.57 | 1424 | 1312 | 508.57 | 1424 | 1312 |
| Base Tx Antenna Message START: | 508.57 | 1424 | 0 | | 508.57 | 1424 | 0 | 508.57 | 1424 | 0 | 508.57 | 1604 | 0 |
| Base Tx Antenna Message END: | 572.86 | 1604 | 180 | | 572.86 | 1604 | 180 | 572.86 | 1604 | 180 | 572.86 | 1604 | 180 |
| Base Twiddles Thumbs (FDD only) START: | 572.86 | 1604 | 0 | | 572.86 | 1604 | 0 | 572.86 | 1604 | 0 | 572.86 | 1604 | 0 |
| Base Twiddles Thumbs (FDD only) END: | 613.57 | 1718 | 114 | | 613.57 | 1718 | 114 | 613.57 | 1718 | 114 | 702.86 | 1968 | 364 |
| Base T -> R Switch START: | 613.57 | 1718 | 0 | | 613.57 | 1750 | 0 | 613.57 | 1718 | 0 | 702.86 | 1968 | 0 |
| Base T -> R Switch END: | 625.00 | 1750 | 32 | | 625.00 | 1750 | 32 | 625.00 | 1750 | 32 | 714.29 | 2000 | 0 |
| Base Rx Preamble START: | 625.00 | 1750 | 0 | | 625.00 | 1750 | 0 | 625.00 | 1750 | 0 | 714.29 | 2000 | 0 |
| Base Rx Preamble END: | 665.00 | 1862 | 112 | | 665.00 | 1862 | 112 | 665.00 | 1862 | 112 | 754.29 | 2112 | 112 |
| Base Rx Message START: | 665.00 | 1862 | 0 | | 665.00 | 1862 | 0 | 665.00 | 1862 | 0 | 754.29 | 2112 | 0 |
| Base Rx Message END: | 1007.86 | 2822 | 960 | | 1133.57 | 3174 | 1312 | 1133.57 | 3174 | 1312 | 1222.86 | 3424 | 1312 |
| Base Rx Guard Time 1 or 2 START: | 1007.86 | 2822 | 0 | | 1133.57 | 3174 | 0 | 1133.57 | 3174 | 0 | 1222.86 | 3424 | 0 |
| Base Rx Guard Time 1 or 2 END: | 1154.64 | 3233 | 411 | | 1133.57 | 3174 | 0 | 1154.64 | 3233 | 59 | 1288.57 | 3608 | 184 |
| Base Rx Time Error Allowance 1 START: | 1154.64 | 3233 | 0 | | 1133.57 | 3174 | 0 | 1154.64 | 3233 | 0 | 1288.57 | 3608 | 0 |
| Base Rx Time Error Allowance 1 END: | 1154.64 | 3233 | 0 | | 1154.64 | 3233 | 59 | 1154.64 | 3233 | 0 | 1288.57 | 3608 | 0 |
| Mobile 1 -> 2 Transient Time (T/R) START: | 1154.64 | 3233 | 0 | | 1154.64 | 3233 | 0 | 1154.64 | 3233 | 0 | 1288.57 | 3608 | 0 |
| Mobile 1 -> 2 Transient Time T/R END: | 1166.07 | 3265 | 32 | | 1166.07 | 3265 | 32 | 1166.07 | 3265 | 32 | 1300.00 | 3640 | 32 |
| Base Rx PCP START: | 1166.07 | 3265 | 0 | | 1166.07 | 3265 | 0 | 1166.07 | 3265 | 0 | 1300.00 | 3640 | 0 |
| Base Rx PCP END: | 1217.50 | 3409 | 144 | | 1217.50 | 3409 | 144 | 1217.50 | 3409 | 144 | 1351.43 | 3784 | 144 |
| Base Rx Guard Time 1 START: | 1217.50 | 3409 | 0 | | 1217.50 | 3409 | 0 | 1217.50 | 3409 | 0 | 1351.43 | 3784 | 0 |
| Base Rx Guard Time 1 END: | 1217.50 | 3409 | 0 | | 1217.50 | 3409 | 0 | 1238.57 | 3468 | 59 | 1417.14 | 3968 | 184 |
| Base Rx Time Error Allowance 2 START: | 1217.50 | 3409 | 0 | | 1217.50 | 3409 | 0 | 1238.57 | 3468 | 0 | 1417.14 | 3968 | 0 |
| Base Rx Time Error Allowance 2 END: | 1238.57 | 3468 | 59 | | 1238.57 | 3468 | 59 | 1238.57 | 3468 | 0 | 1417.14 | 3968 | 0 |
| Mob 2 -> 1 Trans or Base R -> T Swtch START: | 1238.57 | 3468 | 0 | | 1238.57 | 3468 | 0 | 1238.57 | 3468 | 0 | 1417.14 | 3968 | 0 |

TABLE A-6-continued

| | Spread FDD | | | | | | | | | |
|---|---|---|---|---|---|---|---|---|---|---|
| Mob 2 -> 1 Trnnsor Base R -> T Swtch END: | 1250.00 | 3500 | 32 | 1250.00 | 3500 | 32 | 1250.00 | 3500 | 32 | 1428.57 4000 32 |
| Leftovers (Better be Zero): | 0.00 | 0 | | 0.00 | 0 | | 0.00 | 0 | | 0.00 0 |

TABLE A-7

| | 2.80 HF Spread FDD | | | | | | | |
|---|---|---|---|---|---|---|---|---|
| Data Rates/RF Channel: | | | | | | | | |
| BW per RF Channel/Chip Rate (kHz): | 2800 | 2800 | 2800 | 2800 | 2800 | 2800 | 2800 | 2800 |
| Frequency Rouse Factor (N): | 3 | 3 | 3 | 3 | 3 | 3 | 3 | 3 |
| Minimum System Bandwidth (kHz): | 16800 | 16800 | 16800 | 16800 | 16800 | 16800 | 16800 | 16800 |
| S/I (dB): | 6 | 6 | 6 | 6 | 6 | 6 | 6 | 6 |
| Noise FIGURE G 290K (dB): | 4 | 4 | 4 | 4 | 4 | 4 | 4 | 4 |
| Antenna Temperature (K): | 300 | 300 | 300 | 300 | 300 | 300 | 300 | 300 |
| Sys kT inc. NF (dBm/Hz): | −169.9 | −169.9 | −169.9 | −169.9 | −169.9 | −169.9 | −169.9 | −169.9 |
| Sys kT inc. NF (mW/kHz): | 1E-14 | 1E-14 | 1E-14 | 1E-14 | 1E-14 | 1E-14 | 1E-14 | 1E-14 |
| Implimentation Loss (dB): | 3 | 3 | 3 | 3 | 3 | 3 | 3 | 3 |
| I/(S.BW) (num): | 9E-05 | 9E-05 | 9E-05 | 9E-05 | 9E-05 | 9E-05 | 9E-05 | 9E-05 |
| Mary NonCoher Format: | 32 | 32 | 32 | 32 | 32 | 32 | 32 | 32 |
| Bits per Symbol: | 5 | 5 | 5 | 5 | 5 | 5 | 5 | 5 |
| Required Frame Error Rate: | 1.0E-02 | 1.0E-02 | 1.0E-02 | 1.0E-02 | 1.0E-02 | 1.0E-02 | 1.0E-02 | 1.0E-02 |
| Frame Length for Kb/No Calc. (bits): | 200 | 200 | 200 | 200 | 200 | 200 | 200 | 200 |
| Actual Eqv. Frame Length (bits): | 150 | 150 | 150 | 150 | 150 | 150 | 150 | 150 |
| Antenna Diversity Factor: | 2 | 2 | 2 | 2 | 2 | 2 | 2 | 2 |
| Rake Diversity Factor: | 2 | 2 | 2 | 2 | 2 | 2 | 2 | 2 |
| Required Eb/No (dB): | 7.9897 | 7.9897 | 7.9897 | 7.9897 | 7.9897 | 7.9897 | 7.9897 | 7.9897 |
| 1/Eb/NoL (num): | 0.07962 | 0.07962 | 0.07962 | 0.07962 | 0.07962 | 0.07962 | 0.07962 | 0.07962 |
| Sensitivity in S/I (dBm): | −99.57 | −99.57 | −99.57 | −99.57 | −99.57 | −99.57 | −99.57 | −99.57 |
| Sensitivity, Therm Noise Only (dBm): | −102.52 | −102.52 | −102.52 | −102.52 | −102.52 | −102.52 | −102.52 | −102.52 |
| S/I Induced Sensitivity Loss (dB): | 2.95 | 2.95 | 2.95 | 2.95 | 2.95 | 2.95 | 2.95 | 2.95 |
| Required Sensitivity in S/I (mW): | 1.1E-10 | 1.1E-10 | 1.1E-10 | 1.1E-10 | 2H-10 | 2H-10 | 2H-10 | 2H-10 |
| Max Simplex Data Rate (kbps): | 437.50 | 437.50 | 437.50 | 437.50 | 437.50 | 437.50 | 437.50 | 437.50 |
| Max Simplex Symbol Rate (ksps): | 156.25 | 156.25 | 156.25 | 156.25 | 156.25 | 156.25 | 156.25 | 156.25 |
| Chips per Symbol: | 32.00 | 32.00 | 32.00 | 32.00 | 32.00 | 50 | 32.00 | 32.00 |
| Symbol Duration (usec): | 11.429 | 11.429 | 11.429 | 11.429 | 11.429 | 11.429 | 11.429 | 11.429 |
| Chips per Bit: | 6.40 | 6.40 | 6.40 | 6.40 | 6.40 | 20.000 | 6.40 | 6.40 |
| Processing Gain per bit (dB): | 8.06 | 8.06 | 8.06 | 8.06 | 8.06 | 8.06 | 8.06 | 8.06 |
| S/(N + I) into A/D (dB): | 2.93 | 2.93 | 2.93 | 2.93 | 2.93 | 2.93 | 2.93 | 2.93 |
| S/N into A/D (dB): | 2.93 | 2.93 | 2.93 | 2.93 | 2.93 | 2.93 | 2.93 | 2.93 |
| Max Duplex Data Rate (kbps): | 5.88 | 5.88 | 5.88 | 5.88 | 5.88 | 5.88 | 5.88 | 5.88 |
| Pilot Channel Overhead (kbps): | 0.00 | 0.00 | 0.00 | 0.00 | 0.00 | 0.00 | 0.00 | 0.00 |
| Bearer Channel Duplex Rate (kbps): | 159.38 | 200.50 | 196.00 | 200.50 | 196.00 | 200.50 | 171.50 | 175.44 |
| Link Asymmetry Factor (dB): | | 0.00 | | 0.00 | | 0.00 | | 0.00 |

TABLE A-8

| | 2.80 HF Spread FDD | | | | | | | | | | |
|---|---|---|---|---|---|---|---|---|---|---|---|
| | | | dbm | | | dbm | | | dbm | | |
| Voice Channel/GOS Calculations: | | | | | | | | | | | |
| Vocoder Rate (kbps): | 8.00 | 8.00 | | 8.00 | 8.00 | | 8.00 | 8.00 | | 8.00 | 8.00 |
| Overhead Rate per Vocoder (kbps): | 0.00 | 0.00 | | 0.00 | 0.00 | | 0.00 | 0.00 | | 0.00 | 0.00 |
| Data Rate per Voice Circuit (kpbs): | 8.00 | 8.00 | | 8.00 | 8.00 | | 8.00 | 8.00 | | 8.00 | 8.00 |
| Number of RP Channel/Sector | 1 | 1 | | 1 | 1 | | 1 | 1 | | 1 | 1 |
| Deployed System Bandwidth (MHz): | 16.80 | 16.80 | | 16.80 | 16.80 | | 16.80 | 16.80 | | 16.80 | 16.80 |
| Max Number Voice Channels Supported: | 21.0 | 32.0 | | 32.0 | 32.0 | | 32.0 | 32.0 | | 28.0 | 28.0 |
| Percentage of Handsets in TSI/HO: | 25.00% | 25.00% | | 25.00% | 25.00% | | 25.00% | 25.00% | | 25.00% | 25.00% |
| Erlangs Supported at 1% GOS: | 11.23 | 19.29 | | 19.29 | 19.29 | | 19.29 | 19.29 | | 15.57 | 15.57 |
| Erlangs Supported at 2% GOS: | 12.28 | 20.76 | | 20.76 | 20.76 | | 20.76 | 20.76 | | 16.86 | 16.86 |
| Single Tandem Framing Delay (msec): | 20.00 | 20.00 | | 20.00 | 20.00 | | 20.00 | 20.00 | | 20.00 | 20.00 |
| Dual Tandem Framing Delay (msec): | 40.00 | 40.00 | | 40.00 | 40.00 | | 40.00 | 40.00 | | 40.00 | 40.00 |
| Base Station Transmit Duty Cycle: | 91.66% | 91.66% | | 91.66% | 91.66% | | 91.66% | 91.66% | | 80.20% | 80.20% |
| Handset Single Slot Tx Duty Cycle: | 3.31% | 3.31% | | 2.80% | 2.80% | | 2.80% | 2.80% | | 2.80% | 2.80% |
| Capacity Calculations: | | | | | | | | | | | |
| Handset Peak Transmit Power (mW): | 300.00 | 300.00 | 24.8 | 300.00 | 300.00 | 24.8 | 300.00 | 300.00 | 24.8 | 300.00 300 | 24.8 |
| Handset Average Transmit Power (mW): | 9.93 | 9.93 | 10.0 | 8.40 | 8.40 | 9.2 | 8.40 | 8.40 | 9.2 | 8.40 8.40 | 9.2 |

TABLE A-8-continued

2.80 HF Spread FDD

| | dbm | | | dbm | | | dbm | | | |
|---|---|---|---|---|---|---|---|---|---|---|
| Handset Antenna Gain (dBd): | 0.00 | 0.00 | | 0.00 | 0.00 | | −0.00 | 0.00 | | 0.00 | 0.00 | |
| Base Peak Transmit Power (mW): | | 300.00 | 24.8 | | 300.00 | 24.8 | | 300.00 | 24.8 | | 300 | 24.8 |
| Base Average Transmit Power (mW): | | 274.97 | 24.4 | | 274.97 | 24.4 | | 274.97 | 24.4 | | 240.6 | 23.8 |
| Base Antenna Gain (dBd): | 17.00 | 17.00 | | 17.00 | 17.00 | | 17.00 | 17.00 | | 17.00 | 17.00 | |
| Num Geographic Sectors (1 Base/Sector): | 3 | 3 | 3 | 3 | 3 | 3 | 3 | 3 | | | | |
| Sector Loss Due to Antenna Overlap: | 15.0% | 15.0% | 15.0% | 15.0% | 15.0% | 15.0% | 15.0% | 15.0% | | | | |
| Net Sectorization Gain in Capacity: | 2.55 | 2.55 | 2.55 | 2.55 | 2.55 | 2.55 | 2.55 | 2.55 | | | | |
| Total Number of RF Channels at Site: | 3 | 3 | 3 | 3 | 3 | 3 | 3 | 3 | | | | |
| 1% GOS Erlangs Handeled at Site: | 28.64 | 49.19 | 49.19 | 49.19 | 49.19 | 49.19 | 39.71 | 39.71 | | | | |
| 2% GOS Erlangs Haneled at Site: | 31.32 | 52.94 | 52.94 | 52.94 | 52.94 | 52.94 | 42.99 | 42.99 | | | | |

TABLE A-9

1.60 HF Spread FDD

Link Designer 3
FDD Setup for page 145 Operation

| | FDD, Spread M-ary Var Slots, Ranging 1.600 MHz Chip Rate 13.1 × 8.00 kbps | | FDD, Spread M-ary Var Slots, Linked 1.600 MHz Chip Rate 20.0 × 8.00 kbps | | FDD, Spread M-ary with Small Slots 1.600 MHz Chip Rate 20.0 × 8.00 kbps | | | FDD, Spread M-ary with Big Slots 1.600 MHz Chip Rate 16.0 × 8.00 kbps | |
|---|---|---|---|---|---|---|---|---|---|
| Slotting Efficiency: | Reverse Link | Forward Link | Reverse Link | Forward Link | | Reverse Link | Forward Link | Reverse Link | Forward Link |
| 2-way Message Frame Duration (usec): | 1000.00 | 1000.00 | 1000.00 | 1000.00 | | 1000.00 | 1000.0 | 1250.00 | 1250.00 |
| Base T/R Switch Time (chips): | 0 | 24 | 0 | 24 | | 0 | 0 | 0 | 24 |
| Base T/R Switch Time (usec): | 0.00 | 15.00 | 0.00 | 15.00 | | 0.00 | 24 | 0.00 | 15.00 |
| Mobile 1 −> 2 Transient Time (chips): | 24 | 0 | 24 | 0 | | 24 | 15.00 | 24 | 0 |
| Mobile 1 −> 2 Transient Time (usec): | 15.00 | 0.00 | 15.00 | 0.00 | | 15.00 | 0 | 15.00 | 0.00 |
| Base R/T Switch Time (chips): | 24 | 0 | 24 | 0 | | 24 | 0.00 | 24 | 0 |
| Base R/T Switch Time (usec): | 15.00 | 0.00 | 15.00 | 0.00 | | 15.00 | 0 | 15.00 | 0.00 |
| Total Switch Time (usec): | 30.00 | 15.00 | 30.00 | 15.00 | | 30.00 | 0.00 15.00 | 30.00 | 15.00 |
| Mobile Timing Error Allowance (chps): | 0 | 90 | 20 | 90 | | 0 | 90 | 0 | 490 |
| Mobile Timing Error Allowance (usec): | 0.00 | 56.25 | 12.50 | 56.25 | #Bins 0.00 | 56.25 | 0.00 | 306.25 |
| Max Range Bin Step Size (mi): | 0.00 | 5.24 | 1.16 | 5.24 | 18.6 0.00 | 5.24 | 0.00 | 28.52 |
| Total Non Guard Time Overhead (usec): | 30.00 | 71.25 | 55.00 | 71.25 | | 30.00 | 71.25 | 30.00 | 321.25 |
| Number of 2-way TDD Guards: | 1 | 1 | 2 | 1 | | 2 | 1 | 2 | 1 |
| TDD Max Cell Radius (mi): | 21.66 | 0.00 | 0.00 | 0.00 | | 1.16 | 0.00 | 12.81 | 0.00 |
| Total TDD Guard Time Available (usec): | | | | | | | | | |
| Total TDD Guard Time Available (chips): | 232.50 | 0.00 | 0.00 | 0.00 | | 25.00 | 0.00 | 275.00 | 0.00 |
| Guard Time per TDD Guard (chips): | | | | | | | | | |
| Total Guard Time (usec): | 372.00 | 0.00 | 0.00 | 0.00 | | 40.00 | 0.00 | 440.00 | 0.00 |
| Slot Structure Efficiency: | 372.00 | 0.000 | 0.00 | 0.00 | | 20.00 | 0.00 | 220.00 | 00.00 |
| | 262.50 | 71.25 | 55.00 | 71.25 | | 55.00 | 71.25 | 305.00 | 321.25 |
| | 73.75% | 92.88% | 94.50% | 92.88% | | 94.50% | 92.88% | 75.60% | 74.30% |
| # of Ant Probes to Send (Forward Link): | | | | | | | | | |
| Base Antenna probe Length (chips): | 0 | 3 | 0 | 3 | | 0 | 3 | 0 | 3 |
| Antenna Switch Time (chips): | 28 | 28 | 28 | 28 | | 28 | 28 | 28 | 28 |
| Total Chips per Antenna Word (chips): | 2 | 2 | 2 | 2 | | 2 | 2 | 2 | 2 |
| PCP Sync Word Length (chips): | 30 | 30 | 30 | 30 | | 30 | 30 | 30 | 30 |
| Antenna Select (symbols): | 84 | 0 | 84 | 0 | | 84 | 0 | 84 | 0 |
| Antenna Select (bits): | 1 | 0 | 1 | 0 | | 1 | 0 | 1 | 0 |
| PCP Duration (chips): | 5 | 0 | 5 | 0 | | 5 | 0 | 5 | 0 |
| Sync Word Length (chips): | 116 | 0 | 116 | 0 | | 116 | 0 | 116 | 0 |
| Overhead Length (chips): | 84 | 84 | 84 | 84 | | 84 | 84 | 84 | 84 |
| | 200 | 174 | 200 | 174 | | 200 | 174 | 200 | 174 |
| Header Message Length (bits): | 21 | 21 | 21 | 21 | | 21 | 21 | 21 | 21 |
| D-Channel Message Length (bits): | 8 | 8 | 8 | 8 | | 8 | 8 | 8 | 8 |
| B-Channel Messsge Length (bits): | 105 | 160 | 160 | 160 | | 160 | 160 | 160 | 160 |
| R-Channel Messsge Length (bits): | 0 | 0 | 0 | 0 | | 0 | 0 | 0 | 0 |
| CRC Bits in Traffic Mode (bits): | 16 | 16 | 16 | 16 | | 16 | 16 | 16 | 16 |
| Simplex Message Length (bits): | 150 | 205 | 205 | 205 | | 205 | 205 | 205 | 205 |
| Simplex Message Length (symbols): | 30 | 41 | 41 | 41 | | 41 | 41 | 41 | 41 |
| Simplex Message Length (chips): | 960 | 1312 | 1312 | 1312 | | 1312 | 1312 | 1312 | 1312 |
| Total Number of Chips: | 1160 | 1486 | 1512 | 1486 | | 1512 | 1486 | 1512 | 1486 |
| | [ | 77 One | System→ | ] | | | | | |

TABLE A-10

1.60 HF
Spread FDD

| | | | | | | | | | | | |
|---|---|---|---|---|---|---|---|---|---|---|---|
| Transmit Slot Duration (usec): | 725.00 | 928.75 | 945.00 | 928.75 | 945.00 | 928.75 | 945.00 | 928.75 | | | |
| One Slot B-Channel Data Rate (kbps): | 5.25 | 8 | 8 | 8 | 8 | 8 | 8 | 8 | | | |
| Aggregate B-Channel Data Rate (kbps): | 105 | 160 | 160 | 160 | 160 | 160 | 128 | 128 | | | |
| Max # of Voice Channels per RF Channel: | 13.125 | 20 | 20 | 20 | 20 | 20 | 16 | 16 | | | |
| Superframe Duration (msec): | 20 | 20 | 20 | 20 | 20 | 20 | 20 | 20 | | | |
| Chips/Slot: | 1600 | | 1600 | | 1600 | | 2000 | | | | |
| Chip Duration (usec): | 0.63 | | 0.63 | | 0.63 | | 0.63 | | | | |
| Base Slot Layout (mobile at zero range): | (usec) | (chips) | (usec) | (chips) | (usec) | (chips) | (usec) | (chips) | | | |
| Base Tx Preamble START: | 0.00 | 0 | 0.00 | 0 | 0.00 | 0 | 0.00 | 0 | | | |
| Base Tx Preamble END: | 52.50 | 84 | 84 | 52.50 | 84 | 84 | 52.50 | 84 | 84 | 52.50 | 84 | 84 |
| Base Tx Message START: | 52.50 | 84 | 0 | 52.50 | 84 | 0 | 52.50 | 84 | 0 | 52.50 | 84 | 0 |
| Base Tx Message END: | 872.50 | 1396 | 1312 | 872.50 | 1396 | 1312 | 872.50 | 1396 | 131 | 872.5 | 1396 | 1312 |
| Base Tx Antenna Message START: | 872.50 | 1396 | 0 | 872.50 | 1396 | 0 | 872.50 | 1396 | 2 | 872.5 | 1396 | 0 |
| Base Tx Antenna Message END: | 928.75 | 1486 | 90 | 928.75 | 1486 | 90 | 928.75 | 1486 | 0 | 928.75 | 1486 | 90 |
| Base Twiddles Thumbs (FDD only) START: | 928.75 | 1486 | 0 | 928.75 | 1486 | 0 | 928.75 | 1486 | 90 | 928.75 | 1486 | 0 |
| Base Twiddles Thumbs (FDD only) END: | 985.00 | 1576 | 90 | 985.00 | 1576 | 90 | 985.00 | 1576 | 0 | 1235 | 1976 | 490 |
| Base T -> R Switch START: | 985.00 | 1576 | 0 | 985.00 | 1576 | 0 | 985.00 | 1576 | 90 | 1235 | 1976 | 0 |
| Base T -> R Switch END: | 1000 | 1600 | 24 | 1000.00 | 1600 | 24 | 1000 | 1600 | 0 | 1250 | 2000 | 24 |
| Base Rx Preamble START: | 1000 | 1600 | 0 | 1000.00 | 1600 | 0 | 1000 | 1600 | 24 | 1250 | 2000 | 0 |
| Base Rx Preamble END: | 1052.5 | 1684 | 84 | 1052.50 | 1684 | 84 | 1052.5 | 1684 | 0 | 1302.5 | 2084 | 84 |
| Base Rx Message START: | 1052.5 | 1684 | 0 | 1052.50 | 1684 | 0 | 1052.5 | 1684 | 84 | 1302.5 | 2084 | |
| Base Rx Message END: | 1652.5 | 2644 | 960 | 1872.50 | 2996 | 1312 | 1872.5 | 2996 | 0 | 2122.5 | 3396 | 1312 |
| Base Rx Guard Time 1 or 2 START: | 652.5 | 2644 | 0 | 1872.50 | 2996 | 0 | 1872.5 | 2996 | 131 | 2122.5 | 3396 | |
| Base Rx Guard Time 1 or 2 END: | 1885 | 3016 | 372 | 1872.50 | 2996 | 0 | 1885 | 3016 | 2 | 2260 | 3616 | 220 |
| Base Rx Time Error Allowance 1 START: | 1885 | 3016 | 0 | 1872.50 | 2996 | 0 | 1885 | 3016 | 0 | 2260 | 3616 | |
| Base Rx Time Error Allowance 1 END: | 1885 | 3016 | | 1885.00 | 3016 | 20 | 1885 | 3016 | 20 | 2260 | 3616 | |
| Mobile 1 -> 2 Transient Time (T/R) START: | | | 0 | | | | | | 0 | | | |
| | 1885 | 3016 | 0 | 1885.00 | 3016 | 0 | 1885 | 3016 | 0 | 2260.0 | 3616 | |
| Mobile 1 -> 2 Transient Time T/R) END: | 1900 | 3040 | 24 | 1900.00 | 3040 | 24 | 1900 | 3040 | | 2275.0 | 3640 | 24 |
| Base Rx PCP START: | 1900 | 3040 | 0 | 1900.00 | 3040 | 0 | 1900 | 3040 | 0 | 2275.0 | 3640 | |
| Base Rx PCP END: | 1972.5 | 3156 | 116 | 1972.50 | 3156 | 116 | 1972.5 | 3156 | 24 | 2347.5 | 3756 | 116 |
| Base Rx Guard Time 1 START: | 1972.5 | 3156 | 0 | 1972.50 | 3156 | 0 | 1972.5 | 3156 | 0 | 2347.5 | 3756 | |
| Base Rx Guard Time 1 END: | 972.5 | 3156 | 0 | 1972.50 | 3156 | 0 | 1985 | 3176 | 116 | 2485.0 | 3976 | 220 |
| Base Rx Time Error Allowance 2 START: | 1972.5 | 3156 | 0 | 1972.50 | 3156 | 0 | 1985 | 3176 | 0 | 2485.0 | 3976 | |
| Base Rx Time Error Allowance 2 END: | 1985 | 3176 | 20 | 1985.00 | 3176 | 20 | 1985 | 3176 | 20 | 2485.0 | 3976 | |
| Mob 2 -> 1 Trans or Base R -> T Swtch START: | | | 20 | | | | | | 0 | | | |
| | 1985 | 3176 | 0 | 1985.00 | 3176 | 0 | 1985 | 3176 | 0 | 2485.0 | 3976 | |
| Mob 2 -> 1 Trnsor Base R -> T Swtch END: | | | 0 | | | | | | | | | |
| | 2000 | 3200 | 24 | 2000.00 | 3200 | 24 | 2000 | 3200 | 0 | 2500.0 | 4000 | 24 |
| Leftovers (Better be Zero): | 0.00 | 0 | | 0.00 | 0 | | 0.00 | 0 | | 0.00 | 0 | |
| | | | | | | | | | 24 | | | |

TABLE A-11

1.60 HF
Spread FDD

Data Rates/RF Channel:

| | | | | | | | | |
|---|---|---|---|---|---|---|---|---|
| BW per RF Channel/Chip Rate (kHz): | 1600 | 1600 | 1600 | 1600 | 1600 | 1600 | 1600 | 1600 |
| Frequency Rouse Factor (N): | 3 | 3 | 3 | 3 | 3 | 3 | 3 | 3 |
| Minimum System Bandwidth (kHz): | 9600 | 9600 | 9600 | 9600 | %OO | 9600 | 9600 | 9600 |
| S/I (dB): | 6 | 6 | 6 | 6 | 6 | 6 | 6 | 6 |
| Noise FIGURE G 290K (dB): | 4 | 4 | 4 | 4 | 4 | 4 | 4 | 4 |
| Antenna Temperature (K): | 300 | 300 | 300 | 300 | 300 | 300 | 300 | 300 |
| Sys kT inc. NF (dBm/Hz): | −169.9 | −169.9 | −169.9 | −169.9 | −169.9 | −169.9 | −169.9 | |
| Sys kT inc. NF (mW/kHz): | 1E-14 | 1E-14 | 1E-14 | 1E-14 | 1E-14 | 1E-14 | 1E-14 | |
| Implimentation Loss (dB): | 3 | 3 | 3 | 3 | 3 | 3 | 3 | 3 |
| I/(S.BW) (num): | 0.00016 | 0.00016 | 0.00016 | 0.00016 | 0.00016 | 0.0001 | 0.00016 | 0.00016 |
| Mary NonCoher Format: | 32 | 32 | 32 | 32 | 32 | 32 | 32 | 32 |
| Bits per Symbol: | 5 | 5 | 5 | 5 | 5 | 5 | 5 | 5 |
| Required Frame Error Rate: | 1.0E-02 | 1.0E-02 | 1.0E-02 | 1.0E-02 | 1.0E-02 | 1.0E-02 | 1.0E-02 | 1.0E-02 |
| Frame Length for Kb/No Calc. (bits): | 200 | 200 | 200 | 200 | 200 | 200 | 200 | 200 |
| Actual Eqv. Frame Length (bits): | 150 | 150 | 150 | 150 | 150 | 150 | 150 | 150 |
| Antenna Diversity Factor: | 2 | 2 | 2 | 2 | 2 | 2 | 2 | 2 |
| Rake Diversity Factor: | 2 | 2 | 2 | 2 | 2 | 2 | 2 | 2 |
| Required Eb/No (dB): | 7.9897 | 7.9897 | 7.9897 | 7.9897 | 7.9897 | 7.9897 | 7.9897 | 7.9897 |
| 1/Eb/NoL (num): | 0.07962 | 0.07962 | 0.07962 | 0.07962 | 0.07962 | 0.07962 | 0.07962 | 0.07962 |
| Sensitivity in S/I (dBm): | −102.00 | −102.00 | −102.00 | −102.00 | −102.00 | −102.00 | −102.00 | −102.00 |
| Sensitivity, Therm Noise Only (dBm): | −104.95 | −104.95 | −104.95 | −104.95 | −104.95 | −104.95 | −104.95 | −104.95 |

TABLE A-11-continued

1.60 HF Spread FDD

Data Rates/RF Channel:

| | | | | | | | | |
|---|---|---|---|---|---|---|---|---|
| S/I Induced Sensitivity Loss (dB): | 2.95 | 2.95 | 2.95 | 2.95 | 2.95 | 2.95 | 2.95 | 2.95 |
| Required Sensitivity in S/I (mW): | 6.3H-11 | 6.3H-11 | 6.3H-11 | 6.3H-11 | 6.3-11 | 6.3H-11 | 6.3H-11 | 6.3H-11 |
| Max Simplex Data Rate (kbps): | 250.00 | 250.00 | 250.00 | 250.00 | 250.00 | 250.00 | 250.00 | 250.00 |
| Max Simplex Symbol Rate (ksps): | 50 | 50 | 50 | 50 | 50 | 50 | 50 | 50 |
| Chips per Symbol: | 32.00 | 32.00 | 32.00 | 32.00 | 32.00 | 32.00 | 32.00 | 32.00 |
| Symbol Duration (usec): | 20.000 | 20.000 | 20.000 | 20.000 | 20.000 | 20.000 | 20.000 | 20.000 |
| Chips per Bit: | 6.40 | 6.40 | 6.40 | 6.40 | 6.40 | 6.40 | 6.40 | 6.40 |
| Processing Gain per bit (dB): | 8.06 | 8.06 | 8.06 | 8.06 | 8.06 | 8.06 | 8.06 | 8.06 |
| S/(N + I) into A/D (dB): | 2.93 | 2.93 | 2.93 | 2.93 | 2.93 | 2.93 | 2.93 | 2.93 |
| S/N into A/D (dB): | 5.88 | 5.88 | 5.88 | 5.88 | 5.88 | 5.88 | 5.88 | 5.88 |
| Max Duplex Data Rate (kbps): | 92.19 | 116.09 | 118.13 | 116.09 | 118.13 | 116.09 | 94.50 | 92.88 |
| Pilot Channel Overhead (kbps): | 0.00 | 0.00 | 0.00 | 0.00 | 0.00 | 0.00 | 0.00 | 0.00 |
| Bearer Channel Duplex Rate (kbps): | 92.19 | 116.09 | 118.13 | 116.09 | 118.13 | 116.09 | 94.50 | 92.88 |
| Link Asymmetry Factor (dB): | | 0.00 | | 0.00 | | 0.00 | | 0.00 |

TABLE A-12

1.60HF Spread FDD

| | dBm | | dBm | | dBm | | dBm | |
|---|---|---|---|---|---|---|---|---|
| Voice Channel/GOS Calculations: | | | | | | | | |
| Vocoder Rate (kbps): | 8.00 | 8.00 | 8.00 | 8.00 | 8.00 | 8.00 | 8.00 | 8.00 |
| Overhead Rate per Vocoder (kbps): | 0.00 | 0.00 | 0.00 | 0.00 | 0.00 | 0.00 | 0.00 | 0.00 |
| Data Rate per Voice Circuit (kpbs): | 8.00 | 8.00 | 8.00 | 8.00 | 8.00 | 8.00 | 8.00 | 8.00 |
| Number of RP Channels/Sector | 1 | 1 | 1 | 1 | 1 | i | 1 | 1 |
| Deployed System Bandwidth (MHz): | 9.60 | 9.60 | 9.60 | 9.60 | 9.60 | 9.60 | 9.60 | 9.60 |
| Max Number Voice Channels Supported: | 13.1 | 20.0 | 20.0 | 20.0 | 20.0 | 20.0 | 16.0 | 16.0 |
| Percentage of Handsets in TSI/HO: | 25.00% | 25.00% | 25.00% | 25.00% | 25.00% | 25.00% | 25.00% | 25.00% |
| Erlangs Supported at 1% GOS: | 5.78 | 10.53 | 10.53 | 10.53 | 10.53 | 10.53 | 7.77 | 7.77 |
| Erlangs Supported at 2% GOS: | 6.48 | 11.53 | 11.53 | 11.53 | 11.53 | 11.53 | 8.60 | 8.60 |
| Single Tandem Framing Delay (msec): | 20.00 | 20.00 | 20.00 | 20.00 | 20.00 | 20.00 | 20.00 | 20.00 |
| Dual Tandem Framing Delay (msec): | 40.00 | 40.00 | 40.00 | 40.00 | 40.00 | 40.00 | 40.00 | 40.00 |
| Base Station Transmit Duty Cycle: | 92.88% | 92.88% | 92.88% | 92.88% | 92.88% | 92.88% | 74.30% | 74.30% |
| Handset Single Slot Tx Duty Cycle: | 5.52% | 5.52% | 4.73% | 4.735 | 4.735 | 4.735 | 4.73% | 4.73% |
| Capacity Calculations: | | | | | | | | |
| Handset Peak Transmit Power (mW): | 300.00 | 300.00 | 24.8 | 300.00 | 300.00 | 24.8 | 300.00 | 300.00 | 24.8 | 300.00 | 300 |
| Handset Average Transmit Power (mW): | 16.57 | 16.57 | 12.2 | 14.18 | 14.18 | 11.5 | 14.18 | 14.18 | 11.5 | 14.18 | 14.18 | 24.8 |
| Handset Antenna Gain (dBd): | 0.00 | 0.00 | | 0.00 | 0.00 | | 0.00 | 0.00 | | 0.00 | 0.00 | 11.5 |
| Base Peak Transmit Power (mW): | | 300.00 | 24.8 | | 300.00 | 24.8 | | 300.00 | 24.8 | | 300 | 24.8 |
| Base Average Transmit Power (mW): | | 278.63 | 24.5 | | 278.63 | 24.5 | | 278.63 | 24.5 | | 222.9 | 23.5 |
| Base Antenna Gain (dBd): | 17.00 | 17.00 | | 17.00 | 17.00 | | 17.00 | 17.00 | | 17.00 | 17.00 | |
| Num Geographic Sectors(1 Base/Sector): | 3 | 3 | 3 | 3 | 3 | 3 | 3 | 3 | | | | |
| Sector Loss Due to Antenna Overlap: | 15.0% | 15.0% | 15.0% | 15.0% | 15.0% | 15.0% | 15.0% | 15.0% | | | | |
| Net Sectorization Gain in Capacity: | 2.55 | 2.55 | 2.55 | 2.55 | 2.55 | 2.55 | 2.55 | 2.55 | | | | |
| Total Number of RF Channels at Site: | 3 | 3 | 3 | 3 | 3 | 3 | 3 | 3 | | | | |
| 1% GOS Erlangs Handeled at Site: | 14.74 | 26.84 | 26.84 | 26.84 | 26.84 | 26.84 | 19.80 | 19.80 | | | | |
| 2% GOS Erlangs Haneled at Site: | 16.52 | 29.41 | 29.41 | 29.41 | 29.41 | 29.41 | 21.93 | 21.93 | | | | |

TABLE A-13

1.40 HF Spread FDD

Link Designer 3
FDD Setup for page 145 Operation

| | FDD, Spread M-ary Var Slots, Ranging 1.400 MHz Chip Rate 10.5 × 8.00 kbps | | FDD, Spread M-ary Var Slots, Linked 1.400 MHz Chip Rate 16.01 × 8.00 kbps | | FDD, Spread M-ary with Small Slots 1.400 MHz Chip Rate 16.0 × 8.00 kbps | | FDD, Spread M-ary with Big Slots 1.400 MHz Chip Rate 14.0 × 8.00 kbps | |
|---|---|---|---|---|---|---|---|---|
| Slotting Efficiency: | Reverse Link | Forward Link | Reverse Link | Forward Link | Reverse Link | Forward Link | Reverse Link | Forward Link |
| 2-way Message Frame Duration (usec): | 1250.00 | 1250.00 | 1250.00 | 1250.00 | 1250.00 | 1250.00 | 1428.57 | 1428.57 |
| Base T/R Switch Time(chips): | 0 | 24 | 0 | 24 | 0 | 24 | 0 | 24 |

TABLE A-13-continued 1.40 HF
Spread FDD

Link Designer 3
FDD Setup for page 145 Operation

| | FDD, Spread M-ary Var Slots, Ranging 1.400 MHz Chip Rate 10.5 × 8.00 kbps | | FDD, Spread M-ary Var Slots, Linked 1.400 MHz Chip Rate 16.01 × 8.00 kbps | | | FDD, Spread M-ary with Small Slots 1.400 MHz Chip Rate 16.0 × 8.00 kbps | | FDD, Spread M-ary with Big Slots 1.400 MHz Chip Rate 14.0 × 8.00 kbps | |
|---|---|---|---|---|---|---|---|---|---|
| Base T/R Switch Time (usec): | 0.00 | 17.14 | 0.00 | 17.14 | | 0.00 | 17.14 | 0.00 | 17.14 |
| Mobile 1 -> 2 Transient Time (chips): | 24 | 0 | 24 | 0 | | 24 | 0 | 24 | 0 |
| Mobile 1 -> 2 Transient Time (usec): | 17.14 | 0.00 | 17.14 | 0.00 | | 17.14 | 0.00 | 17.14 | 0.00 |
| Base R/T Switch Time (chips): | 24 | 0 | 24 | 0 | | 24 | 0 | 24 | 0 |
| Base R/T Switch Time (usec): | 17.14 | 0.00 | 17.14 | 0.00 | | 17.14 | 0.00 | 17.14 | 0.00 |
| Total Switch Time (usec): | 34.29 | 17.14 | 34.29 | 17.14 | | 34.29 | 17.14 | 34.29 | 17.14 |
| Mobile Timing Error Allowance (chps): | 0 | 212 | 67 | 212 | #Bins 0 | | 212 | 0 | 462 |
| Mobile Timing Error Allowance (usec): | 0.00 | 151.43 | 47.86 | 151.43 | 6.25 | 0.00 | 151.43 | 0.00 | 330.00 |
| Max Range Bin Step Size (mi): | 0.00 | 14.10 | 4.46 | 14.10 | | | | | |
| Total Non Guard Time Overhead (usec): | 34.29 | 168.57 | 130.00 | 168.57 | | 0.00 | 14.10 | 0.00 | 30.74 |
| | | | | | | 34.29 | 168.57 | 34.29 | 347.14 |
| Number of 2-way TDD Guards: | 1 | 1 | 2 | 1 | | 1 | 2 | 1 | |
| TDD Max Cell Radius (mi): | 27.88 | 0.00 | 0.00 | 0.00 | | 4.46 | 0.00 | 12.77 | 0.00 |
| Total TDD Guard Time Available (usec): | 299.29 | 0.00 | 0.00 | 0.00 | 95.71 | 0.00 | 274.29 | 0.00 | |
| Total TDD Guard Time Available (chips): | 419.00 | 0.00 | 0.00 | 0.00 | | 134.00 | 0.00 | 384.00 | 0.00 |
| Guard Time per TDD Guard (chips): | 419.00 | 0.00 | 0.00 | 0.00 | | 67.00 | 0.00 | 192.00 | 0.00 |
| Total Guard Time (usec): | 333.57 | 168.57 | 130.00 | 168.57 | | 130.00 | 168.57 | 308.57 | 347.14 |
| Slot Structure Efficiency: | 73.31% | 86.51% | 89.60% | 86.51% | | 89.60% | 86.51% | 78.40% | 75.70% |
| # of Ant Probes to Send (Forward Link): | 0 | 3 | | 0 | 3 | 0 | 3 | 0 | 3 |
| Base Antenna probe Length (chips): | 28 | 28 | | 28 | 28 | 28 | 28 | 28 | 28 |
| Antenna Switch Time (chips): | 2 | 2 | | 2 | 2 | 2 | 2 | 2 | 2 |
| Total Chips per Antenna Word (chips): | 30 | 30 | | 30 | 30 | 30 | 30 | 30 | 30 |
| PCP Sync Word Length (chips): | 112 | 0 | | 112 | 0 | 112 | 0 | 112 | 0 |
| Antenna Select (symbols): | 1 | 0 | | 1 | 0 | 1 | 0 | 1 | 0 |
| Antenna Select (bits): | 5 | 0 | | 5 | 0 | 5 | 0 | 5 | 0 |
| PCP Duration (chips): | 144 | 0 | | 144 | 0 | 144 | 0 | 144 | 0 |
| Sync Word Length (chips): | 112 | 112 | | 112 | 112 | 112 | 0 | 112 | 112 |
| Overhead Length (chips): | 256 | 202 | | 256 | 202 | 256 | 202 | 256 | 202 |
| Header Message Length (bits): | 21 | 21 | | 21 | 21 | 21 | 21 | 21 | 21 |
| D-Channel Message Length (bits): | 8 | 8 | | 8 | 8 | 8 | 8 | 8 | 8 |
| B-Channel Messsge Length (bits): | 105 | 160 | | 160 | 160 | 160 | 160 | 160 | 160 |
| R-Channel Message Length (bits): | 0 | 0 | | 0 | 0 | 0 | 0 | 0 | 0 |
| CRC Bits in Traffic Mode (bits): | 16 | 16 | | 16 | 16 | 16 | 16 | 16 | 16 |
| Simplex Message Length (bits): | 150 | 205 | | 205 | 205 | 205 | 205 | 205 | 205 |
| Simplex Message Length (symbols): | 30 | 41 | | 41 | 41 | 41 | 41 | 41 | 41 |
| Simplex Message Length (chips): | 960 | 1312 | | 1312 | 1312 | 1312 | 1312 | 1312 | 1312 |
| Total Number of Chips: | 1260 | 1514 | | 1568 | 1514 | 1568 | 1514 | 1568 | 1514 |
| | [ | ←One | SystemΔ | ] | | | | | |

TABLE A-14

1.40 HF
Spread FDD

| | | | | | | | | | | |
|---|---|---|---|---|---|---|---|---|---|---|
| Transmit Slot Duration (usec): | 868.57 | 1081.43 | | 1120.00 | 1081.43 | | 1120.00 | 1081.43 | | 1120.00 | 1081.43 |
| One Slot B-Channel Data Rate (kbps): | 5.25 | 8 | 8 | 8 | 8 | 8 | 8 | 8 | | | |
| Aggregate B-Channel Data Rate (kbps): | 84 | 200 | 200 | 200 | 200 | 200 | 160 | 160 | | | |
| Max # of Voice Channels per RF Channel: | 10.5 | 25 | 25 | 25 | 25 | 25 | 20 | 20 | | | |
| Superframe Duration (msec): | 20 | 20 | 20 | 20 | 20 | 20 | 20 | 20 | | | |
| Chips/Slot: | 1750 | | 280 | | 280 | | 350 | | | | |
| Chip Duration (usec): | 0.71 | | 2.86 | | 2.86 | | 2.86 | | | | |
| Base Slot Layout (mobile at zero range): | (usec) | (chips) | (usec) | (chips) | (usec) | (chips) | (usec) | (chips) | | | |
| Base Tx Preamble START: | 0.00 | 0 | | 0.00 | 0 | | 0.00 | 0 | | 0.00 | 0 |
| Base Tx Preamble END: | 80.00 | 112 | 112 | 80.00 | 112 | 112 | 80.00 | 112 | 112 | 80.00 | 112 | 112 |
| Base Tx Message START: | 80.00 | 112 | 0 | 80.00 | 112 | 0 | 80.00 | 112 | 0 | 80.00 | 112 | 0 |
| Base Tx Message END: | 1017.14 | 1424 | 1312 | 1017.14 | 1424 | 1312 | 1017.14 | 1424 | 1312 | 1017.14 | 1424 | 1312 |
| Base Tx Antenna Message START: | 1017.14 | 1424 | 0 | 1017.14 | 1424 | 0 | 1017.14 | 1424 | 0 | 1017.14 | 1424 | 0 |
| Base Tx Antenna Message END: | 1081.43 | 1514 | 90 | 1081.43 | 1514 | 90 | 1081.43 | 1514 | 90 | 1081.43 | 1514 | 90 |
| Base Twiddles Thumbs (FDD only) START: | 1081.43 | 1514 | 0 | 1081.43 | 1514 | 0 | 1081.43 | 1514 | 0 | 1081.43 | 1514 | 0 |
| Base Twiddles Thumbs (FDD only) END: | 1232.86 | 1726 | 212 | 1232.86 | 1726 | 212 | 1232.86 | 1726 | 212 | 1411.43 | 1976 | 462 |
| Base T -> R Switch START: | 1232.86 | 1726 | 0 | 1232.86 | 1726 | 0 | 1232.86 | 1726 | 0 | 1411.43 | 1976 | 0 |
| Base T -> R Switch END: | 1250.00 | 1750 | 24 | 1250.00 | 1750 | 24 | 1250.00 | 1750 | 24 | 1428.57 | 2000 | 24 |

TABLE A-14-continued

1.40 HF
Spread FDD

| | | | | | | | | | | | |
|---|---|---|---|---|---|---|---|---|---|---|---|
| Base Rx Preamble START: | 1250.00 | 1750 | 0 | 1250.00 | 1750 | 0 | 1250.00 | 1750 | 0 | 1428.57 | 2000 | 0 |
| Base Rx Preamble END: | 1330.00 | 1862 | 112 | 1330.00 | 1862 | 112 | 1330.00 | 1882 | 112 | 1508.57 | 2112 | 112 |
| Base Rx Message START: | 1330.00 | 1862 | 0 | 1330.00 | 1862 | 0 | 1330.00 | 1862 | 0 | 1508.57 | 2112 | 0 |
| Base Rx Message END: | 2015.71 | 2822 | 960 | 2267.14 | 3174 | 1312 | 2267.14 | 3174 | 1312 | 2445.71 | 3424 | 1312 |
| Base Rx Guard Time 1 or 2 START: | 2015.71 | 2822 | 0 | 2267.14 | 3174 | 0 | 2267.14 | 3174 | 0 | 2445.71 | 3424 | 0 |
| Base Rx Guard Time 1 or 2 END: | 2315.00 | 3241 | 419 | 2267.14 | 3174 | 0 | 2315.00 | 3241 | 67 | 2582.86 | 3616 | 192 |
| Base Rx Time Error Allwnc 1 START: | 2315.00 | 3241 | 0 | 2267.14 | 3174 | 0 | 2315.00 | 3241 | 0 | 2582.86 | 3616 | 0 |
| Base Rx Time Error Allwnc 1 END: | 2315.00 | 3241 | 0 | 2315.00 | 3241 | 67 | 2315.00 | 3241 | 0 | 2582.86 | 3616 | 0 |
| Mobile 1 -> 2 Transient Time (T/R) START: | 2315.00 | 3241 | 0 | 2315.00 | 3241 | 0 | 2315.00 | 3241 | 0 | 2582.86 | 3616 | 0 |
| Mobile 1 -> 2 Transient Time (T/R) END: | 2332.14 | 3265 | 24 | 2332.14 | 3265 | 24 | 2332.14 | 3265 | 24 | 2600.00 | 3640 | 24 |
| Base Rx PCP START: | 2332.14 | 3265 | 0 | 2332.14 | 3265 | 0 | 2332.14 | 3265 | 0 | 2600.00 | 3640 | 0 |
| Base Rx PCP END: | 2435.00 | 3409 | 144 | 2435.00 | 3409 | 144 | 2435.00 | 3409 | 144 | 2702.86 | 3784 | 144 |
| Base Rx Guard Time 1 START: | 2435.00 | 3409 | 0 | 2435.00 | 3409 | 0 | 2435.00 | 3409 | 0 | 2702.86 | 3784 | 0 |
| Base Rx Guard Time 1 END: | 2435.00 | 3409 | 0 | 2435.00 | 3409 | 0 | 2482.86 | 3476 | 67 | 2840.00 | 3976 | 192 |
| Base Rx Time Error Allwnc 2 START: | 2435.00 | 3409 | 0 | 2435.00 | 3409 | 0 | 2482.86 | 3476 | 0 | 2840.00 | 3976 | 0 |
| Base Rx Time Error Allwnc 2 END: | 2482.86 | 3476 | 67 | 2482.86 | 3476 | 67 | 2482.86 | 3476 | 0 | 2840.00 | 3976 | 0 |
| Mob 2 -> 1 Trans or Base R -> T Swtch START: | 2482.86 | 3476 | 0 | 2482.86 | 3476 | 0 | 2482.86 | 3476 | 0 | 2840.00 | 3976 | 0 |
| Mob 2 -> 1 Trans or Base R -> T Swtch END: | 2500.00 | 3500 | 24 | 2500.00 | 3500 | 24 | 2500.00 | 3500 | 24 | 2857.21 | 4000 | 24 |
| Leftovers (Better be Zero): | 0.00 | 0 | | 0.00 | 0 | | 0.00 | 0 | | 0.00 | 0 | |

TABLE A-15

1.40 HF
Spread FDD

Data Rates/RF Channel:

| | | | | | | | | | |
|---|---|---|---|---|---|---|---|---|---|
| BW per RF Channel/Chip Rate (kHz): | 1400 | 1400 | 1400 | 1400 | 1400 | 1400 | | 1400 | 1400 |
| Frequency Rouse Factor (N): | 3 | 3 | 3 | 3 | 3 | 3 | 3 | 3 | |
| Minimum System Bandwidth (kHz): | 8400 | 8400 | 8400 | 8400 | 8400 | 8400 | 8400 | 8400 | |
| S/I (dB): | 6 | 6 | 6 | 6 | 6 | 6 | 6 | 6 | |
| Noise Figure G 290K (dB): | 4 | 4 | 4 | 4 | 4 | 4 | 4 | 4 | |
| Antenna Temperature (K): | 300 | 300 | 300 | 300 | 300 | 300 | 300 | 300 | |
| Sys kT inc. NF (dBm/Hz): | −169.9 | −169.9 | −169.9 | −169.9 | −169.9 | −169.9 | −169.9 | −169.9 | |
| Sys kT inc. NF (mW/kHz): | 1E-14 | 1E-14 | 1E-14 | 1E-14 | 1E-14 | 1E-14 | 1E-14 | 1E-14 | |
| Implimentation Loss (dB): | 3 | 3 | 3 | 3 | 3 | 3 | 3 | 3 | |
| I/(S.BW) (num): | 0.00018 | 0.00018 | 0.00018 | 0.00018 | 0.00018 | 0.00018 | 0.00018 | 0.00018 | |
| Mary NonCoher Format: | 32 | 32 | 32 | 32 | 32 | 32 | 32 | 32 | |
| Bits per Symbol: | 5 | 5 | 5 | 5 | 5 | 5 | 5 | 5 | |
| Required Frame Error Rate: | 1.0E-02 | 1.0E-02 | 1.0E-02 | 1.0E-02 | 1.0E-02 | 1.0E-02 | 1.0E-02 | 1.0E-02 | |
| Frame Length for Kb/No Calc. (bits): | 200 | 200 | 200 | 200 | 200 | 200 | 200 | 200 | |
| Actual Eqv. Frame Length (bits): | 150 | 150 | 150 | 150 | 150 | 150 | 150 | 150 | |
| Antenna Diversity Factor: | 2 | 2 | 2 | 2 | 2 | 2 | 2 | 2 | |
| Rake Diversity Factor: | 2 | 2 | 2 | 2 | 2 | 2 | 2 | 2 | |
| Required Eb/No (dB): | 7.9897 | 7.9897 | 7.9897 | 7.9897 | 7.9897 | 7.9897 | 7.9897 | 7.9897 | |
| 1/Eb/NoL (num): | 0.07962 | 0.07962 | 0.07962 | 0.07962 | 0.07962 | 0.07962 | 0.07962 | 0.07962 | |
| Sensitivity in S/I (dBm): | −102.58 | −102.58 | −102.58 | −102.58 | −102.58 | −102.58 | −102.58 | −102.58 | |
| Sensitivity, Therm Noise Only (dBm): | −105.53 | −105.53 | −105.53 | −105.53 | −105.53 | −105.53 | −105.53 | −105.53 | |
| S/I Induced Sensitivity Loss (dB): | 2.95 | 2.95 | 2.95 | 2.95 | 2.95 | 2.95 | 2.95 | 2.95 | |
| Required Sensitivity in S/I (mW): | 5.5E-11 | 5.5E-11 | 5.5E-11 | 5.5E-11 | 5.5E-11 | 5.5E-11 | 5.5E-11 | 5.5E-11 | |
| Max Simplex Data Rate (kbps): | 218.75 | 218.75 | 218.75 | 218.75 | 218.75 | 218.75 | 218.75 | 218.75 | |
| Max Simplex Symbol Rate (ksps): | 43.75 | 43.75 | 43.75 | 43.75 | 43.75 | 43.75 | 43.75 | 43.75 | |
| Chips per Symbol: | 32.00 | 32.00 | 32.00 | 32.00 | 32.00 | 32.00 | 32.00 | 32.00 | |
| Symbol Duration (usec): | 22.857 | 22.857 | 22.857 | 22.857 | 22.857 | 22.857 | 22.857 | 22.857 | |
| Chips per Bit: | 6.40 | 6.40 | 6.40 | 6.40 | 6.40 | 6.40 | 6.40 | 6.40 | |
| Processing Gain per bit (dB): | 8.06 | 8.06 | 8.06 | 8.06 | 8.06 | 8.06 | 8.06 | 8.06 | |

TABLE A-16

1.40 HF
Spread FDD

| | dbm | | dBm | | dBm | | dBm | |
|---|---|---|---|---|---|---|---|---|
| Spread TDD Voice Channel/GOS Calculations: | 13.64 | 13.64 | 24.27 | 24.27 | 18.94 | 18.94 | 17.01 | 17.01 |
| Vocoder Rate (kbps): | 8.00 | 8.00 | 8.00 | 8.00 | 8.00 | 8.00 | 8.00 | 8.00 |
| Overhead Rate per Vocoder (kbps): | 0.00 | 0.00 | 0.00 | 0.00 | 0.00 | 0.00 | 0.00 | 0.00 |
| Data Rate per Voice Circuit (kpbs): | 8.00 | 8.00 | 8.00 | 8.00 | 8.00 | 8.00 | 8.00 | 8.00 |

TABLE A-16-continued

1.40 HF Spread FDD

| | dbm | | | dBm | | | dBm | | | dBm | | |
|---|---|---|---|---|---|---|---|---|---|---|---|---|
| Number of RP Channel/Sector | 1 | 1 | | 1 | 1 | | 1 | 1 | | 1 | | 1 |
| Deployed System Bandwidth (MHz): | 8.40 | 8.40 | | 8.40 | 8.40 | | 8.40 | 4.20 | | 8.40 | | 8.40 |
| Max Number Voice Channels | 10.5 | 16.0 | | 16.0 | 16.0 | | 16.0 | 16.0 | | 16.0 | | 14.00 |
| Supported: | | | | | | | | | | | | |
| Percentage of Handsets in TSI/HO: | 25.00% | 25.00% | | 25.00% | 25.00% | | 25.00% | 25.00% | | 25.00% | | 25.00% |
| Erlangs Supported at 1% GOS: | 3.90 | 7.77 | | 7.77 | 7.77 | | 7.77 | 7.77 | | 5.78 | | 5.78 |
| Erlangs Supported at 2% GOS: | 4.45 | 8.60 | | 8.60 | 8.60 | | 8.60 | 8.60 | | 6.48 | | 6.48 |
| Single Tandem Framing Delay (msec): | 20.00 | 20.00 | | 20.00 | 20.00 | | 20.00 | 20.00 | | 20.00 | | 20.00 |
| Dual Tandem Framing Delay (msec): | 40.00 | 40.00 | | 40.00 | 40.00 | | 40.00 | 40.00 | | 40.00 | | 40.00 |
| Base Station Transmit Duty Cycle: | 86.51% | 86.51% | | 86.51% | 86.51% | | 86.51% | 86.51% | | 75.70% | | 75.70% |
| Handset Single Slot Tx Duty Cycle: | 6.62% | 6.62% | | 5.60% | 5.60% | | 5.60% | 5.60% | | 5.60% | | 5.60% |
| Capacity Calculations: | | | | | | | | | | | | |
| Handset Peak Transmit Power (mW): | 300.00 | 300.00 | 24.8 | 300.00 | 300.00 | 24.8 | 300.00 | 300 | 24.8 | 300.00 | 300 | 24.8 |
| Handset Average Transmit Power (mW): | 19.85 | 19.85 | 13.0 | 16.80 | 16.80 | 12.3 | 16.80 | 16.80 | 12.3 | 16.80 | 16.80 | 12.3 |
| Handset Antenna Gain (dBd): | 0.00 | 0.00 | | 0.00 | 0.00 | | 0.00 | 0.00 | | 0.00 | 0.00 | |
| Base Peak Transmit Power (mW): | | 300.00 | 24.8 | | 300.00 | 24.8 | | 300 | 24.8 | | 300 | 24.8 |
| Base Average Transmit Power (mW): | | 259.54 | 24.1 | | 259.54 | 24.1 | | 259.54 | 24.1 | | 227.1 | 23.6 |
| Base Antenna Gain (dBd): | 17.00 | 17.00 | | 17.00 | 17.00 | | 17.00 | 17.00 | | 17.00 | 17.00 | |
| Num Geographic Sectors(1 Base/Sector): | 3 | 3 | | 3 | 3 | | 3 | 3 | | 3 | | 3 |
| Sector Loss Due to Antenna Overlap: | 15.0% | 15.0% | | 15.0% | 15.0% | | 15.0% | 15.0% | | 15.0% | | 15.0% |
| Net Sectorization Gain in Capacity: | 2.55 | 2.55 | | 2.55 | 2.55 | | 2.55 | 2.55 | | 2.55 | | 2.55 |
| Total Number of RF Channels at Site: | 3 | 3 | | 3 | 3 | | 3 | 3 | | 3 | | 3 |
| 1% GOS Erlangs Handeled at Site: | 9.95 | 19.80 | | 19.80 | 19.80 | | 19.80 | 14.74 | | 14.74 | | 14.74 |
| 2% GOS Erlangs Haneled at Site: | 11.34 | 21.93 | | 21.93 | 21.93 | | 21.93 | 21.93 | | 16.52 | | 16.52 |

TABLE A-17

0.64 LF Unspread FDD

Link Designer 3
FDD Setup for page 145 Operation

| | FDD, No Spread Var Slots, Ranging 0.640 MHz Chip Rate 26.3 × 8.00 kbps | | FDD, No Spread Var Slots, Linked 0.640 MHz Chip Rate 40.0 × 8.00 kbps | | FDD, No Spread with Small Slots 0.640 MHz Chip Rate 40.0 × kbps | | FDD, No Spread with Big Slots 0.640 MHz Chip Rate 32.0 × 8.00 kbps | |
|---|---|---|---|---|---|---|---|---|
| Slotting Efficiency: | Reverse Link | Forward Link | Reverse Link | Forward Link | Reverse Link | Forward Link | Reverse Link | Forward Link |
| 2-way Message Frame Duration (usec): | 500.00 | 500.00 | 500.00 | 500.00 | 500.00 | 500.00 | 625.00 | 625.00 |
| Base T/R Switch Time(chips): | 0 | 8 | 0 | 8 | 0 | 8 | 0 | 8 |
| Base T/R Switch Time (usec): | 0.00 | 12.50 | 0.00 | 12.50 | 0.00 | 12.50 | 0.00 | 12.50 |
| Mobile 1 -> 2 Transient Time (chips): | 8 | 0 | 8 | 0 | 8 | 0 | 8 | 0 |
| Mobile 1 -> 2 Transient Time (usec): | 12.50 | 0.00 | 12.50 | 0.00 | 12.50 | 0.00 | 12.50 | 0.00 |
| Base R/T Switch Time (chips): | 8 | 0 | 8 | 0 | 8 | 0 | 8 | 0 |
| Base R/T Switch Time (usec): | 12.50 | 0.00 | 12.50 | 0.00 | 12.50 | 0.00 | 12.50 | 0.00 |
| Total Switch Time (usec): | 25.00 | 12.50 | 25.00 | 12.50 | 25.00 | 12.50 | 25.00 | 12.50 |
| Mobile Timing Error Allowance (chps): | 0 | 34 | 19 | 34 | #Bins 0 | 34 | 0 | 114 |
| Mobile Timing Error Allowance (usec): | 0.00 | 53.13 | 29.69 | 53.13 | 3.89 0.00 | 53.13 | 0.00 | 178.13 |
| Max Range Bin Step Size (mi): | 0.00 | 4.95 | 2.77 | 4.95 | 0.00 | 4.95 | 0.00 | 16.59 |
| Total Non Guard Time Overhead (usec): | 25.00 | 65.63 | 84.38 | 65.63 | 25.00 | 65.63 | 25.00 | 190.63 |
| Number of 2-way TDD Guards: | 1 | 1 | 2 | 1 | 2 | 1 | 2 | 1 |
| TDD Max Cell Radius (mi): | 10.77 | 0.00 | 0.00 | 0.00 | 2.77 | 0.00 | 8.59 | 0.00 |
| Total TDD Guard Time Available (usec): | 115.63 | 0.00 | 0.00 | 0.00 | 59.38 | 0.00 | 184.38 | 0.00 |
| Total TDD Guard Time Available (chips): | 74.00 | 0.00 | 0.00 | 0.00 | 38.00 | 0.00 | 118.00 | 0.00 |
| Guard Time per TDD Guard (chips): | 74.00 | 0.00 | 0.00 | 0.00 | 19.00 | 0.00 | 59.00 | 0.00 |
| Total Guard Time (usec): | 140.63 | 65.63 | 84.38 | 65.63 | 84.38 | 65.63 | 209.38 | 190.63 |
| Slot Structure Efficiency: | 71.88% | 86.88% | 83.13% | 86.88% | 83.13% | 86.88% | 66.50% | 69.50% |
| # of Ant Probes to Send (Forward Link): | 0 | 3 | 0 | 3 | 0 | 3 | 0 | 3 |
| Base Antenna probe Length (chips): | 28 | 13 | 28 | 13 | 28 | 13 | 28 | 13 |
| Antenna Switch Time (chips): | 2 | 2 | 2 | 2 | 2 | 2 | 2 | 2 |
| Total Chips per Antenna Word (chips): | 30 | 15 | 30 | 15 | 30 | 15 | 30 | 15 |

TABLE A-17-continued 0.64 LF
Unspread FDD

Link Designer 3
FDD Setup for page 145 Operation

|  | FDD, No Spread Var Slots, Ranging 0.640 MHz Chip Rate 26.3 × 8.00 kbps | | FDD, No Spread Var Slots, Linked 0.640 MHz Chip Rate 40.0 × 8.00 kbps | | FDD, No Spread with Small Slots 0.640 MHz Chip Rate 40.0 × kbps | | FDD, No Spread with Big Slots 0.640 MHz Chip Rate 32.0 × 8.00 kbps | |
| --- | --- | --- | --- | --- | --- | --- | --- | --- |
| PCP Sync Word Length (chips): | 28 | 0 | 28 | 0 | 28 | 0 | 28 | 0 |
| Antenna Select (symbols): | 5 | 0 | 5 | 0 | 5 | 0 | 5 | 0 |
| Antenna Select (bits): | 5 | 0 | 5 | 0 | 5 | 0 | 5 | 0 |
| PCP Duration (chips): | 33 | 0 | 33 | 0 | 33 | 0 | 33 | 0 |
| Sync Word Length (chips): | 28 | 28 | 28 | 28 | 28 | 28 | 28 | 28 |
| Overhead Length (chips): | 61 | 73 | 61 | 73 | 61 | 73 | 61 | 73 |
| Header Message Length (bits): | 21 | 21 | 21 | 21 | 21 | 21 | 21 | 21 |
| D-Channel Message Length (bits): | 8 | 8 | 8 | 8 | 8 | 8 | 8 | 8 |
| B-Channel Messsge Length (bits): | 105 | 160 | 160 | 160 | 160 | 160 | 160 | 160 |
| R-Channel Message Length (bits): | 0 | 0 | 0 | 0 | 0 | 0 | 0 | 0 |
| CRC Bits in Traffic Mode (bits): | 16 | 16 | 16 | 16 | 16 | 16 | 16 | 16 |
| Simplex Message Length (bits): | 150 | 205 | 205 | 205 | 205 | 205 | 205 | 205 |
| Simplex Message Length (symbols): | 150 | 205 | 205 | 205 | 205 | 205 | 205 | 205 |
| Simplex Message Length (chips): | 150 | 205 | 205 | 205 | 205 | 205 | 205 | 205 |
| Total Number of Chips: | 211 | 278 | 266 | 278 | 266 | 278 | 266 | 278 |
|  | | ←One | System→ | | | | | |

TABLE A-18

0.64 LF
Unspread FDD

|  | | | | | | | | | |
| --- | --- | --- | --- | --- | --- | --- | --- | --- | --- |
| Transmit Slot Duration (usec): | 329.69 | 434.38 | | 415.63 | 434.38 | | 415.63 | 434.38 | |
| One Slot B-Channel Data Rate (kbps): | 5.25 | 8 | | 8 | 8 | | 8 | 8 | |
| Aggregate B-Channel Data Rate (kbps): | 210 | 3200 | | 320 | 320 | | 320 | 320 | |
| Max # of Voice Channels per RF Channel: | 26.25 | 40 | | 40 | 40 | | 40 | 40 | |
| Superframe Duration (msec): | 20 | 20 | | 20 | 20 | | 20 | 20 | |
| Chips/Slot: | 320 | | | 320 | | | 320 | | |
| Chip Duration (usec): | 1.56 | | | 1.56 | | | 1.56 | | |
| Base Slot Layout (mobile at zero range): | (usec) | (chips) | | (usec) | (chips) | | (usec) | (chips) | |
| Base Tx Preamble START: | 0.00 | 0 | | 0.00 | 0 | | 0.00 | 0 | |
| Base Tx Preamble END: | 43.75 | 28 | 28 | 43.75 | 28 | 28 | 43.75 | 28 | 28 |
| Base Tx Message START: | 43.75 | 28 | 0 | 43.75 | 28 | 0 | 43.75 | 28 | 0 |
| Base Tx Message END: | 364.06 | 233 | 205 | 364.06 | 233 | 205 | 364.06 | 233 | 205 |
| Base Tx Antenna Message START: | 364.06 | 233 | 0 | 364.06 | 233 | 0 | 364.06 | 233 | 0 |
| Base Tx Antenna Message END: | 434.38 | 278 | 45 | 434.38 | 278 | 45 | 434.38 | 278 | 45 |
| Base Twiddles Thumbs (FDD only) START: | 438.38 | 278 | 0 | 434.38 | 278 | 0 | 434.38 | 278 | 0 |
| Base Twiddles Thumbs (FDD only) END: | 487.50 | 312 | 34 | 487.50 | 312 | 34 | 487.50 | 312 | 34 |
| Base T -> R Switch START: | 487.50 | 312 | 0 | 487.50 | 312 | 0 | 487.50 | 312 | 0 |
| Base T -> R Switch END: | 500.00 | 320 | 8 | 500.00 | 320 | 8 | 500.00 | 320 | 8 |
| Base Rx Preamble START: | 500.00 | 320 | 0 | 500.00 | 320 | 0 | 500.00 | 320 | 0 |
| Base Rx Preamble END: | 543.75 | 348 | 28 | 543.75 | 348 | 28 | 543.75 | 348 | 28 |
| Base Rx Message START: | 543.75 | 348 | 0 | 543.75 | 348 | 0 | 543.75 | 348 | 0 |
| Base Rx Message END: | 778.13 | 498 | 150 | 864.06 | 553 | 205 | 864.06 | 553 | 205 |
| Base Rx Guard Time 1 or 2 START: | 778.13 | 498 | 0 | 864.06 | 553 | 0 | 864.06 | 553 | 0 |
| Base Rx Guard Time 1 or 2 END: | 893.75 | 572 | 74 | 864.06 | 553 | 0 | 864.06 | 572 | 19 |
| Base Rx Time Error Allowance 1 START: | 893.75 | 572 | 0 | 864.06 | 553 | 0 | 864.06 | 572 | 0 |
| Base Rx Time Error Allowance 1 END: | 893.75 | 572 | 0 | 893.75 | 572 | 19 | 893.75 | 572 | 0 |
| Mobile 1 -> 2 Transient Time (T/R) START: | 893.75 | 572 | 0 | 893.75 | 572 | 0 | 893.75 | 572 | 0 |
| Mobile 1 -> 2 Transient Time (T/R) END: | 906.25 | 580 | 8 | 906.25 | 580 | 8 | 906.25 | 50 | 8 |
| Base Rx PCP START: | 906.25 | 580 | 0 | 906.25 | 820 | 0 | 906.25 | 580 | 0 |
| Base Rx PCP END: | 957.81 | 613 | 33 | 957.81 | 613 | 33 | 957.81 | 613 | 33 |
| Base Rx Guard Time 1 START: | 957.81 | 613 | 0 | 957.81 | 613 | 0 | 957.81 | 613 | 0 |
| Base Rx Guard Time 1 END: | 957.81 | 613 | 0 | 957.81 | 613 | 0 | 957.81 | 632 | 19 |
| Base Rx Time Error Allwnc 2 START: | 957.81 | 613 | 0 | 957.81 | 613 | 0 | 957.81 | 632 | 0 |
| Base Rx Time Error Allwnc 2 END: Mob 2 -> 1 Trans or Base R -> T | 987.50 | 632 | 19 | 987.50 | 632 | 19 | 987.50 | 632 | 0 |

(continuation with 4th group)

|  | (usec) | (chips) | |
| --- | --- | --- | --- |
| Transmit Slot Duration (usec): | 415.63 | 434.38 | |
| One Slot B-Channel Data Rate (kbps): | 8 | 8 | |
| Aggregate B-Channel Data Rate (kbps): | 256 | 256 | |
| Max # of Voice Channels per RF Channel: | 32 | 32 | |
| Superframe Duration (msec): | 20 | 20 | |
| Chips/Slot: | 400 | | |
| Chip Duration (usec): | 1.56 | | |
| Base Tx Preamble START: | 0.00 | 0 | |
| Base Tx Preamble END: | 43.75 | 28 | 28 |
| Base Tx Message START: | 43.75 | 28 | 0 |
| Base Tx Message END: | 364.06 | 233 | 205 |
| Base Tx Antenna Message START: | 364.06 | 233 | 0 |
| Base Tx Antenna Message END: | 434.38 | 278 | 45 |
| Base Twiddles Thumbs (FDD only) START: | 434.38 | 278 | 0 |
| Base Twiddles Thumbs (FDD only) END: | 612.50 | 392 | 114 |
| Base T -> R Switch START: | 612.50 | 392 | 0 |
| Base T -> R Switch END: | 625.00 | 400 | 8 |
| Base Rx Preamble START: | 625.00 | 400 | 0 |
| Base Rx Preamble END: | 668.75 | 428 | 28 |
| Base Rx Message START: | 668.75 | 428 | 0 |
| Base Rx Message END: | 989.06 | 633 | 205 |
| Base Rx Guard Time 1 or 2 START: | 989.06 | 633 | 0 |
| Base Rx Guard Time 1 or 2 END: | 1081.25 | 692 | 59 |
| Base Rx Time Error Allowance 1 START: | 1081.25 | 692 | 0 |
| Base Rx Time Error Allowance 1 END: | 1081.25 | 692 | 0 |
| Mobile 1 -> 2 Transient Time (T/R) START: | 1081.25 | 700 | 0 |
| Mobile 1 -> 2 Transient Time (T/R) END: | 1093.75 | 700 | 8 |
| Base Rx PCP START: | 1093.75 | 700 | 0 |
| Base Rx PCP END: | 1145.31 | 733 | 33 |
| Base Rx Guard Time 1 START: | 1145.31 | 733 | 0 |
| Base Rx Guard Time 1 END: | 1237.50 | 792 | 59 |
| Base Rx Time Error Allwnc 2 START: | 1237.50 | 792 | 0 |
| Base Rx Time Error Allwnc 2 END: | 1237.50 | 792 | 0 |

TABLE A-18-continued

| | 0.64 LF Unspread FDD | | | | | | | | | |
|---|---|---|---|---|---|---|---|---|---|---|
| Swtch START: Mob 2->1 Trans or Base R-> T Swtch | 987.50 | 632 | 0 | 987.50 | 632 | 0 | 987.50 | 632 | 0 | 1237.50 792 0 |
| END: | 1000.00 | 640 | 8 | 1000.00 | 640 | 8 | 1000.00 | 640 | 8 | 1250.00 800 8 |
| Leftovers (Better be Zero): | 0.00 | 0 | | 0.00 | 0 | | 0.00 | 0 | | 0.00 0 |

TABLE A-19

0.64 LF
Nonspread FDD

Data Rates/RF Channel:

| | | | | | | | | |
|---|---|---|---|---|---|---|---|---|
| BW per RF Channel/Chip Rate (kHz): | 640 | 640 | 640 | 640 | 640 | 640 | 640 | 640 |
| Frequency Rouse Factor (N): | 6 | 6 | 6 | 6 | 6 | 6 | 6 | 6 |
| Minimum System Bandwidth (kHz): | 7680 | 7680 | 7680 | 7680 | 7680 | 7680 | 7680 | 7680 |
| S/I (dB): | 50 | 50 | 50 | 50 | 50 | 50 | 50 | 50 |
| Noise FIGURE G 290K (dB): | 4 | 4 | 4 | 4 | 4 | 4 | 4 | 4 |
| Antenna Temperature (K): | 300 | 300 | 300 | 300 | 300 | 300 | 300 | 300 |
| Sys kT inc. NF (dBm/Hz): | −169.9 | −169.9 | −169.9 | −169.9 | −169.9 | −169.9 | −169.9 | −169.9 |
| Sys kT inc. NF (mW/kHz): | 1E-14 | 1E-14 | 1E-14 | 1E-14 | 1E-14 | 1E-14 | 1E-14 | 1E-14 |
| Implimentation Loss (dB): | 3 | 3 | 3 | 3 | 3 | 3 | 3 | 3 |
| I/(S.BW) (num): | 1.6E-08 | 1.6E-08 | 1.6E-08 | 1.6E-08 | 1.6E-08 | 1.6E-08 | 1.6E-08 | 1.6E-08 |
| Mary NonCoher Format: | 2 | 2 | 2 | 2 | 2 | 2 | 2 | 2 |
| Bits per Symbol: | 1 | 1 | 1 | 1 | 1 | 1 | 1 | 1 |
| Required Frame Error Rate: | 1.0E-02 | 1.0E-02 | 1.0E-02 | 1.0E-02 | 1.0E-02 | 1.0E-02 | 1.0E-02 | 1.0E-02 |
| Frame Length for Kb/No Calc. (bits): | 200 | 200 | 200 | 200 | 200 | 200 | 200 | 200 |
| Actual Eqv. Frame Length (bits): | 150 | 150 | 150 | 150 | 150 | 150 | 150 | 150 |
| Antenna Diversity Factor: | 0 | 0 | 1 | 1 | 2 | 2 | 3 | 3 |
| Rake Diversity Factor: | 1 | 1 | 1 | 1 | 2 | 2 | 1.33333 | 1.33333 |
| Required Eb/No (dB): | 10.6404 | 10.6404 | 21.2716 | 21.2716 | 15.9373 | 15.9373 | 14.0081 | 14.0081 |
| 1/Eb/NoL (num): | 0.04325 | 0.04325 | 0.00374 | 0.00374 | 0.01277 | 0.01277 | 0.01992 | 0.01992 |
| Sensitivity in S/I (dBm): | −98.21 | −98.21 | −87.57 | −87.57 | −92.92 | −92.92 | −94.85 | −94.85 |
| Sensitivity, Therm Noise Only (dBm): | −98.22 | −98.22 | −87.58 | −87.58 | −92.92 | −92.92 | −94.85 | −94.85 |
| S/I Induced Sensitivity Loss (dB): | 0.00 | 0.00 | 0.01 | 0.01 | 0.00 | 0.00 | 0.00 | 0.00 |
| Required Sensitivity in S/I (mW): | 1.5E-10 | 1.5E-10 | 1.7E-09 | 1.7E-09 | 5.1E-10 | 5.1E-10 | 3.3E-10 | 3.3E-10 |
| Max Simplex Data Rate (kbps): | 640.00 | 640.00 | 640.00 | 640.00 | 640.00 | 640.00 | 640.00 | 640.00 |
| Max Simplex Symbol Rate (ksps): | 640 | 640 | 640 | 640 | 640 | 640 | 640 | 640 |
| Chips per Symbol: | 1.00 | 1.00 | 1.00 | 1.00 | 1.00 | 1.00 | 1.00 | 1.00 |
| Symbol Duration (usec): | 1.563 | 1.563 | 1.563 | 1.563 | 1.563 | 1.563 | 1.563 | 1.563 |
| Chips per Bit: | 1.00 | 1.00 | 1.00 | 1.00 | 1.00 | 1.00 | 1.00 | 1.00 |
| Processing Gain per bit (dB): | 0.00 | 0.00 | 0.00 | 0.00 | 0.00 | 0.00 | 0.00 | 0.00 |
| S/(N + I) into A/D (dB): | 13.64 | 13.64 | 24.27 | 24.27 | 18.94 | 18.94 | 17.01 | 17.01 |
| S/N into A/D (dB): | 13.64 | 13.64 | 24.28 | 24.28 | 18.94 | 18.94 | 17.01 | 17.01 |
| Max Duplex Data Rate (kbps): | 230.00 | 278.00 | 266.00 | 278.88 | 266.00 | 278.00 | 212.80 | 222.40 |
| Pilot Channel Overhead (kbps): | 0.00 | 0.00 | 0.00 | 0.00 | 0.00 | 0.00 | 0.00 | 0.00 |
| Bearer Channel Duplex Rate (kbps): | 230.00 | 278.00 | 266.00 | 278.00 | 266.00 | 278.00 | 212.80 | 222.40 |
| Link Asymmetry Factor (dB): | | 0.00 | | 0.00 | | 0.00 | | 0.00 |

TABLE A-20

0.64 LF
UnSpread FDD

| | | dBm | | dBm | | dBm | | dBm |
|---|---|---|---|---|---|---|---|---|
| Voice Channel/GOS Calculations: | | | | | | | | |
| Vocoder Rate (kbps): | 8.00 | 8.00 | 8.00 | 8.00 | 8.00 | 8.00 | 8.00 | 8.00 |
| Overhead Rate per Vocoder (kbps): | 0.00 | 0.00 | 0.00 | 0.00 | 0.00 | 0.00 | 0.00 | 0.00 |
| Data Rate per Voice Circuit (kpbs): | 8.00 | 8.00 | 8.00 | 8.00 | 8.00 | 8.00 | 8.00 | 8.00 |
| Number of RP Channels/Sector | 1 | 1 | 1 | 1 | 1 | 1 | 1 | 1 |
| Deployed System Bandwidth (MHz): | 7.68 | 7.68 | 7.68 | 7.68 | 7.68 | 7.68 | 7.68 | 7.68 |
| Max Number Voice Channels Supported: | 26.3 | 40.0 | 40.0 | 40.0 | 40.0 | 40.0 | 32.0 | 32.0 |
| Percentage of Handsets in TSI/HO: | 25.00% | 25.00% | 25.00% | 25.00% | 25.00% | 25.00% | 25.00% | 25.00% |
| Erlangs Supported at 1% GOS: | 14.84 | 25.38 | 25.38 | 25.38 | 25.38 | 25.38 | 19.29 | 19.29 |
| Erlangs Supported at 2% GOS: | 16.09 | 27.12 | 27.12 | 27.12 | 27.12 | 27.12 | 20.76 | 20.76 |
| Single Tandem Framing Delay (msec): | 20.00 | 20.00 | 20.00 | 20.00 | 20.00 | 20.00 | 20.00 | 20.00 |
| Dual Tandem Framing Delay (msec): | 40.00 | 40.00 | 40.00 | 40.00 | 40.00 | 40.00 | 40.00 | 40.00 |
| Base Station Transmit Duty Cycle: | 86.88% | 86.88% | 86.88% | 86.88% | 86.88% | 86.88% | 69.50% | 69.50% |
| Handset Single Slot Tx Duty Cycle: | 2.51% | 2.51% | 2.08% | 2.08% | 2.08% | 2.08% | 2.08% | 2.08% |

TABLE A-20-continued

0.64 LF UnSpread FDD

| Capacity Calculations: | dBm | | | dBm | | | dBm | | | dBm | | |
|---|---|---|---|---|---|---|---|---|---|---|---|---|
| Handset Peak Transmit Power (mW): | 300.00 | 300.00 | 24.8 | 300.00 | 300.00 | 24.8 | 300.00 | 300.00 | 24.8 | 300.00 | 300.00 | 24.8 |
| Handset Average Transmit Power (mW): | 7.54 | 7.54 | 8.8 | 6.23 | 6.23 | 7.9 | 6.23 | 6.23 | 7.9 | 6.23 | 6.23 | 7.9 |
| Handset Antenna Gain (dBd): | 0.00 | 0.00 | | 0.00 | 0.00 | | 0.00 | 0.00 | | 0.00 | 0.00 | |
| Base Peak Transmit Power (mW): | | 300.00 | 24.8 | | 300.00 | 24.8 | | 300.00 | 24.8 | | 300.00 | 24.8 |
| Base Average Transmit Power (mW): | | 260.63 | 24.2 | | 260.63 | 24.2 | | 260.63 | 24.2 | | 208.50 | 23.2 |
| Base Antenna Gain (dBd): | 17.00 | 17.00 | | 17.00 | 17.00 | | 17.00 | 17.00 | | 17.00 | 17.00 | |
| Num Geographic Sectors(1 Base/Sector): | 3 | 3 | | 3 | 3 | | 3 | 3 | | 3 | 3 | |
| Sector Loss Due to Antenna Overlap: | 15.0% | 15.0% | | 15.0% | 15.0% | | 15.0% | 15.0% | | 15.0% | 15.0% | |
| Net Sectorization Gain in Capacity: | 2.55 | 2.55 | | 2.55 | 2.55 | | 2.55 | 2.55 | | 2.55 | 2.55 | |
| Total Number of RF Channels at Site: | 3 | 3 | | 3 | 3 | | 3 | 3 | | 3 | 3 | |
| 1% GOS Erlangs Handeled at Site: | 37.84 | 64.72 | | 64.72 | 64.72 | | 64.72 | 64.72 | | 49.19 | 49.19 | |
| 2% GOS Erlangs Haneled at Site: | 41.02 | 69.16 | | 69.16 | 69.16 | | 69.16 | 69.16 | | 52.94 | 52.94 | |

TABLE A-21

0.56 LF UnSpread FDD

Link Designer 3
FDD Setup for page 145 Operation

| | FDD, No Spread Var Slots, Ranging 0.560 MHz Chip Rate | | FDD, No Spread Var Slots, Linked 0.560 MHz Chip Rate 35.0 × 8.00 kbps | | FDD, No Spread with Small Slots 0.560 Chip Rate 35.0 × 8.00 kbps | | | FDD, No Spread with Big Slots 0.560 MHz Chip Rate 32.0 × 8.00 kbps | |
|---|---|---|---|---|---|---|---|---|---|
| Slotting Efficiency: | Reverse Link | Forward Link | Reverse Link | Forward Link | | Reverse Link | Forward Link | Reverse Link | Forward Link |
| 2-way Message Frame Duration (usec): | 571.43 | 571.43 | 571.43 | 571.43 | | 571.43 | 571.43 | 625.00 | 625.00 |
| Base T/R Switch Time (chips): | 0 | 8 | 0 | 8 | | 0 | 8 | 0 | 8 |
| Base T/R Switch Time (usec): | 0.00 | 14.29 | 0.00 | 14.29 | | 0.00 | 14.29 | 0.00 | 14.29 |
| Mobile 1 -> 2 Transient Time (chips): | 8 | 0 | 8 | 0 | | 8 | 0 | 8 | 0 |
| Mobile 1 -> 2 Transient Time (usec): | 14.29 | 0.00 | 14.29 | 0.00 | | 14.29 | 0.00 | 14.29 | 0.00 |
| Base R/T Switch Time (chips): | 8 | 0 | 8 | 0 | | 8 | 0 | 8 | 0 |
| Base R/T Switch Time (usec): | 14.29 | 0.00 | 14.29 | 0.00 | | 14.29 | 0.00 | 14.29 | 0.00 |
| Total Switch Time (usec): | 28.57 | 14.29 | 28.57 | 14.29 | | 28.57 | 14.29 | 28.57 | 14.29 |
| Mobile Timing Error Allowance (chps): | 0 | 34 | 19 | 34 | | 0 | 34 | 0 | 34 |
| Mobile Timing Error Allowance (usec): | 0.00 | 60.71 | 33.93 | 60.71 | #Bins 0.00 | 60.71 | 0.00 | 60.71 |
| Max Range Bin Step Size (mi): | 0.00 | 5.66 | 3.16 | 5.66 | 3.89 0.00 | 5.66 | 0.00 | 5.66 |
| Total Non Guard Time Overhead (usec): | 28.57 | 75.00 | 96.43 | 75.00 | | 28.57 | 75.00 | 28.57 | 75.00 |
| Number of 2-way TDD Guards: | 1 | 1 | 2 | 1 | | 2 | 1 | 2 | 1 |
| TDD Max Cell Radius (mi): | 12.31 | 0.00 | 0.00 | 0.00 | | 3.16 | 0.00 | 5.66 | 4.99 |
| Total TDD Guard Time Available (usec): | 132.14 | 0.00 | 0.00 | 0.00 | | 67.86 | 0.00 | 121.43 | 53.57 |
| Total TDD Guard Time Available (chips): | 74.00 | 0.00 | 0.00 | 0.00 | | 38.00 | 0.00 | 68.00 | 30.00 |
| Guard Time per TDD Guard (chips): | 74.00 | 0.00 | 0.00 | 0.00 | | 19.00 | 0.00 | 34.00 | 30.00 |
| Total Guard Time (usec): | 160.71 | 75.00 | 96.43 | 75.00 | | 96.43 | 75.00 | 150.00 | 128.57 |
| Slot Structure Efficiency: | 71.88% | 86.88% | 83.13% | 86.88% | | 83.13% | 86.88% | 76.00% | 79.43% |
| # of Ant Probes to Send (Forward Link): | 0 | 3 | 0 | 3 | | 0 | 3 | 0 | 3 |
| Base Antenna probe Length (chips): | 28 | 13 | 28 | 13 | | 28 | 13 | 28 | 13 |
| Antenna Switch Time (chips): | 2 | 2 | 2 | 2 | | 2 | 2 | 2 | 2 |
| Total Chips per Antenna Word (chips): | 30 | 15 | 30 | 15 | | 30 | 15 | 30 | 15 |
| PCP Sync Word Length (chips): | 28 | 0 | 28 | 0 | | 28 | 0 | 28 | 0 |
| Antenna Select (symbols): | 5 | 0 | 5 | 0 | | 5 | 0 | 5 | 0 |
| Antenna Select (bits): | 5 | 0 | 5 | 0 | | 5 | 0 | 5 | 0 |
| PCP Duration (chips): | 33 | 0 | 33 | 0 | | 33 | 0 | 33 | 0 |
| Sync Word Length (chips): | 28 | 28 | 28 | 28 | | 28 | 28 | 28 | 28 |
| Overhead Length (chips): | 61 | 73 | 61 | 73 | | 61 | 73 | 61 | 73 |
| Header Message Length (bits): | 21 | 21 | 21 | 21 | | 21 | 21 | 21 | 21 |
| D-Channel Message Length (bits): | 8 | 8 | 8 | 8 | | 8 | 8 | 8 | 8 |
| B-Channel Messsge Length (bits): | 105 | 160 | 160 | 160 | | 160 | 160 | 160 | 160 |
| R-Channel Message Length (bits): | 0 | 0 | 0 | 0 | | 0 | 0 | 0 | 0 |

TABLE A-21-continued 0.56 LF
UnSpread FDD

Link Designer 3
FDD Setup for page 145 Operation

|  | FDD, No Spread Var Slots, Ranging 0.560 MHz Chip Rate | FDD, No Spread Var Slots, Linked 0.560 MHz Chip Rate 35.0 × 8.00 kbps | FDD, No Spread with Small Slots 0.560 Chip Rate 35.0 × 8.00 kbps | FDD, No Spread with Big Slots 0.560 MHz Chip Rate 32.0 × 8.00 kbps |
|---|---|---|---|---|
| CRC Bits in Traffic Mode (bits): | 16  16 | 16  16 | 16  16 | 16  16 |
| Simplex Message Length (bits): | 150  205 | 205  205 | 205  205 | 205  205 |
| Simplex Message Length (symbols): | 150  205 | 205  205 | 205  205 | 205  205 |
| Simplex Message Length (chips): | 150  205 | 205  205 | 205  205 | 205  205 |
| Total Number of Chips: | 211  278 | 266  278 | 266  278 | 266  278 |
|  | | ←One  System→ | | |

TABLE A-22

0.56 LF
UnSpread FDD

| | | | | | | | | | | |
|---|---|---|---|---|---|---|---|---|---|---|
| Transmit Slot Duration (usec): | 376.79 | 496.43 | 475.00 | 496.43 | | 475.00 | 496.43 | | 475.00 | 496.43 |
| One Slot B-Channel Data Rate (kbps): | 5.25 | 8 | 8 | 8 | | 8 | 8 | | 8 | 8 |
| Aggregate B-Channel Data Rate (kbps): | 183.75 | 280 | 280 | 280 | | 280 | 280 | | 256 | 256 |
| Max # of Voice Channels per RF Channel: | 22.9688 | 35 | 35 | 35 | | 35 | 35 | | 32 | 32 |
| Superframe Duration (msec): | 20 | 20 | 20 | 20 | | 20 | 20 | | 20 | 20 |
| Chips/Slot: | 320 | | 320 | | | 320 | | | 350 | |
| Chip Duration (usec): | 1.79 | | 1.79 | | | 1.79 | | | 1.79 | |
| Base Slot Layout (mobile at zero range): | (usec) | (chips) | (usec) | (chips) | | (usec) | (chips) | | (usec) | (chips) |
| Base Tx Preamble START: | 0.00 | 0 | 0.00 | 0 | | 0.00 | 0 | | 0.00 | 0 |
| Base Tx Preamble END: | 50.00 | 28 | 28 | 50.00 | 28 | 28 | 50.00 | 28 | 28 | 50.00 | 28 | 28 |
| Base Tx Message START: | 50.00 | 28 | 0 | 50.00 | 28 | 0 | 50.00 | 28 | 0 | 50.00 | 28 | 0 |
| Base Tx Message END: | 416.07 | 233 | 205 | 416.07 | 233 | 205 | 416.07 | 233 | 205 | 416.07 | 233 | 205 |
| Base Tx Antenna Message START: | 416.07 | 233 | 0 | 416.07 | 233 | 0 | 416.07 | 233 | 0 | 416.07 | 233 | 0 |
| Base Tx Antenna Message END: | 496.43 | 278 | 45 | 496.43 | 278 | 45 | 496.43 | 278 | 45 | 496.43 | 278 | 45 |
| Base Twiddles Thumbs (FDD only) START: | 496.43 | 278 | 0 | 496.43 | 278 | 0 | 496.43 | 278 | 0 | 496.43 | 278 | 0 |
| Base Twiddles Thumbs (FDD only) END: | 557.14 | 312 | 34 | 557.14 | 312 | 34 | 557.14 | 312 | 34 | 557.14 | 312 | 34 |
| Base T -> R Switch START: | 557.14 | 312 | 0 | 557.14 | 312 | 0 | 557.14 | 312 | 0 | 557.14 | 312 | 0 |
| Base T -> R Switch END: | 571.43 | 320 | 8 | 571.43 | 320 | 8 | 571.43 | 320 | 8 | 571.43 | 320 | 8 |
| Base Rx Preamble START: | 571.43 | 320 | 0 | 571.43 | 320 | 0 | 571.43 | 320 | 0 | 571.43 | 320 | 0 |
| Base Rx Preamble END: | 621.43 | 348 | 28 | 621.43 | 348 | 28 | 621.43 | 348 | 28 | 621.43 | 348 | 28 |
| Base Rx Message START: | 621.43 | 348 | 0 | 621.43 | 348 | 0 | 621.43 | 348 | 0 | 621.43 | 348 | 0 |
| Base Rx Message END: | 889.29 | 498 | 150 | 987.50 | 553 | 205 | 987.50 | 553 | 205 | 987.50 | 553 | 205 |
| Base Rx Guard Time 1 or 2 START: | 889.29 | 498 | 0 | 987.50 | 553 | 0 | 987.50 | 553 | 0 | 987.50 | 553 | 0 |
| Base Rx Guard Time 1 or 2 END: | 1021.43 | 572 | 74 | 987.50 | 553 | 0 | 1021.43 | 572 | 19 | 1048.21 | 587 | 34 |
| Base Rx Time Error Allwnc 1 START: | 1021.43 | 572 | 0 | 987.50 | 553 | 0 | 1021.43 | 572 | 0 | 1048.21 | 587 | 0 |
| Base Rx Time Error Allowance 1 END: | 1021.43 | 572 | 0 | 1021.43 | 572 | 19 | 1021.43 | 572 | 0 | 1048.21 | 587 | 0 |
| Mobile 1 -> 2 Transient Time (T/R) START: | 1021.43 | 572 | 0 | 1021.43 | 572 | 0 | 1021.43 | 572 | 0 | 1048.21 | 587 | 0 |
| Mobile 1 -> 2 Transient Time T/R) END: | 1035.71 | 580 | 8 | 1034.71 | 580 | 8 | 1035.71 | 580 | 8 | 1062.50 | 595 | 8 |
| Base Rx PCP START: | 1035.71 | 580 | 0 | 1035.71 | 820 | 0 | 1035.71 | 580 | 0 | 1062.50 | 595 | 0 |
| Base Rx PCP END: | 1094.64 | 613 | 33 | 1094.64 | 613 | 33 | 1094.64 | 613 | 33 | 1121.43 | 628 | 33 |
| Base Rx Guard Time 1 START: | 1094.64 | 613 | 0 | 1094.64 | 613 | 0 | 1094.64 | 613 | 0 | 1121.43 | 628 | 0 |
| Base Rx Guard Time 1 END: | 1094.64 | 613 | 0 | 1094.64 | 613 | 0 | 1128.57 | 632 | 19 | 1182.14 | 662 | 34 |
| Base Rx Time Error Allwnc 2 START: | 1094.64 | 613 | 0 | 1094.64 | 613 | 0 | 1128.57 | 632 | 0 | 1182.14 | 662 | 0 |
| Base Rx Time Error Allowance 2 END: | 1128.57 | 632 | 19 | 1128.57 | 632 | 19 | 1128.57 | 632 | 0 | 1182.14 | 662 | 0 |
| Mob 2 -> 1 Trans or Base R -> T Swtch START: | 1128.57 | 632 | 0 | 1128.57 | 632 | 0 | 1128.57 | 632 | 0 | 1182.14 | 662 | 0 |
| Mob 2 -> 1 Trans or Base R -> T Swtch END: | 1142.86 | 640 | 8 | 1142.86 | 640 | 8 | 1142.86 | 640 | 8 | 1196.43 | 670 | 8 |
| Leftovers (Better be Zero): | 0.00 | 0 | | 0.00 | 0 | | 0.00 | 0 | | 53.57 | 30 | 0 |

TABLE A-23

0.65 LF
NonSpread FDD

Data Rates/RF Channel:

| | | | | | | | | |
|---|---|---|---|---|---|---|---|---|
| BW per RF Channel/Chip Rate (kHz): | 560 | 560 | 560 | 560 | 560 | 560 | 560 | 560 |
| Frequency Reuse Factor (N): | 6 | 6 | 6 | 6 | 6 | 6 | 6 | 6 |
| Minimum System Bandwidth (kHz): | 6720 | 6720 | 6720 | 6720 | 6720 | 6720 | 6720 | 6720 |
| S/I (dB): | 50 | 50 | 50 | 50 | 50 | 50 | 50 | 50 |
| Noise FIGURE G 290K (dB): | 4 | 4 | 4 | 4 | 4 | 4 | 4 | 4 |
| Antenna Temperature (K): | 300 | 300 | 300 | 300 | 300 | 300 | 300 | 300 |
| Sys kT inc. NF (dBm/Hz): | −169.9 | −169.9 | −169.9 | −169.9 | −169.9 | −169.9 | −169.9 | −169.9 |
| Sys kT inc. NF (mW/kHz): | 1E-14 | 1E-14 | 1E-14 | 1E-14 | 1E-14 | 1E-14 | 1E-14 | 1E-14 |
| Implimentation Loss (dB): | 3 | 3 | 3 | 3 | 3 | 3 | 3 | 3 |
| I/(S.BW) (num): | 1.8E-08 | 1.8E-08 | 1.8E-08 | 1.8E-08 | 1.8E-08 | 1.8E-08 | 1.8E-08 | 1.8E-08 |
| Mary NonCoher Format: | 2 | 2 | 2 | 2 | 2 | 2 | 2 | 2 |
| Bits per Symbol: | 1 | 1 | 1 | 1 | 1 | 1 | 1 | 1 |
| Required Frame Error Rate: | 1.0E-02 | 1.0E-02 | 1.0E-02 | 1.0E-02 | 1.0E-02 | 1.0E-02 | 1.0E-02 | 1.0E-02 |
| Frame Length for Kb/No Calc. (bits): | 200 | 200 | 200 | 200 | 200 | 200 | 200 | 200 |
| Actual Eqv. Frame Length (bits): | 150 | 150 | 205 | 205 | 205 | 205 | 205 | 205 |
| Antenna Diversity Factor: | 0 | 0 | 1 | 1 | 2 | 2 | 3 | 3 |
| Rake Diversity Factor: | 1 | 1 | 1 | 1 | 2 | 2 | 1.33333 | 1.33333 |
| Required Eb/No (dB): | 10.6404 | 10.6404 | 21.2716 | 21.2716 | 15.9373 | 15.9373 | 14.0081 | 14.0081 |
| 1/Eb/NoL (num): | 0.04325 | 0.04325 | 0.000374 | 0.00374 | 0.001277 | 0.01277 | 0.01992 | 0.01992 |
| Sensitivity in S/I (dBm): | −98.79 | −98.79 | −88.15 | −97.05 | −97.05 | −97.05 | −97.05 | −97.05 |
| Sensitivity, Therm Noise Only (dBm): | −98.80 | −98.80 | −88.16 | −88.16 | −93.50 | −93.50 | −95.43 | −95.43 |
| S/I Induced Sensitivity Loss (dB): | 0.00 | 0.00 | 0.01 | 0.01 | 0.00 | 0.00 | 0.00 | 0.00 |
| Required Sensitivity in S/I (mW): | 1.3E-10 | 1.3E-10 | 1.5E-09 | 1.5E-09 | 4.5E-10 | 4.5E-10 | 2.9E-10 | 2.9E-10 |
| Max Simplex Data Rate (kbps): | 560.00 | 560.00 | 560.00 | 560.00 | 560.00 | 560.00 | 560.00 | 560.00 |
| Max Simplex Symbol Rate (ksps): | 560 | 560 | 560 | 560 | 560 | 560 | 560 | 560 |
| Chips per Symbol: | 1.00 | 1.00 | 1.00 | 1.00 | 1.00 | 1.00 | 1.00 | 1.00 |
| Symbol Duration (usec): | 1.786 | 1.786 | 1.786 | 1.786 | 1.786 | 1.786 | 1.786 | 1.786 |
| Chips per Bit: | 1.00 | 1.00 | 1.00 | 1.00 | 1.00 | 1.00 | 1.00 | 1.00 |
| Processing Gain per bit (dB): | 0.00 | 0.00 | 0.00 | 0.00 | 0.00 | 0.00 | 0.00 | 0.00 |
| S/(N + I) into A/D (dB): | 13.64 | 13.64 | 24.97 | 24.97 | 18.94 | 18.94 | 17.01 | 17.01 |
| S/N into A/D (dB): | 13.64 | 13.64 | 24.98 | 24.28 | 18.94 | 18.94 | 17.01 | 17.01 |
| Max Duplex Data Rate (kbps): | 201.00 | 243.00 | 232.75 | 243.25 | 232.75 | 243.25 | 212.80 | 222.40 |
| Pilot Channel Overhead (kbps): | 0.00 | 0.00 | 0.00 | 0.00 | 0.00 | 0.00 | 0.00 | 0.00 |
| Bearer Channel Duplex Rate (kbps): | 201.00 | 243.00 | 232.75 | 243.25 | 232.75 | 243.25 | 212.80 | 222.40 |
| Link Asymmetry Factor (dB): | | 0.00 | | 0.00 | | 0.00 | | 0.00 |

TABLE A-24

0.56 LF
Unspread FDD

| | dBm | | | dbm | | | dbm | | | dbm | | |
|---|---|---|---|---|---|---|---|---|---|---|---|---|
| Voice Channel/GOS Calculations: | | | | | | | | | | | | |
| Vocoder Rate (kbps): | 8.00 | 8.00 | | 8.00 | 8.00 | | 8.00 | 8.00 | | 8.00 | | 8.00 |
| Overhead Rate per Vocoder (kbps): | 0.00 | 0.00 | | 0.00 | 0.00 | | 0.00 | 0.00 | | 0.00 | | 0.00 |
| Data Rate per Voice Circuit (kpbs): | 8.00 | 8.00 | | 8.00 | 8.00 | | 8.00 | 8.00 | | 8.00 | | 8.00 |
| Number of RP Channels/Sector | 1 | 1 | | 1 | 1 | | 1 | 1 | | 1 | | 1 |
| Deployed System Bandwidth (MHz): | 6.72 | 6.72 | | 6.72 | 6.72 | | 6.72 | 6.72 | | 6.72 | | 6.72 |
| Max Number Voice Channels Supported: | 23.0 | 35.0 | | 35.0 | 35.0 | | 35.0 | 35.0 | | 32.0 | | 32.0 |
| Percentage of Handsets in TSI/HO: | 25.00% | 25.00% | | 25.00% | 25.00% | | 25.00% | 25.00% | | 25.00% | | 25.00% |
| Erlangs Supported at 1% GOS: | 11.94 | 21.56 | | 21.56 | 21.56 | | 21.56 | 21.56 | | 19.29 | | 19.29 |
| Erlangs Supported at 2% GOS: | 13.03 | 23.13 | | 23.13 | 23.13 | | 23.13 | 23.13 | | 20.76 | | 20.76 |
| Single Tandem Framing Delay (msec): | 20.00 | 20.00 | | 20.00 | 20.00 | | 20.00 | 20.00 | | 20.00 | | 20.00 |
| Dual Tandem Framing Delay (msec): | 40.00 | 40.00 | | 40.00 | 40.00 | | 40.00 | 40.00 | | 40.00 | | 40.00 |
| Base Station Transmit Duty Cycle: | 86.88% | 86.88% | | 86.88% | 86.88% | | 86.88% | 86.88% | | 79.43% | | 79.43% |
| Handset Single Slot Tx Duty Cycle: | 2.87% | 2.87% | | 2.38% | 2.38% | | 2.38% | 2.38% | | 2.38% | | 2.38% |
| Capacity Calculations: | | | | | | | | | | | | |
| Handset Peak Transmit Power (mW): | 300.00 | 300.00 | 24.8 | 300.00 | 300.00 | 24.8 | 300.00 | 300.00 | 24.8 | 300.00 | 300 | 24.8 |
| Handset Average Transmit Power (mW): | 8.61 | 8.61 | 9.4 | 7.13 | 7.13 | 8.5 | 7.13 | 7.13 | 8.5 | 7.13 | 7.13 | 8.5 |
| Handset Antenna Gain (dBd): | 0.00 | 0.00 | | 0.00 | 0.00 | | 0.00 | 0.00 | | 0.00 | 0.00 | |
| Base Peak Transmit Power (mW): | | 300.00 | 24.8 | | 300.00 | 24.8 | | 300.00 | 24.8 | | 300 | 24.8 |
| Base Average Transmit Power (mW): | | 260.63 | 24.2 | | 260.63 | 24.2 | | 260.63 | 24.2 | | 238.29 | 23.8 |
| Base Antenna Gain (dBd): | 17.00 | 17.00 | | 17.00 | 17.00 | | 17.00 | 17.00 | | 17.00 | 17.00 | |
| Num Geographic Sectors (1 Base/Sector): | 3 | 3 | | 3 | 3 | | 3 | 3 | | 3 | | 3 |
| Sector Loss Due to Antenna Overlap: | 15.0% | 15.0% | | 15.0% | 15.0% | | 15.0% | 15.0% | | 15.0% | | 15.0% |

TABLE A-24-continued

| | 0.56 LF Unspread FDD | | | | | | | |
|---|---|---|---|---|---|---|---|---|
| | dBm | | dbm | | dbm | | dbm | |
| Net Sectorization Gain in Capacity: | 2.55 | 2.55 | 2.55 | 2.55 | 2.55 | 2.55 | 2.55 | 2.55 |
| Total Number of RF Channels at Site: | 3 | 3 | 3 | 3 | 3 | 3 | 3 | 43 |
| 1% GOS Erlangs Handeled at Site: | 30.46 | 54.97 | 54.97 | 54.97 | 54.97 | 54.97 | 49.19 | 49.19 |
| 2% GOS Erlangs Haneled at Site: | 33.24 | 58.98 | 58.98 | 58.98 | 58.98 | 58.98 | 52.94 | 52.94 |

TABLE A-25

0.35 LF
Spread FDD

Link Designer 3
FDD Setup for page 145 Operation

| | FDD, No Spread Var Slots, Ranging 0.350 MHz Chip Rate 16.4 × 8.00 kbps | | FDD, No Spread Var Slots, Linked 0.350 MHz Chip Rate 25.0 × 8.00 kbps | | | FDD, No Spread with Small Slots 0.350 MHz Chip Rate 25.0 × 8.00 kbps | | FDD, No Spread with Big Slots 0.350 MHz Chip Rate 20.0 × 8.00 kbps | |
|---|---|---|---|---|---|---|---|---|---|
| Slotting Efficiency: | Reverse Link | Forward Link | Reverse Link | Forward Link | Link | Reverse Link | Forward Link | Reverse Link | Forward Link |
| 2-way Message Frame Duration (usec): | 800.00 | 800.00 | 800.00 | 800.00 | | 800.00 | 800.00 | 1000.00 | 1000.00 |
| Base T/R Switch Time (chips): | 0 | 8 | 0 | 8 | | 0 | 8 | 0 | 8 |
| Base T/R Switch Time (usec): | 0.00 | 22.86 | 0.00 | 22.86 | | 0.00 | 22.86 | 0.00 | 22.86 |
| Mobile 1 -> 2 Transient Time (chips): | 8 | 0 | 8 | 0 | | 8 | 0 | 8 | 0 |
| Mobile 1 -> 2 Transient Time (usec): | 22.86 | 0.00 | 22.86 | 0.00 | | 22.86 | 22.86 | 22.86 | 0.00 |
| Base R/T Switch Time (chips): | 8 | 0 | 8 | 0 | | 8 | 0 | 8 | 0 |
| Base R/T Switch Time (usec): | 22.86 | 0.00 | 22.86 | 0.00 | | 22.86 | 0.00 | 22.86 | 0.00 |
| Total Switch Time (usec): | 45.71 | 22.86 | 45.71 | 22.86 | | 45.71 | 22.86 | 45.71 | 22.86 |
| Mobile Timing Error Allowance (chps): | 0 | 3 | 2 | 3 | | 0 | 3 | 0 | 73 |
| Mobile Timing Error Allowance (usec): | 0.00 | 8.57 | 5.71 | 8.57 | #Bins | 0.00 | 8.57 | 0.00 | 208.57 |
| Max Range Bin Step Size (mi): | 0.00 | 0.80 | 0.53 | 0.80 | 6.97 | 0.00 | 0.80 | 0.00 | 19.43 |
| Total Non Guard Time Overhead (usec): | 45.71 | 31.43 | 57.14 | 31.43 | | 45.71 | 31.43 | 45.71 | 231.43 |
| Number of 2-way TDD Guards: | 1 | 1 | 2 | 1 | | 2 | 1 | 2 | 1 |
| TDD Max Cell Radius (mi): | 15.17 | 0.00 | −0.00 | 0.00 | | 0.53 | 0.00 | 9.85 | 0.00 |
| Total TDD Guard Time Available (usec): | 162.86 | 0.00 | −0.00 | 0.00 | | 11.43 | 0.00 | 211.43 | 0.00 |
| Total TDD Guard Time Available (chips): | 57.00 | 0.00 | −0.00 | 0.00 | | 4.00 | 0.00 | 74.00 | 0.00 |
| Guard Time per TDD Guard (chips): | 57.00 | 0.00 | −0.00 | 0.00 | | 2.00 | 0.00 | 37.00 | 0.00 |
| Total Guard Time (usec): | 208.57 | 31.43 | 57.14 | 31.43 | | 57.14 | 31.43 | 257.14 | 231.43 |
| Slot Structure Efficiency: | 73.93% | 96.07% | 92.86% | 96.07% | | 92.86% | 96.07% | 74.29% | 76.86% |
| # of Ant Probes to Send (Forward Link): | 0 | 3 | 0 | 3 | | 0 | 3 | 0 | 3 |
| Base Antenna probe Length (chips): | 28 | 11 | 28 | 11 | | 28 | 11 | 28 | 11 |
| Antenna Switch Time (chips): | 2 | 2 | 2 | 2 | | 2 | 2 | 2 | 2 |
| Total Chips per Antenna Word (chips): | 30 | 13 | 30 | 13 | | 30 | 13 | 30 | 13 |
| PCP Sync Word Length (chips): | 25 | 0 | 25 | 0 | | 25 | 0 | 25 | 0 |
| Antenna Select (symbols): | 5 | 0 | 5 | 0 | | 5 | 0 | 5 | 0 |
| Antenna Select (bits): | 5 | 0 | 5 | 0 | | 5 | 0 | 5 | 0 |
| PCP Duration (chips): | 30 | 0 | 30 | 0 | | 30 | 0 | 30 | 0 |
| Sync Word Length (chips): | 25 | 25 | 25 | 25 | | 25 | 25 | 25 | 25 |
| Overhead Length (chips): | 55 | 64 | 55 | 64 | | 55 | 64 | 55 | 64 |
| Header Message Length (bits): | 21 | 21 | 21 | 21 | | 21 | 21 | 21 | 21 |
| D-Channel Message Length (bits): | 8 | 8 | 8 | 8 | | 8 | 8 | 8 | 8 |
| B-Channel Messsge Length (bits): | 105 | 160 | 160 | 160 | | 160 | 160 | 160 | 160 |
| R-Channel Message Length (bits): | 0 | 0 | 0 | 0 | | 0 | 0 | 0 | 0 |
| CRC Bits in Traffic Mode (bits): | 16 | 16 | 16 | 16 | | 16 | 16 | 16 | 16 |
| Simplex Message Length (bits): | 150 | 205 | 205 | 205 | | 205 | 205 | 205 | 205 |
| Simplex Message Length (symbols): | 150 | 205 | 205 | 205 | | 205 | 205 | 205 | 205 |
| Simplex Message Length (chips): | 150 | 205 | 205 | 205 | | 205 | 205 | 205 | 205 |
| Total Number of Chips: | 205 | 269 | 260 | 269 | | 260 | 269 | 260 | 269 |
| | [ | ←One | System→ | ] | | | | | |

TABLE A-26

| | 0.35 LF Unspread FDD | | | | | | | |
|---|---|---|---|---|---|---|---|---|
| Transmit Slot Duration (usec): | 585.71 | 768.57 | 742.86 | 768.57 | 742.86 | 768.57 | 752.86 | 768.57 |
| One Slot B-Channel Data Rate (kbps): | 5.25 | 8 | 8 | 8 | 8 | 8 | 8 | 8 |

TABLE A-26-continued 0.35 LF
Unspread FDD

| | | | | | | | | | | | | |
|---|---|---|---|---|---|---|---|---|---|---|---|---|
| Aggregate B-Channel Data Rate (kbps): | 131.25 | | 200 | 200 | | 200 | 200 | | 200 | 200 | | 160 | 160 |
| Max # of Voice Channels per RF Channel: | 16.4063 | | 25 | 25 | | 25 | 25 | | 25 | 25 | | 20 | 20 |
| Superframe Duration (msec): | 20 | | 20 | 20 | | 20 | 20 | | 20 | 20 | | 20 | 20 |
| Chips/Slot: | 280 | | | 280 | | | 280 | | | 350 | | |
| Chip Duration (usec): | 2.86 | | | 2.86 | | | 2.86 | | | 2.86 | | |

Base Slot Layout (mobile at zero range):

| | (usec) | (chips) | | (usec) | (chips) | | (usec) | (chips) | | (usec) | | (chips) |
|---|---|---|---|---|---|---|---|---|---|---|---|---|
| Base Tx Preamble START: | 0.00 | 0 | | 0.00 | 0 | | 0.00 | 0 | | 0.00 | 0 | |
| Base Tx Preamble END: | 71.43 | 25 | | 71.43 | 25 | 25 | 71.43 | 25 | 25 | 71.43 | 25 | 25 |
| Base Tx Message START: | 71.43 | 25 | 0 | 71.43 | 25 | 0 | 71.43 | 25 | 0 | 71.43 | 25 | 0 |
| Base Tx Message END: | 657.14 | 230 | 205 | 657.14 | 230 | 205 | 657.14 | 230 | 205 | 657.14 | 230 | 205 |
| Base Tx Antenna Message START: | 657.14 | 230 | 0 | 657.14 | 230 | 0 | 657.14 | 230 | 0 | 657.14 | 230 | 0 |
| Base Tx Antenna Message END: | 768.57 | 269 | 39 | 768.57 | 269 | 39 | 768.57 | 269 | 39 | 768.57 | 269 | 39 |
| Base Twiddles Thumbs (FDD only) START: | 768.57 | 269 | 0 | 768.57 | 269 | 0 | 768.57 | 269 | 0 | 768.57 | 269 | 0 |
| Base Twiddles Thumbs (FDD only) END: | 777.14 | 272 | 3 | 777.14 | 272 | 3 | 777.14 | 272 | 3 | 977.14 | 342 | 73 |
| Base T -> R Switch START: | 777.14 | 272 | 0 | 777.14 | 272 | 0 | 777.14 | 272 | 0 | 977.14 | 342 | 0 |
| Base T -> R Switch END: | 800.00 | 280 | 8 | 800.00 | 280 | 8 | 800.00 | 280 | 8 | 1000 | 350 | 8 |
| Base Rx Preamble START: | 800.00 | 280 | 0 | 800.00 | 280 | 0 | 800.00 | 280 | 0 | 1000 | 350 | 0 |
| Base Rx Preamble END: | 871.43 | 305 | 25 | 871.43 | 305 | 25 | 871.43 | 305 | 25 | 1071.43 | 375 | 25 |
| Base Rx Message START: | 871.43 | 305 | 0 | 871.43 | 305 | 0 | 871.43 | 305 | 0 | 1071.43 | 375 | 0 |
| Base Rx Message END: | 1300.00 | 455 | 150 | 1457.14 | 510 | 205 | 1457.14 | 510 | 205 | 1657.14 | 580 | 205 |
| Base Rx Guard Time 1 or 2 START: | 1300.00 | 455 | 0 | 1457.14 | 510 | 0 | 1457.14 | 510 | 0 | 1657.14 | 580 | 0 |
| Base Rx Guard Time 1 or 2 END: | 1462.86 | 512 | 57 | 1457.14 | 510 | 0 | 1462.86 | 512 | 2 | 1762.86 | 617 | 37 |
| Base Rx Time Error Allwnc 1 START: | 1462.86 | 512 | 0 | 1457.14 | 510 | 0 | 1462.86 | 512 | 0 | 1762.86 | 617 | 0 |
| Base Rx Time Error Allwnc 1 END: | 1462.86 | 512 | 0 | 1462.86 | 512 | 2 | 1462.86 | 512 | 0 | | 617 | 0 |
| Mobile 1 -> 2 Transient Time (T/R) START: | 1462.86 | 512 | 0 | 1462.86 | 512 | 0 | 1462.86 | 512 | 0 | 1762.86 1785.71 | 617 | 0 |
| Mobile 1 -> 2 Transient Time T/R) END: | 1485.71 | 520 | 8 | 1485.71 | 520 | 8 | 1485.71 | 520 | 8 | 1785.71 1871.43 | 625 | 8 |
| Base Rx PCP START: | 1485.71 | 520 | 0 | 1485.71 | 520 | 0 | 1485.71 | 520 | 0 | 1871.43 | 625 | 0 |
| Base Rx PCP END: | 1571.43 | 550 | 30 | 1571.43 | 550 | 30 | 1571.43 | 550 | 30 | 1977.14 | 655 | 30 |
| Base Rx Guard Time 1 START: | 1571.43 | 550 | 0 | 1571.43 | 550 | 0 | 1571.43 | 550 | 0 | 1977.14 1977.14 | 655 692 | 0 37 |
| Base Rx Guard Time 1 END: | 1571.43 | 550 | 0 | 1571.43 | 550 | 0 | 1577.14 | 552 | 2 | | 692 | 0 |
| Base Rx Time Error Allwnc 2 START: | 1571.50 | 550 | 0 | 1571.43 | 550 | 0 | 1577.14 | 552 | 0 | 1977.14 | 692 | 0 |
| Base Rx Time Error Allwnc 2 END: | 1577.14 | 552 | 2 | 1577.14 | 552 | 2 | 1577.14 | 552 | 0 | | 692 | 0 |
| Mob 2 -> 1 Trans or Base R -> T Swtch START: | 1577.14 | 552 | 0 | 1577.14 | 552 | 0 | 1577.14 | 552 | 0 | 2000 0.00 | 692 | 0 |
| Mob 2 -> 1 Trans or Base R -> T Swtch END: | 1600.00 | 560 | 8 | 1600.00 | 560 | 8 | 1600.00 | 560 | 8 | | 700 | 8 |
| Leftovers (Better be Zero): | 0.00 | 0 | | 0.00 | 0 | | 0.00 | 0 | | | 0 | |

TABLE A-27

0.35 LF
Unspread FDD

Data Rates/RF Channel:

| | | | | | | | | |
|---|---|---|---|---|---|---|---|---|
| BW per RF Channel/Chip Rate (kHz): | 350 | 350 | 350 | 350 | 350 | 350 | 350 | 350 |
| Frequency Rouse Factor (N): | 6 | 6 | 6 | 6 | 6 | 6 | 6 | 6 |
| Minimum System Bandwidth (kHz): | 4200 | 4200 | 4200 | 4200 | 4200 | 4200 | 4200 | 4200 |
| S/I (dB): | 50 | 50 | 50 | 50 | 50 | 50 | 50 | 50 |
| Noise FIGURE G 290K (dB): | 4 | 4 | 4 | 4 | 4 | 4 | 4 | 4 |
| Antenna Temperature (K): | 300 | 300 | 300 | 300 | 300 | 300 | 300 | 300 |
| Sys kT inc. NF (dBm/Hz): | −169.9 | −169.9 | −169.9 | −169.9 | −169.9 | −169.9 | −169.9 | −169.9 |
| Sys kT inc. NF (mW/kHz): | 1E-14 | 1E-14 | 1E-14 | 1E-14 | 1E-14 | 1E-14 | 1E-14 | 1E-14 |
| Implimentation Loss (dB): | 3 | 3 | 3 | 3 | 3 | 3 | 3 | 3 |
| I/(S.BW) (num): | 2.9E-08 | 2.9E-08 | 2.9E-08 | 2.9E-08 | 2.9E-08 | 2.9E-08 | 2.9E-08 | 2.9E-08 |
| Mary NonCoher Format: | 2 | 2 | 2 | 2 | 2 | 2 | 2 | 2 |
| Bits per Symbol: | 1 | 1 | 1 | 1 | 1 | 1 | 1 | 1 |
| Required Frame Error Rate: | 1.0E-02 | 1.0E-02 | 1.0E-02 | 1.0E-02 | 1.0E-02 | 1.0E-02 | 1.0E-02 | 1.0E-02 |
| Frame Length for Kb/No Calc. (bits): | 200 | 200 | 200 | 200 | 200 | 200 | 200 | 200 |
| Actual Eqv. Frame Length (bits): | 150 | 205 | 205 | 205 | 205 | 205 | 205 | 205 |
| Antenna Diversity Factor: | 0 | 0 | 0 | 0 | 2 | 2 | 3 | 3 |
| Rake Diversity Factor: | 1 | 1 | 1 | 1 | 2 | 2 | 1.33333 | 1.33333 |
| Required Eb/No (dB): | 10.6404 | 10.6404 | 21.2716 | 21.2716 | 15.9373 | 15.9373 | 14.0081 | 14.0081 |
| I/Eb/NoL (num): | 0.04325 | 0.04325 | 0.00374 | 0.00374 | 0.01277 | 0.01277 | 0.01992 | 0.01992 |
| Sensitivity in S/I (dBm): | −100.84 | −100.84 | −90.19 | −90.19 | −95.54 | −95.54 | −97.47 | −97.47 |
| Sensitivity, Therm Noise Only (dBm): | −100.84 | −100.84 | −90.21 | −90.21 | −95.54 | −95.54 | −97.47 | −97.47 |

TABLE A-27-continued 0.35 LF
Unspread FDD

Data Rates/RF Channel:

| | | | | | | | | |
|---|---|---|---|---|---|---|---|---|
| S/I Induced Sensitivity Loss (dB): | 0.00 | 0.00 | 0.00 | 0.00 | 0.00 | 0.00 | 0.00 | 0.00 |
| Required Sensitivity in S/I (mW): | 8.2E-11 | 8.2E-11 | 9.6E-10 | 9.6E-10 | 2.8E-10 | 2.8E-10 | 2.8E-10 | 1.8E-10 |
| Max Simplex Data Rate (kbps): | 350.00 | 350.00 | 350.00 | 350.00 | 350.00 | 350.00 | 350.00 | 350.00 |
| Max Simplex Symbol Rate (ksps): | 350 | 350 | 350 | 350 | 350 | 350 | 350 | 350 |
| Chips per Symbol: | 1.00 | 1.00 | 1.00 | 1.00 | 1.00 | 1.00 | 1.00 | 1.00 |
| Symbol Duration (usec): | 2.857 | 2.857 | 2.87 | 2.87 | 2.857 | 2.857 | 2.857 | 2.857 |
| Chips per Bit: | 1.00 | 1.00 | 1.00 | 1.00 | 1.00 | 1.00 | 1.00 | 1.00 |
| Processing Gain per bit (dB): | 0.00 | 0.00 | 0.00 | 0.00 | 0.00 | 0.00 | 0.00 | 0.00 |

TABLE A-28

0.35 LF
Unspread FDD

| | | | dBm | | | dBm | | | dBm | | | dBm |
|---|---|---|---|---|---|---|---|---|---|---|---|---|
| S/(N + I) into A/D (dB): | 13.64 | 13.64 | | 24.27 | 24.27 | | 18.94 | 18.94 | | 17.01 | | 17.01 |
| S/N into A/D (dB): | 13.64 | 13.64 | | 24.28 | 24.28 | | 18.94 | 18.94 | | 17.01 | | 17.01 |
| Max Duplex Data Rate (kbps): | 129.38 | 168.13 | | 162.50 | 168.13 | | 162.50 | 168.13 | | 130.00 | | 134.50 |
| Pilot Channel Overhead (kbps): | 0.00 | 0.00 | | 0.00 | 0.00 | | 0.00 | 0.00 | | 0.00 | | 0.00 |
| Bearer Channel Duplex Rate (kbps): | 129.38 | 168.13 | | 162.50 | 168.13 | | 162.50 | 168.13 | | 130.00 | | 134.50 |
| Link Asymmetry Factor (dB): | | 0.00 | | | 0.00 | | | 0.00 | | | | 0.00 |
| Unspread FDD | | | | | | | | | | | | |
| Voice Channel/GOS Calculations: | | | | | | | | | | | | |
| Vocoder Rate (kbps): | 8.00 | 8.00 | | 8.00 | 8.00 | | 8.00 | 8.00 | | 8.00 | | 8.00 |
| Overhead Rate per Vocoder (kbps): | 0.00 | 0.00 | | 0.00 | 0.00 | | 0.00 | 0.00 | | 0.00 | | 0.00 |
| Data Rate per Voice Circuit (kpbs): | 8.00 | 8.00 | | 8.00 | 8.00 | | 8.00 | 8.00 | | 8.00 | | 8.00 |
| Number of RP Channels/Sector | 1 | 1 | | 1 | 1 | | 1 | 1 | | 1 | | 1 |
| Deployed System Bandwidth (MHz): | 4.20 | 4.20 | | 4.20 | 4.20 | | 4.20 | 4.20 | | 4.20 | | 4.20 |
| Max Number Voice Channels Supported: | 16.4 | 25.0 | | 25.0 | 25.0 | | 25.0 | 25.0 | | 25.0 | | 20.0 |
| Percentage of Handsets in TSI/HO: | 25.00% | 25.00% | | 25.00% | 25.00% | | 25.00% | 25.00% | | 25.00% | | 25.00% |
| Erlangs Supported at 1% GOS: | 7.77 | 14.11 | | 14.11 | 14.11 | | 14.11 | 14.11 | | 10.53 | | 10.53 |
| Erlangs Supported at 2% GOS: | 8.60 | 15.32 | | 15.32 | 15.32 | | 15.32 | 15.32 | | 11.53 | | 11.53 |
| Single Tandem Framing Delay (msec): | 20.00 | 20.00 | | 20.00 | 20.00 | | 20.00 | 20.00 | | 20.00 | | 20.00 |
| Dual Tandem Framing Delay (msec): | 40.00 | 40.00 | | 40.00 | 40.00 | | 40.00 | 40.00 | | 40.00 | | 40.00 |
| Base Station Transmit Duty Cycle: | 96.07% | 96.07% | | 96.07% | 96.07% | | 96.07% | 96.07 | | 76.86% | | 76.86% |
| Handset Single Slot Tx Duty Cycle: | 4.46% | 4.46% | | 3.71% | 3.71% | | 3.71% | 3.71% | | 3.71% | | 3.71% |
| Capacity Calculations: | | | | | | | | | | | | |
| Handset Peak Transmit Power (mW): | 300.00 | 300.00 | 24.8 | 300.00 | 300.00 | 24.8 | 300.00 | 300.00 | 24.8 | 300.00 | 300 | 24.8 |
| Handset Average Transmit Power (mW): | 13.39 | 13.39 | 11.3 | 11.14 | 11.14 | 10.5 | 11.14 | 11.14 | 10.5 | 11.14 | 11.14 | 10.5 |
| Handset Antenna Gain (dBd): | 0.00 | 0.00 | | 0.00 | 0.00 | | 0.00 | 0.00 | | 0.00 | 0.00 | |
| Base Peak Transmit Power (mW): | | 300.00 | 24.8 | | 300.00 | 24.8 | | 300.00 | 24.8 | | 300 | 24.8 |
| Base Average Transmit Power (mW): | | 288.21 | 24.6 | | 288.21 | 24.6 | | 288.21 | 24.6 | | 230.57 | 23.6 |
| Base Antenna Gain (dBd): | 17.00 | 17.00 | | 17.00 | 17.00 | | 17.00 | 17.00 | | 17.00 | 17.00 | |
| Num Geographic Sectors (1 Base/Sector): | 3 | 3 | | 3 | 3 | | 3 | 3 | | 3 | | 3 |
| Sector Loss Due to Antenna Overlap: | 15.0% | 15.0% | | 15.0% | 15.0% | | 15.0% | 15.0% | | 15.0% | | 15.0% |
| Net Sectorization Gain in Capacity: | 2.55 | 2.55 | | 2.55 | 2.55 | | 2.55 | 2.55 | | 2.55 | | 2.55 |
| Total Number of RF Channels at Site: | 3 | 3 | | 3 | 3 | | 3 | 3 | | 3 | | 3 |
| 1% GOS Erlangs Handeled at Site: | 19.80 | 35.98 | | 35.98 | 35.98 | | 35.98 | 35.98 | | 26.84 | | 26.84 |
| 2% GOS Erlangs Haneled at Site: | 21.93 | 39.06 | | 39.06 | 39.06 | | 39.06 | 39.06 | | 29.41 | | 29.41 |

What is claimed is:

1. A base station for use in wireless communication, comprising state control circuitry, said state control circuitry generating a repetitive clock signal defining a plurality of time frames, and a plurality of time slots defined by said clock signal in each time frame, each time slot defined by a base transmission interval reserved for a base station to transmit over a designated frequency band a base-to-user message to one of a plurality of user stations, and a user transmission interval reserved for one of said user stations to transmit a user-to-base message to said base station over said designated frequency band, wherein a first forward link transmission and a first reverse link transmission between said base station and a first user station of said plurality of user stations are separated by a number of intervening forward or reverse link communications, said number being variable according to a command from said base station.

2. The base station of claim 1 wherein said first forward link transmission and said first reverse link transmission are separated by an amount of time sufficient to allow propagation of said first forward link transmission to a forward link destination and propagation of said first reverse link transmission to a reverse link destination.

3. The base station of claim 2 wherein said forward link destination is said first user station, and said reverse link destination is said base station.

4. The base station of claim 3 wherein said clock signal further comprises a preamble interval preceding said first forward link transmission, during which a control pulse preamble is received by said base station from said first user station.

5. The base station of claim 2 wherein said forward link destination is said base station, and said reverse link destination is said first user station.

6. The base station of claim 1 wherein said base-to-user messages periodically comprise a timing adjustment command whereby a time for transmitting said user-to-base messages is adjusted.

7. A method of wireless communication comprising
transmitting, over a designated frequency band and in a first time interval of a time frame, a first base message from a base station directed to a first user station,
receiving said first base message at said first user station,
transmitting from a second user station, over said designated frequency band, a first user message directed to said base station,
receiving said first user message at said base station in a second time interval of said time frame,
transmitting, over said designated frequency band and in a third time interval of said time frame, a second base message from said base station to a third user station,
transmitting from said first user station, over said designated frequency band, a second user message directed to said base station, and
receiving said second user message at said base station in a fourth time interval of said time frame, wherein a number of time intervals between said first time interval and said fourth time interval is variable according to a command from said base station.

8. The method of claim 7 wherein a time between transmitting said first base message and receiving said second user message is sufficient to allow said first base message to propagate from said base station to said first user station, and said second user message to propagate from said first user station to said base station.

9. The method of claim 7 wherein at least one of said first user message, said second user message, said first base message, and said second base message is encoded using a spread spectrum technique.

10. The method of claim 7 further comprising the steps of
calculating at said base station, based on a time of receiving said second user message at said base station, a distance of said first user station relative to said base station, and
transmitting, in a subsequent time frame, a third base message from said base station directed to said first user station, said third base message comprising a timing adjustment commands whereby a time for transmitting a subsequent message from said first user station directed to said base station over said designated frequency is advanced or retarded.

11. The method of claim 7 further comprising the step of transmitting, prior to said step of transmitting said first base message to said first user station, a control pulse preamble over said designated frequency band from said first user station to said base station.

12. A method of wireless communication comprising transmitting, during a first time slot of a time frame, a first base-to-user message from a base station directed to a first user station,
receiving, during said first time slot, a first user-to-base message at said base station from a second user station,
receiving, during said first time slot after said first user-to-base message, a control pulse preamble at said base station from a third user station,
transmitting, during a second time slot of said time frame, a second base-to-user message from said base station directed to said third user station, and
receiving, during said second time slot, a second user-to-base message at said base station from said first user station.

13. The method of claim 12 further comprising the step of receiving, after said second user-to-base message in said second time slot, a second control pulse preamble at said base station from a fourth user station.

14. The method of claim 12 further comprising the step of calculating at said base station, based on a time of receiving said control pulse preamble at said base station, a distance of said third user station relative to said base station, and wherein said second base-to-user message comprises a timing adjustment command whereby a time of transmitting subsequent messages from said third user station directed to said base station is advanced or retarded.

15. The method of claim 12 further comprising the steps of
calculating at said base station, based on a time of receiving said second user-to-base message at said base station, a distance of said first user station relative to said base station, and
transmitting, in a subsequent time frame, a third base-to-user message from said base station directed to said first user station, said third base message comprising a timing adjustment command whereby a time for transmitting a subsequent message from said first user station directed to said base station is advanced or retarded.

16. A method of wireless communication, comprising
receiving, over a designated frequency band, a first control pulse preamble at a base station from a first user station,
transmitting, over said designated frequency band, a first base-to-user message from said base station to said first user station, and
after a time interval of sufficient duration to receive a first user-to-base message at said base station from a second user station, transmitting a second base-to-user message from said base station, and receiving a second control pulse preamble at said base station from a third user station, wherein said base station is capable of responding to said third user station in an adjacent time slot.

17. The method of claim 16 wherein said first base-to-user message comprises a timing adjustment command.

18. The method of claim 17 wherein, in response to said timing adjustment command, a time for transmitting subsequent messages from said first user station are advanced or retarded by an amount of time specified by said timing adjustment command.

19. The method of claim 16 wherein at least one of said first base-to-user message and said second user-to-base message is encoded using a spread spectrum technique.

20. A base station for use in wireless communication, comprising state control circuitry, said state control circuitry generating a repetitive clock signal defining a plurality of time frames, and said clock signal further defining a plurality of time slots in each time frame, each of said time slots being defined by said clock signal into a base message interval reserved for transmission of a base-to-user message over a predetermined frequency band by a base station to a first user station in established communication with said base station, a user message interval reserved for reception of a user-to-base message over said predetermined frequency band at said base station from a second user station in established communication with said base station, and a preamble interval reserved for reception of a control pulse preamble over said predetermined frequency band from a third user station in established communication with said base station, whereby said base station is configured to be able to respond to said third base station in an immediately following time slot.

21. The base station of claim 20 wherein said base-to-user message comprises a timing adjustment command.

22. The base station of claim 21 wherein, in response to said timing adjustment command, a time for transmitting subsequent messages from said first user station are advanced or retarded by an amount of time specified by said timing adjustment command.

23. The base station of claim 20 wherein at least one of said base-to-user message and said user-to-base message is encoded using a spread spectrum technique.

24. A base station for carrying out wireless communication, comprising state control circuitry, said state control circuitry generating a repetitive clock signal defining a plurality of time frames, and said clock signal further defining a plurality of time slots in each of said time frames, said clock signal defining in each of said time slots a base interval, reserved for transmission of either a base-to-user message sent by said base station to a first user station in established communication with said base station during said time slot, or a general polling message transmitted by said base station indicating availability of said time slot for communication, a user interval, reserved for reception of either a user-to-base message at said base station from a second user station in established communication with said base station, or a reply message at said base station from a third user station seeking to establish communication with said base station, and a preamble interval reserved for reception of a control pulse preamble from a fourth user station in established communication with said base station, whereby said base station is capable of responding to said fourth base station in an immediately following time slot.

25. The base station of claim 24 wherein said base interval occurs prior to said user interval.

26. The base station of claim 24 wherein said base-to-user message comprises a timing adjustment command directed to said first user station.

27. The base station of claim 26 wherein, in response to said timing adjustment command, a time for transmitting subsequent messages from said first user station are advanced or retarded by an amount of time specified by said timing adjustment command.

28. The base station of claim 24 wherein at least one of said base-to-user message and said user-to-base message is encoded using spread spectrum.

29. The base station of claim 24 wherein, in response to receiving said reply message at said base station from said third user station, said base station transmits a timing adjustment command to said third user station.

30. A user station for use in wireless communication, comprising state control circuitry, said state control circuitry generating a repetitive clock signal defining a plurality of time frames, and a plurality of time slots defined by said clock signal in each time frame, each time slot defined by a base transmission interval reserved for a base station to transmit over a designated frequency band a base-to-user message to one of a plurality of user stations, and a user transmission interval reserved for one of said user stations to transmit a user-to-base message to said base station over said designated frequency band, wherein a first forward link transmission and a first reverse link transmission between said base station and a first user station are separated by a number of intervening forward or reverse link communications, said number being variable according to a command from said base station.

31. The user station of claim 30 wherein said first forward link transmission and said first reverse link transmission are separated by an amount of time sufficient to allow propagation of said first forward link transmission to a forward link destination and propagation of said first reverse link transmission to a reverse link destination.

32. The user station of claim 31 wherein said forward link destination is said first user station, and said reverse link destination is said base station.

33. The user station of claim 32 wherein said clock signal further comprises a preamble interval preceding said first forward link transmission, during which a control pulse preamble is received by said base station from said first user station.

34. The user station of claim 31 wherein said forward link destination is said base station, and said reverse link destination is said first user station.

35. The user station of claim 30 wherein said base-to-user messages periodically comprise a timing adjustment command whereby a time for transmitting said user-to-base messages is adjusted.

36. A user station for use in wireless communication, comprising state control circuitry, said state control circuitry generating a repetitive clock signal defining a plurality of time frames, and said clock signal further defining a plurality of time slots in each time frame, each of said time slots being further defined into by said clock signal into a base message interval reserved for transmission of a base-to-user message over a predetermined frequency band by a base station to a first user station in established communication with said base station, a user message interval reserved for reception of a user-to-base message over said predetermined frequency band at said base station from a second user station in established communication with said base station, and a preamble interval reserved for reception of a control pulse preamble over said predetermined frequency band from a third user station in established communication with said base station, whereby said base station is configured to be able to respond to said third base station in an immediately following time slot.

37. The user station of claim 36 wherein said base-to-user message comprises a timing adjustment command.

38. The user station of claim 37 wherein, in response to said timing adjustment command, a time for transmitting subsequent messages from said first user station are advanced or retarded by an amount of time specified by said timing adjustment command.

39. The user station of claim 38 wherein at least one of said base-to-user message and said user-to-base message is encoded using a spread spectrum technique.

40. A user station for carrying out wireless communication, comprising state control circuitry, said state control circuitry generating a repetitive clock signal defining a plurality of time frames, and said clock signal further defining a plurality of time slots in each of said time frames, said clock signal defining in each of said time slots a base interval, reserved for transmission of either a base-to-user message sent by said base station to a first user station in established communication with said base station during said time slot, or a general polling message transmitted by said base station indicating availability of said time slot for communication, a user interval, reserved for reception of either a user-to-base message at said base station from a second user station in established communication with said base station, or a reply message at said base station from a third user station seeking to establish communication with said base station, and a preamble interval reserved for reception of a control pulse preamble from a fourth user station in established communication with said base station, whereby said base station is capable of responding to said fourth base station in an immediately following time slot.

41. The user station of claim 40 wherein said base interval occurs prior to said user interval.

42. The user station of claim 40 wherein said base-to-user message comprises a timing adjustment command directed to said first user station.

43. The user station of claim 42 wherein, in response to said timing adjustment command, a time for transmitting subsequent messages from said first user station are advanced or retarded by an amount of time specified by said timing adjustment command.

44. The user station of claim 40 wherein at least one of said base-to-user message and said user-to-base message is encoded using spread spectrum.

45. The user station of claim 40 wherein, in response to receiving said reply message at said base station from said third user station, said base station transmits a timing adjustment command to said third user station.

* * * * *